US012769431B2

(12) United States Patent
Shutzberg et al.

(10) Patent No.: US 12,769,431 B2
(45) Date of Patent: Oct. 20, 2026

(54) DEVICES, METHODS, AND GRAPHICAL USER INTERFACES FOR DETECTING INPUTS

(71) Applicant: Apple Inc., Cupertino, CA (US)

(72) Inventors: Julian K. Shutzberg, San Francisco, CA (US); Nima Parivar, Burlingame, CA (US)

(73) Assignee: APPLE INC., Cupterino, CA (US)

( * ) Notice: Subject to any disclaimer, the term of this patent is extended or adjusted under 35 U.S.C. 154(b) by 254 days.

(21) Appl. No.: 18/616,383

(22) Filed: Mar. 26, 2024

(65) Prior Publication Data

US 2024/0402862 A1 Dec. 5, 2024

Related U.S. Application Data

(60) Provisional application No. 63/471,052, filed on Jun. 5, 2023.

(51) Int. Cl.
*G06F 3/0481* (2022.01)
*G06F 3/01* (2006.01)

(52) U.S. Cl.
CPC ............ *G06F 3/0481* (2013.01); *G06F 3/013* (2013.01); *G06F 3/017* (2013.01)

(58) Field of Classification Search
CPC ........ G06F 3/0481; G06F 3/013; G06F 3/017; G06F 3/04842
See application file for complete search history.

(56) References Cited

U.S. PATENT DOCUMENTS

| | | | |
|---|---|---|---|
| 8,452,600 B2 | 5/2013 | Fleizach | |
| 9,294,819 B2 | 3/2016 | Lee et al. | |
| 9,483,113 B1 * | 11/2016 | Fowers | G02B 27/0093 |
| 9,804,733 B2 | 10/2017 | Walline et al. | |
| 10,372,205 B2 * | 8/2019 | Young | G06F 3/013 |
| 10,489,459 B1 | 11/2019 | Jastrzebski et al. | |
| 10,860,098 B1 * | 12/2020 | Stratton | G06V 40/193 |
| 10,997,963 B1 | 5/2021 | Baligar et al. | |
| 11,231,777 B2 * | 1/2022 | Lee | G06F 3/017 |
| 11,934,569 B2 | 3/2024 | Pastrana Vicente et al. | |
| 2009/0123046 A1 | 5/2009 | Mielekamp et al. | |
| 2011/0197147 A1 | 8/2011 | Fai | |

(Continued)

FOREIGN PATENT DOCUMENTS

| | | |
|---|---|---|
| AU | 2021239971 A1 | 9/2022 |
| CN | 117873325 A | 4/2024 |

(Continued)

OTHER PUBLICATIONS

"2GIG Edge™ Security & Smart Home System—User Guide"; https:/2gig.com/wp-content/uploads/10029908-Rev-A-2GIG-Edge-User-Guide-0322_WEB.pdf; Nortek Security & Control LLC; © 2021; 60 pages.

(Continued)

*Primary Examiner* — Justin R. Blaufeld
(74) *Attorney, Agent, or Firm* — Kyle B. Morse; BAKERHOSTETLER

(57) ABSTRACT

The present disclosure generally relates to managing inputs. In some examples, one or more techniques are described, such as managing location-defined inputs, enabling certain inputs, interacting with locked objects, interacting with interface objects, virtual controller-based inputs, and gaze directed inputs.

36 Claims, 62 Drawing Sheets

(56) References Cited

U.S. PATENT DOCUMENTS

| | | | | |
|---|---|---|---|---|
| 2012/0272179 | A1* | 10/2012 | Stafford | G06F 3/0482 345/157 |
| 2012/0293519 | A1 | 11/2012 | Ribble et al. | |
| 2013/0019178 | A1 | 1/2013 | Morikawa et al. | |
| 2013/0159939 | A1 | 6/2013 | Krishnamurthi | |
| 2013/0162530 | A1 | 6/2013 | Takahashi | |
| 2014/0079247 | A1 | 3/2014 | Sanders | |
| 2014/0136518 | A1 | 5/2014 | Shum et al. | |
| 2014/0359651 | A1 | 12/2014 | Lee et al. | |
| 2015/0131855 | A1 | 5/2015 | Hanzawa et al. | |
| 2015/0254905 | A1 | 9/2015 | Ramsby et al. | |
| 2015/0338651 | A1* | 11/2015 | Wang | G06F 1/163 345/8 |
| 2017/0103574 | A1* | 4/2017 | Faaborg | G06T 19/006 |
| 2017/0150139 | A1 | 5/2017 | Lee et al. | |
| 2017/0262168 | A1* | 9/2017 | Xu | G06F 3/04883 |
| 2018/0046352 | A1 | 2/2018 | Johnson et al. | |
| 2018/0081447 | A1 | 3/2018 | Gummadi et al. | |
| 2018/0284872 | A1 | 10/2018 | Schluessler et al. | |
| 2018/0330515 | A1 | 11/2018 | Stall et al. | |
| 2019/0197785 | A1 | 6/2019 | Tate-Gans et al. | |
| 2019/0247130 | A1 | 8/2019 | State et al. | |
| 2019/0342425 | A1 | 11/2019 | Cheng et al. | |
| 2020/0082493 | A1 | 3/2020 | Wang et al. | |
| 2020/0249752 | A1* | 8/2020 | Parshionikar | G06F 3/016 |
| 2020/0320794 | A1 | 10/2020 | Huang et al. | |
| 2021/0041956 | A1 | 2/2021 | Hasburgh | |
| 2021/0089132 | A1 | 3/2021 | Mathur | |
| 2021/0096726 | A1* | 4/2021 | Faulkner | G06F 3/011 |
| 2022/0137713 | A1 | 5/2022 | Hu et al. | |
| 2022/0214857 | A1 | 7/2022 | Lambourne et al. | |
| 2022/0229534 | A1 | 7/2022 | Terre et al. | |
| 2022/0253139 | A1 | 8/2022 | Berliner et al. | |
| 2023/0074380 | A1 | 3/2023 | Kim et al. | |
| 2023/0094522 | A1 | 3/2023 | Stauber et al. | |
| 2023/0100689 | A1 | 3/2023 | Chiu et al. | |
| 2023/0146384 | A1 | 5/2023 | Terre et al. | |
| 2023/0152935 | A1 | 5/2023 | McKenzie et al. | |
| 2023/0165639 | A1 | 6/2023 | Dulin et al. | |
| 2023/0315247 | A1 | 10/2023 | Vicente et al. | |
| 2025/0271856 | A1 | 8/2025 | Von Volkmann et al. | |
| 2025/0301556 | A1 | 9/2025 | Mouilleseaux et al. | |

FOREIGN PATENT DOCUMENTS

| | | | | |
|---|---|---|---|---|
| EP | 3265883 | B1 | 2/2023 | |
| WO | WO-2021073743 | A1 * | 4/2021 | G06F 3/013 |
| WO | WO 2022/055822 | A1 | 3/2022 | |
| WO | WO 2023/014618 | A1 | 2/2023 | |

OTHER PUBLICATIONS

"Get Back to Work Safely"; https://www.anviz.com/gel-back-to-work-safely.html; Anviz Global Inc.; © 2023; accessed Sep. 10, 2024; 5 pages.

"Top 7 Use Cases for Facial Recognition in 2023"; https://www.cyberlink.com/faceme/insights/articles/228/how-to-use-facial-recognition; FaceMe; Mar. 2023; accessed Sep. 10, 2024; 12 pages.

International Patent Application No. PCT/US2024/030462; Invitation to Pay Add'l Fees; dated Aug. 9, 2024; 14 pages.

International Patent Application No. PCT/US2024/029952; Int'l Search Report and the Written Opinion; dated Sep. 12, 2024; 12 pages.

International Patent Application No. PCT/US2024/030181; Invitation to Pay Additional Fees; dated Sep. 10, 2024; 14 pages.

International Patent Application No. PCT/US2024/032401; Invitation to Pay Add'l Fees; Aug. 23, 2024 17 pages.

European Patent Application No. 25180819.2; Extended Search Report; dated Aug. 14, 2025; 10 pages.

United States U.S. Appl. No. 18/619,568; Non-Final Office Action; dated Nov. 28, 2025; 19 pages.

Huynh et al.; "Layerable Apps: Comparing Concurrent and Exclusive Display of Augmented Reality Applications"; IEEE Int'l Symposium on Mixed and Augmented Reality; 2022; p. 857-863.

International Patent Application No. PCT/US2024/029855; Int'l Search Report and the Written Opinion; dated Sep. 18, 2024; 13 pages.

International Patent Application No. PCT/US2024/030462; Int'l Search Report and the Written Opinion; dated Sep. 30, 2024; 21 pages.

International Patent Application No. PCT/US2024/032394; Invitation to Pay Add'l Fees; dated Sep. 25, 2024; 20 pages.

International Patent Application No. PCT/US2024/032401; Int'l Search Report and the Written Opinion; dated Oct. 14, 2024; 16 pages.

International Patent Application No. PCT/US2024/030181; Int'l Search Report and the Written Opinion; dated Oct. 31, 2024; 21 pages.

International Patent Application No. PCT/US2024/032394; Int'l Search Report and the Written Opinion; dated Nov. 15, 2024; 23 pages.

International Patent Application No. PCT/US2024/047378; Invitation to Pay Add'l Fees; dated Dec. 20, 2024; 13 pages.

International Patent Application No. PCT/US2024/047378; Int'l Search Report and the Written Opinion; dated Feb. 10, 2025; 22 pages.

European Patent Application No. 25150841.2; Extended Search Report; dated Feb. 18, 2025; 10 pages.

European Patent Application No. 25180843.2; Extended Search Report; dated Jul. 14, 2025; 11 pages.

U.S. Appl. No. 18/799,489; Non-Final Office Action; dated Dec. 11, 2025; 16 pages.

* cited by examiner

DEVICES, METHODS, AND GRAPHICAL USER INTERFACES FOR DETECTING INPUTS

CROSS-REFERENCE TO RELATED APPLICATIONS

The present application claims priority to U.S. Provisional Patent Application Ser. No. 63/471,052 entitled "DEVICES, METHODS, AND GRAPHICAL USER INTERFACES FOR DETECTING INPUTS," filed Jun. 5, 2023, which is hereby incorporated by reference in its entirety for all purposes.

TECHNICAL FIELD

The present disclosure relates generally to computer systems that provide computer-generated experiences, including, but not limited to, electronic devices that provide virtual reality and mixed reality experiences.

BACKGROUND

The development of computer systems for augmented reality has increased significantly in recent years. Example augmented reality environments include at least some virtual elements that replace or augment the physical world. Input devices, such as cameras, controllers, joysticks, touch-sensitive surfaces, and touch-screen displays for computer systems and other electronic computing devices are used to interact with virtual/augmented reality environments. Example virtual elements include virtual objects, such as digital images, video, text, icons, overlays, and control elements such as buttons and other graphics.

SUMMARY

Some methods and interfaces for detecting inputs are cumbersome, inefficient, and/or limited. For example, systems that detect inputs often do not properly disambiguate between whether or not an input is intended to cause a computer system to perform an operation to achieve a desired outcome in an augmented reality environment, and systems in which manipulation of virtual objects are complex, tedious, and error-prone create a significant cognitive burden on a user and detract from the experience with the virtual/augmented reality environment. In addition, these methods take longer than necessary, thereby wasting energy of the computer system. This latter consideration is particularly important in battery-operated devices.

Accordingly, there is a need for computer systems with improved methods and interfaces for providing computer-generated experiences to users that make interaction with virtual objects displayed via the computer systems more efficient and intuitive for a user. Such methods and interfaces optionally complement or replace conventional methods detecting inputs. Such methods and interfaces reduce the number, extent, and/or nature of the inputs from a user by helping the user to understand the connection between provided inputs and device responses to the inputs, thereby creating a more efficient human-machine interface.

The above deficiencies and other problems associated with user interfaces for computer systems are reduced or eliminated by the disclosed systems. In some embodiments, the computer system is a desktop computer with an associated display. In some embodiments, the computer system is portable device (e.g., a notebook computer, tablet computer, or handheld device). In some embodiments, the computer system is a personal electronic device (e.g., a wearable electronic device, such as a watch, or a head-mounted device). In some embodiments, the computer system has a touchpad. In some embodiments, the computer system has one or more cameras. In some embodiments, the computer system has a touch-sensitive display (also known as a "touch screen" or "touch-screen display"). In some embodiments, the computer system has one or more eye-tracking components. In some embodiments, the computer system has one or more hand-tracking components. In some embodiments, the computer system has one or more output devices in addition to the display generation component, the output devices including one or more tactile output generators and/or one or more audio output devices. In some embodiments, the computer system has a graphical user interface (GUI), one or more processors, memory and one or more modules, programs or sets of instructions stored in the memory for performing multiple functions. In some embodiments, the user interacts with the GUI through a stylus and/or finger contacts and gestures on the touch-sensitive surface, movement of the user's eyes and hand in space relative to the GUI (and/or computer system) or the user's body as captured by cameras and other movement sensors, and/or voice inputs as captured by one or more audio input devices. In some embodiments, the functions performed through the interactions optionally include image editing, drawing, presenting, word processing, spreadsheet making, game playing, telephoning, video conferencing, e-mailing, instant messaging, workout support, digital photographing, digital videoing, web browsing, digital music playing, note taking, and/or digital video playing. Executable instructions for performing these functions are, optionally, included in a transitory and/or non-transitory computer readable storage medium or other computer program product configured for execution by one or more processors.

There is a need for computer systems with improved methods and interfaces for managing overlays that are visible within a three-dimensional environment. Such methods and interfaces may complement or replace conventional methods for managing overlays that are visible within a three-dimensional environment. Such methods and interfaces reduce the number, extent, and/or the nature of the inputs from a user and produce a more efficient human-machine interface. For battery-operated computing devices, such methods and interfaces conserve power and increase the time between battery charges.

In some examples, a method that is performed at a computer system is described. In some examples, the method comprises: detecting an input performed by a portion of a user relative to a three-dimensional environment; and in response to detecting the input: in accordance with a determination that the input was performed at a first location relative to the three-dimensional environment, performing an operation based on the input; and in accordance with a determination that the input was performed at a second location in the three-dimensional environment, wherein the second location is different from the first location, forgoing performing the operation based on the input.

In some examples, a non-transitory computer-readable storage medium storing one or more programs configured to be executed by one or more processors of a computer system is described. In some examples, the one or more programs includes instructions for: detecting an input performed by a portion of a user relative to a three-dimensional environment; and in response to detecting the input: in accordance with a determination that the input was performed at a first location relative to the three-dimensional environment, performing an operation based on the input; and in accordance with a determination that the input was performed at a second location in the three-dimensional environment, wherein the second location is different from the first location, forgoing performing the operation based on the input.

In some examples, a transitory computer-readable storage medium storing one or more programs configured to be executed by one or more processors of a computer system is described. In some examples, the one or more programs includes instructions for: detecting an input performed by a portion of a user relative to a three-dimensional environment; and in response to detecting the input: in accordance with a determination that the input was performed at a first location relative to the three-dimensional environment, performing an operation based on the input; and in accordance with a determination that the input was performed at a second location in the three-dimensional environment, wherein the second location is different from the first location, forgoing performing the operation based on the input.

In some examples, a computer system is described. In some examples, the computer system comprises one or more processors and memory storing one or more programs configured to be executed by the one or more processors. In some examples, the one or more programs includes instructions for: detecting an input performed by a portion of a user relative to a three-dimensional environment; and in response to detecting the input: in accordance with a determination that the input was performed at a first location relative to the three-dimensional environment, performing an operation based on the input; and in accordance with a determination that the input was performed at a second location in the three-dimensional environment, wherein the second location is different from the first location, forgoing performing the operation based on the input.

In some examples, a computer system is described. In some examples, the computer system comprises means for performing each of the following steps: detecting an input performed by a portion of a user relative to a three-dimensional environment; and in response to detecting the input: in accordance with a determination that the input was performed at a first location relative to the three-dimensional environment, performing an operation based on the input; and in accordance with a determination that the input was performed at a second location in the three-dimensional environment, wherein the second location is different from the first location, forgoing performing the operation based on the input.

In some examples, a computer program product is described. In some examples, the computer program product comprises one or more programs configured to be executed by one or more processors of a computer system. In some examples, the one or more programs include instructions for: detecting an input performed by a portion of a user relative to a three-dimensional environment; and in response to detecting the input: in accordance with a determination that the input was performed at a first location relative to the three-dimensional environment, performing an operation based on the input; and in accordance with a determination that the input was performed at a second location in the three-dimensional environment, wherein the second location is different from the first location, forgoing performing the operation based on the input.

In some examples, a method that is performed at a computer system that is in communication with one or more input devices is described. In some examples, the method comprises: detecting, via the one or more input devices, an input performed by a portion of the user that is directed to a user interface object; and in response to detecting the input: in accordance with a determination that the portion of the user is enabled to be used as input, performing an operation; and in accordance with a determination that the portion of the user is not enabled to be used as input, forgoing performing the operation.

In some examples, a non-transitory computer-readable storage medium storing one or more programs configured to be executed by one or more processors of a computer system that is in communication with one or more input devices is described. In some examples, the one or more programs includes instructions for: detecting, via the one or more input devices, an input performed by a portion of the user that is directed to a user interface object; and in response to detecting the input: in accordance with a determination that the portion of the user is enabled to be used as input, performing an operation; and in accordance with a determination that the portion of the user is not enabled to be used as input, forgoing performing the operation.

In some examples, a transitory computer-readable storage medium storing one or more programs configured to be executed by one or more processors of a computer system that is in communication with one or more input devices is described. In some examples, the one or more programs includes instructions for: detecting, via the one or more input devices, an input performed by a portion of the user that is directed to a user interface object; and in response to detecting the input: in accordance with a determination that the portion of the user is enabled to be used as input, performing an operation; and in accordance with a determination that the portion of the user is not enabled to be used as input, forgoing performing the operation.

In some examples, a computer system that is in communication with one or more input devices is described. In some examples, the computer system comprises one or more processors and memory storing one or more programs configured to be executed by the one or more processors. In some examples, the one or more programs includes instructions for: detecting, via the one or more input devices, an input performed by a portion of the user that is directed to a user interface object; and in response to detecting the input: in accordance with a determination that the portion of the user is enabled to be used as input, performing an operation; and in accordance with a determination that the portion of the user is not enabled to be used as input, forgoing performing the operation.

In some examples, a computer system that is in communication with one or more input devices is described. In some examples, the computer system comprises means for performing each of the following steps: detecting, via the one or more input devices, an input performed by a portion of the user that is directed to a user interface object; and in response to detecting the input: in accordance with a determination that the portion of the user is enabled to be used as input, performing an operation; and in accordance with a determination that the portion of the user is not enabled to be used as input, forgoing performing the operation.

In some examples, a computer program product is described. In some examples, the computer program product comprises one or more programs configured to be executed by one or more processors of a computer system that is in communication with one or more input devices. In some examples, the one or more programs include instructions for: detecting, via the one or more input devices, an input performed by a portion of the user that is directed to a user interface object; and in response to detecting the input: in accordance with a determination that the portion of the user is enabled to be used as input, performing an operation; and in accordance with a determination that the portion of the user is not enabled to be used as input, forgoing performing the operation.

In some examples, a method that is performed at a computer system that is in communication with one or more input devices is described. In some examples, the method comprises: detecting, via the one or more input devices, a first input performed by a portion of a user that is directed to a user interface object in a three-dimensional environment, wherein the first input is an air gesture; and in response to detecting the first input: in accordance with a determination that the user interface object is operating in an unlocked state, performing an operation based on the first input; and in accordance with a determination that the user interface object is operating in a locked state, forgoing performing the operation.

In some examples, a non-transitory computer-readable storage medium storing one or more programs configured to be executed by one or more processors of a computer system that is in communication with one or more input devices is described. In some examples, the one or more programs includes instructions for: detecting, via the one or more input devices, a first input performed by a portion of a user that is directed to a user interface object in a three-dimensional environment, wherein the first input is an air gesture; and in response to detecting the first input: in accordance with a determination that the user interface object is operating in an unlocked state, performing an operation based on the first input; and in accordance with a determination that the user interface object is operating in a locked state, forgoing performing the operation.

In some examples, a transitory computer-readable storage medium storing one or more programs configured to be executed by one or more processors of a computer system that is in communication with one or more input devices is described. In some examples, the one or more programs includes instructions for: detecting, via the one or more input devices, a first input performed by a portion of a user that is directed to a user interface object in a three-dimensional environment, wherein the first input is an air gesture; and in response to detecting the first input: in accordance with a determination that the user interface object is operating in an unlocked state, performing an operation based on the first input; and in accordance with a determination that the user interface object is operating in a locked state, forgoing performing the operation.

In some examples, a computer system that is in communication with one or more input devices is described. In some examples, the computer system comprises one or more processors and memory storing one or more programs configured to be executed by the one or more processors. In some examples, the one or more programs includes instructions for: detecting, via the one or more input devices, a first input performed by a portion of a user that is directed to a user interface object in a three-dimensional environment, wherein the first input is an air gesture; and in response to detecting the first input: in accordance with a determination that the user interface object is operating in an unlocked state, performing an operation based on the first input; and in accordance with a determination that the user interface object is operating in a locked state, forgoing performing the operation.

In some examples, a computer system that is in communication with one or more input devices is described. In some examples, the computer system comprises means for performing each of the following steps: detecting, via the one or more input devices, a first input performed by a portion of a user that is directed to a user interface object in a three-dimensional environment, wherein the first input is an air gesture; and in response to detecting the first input: in accordance with a determination that the user interface object is operating in an unlocked state, performing an operation based on the first input; and in accordance with a determination that the user interface object is operating in a locked state, forgoing performing the operation.

In some examples, a computer program product is described. In some examples, the computer program product comprises one or more programs configured to be executed by one or more processors of a computer system that is in communication with one or more input devices. In some examples, the one or more programs include instructions for: detecting, via the one or more input devices, a first input performed by a portion of a user that is directed to a user interface object in a three-dimensional environment, wherein the first input is an air gesture; and in response to detecting the first input: in accordance with a determination that the user interface object is operating in an unlocked state, performing an operation based on the first input; and in accordance with a determination that the user interface object is operating in a locked state, forgoing performing the operation.

In some examples, a method that is performed at a computer system that is in communication with one or more input devices is described. In some examples, the method comprises: while detecting that attention of the user is directed to a user interface element, detecting, via the one or more input devices, an air gesture; and in response to detecting the air gesture while detecting that the attention of the user is directed to the user interface element: in accordance with a determination that the user interface element is a first type of user interface element and the air gesture satisfies a first set of one or more criteria, performing an operation corresponding to the user interface element; in accordance with a determination that the user interface element is the first type of user interface element and the air gesture does not satisfy the first set of one or more criteria, forgoing performing the operation corresponding to the user interface element; in accordance with a determination that the user interface element is a second type of user interface element and the air gesture satisfies the first set of one or more criteria without satisfying a second set of one or more criteria, forgoing performing the operation corresponding to the user interface element; and in accordance with a determination that the user interface element is the second type of user interface element and the air gesture satisfies the second set of one or more criteria, performing the operation corresponding to the user interface element.

In some examples, a non-transitory computer-readable storage medium storing one or more programs configured to be executed by one or more processors of a computer system that is in communication with one or more input devices is described. In some examples, the one or more programs includes instructions for: while detecting that attention of the user is directed to a user interface element, detecting, via the one or more input devices, an air gesture; and in response to detecting the air gesture while detecting that the attention of the user is directed to the user interface element: in accordance with a determination that the user interface element is a first type of user interface element and the air gesture satisfies a first set of one or more criteria, performing an operation corresponding to the user interface element; in accordance with a determination that the user interface element is the first type of user interface element and the air gesture does not satisfy the first set of one or more criteria, forgoing performing the operation corresponding to the user interface element; in accordance with a determination that the user interface element is a second type of user interface element and the air gesture satisfies the first set of one or more criteria without satisfying a second set of one or more criteria, forgoing performing the operation corresponding to the user interface element; and in accordance with a determination that the user interface element is the second type of user interface element and the air gesture satisfies the second set of one or more criteria, performing the operation corresponding to the user interface element.

In some examples, a transitory computer-readable storage medium storing one or more programs configured to be executed by one or more processors of a computer system that is in communication with one or more input devices is described. In some examples, the one or more programs includes instructions for: while detecting that attention of the user is directed to a user interface element, detecting, via the one or more input devices, an air gesture; and in response to detecting the air gesture while detecting that the attention of the user is directed to the user interface element: in accordance with a determination that the user interface element is a first type of user interface element and the air gesture satisfies a first set of one or more criteria, performing an operation corresponding to the user interface element; in accordance with a determination that the user interface element is the first type of user interface element and the air gesture does not satisfy the first set of one or more criteria, forgoing performing the operation corresponding to the user interface element; in accordance with a determination that the user interface element is a second type of user interface element and the air gesture satisfies the first set of one or more criteria without satisfying a second set of one or more criteria, forgoing performing the operation corresponding to the user interface element; and in accordance with a determination that the user interface element is the second type of user interface element and the air gesture satisfies the second set of one or more criteria, performing the operation corresponding to the user interface element.

In some examples, a computer system that is in communication with one or more input devices is described. In some examples, the computer system comprises one or more processors and memory storing one or more programs configured to be executed by the one or more processors. In some examples, the one or more programs includes instructions for: while detecting that attention of the user is directed to a user interface element, detecting, via the one or more input devices, an air gesture; and in response to detecting the air gesture while detecting that the attention of the user is directed to the user interface element: in accordance with a determination that the user interface element is a first type of user interface element and the air gesture satisfies a first set of one or more criteria, performing an operation corresponding to the user interface element; in accordance with a determination that the user interface element is the first type of user interface element and the air gesture does not satisfy the first set of one or more criteria, forgoing performing the operation corresponding to the user interface element; in accordance with a determination that the user interface element is a second type of user interface element and the air gesture satisfies the first set of one or more criteria without satisfying a second set of one or more criteria, forgoing performing the operation corresponding to the user interface element; and in accordance with a determination that the user interface element is the second type of user interface element and the air gesture satisfies the second set of one or more criteria, performing the operation corresponding to the user interface element.

In some examples, a computer system that is in communication with one or more input devices is described. In some examples, the computer system comprises means for performing each of the following steps: while detecting that attention of the user is directed to a user interface element, detecting, via the one or more input devices, an air gesture; and in response to detecting the air gesture while detecting that the attention of the user is directed to the user interface element: in accordance with a determination that the user interface element is a first type of user interface element and the air gesture satisfies a first set of one or more criteria, performing an operation corresponding to the user interface element; in accordance with a determination that the user interface element is the first type of user interface element and the air gesture does not satisfy the first set of one or more criteria, forgoing performing the operation corresponding to the user interface element; in accordance with a determination that the user interface element is a second type of user interface element and the air gesture satisfies the first set of one or more criteria without satisfying a second set of one or more criteria, forgoing performing the operation corresponding to the user interface element; and in accordance with a determination that the user interface element is the second type of user interface element and the air gesture satisfies the second set of one or more criteria, performing the operation corresponding to the user interface element.

In some examples, a computer program product is described. In some examples, the computer program product comprises one or more programs configured to be executed by one or more processors of a computer system that is in communication with one or more input devices. In some examples, the one or more programs include instructions for: while detecting that attention of the user is directed to a user interface element, detecting, via the one or more input devices, an air gesture; and in response to detecting the air gesture while detecting that the attention of the user is directed to the user interface element: in accordance with a determination that the user interface element is a first type of user interface element and the air gesture satisfies a first set of one or more criteria, performing an operation corresponding to the user interface element; in accordance with a determination that the user interface element is the first type of user interface element and the air gesture does not satisfy the first set of one or more criteria, forgoing performing the operation corresponding to the user interface element; in accordance with a determination that the user interface element is a second type of user interface element and the air gesture satisfies the first set of one or more criteria without satisfying a second set of one or more criteria, forgoing performing the operation corresponding to the user interface element; and in accordance with a determination that the user interface element is the second type of user interface element and the air gesture satisfies the second set of one or more criteria, performing the operation corresponding to the user interface element.

In some examples, a method that is performed at a computer system that is in communication with one or more input devices is described. In some examples, the method comprises: detecting an air gesture; and in response to detecting the air gesture: in accordance with a determination that an input corresponding to a request to interact with a virtual object was detected before the air gesture was detected, performing an operation corresponding to the virtual object; and in accordance with a determination that the input corresponding to the request to interact with the virtual object was not detected before the air gesture was detected, forgoing performing the operation corresponding to the virtual object.

In some examples, a non-transitory computer-readable storage medium storing one or more programs configured to be executed by one or more processors of a computer system that is in communication with one or more input devices is described. In some examples, the one or more programs includes instructions for: detecting an air gesture; and in response to detecting the air gesture: in accordance with a determination that an input corresponding to a request to interact with a virtual object was detected before the air gesture was detected, performing an operation corresponding to the virtual object; and in accordance with a determination that the input corresponding to the request to interact with the virtual object was not detected before the air gesture was detected, forgoing performing the operation corresponding to the virtual object.

In some examples, a transitory computer-readable storage medium storing one or more programs configured to be executed by one or more processors of a computer system that is in communication with one or more input devices is described. In some examples, the one or more programs includes instructions for: detecting an air gesture; and in response to detecting the air gesture: in accordance with a determination that an input corresponding to a request to interact with a virtual object was detected before the air gesture was detected, performing an operation corresponding to the virtual object; and in accordance with a determination that the input corresponding to the request to interact with the virtual object was not detected before the air gesture was detected, forgoing performing the operation corresponding to the virtual object.

In some examples, a computer system that is in communication with one or more input devices is described. In some examples, the computer system comprises one or more processors and memory storing one or more programs configured to be executed by the one or more processors. In some examples, the one or more programs includes instructions for: detecting an air gesture; and in response to detecting the air gesture: in accordance with a determination that an input corresponding to a request to interact with a virtual object was detected before the air gesture was detected, performing an operation corresponding to the virtual object; and in accordance with a determination that the input corresponding to the request to interact with the virtual object was not detected before the air gesture was detected, forgoing performing the operation corresponding to the virtual object.

In some examples, a computer system that is in communication with one or more input devices is described. In some examples, the computer system comprises means for performing each of the following steps: detecting an air gesture; and in response to detecting the air gesture: in accordance with a determination that an input corresponding to a request to interact with a virtual object was detected before the air gesture was detected, performing an operation corresponding to the virtual object; and in accordance with a determination that the input corresponding to the request to interact with the virtual object was not detected before the air gesture was detected, forgoing performing the operation corresponding to the virtual object.

In some examples, a computer program product is described. In some examples, the computer program product comprises one or more programs configured to be executed by one or more processors of a computer system that is in communication with one or more input devices. In some examples, the one or more programs include instructions for: detecting an air gesture; and in response to detecting the air gesture: in accordance with a determination that an input corresponding to a request to interact with a virtual object was detected before the air gesture was detected, performing an operation corresponding to the virtual object; and in accordance with a determination that the input corresponding to the request to interact with the virtual object was not detected before the air gesture was detected, forgoing performing the operation corresponding to the virtual object.

In some examples, a method that is performed at a computer system that is in communication with a display generation component and one or more input devices is described. In some examples, the method comprises: while presenting, via the display generation component, a user interface object, detecting gaze input directed to the user interface object; after detecting the gaze input directed to the user interface object, detecting, via the one or more input devices, an air gesture, wherein the air gesture is detected before detecting that the gaze input is directed to a location that does not correspond to the user interface object; and in response to detecting the air gesture: in accordance with a determination that one or more eyes of the user were opened in conjunction with the air gesture being detected, performing an operation corresponding to the user interface object; and in accordance with a determination that one or more eyes of the user were closed for more than a threshold amount of time in conjunction with the air gesture being detected, forgoing performing the operation corresponding to the user interface object.

In some examples, a non-transitory computer-readable storage medium storing one or more programs configured to be executed by one or more processors of a computer system that is in communication with a display generation component and one or more input devices is described. In some examples, the one or more programs includes instructions for: while presenting, via the display generation component, a user interface object, detecting gaze input directed to the user interface object; after detecting the gaze input directed to the user interface object, detecting, via the one or more input devices, an air gesture, wherein the air gesture is detected before detecting that the gaze input is directed to a location that does not correspond to the user interface object; and in response to detecting the air gesture: in accordance with a determination that one or more eyes of the user were opened in conjunction with the air gesture being detected, performing an operation corresponding to the user interface object; and in accordance with a determination that one or more eyes of the user were closed for more than a threshold amount of time in conjunction with the air gesture being detected, forgoing performing the operation corresponding to the user interface object.

In some examples, a transitory computer-readable storage medium storing one or more programs configured to be executed by one or more processors of a computer system that is in communication with a display generation component and one or more input devices is described. In some examples, the one or more programs includes instructions for: while presenting, via the display generation component, a user interface object, detecting gaze input directed to the user interface object; after detecting the gaze input directed to the user interface object, detecting, via the one or more input devices, an air gesture, wherein the air gesture is detected before detecting that the gaze input is directed to a location that does not correspond to the user interface object; and in response to detecting the air gesture: in accordance with a determination that one or more eyes of the user were opened in conjunction with the air gesture being detected, performing an operation corresponding to the user interface object; and in accordance with a determination that one or more eyes of the user were closed for more than a threshold amount of time in conjunction with the air gesture being detected, forgoing performing the operation corresponding to the user interface object.

In some examples, a computer system that is in communication with a display generation component and one or more input devices is described. In some examples, the computer system comprises one or more processors and memory storing one or more programs configured to be executed by the one or more processors. In some examples, the one or more programs includes instructions for: while presenting, via the display generation component, a user interface object, detecting gaze input directed to the user interface object; after detecting the gaze input directed to the user interface object, detecting, via the one or more input devices, an air gesture, wherein the air gesture is detected before detecting that the gaze input is directed to a location that does not correspond to the user interface object; and in response to detecting the air gesture: in accordance with a determination that one or more eyes of the user were opened in conjunction with the air gesture being detected, performing an operation corresponding to the user interface object; and in accordance with a determination that one or more eyes of the user were closed for more than a threshold amount of time in conjunction with the air gesture being detected, forgoing performing the operation corresponding to the user interface object.

In some examples, a computer system that is in communication with a display generation component and one or more input devices is described. In some examples, the computer system comprises means for performing each of the following steps: while presenting, via the display generation component, a user interface object, detecting gaze input directed to the user interface object; after detecting the gaze input directed to the user interface object, detecting, via the one or more input devices, an air gesture, wherein the air gesture is detected before detecting that the gaze input is directed to a location that does not correspond to the user interface object; and in response to detecting the air gesture: in accordance with a determination that one or more eyes of the user were opened in conjunction with the air gesture being detected, performing an operation corresponding to the user interface object; and in accordance with a determination that one or more eyes of the user were closed for more than a threshold amount of time in conjunction with the air gesture being detected, forgoing performing the operation corresponding to the user interface object.

In some examples, a computer program product is described. In some examples, the computer program product comprises one or more programs configured to be executed by one or more processors of a computer system that is in communication with a display generation component and one or more input devices. In some examples, the one or more programs include instructions for: while presenting, via the display generation component, a user interface object, detecting gaze input directed to the user interface object; after detecting the gaze input directed to the user interface object, detecting, via the one or more input devices, an air gesture, wherein the air gesture is detected before detecting that the gaze input is directed to a location that does not correspond to the user interface object; and in response to detecting the air gesture: in accordance with a determination that one or more eyes of the user were opened in conjunction with the air gesture being detected, performing an operation corresponding to the user interface object; and in accordance with a determination that one or more eyes of the user were closed for more than a threshold amount of time in conjunction with the air gesture being detected, forgoing performing the operation corresponding to the user interface object.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes and may not have been selected to delineate or circumscribe the inventive subject matter.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

DESCRIPTION OF EMBODIMENTS

The present disclosure relates to user interfaces for providing an extended reality (XR) experience to a user, in accordance with some embodiments.

The systems, methods, and GUIs described herein improve user interface interactions with virtual/augmented reality environments in multiple ways.

Figure 12:
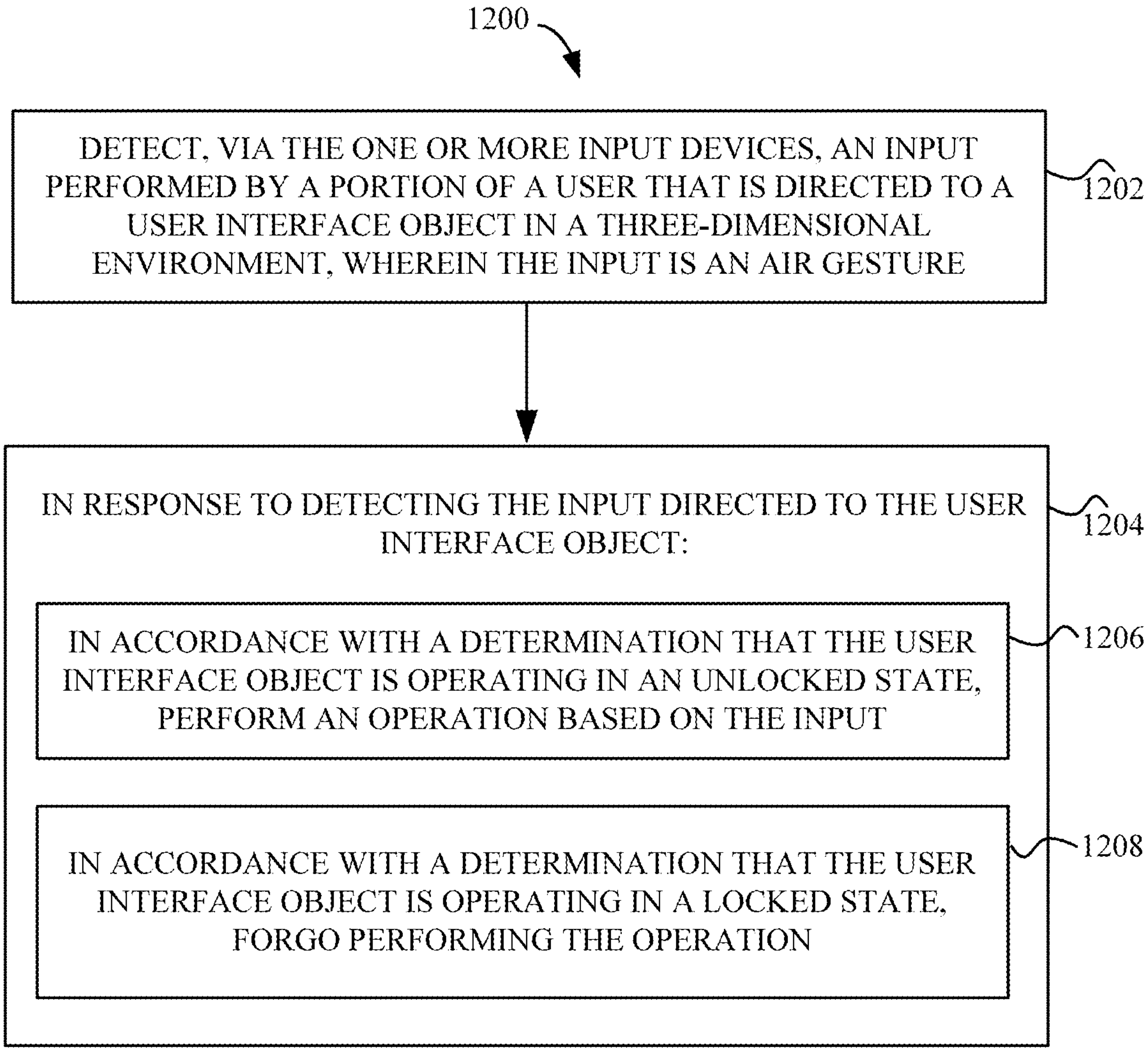
FIG. 12 is a flow diagram illustrating a method for interacting with locked objects in accordance with some embodiments.
Figure 13:
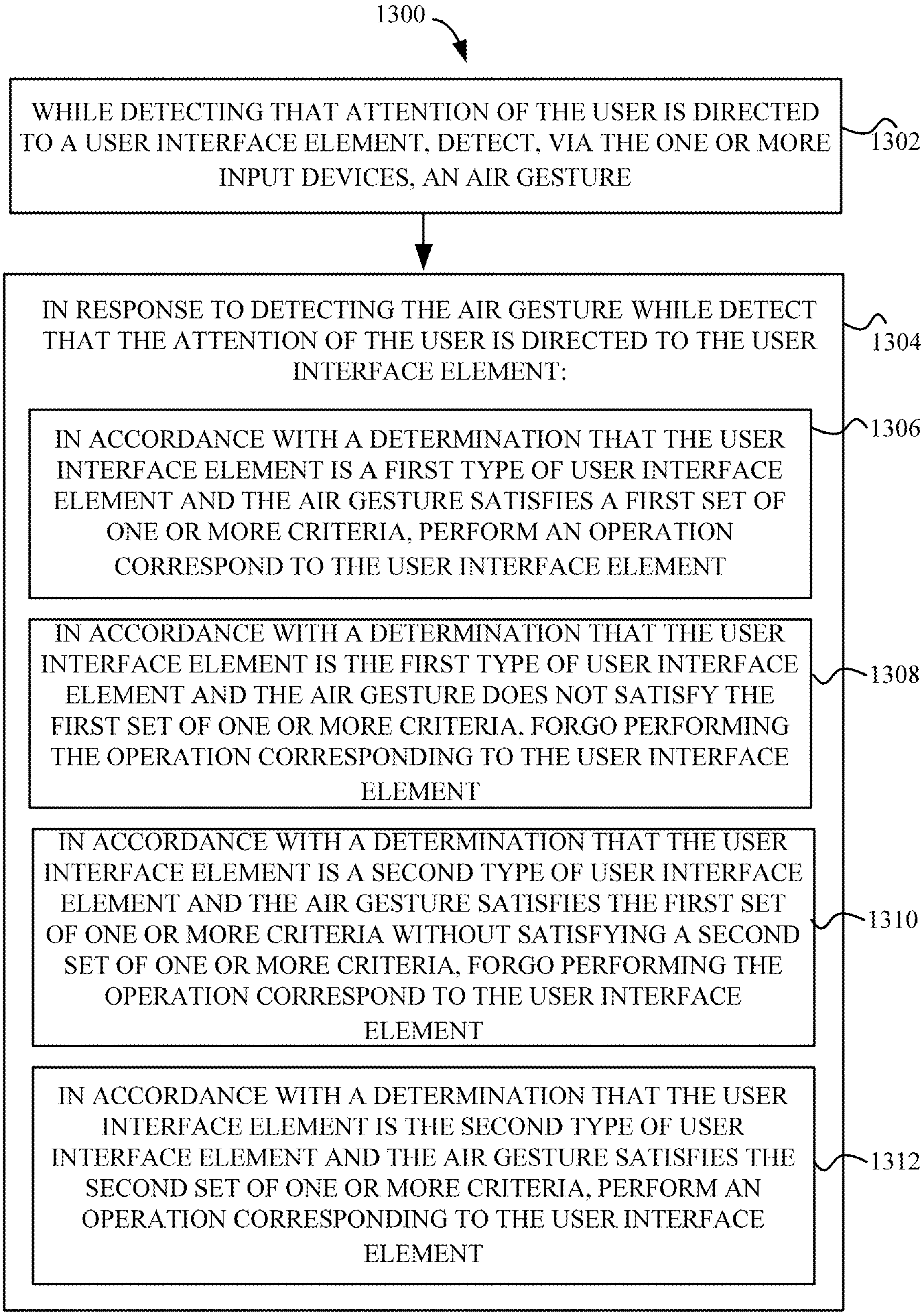
FIG. 13 is a flow diagram illustrating a method for interacting with objects using inputs in accordance with some embodiments.
Figure 14A:
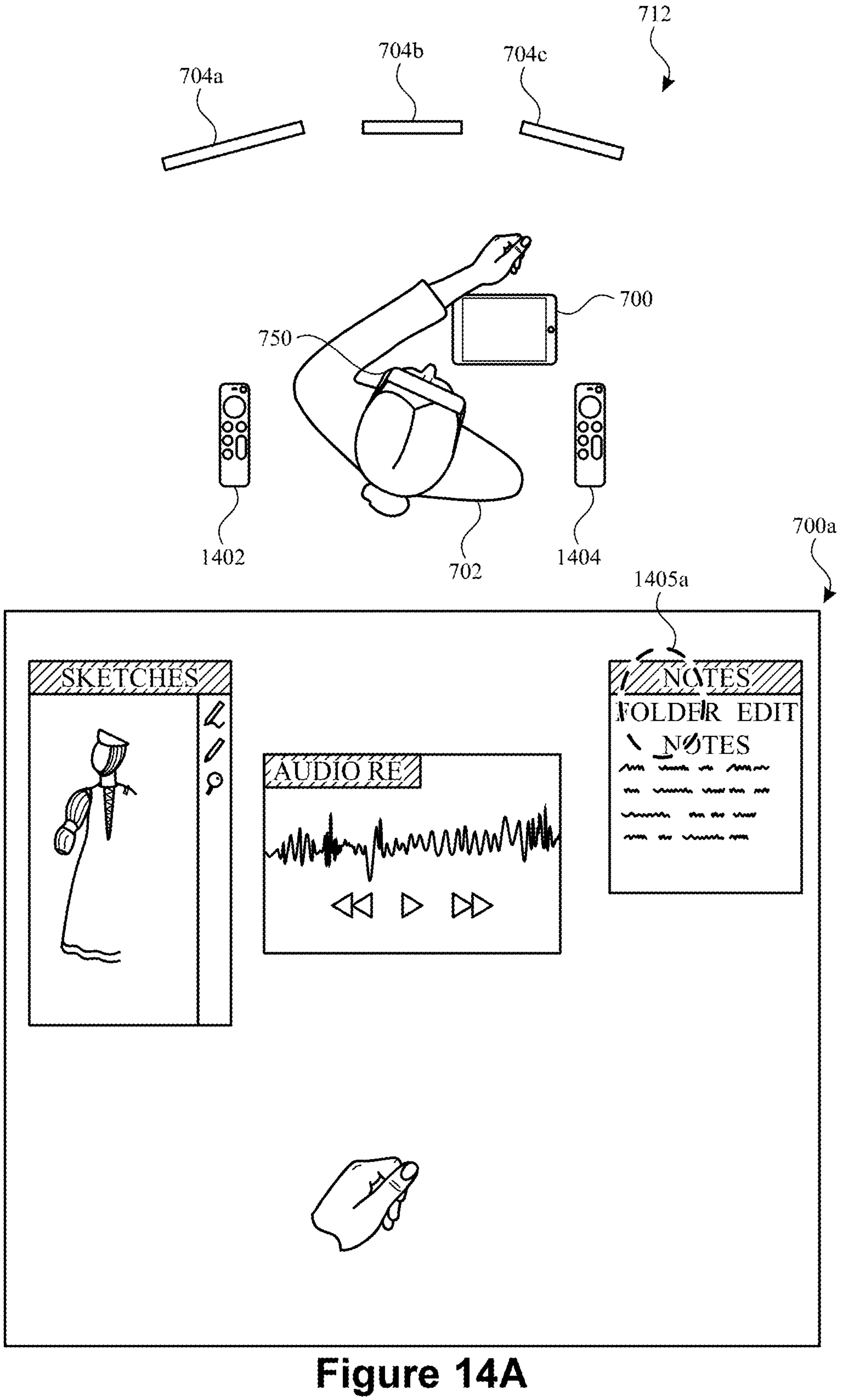
FIGS. 14A-14I illustrate exemplary user interfaces for managing virtual controller-based inputs in accordance with some embodiments.

FIGS. 1A-6 provide a description of example computer systems for providing XR experiences to users (such as described below with respect to method 800). FIGS. 7A-7U illustrate exemplary user interfaces for managing the display of an overlay in accordance with some embodiments. FIGS. 7A-7G illustrate exemplary user interfaces for location-based inputs in accordance with some embodiments. FIG. 8 is a flow diagram illustrating a method for location-based inputs in accordance with some embodiments. The user interface of FIGS. 7A-7G are used to illustrate the process described below, including the processes in FIG. 8. FIGS. 9A-9H illustrate exemplary user interfaces for enabling certain inputs in accordance with some embodiments. FIG. 10 is a flow diagram illustrating a method for enabling certain inputs in accordance with some embodiments. The user interface of FIGS. 9A-9H are used to illustrate the process described below, including the processes in FIG. 10. FIGS. 11A-11I illustrate exemplary user interfaces for interacting with locked objects in accordance with some embodiments. FIG. 12 is a flow diagram illustrating a method for interacting with locked objects in accordance with some embodiments. FIG. 13 is a flow diagram illustrating a method for interacting with objects using inputs in accordance with some embodiments. The user interface of FIGS. 11A-11I are used to illustrate the process described below, including the processes in FIG. 12 and FIG. 13. FIGS. 14A-141 illustrate exemplary user interfaces for managing virtual controller-based inputs in accordance with some embodiments. FIG. 15 is a flow diagram illustrating a method for managing virtual controller-based inputs in accordance with some embodiments. The user interface of FIGS. 14A-14I are used to illustrate the process described below, including the processes in FIG. 15.

FIGS. 16A-16G illustrate exemplary user interfaces for managing gaze directed inputs in accordance with some embodiments. FIG. 17 is a flow diagram illustrating a method for managing gaze directed inputs in accordance with some embodiments. The user interface of FIGS. 16A-16G are used to illustrate the process described below, including the processes in FIG. 17.

The processes described below enhance the operability of the devices and make the user-device interfaces more efficient (e.g., by helping the user to provide proper inputs and reducing user mistakes when operating/interacting with the device) through various techniques, including by providing improved visual feedback to the user, reducing the number of inputs needed to perform an operation, providing additional control options without cluttering the user interface with additional displayed controls, performing an operation when a set of conditions has been met without requiring further user input, improving privacy and/or security, providing a more varied, detailed, and/or realistic user experience while saving storage space, and/or additional techniques. These techniques also reduce power usage and improve battery life of the device by enabling the user to use the device more quickly and efficiently. Saving on battery power, and thus weight, improves the ergonomics of the device. These techniques also enable real-time communication, allow for the use of fewer and/or less-precise sensors resulting in a more compact, lighter, and cheaper device, and enable the device to be used in a variety of lighting conditions. These techniques reduce energy usage, thereby reducing heat emitted by the device, which is particularly important for a wearable device where a device well within operational parameters for device components can become uncomfortable for a user to wear if it is producing too much heat.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

Although the following description uses terms "first," "second," etc. to describe various elements, these elements should not be limited by the terms. In some embodiments, these terms are used to distinguish one element from another. For example, a first touch could be termed a second touch, and, similarly, a second touch could be termed a first touch, without departing from the scope of the various described embodiments. In some embodiments, the first touch and the second touch are two separate references to the same touch. In some embodiments, the first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Figure 1A:
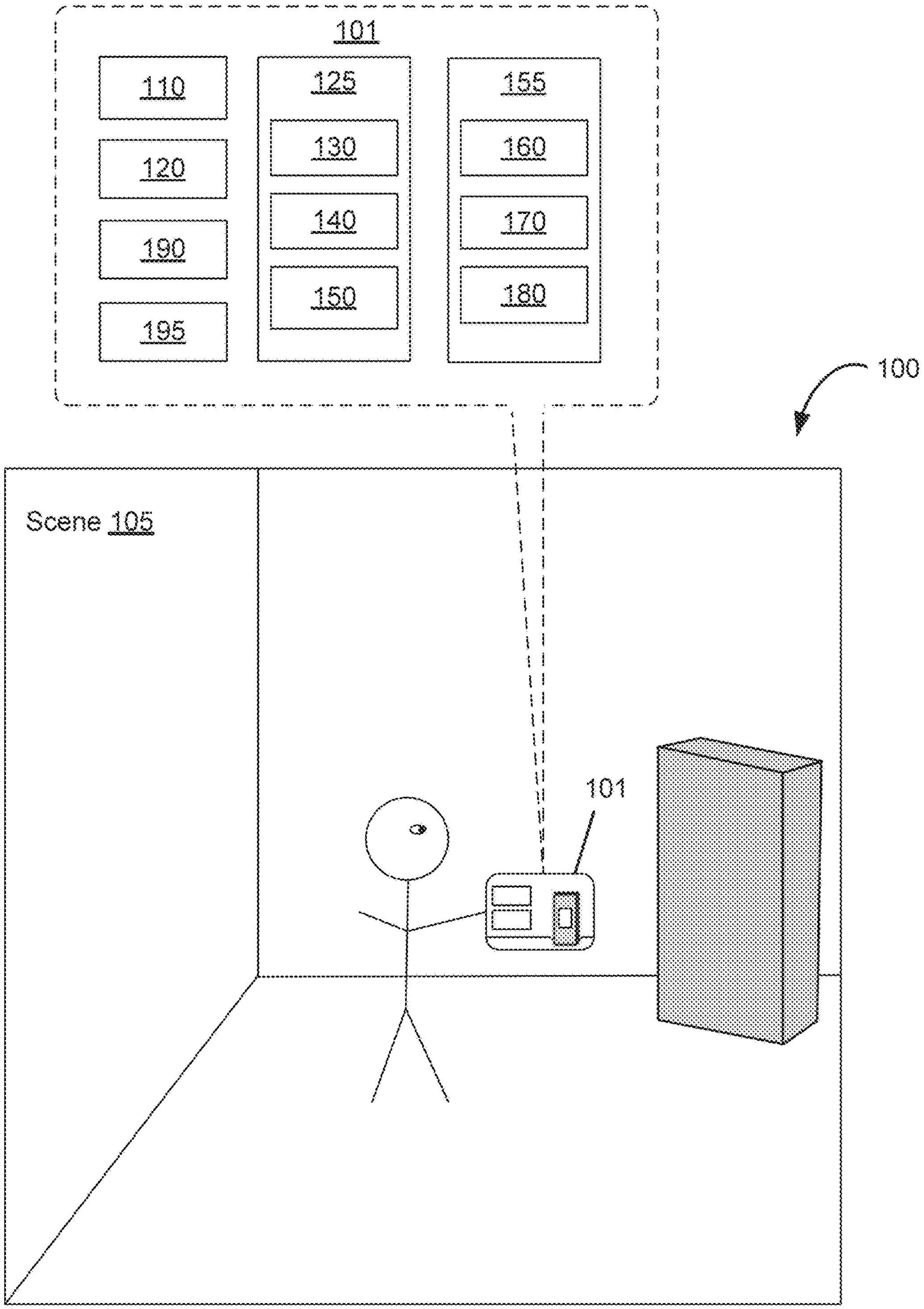
FIG. 1A is a block diagram illustrating an operating environment of a computer system for providing XR experiences in accordance with some examples.

In some embodiments, as shown in FIG. 1A, the XR experience is provided to the user via an operating environment 100 that includes a computer system 101. The computer system 101 includes a controller 110 (e.g., processors of a portable electronic device or a remote server), a display generation component 120 (e.g., a head-mounted device (HMD), a display, a projector, a touch-screen, etc.), one or more input devices 125 (e.g., an eye tracking device 130, a hand tracking device 140, other input devices 150), one or more output devices 155 (e.g., speakers 160, tactile output generators 170, and other output devices 180), one or more sensors 190 (e.g., image sensors, light sensors, depth sensors, tactile sensors, orientation sensors, proximity sensors, temperature sensors, location sensors, motion sensors, velocity sensors, etc.), and optionally one or more peripheral devices 195 (e.g., home appliances, wearable devices, etc.). In some embodiments, one or more of the input devices 125, output devices 155, sensors 190, and peripheral devices 195 are integrated with the display generation component 120 (e.g., in a head-mounted device or a handheld device).

When describing an XR experience, various terms are used to differentially refer to several related but distinct environments that the user may sense and/or with which a user may interact (e.g., with inputs detected by a computer system 101 generating the XR experience that cause the computer system generating the XR experience to generate audio, visual, and/or tactile feedback corresponding to various inputs provided to the computer system 101). The following is a subset of these terms:

Physical environment: A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

Extended reality: In contrast, an extended reality (XR) environment refers to a wholly or partially simulated environment that people sense and/or interact with via an electronic system. In XR, a subset of a person's physical motions, or representations thereof, are tracked, and, in response, one or more characteristics of one or more virtual objects simulated in the XR environment are adjusted in a manner that comports with at least one law of physics. For example, a XR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a XR environment may be made in response to representations of physical motions (e.g., vocal commands). A person may sense and/or interact with a XR object using any one of their senses, including sight, sound, touch, taste, and smell. For example, a person may sense and/or interact with audio objects that create a 3D or spatial audio environment that provides the perception of point audio sources in 3D space. In another example, audio objects may enable audio transparency, which selectively incorporates ambient sounds from the physical environment with or without computer-generated audio. In some XR environments, a person may sense and/or interact only with audio objects.

Examples of XR include virtual reality and mixed reality.

Virtual reality: A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

Mixed reality: In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end. In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof).

For example, a system may account for movements so that a virtual tree appears stationary with respect to the physical ground.

Examples of mixed realities include augmented reality and augmented virtuality.

Augmented reality: An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment. An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

Augmented virtuality: An augmented virtuality (AV) environment refers to a simulated environment in which a virtual or computer-generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

In an augmented reality, mixed reality, or virtual reality environment, a view of a three-dimensional environment is visible to a user. The view of the three-dimensional environment is typically visible to the user via one or more display generation components (e.g., a display or a pair of display modules that provide stereoscopic content to different eyes of the same user) through a virtual viewport that has a viewport boundary that defines an extent of the three-dimensional environment that is visible to the user via the one or more display generation components. In some embodiments, the region defined by the viewport boundary is smaller than a range of vision of the user in one or more dimensions (e.g., based on the range of vision of the user, size, optical properties or other physical characteristics of the one or more display generation components, and/or the location and/or orientation of the one or more display generation components relative to the eyes of the user). In some embodiments, the region defined by the viewport boundary is larger than a range of vision of the user in one or more dimensions (e.g., based on the range of vision of the user, size, optical properties or other physical characteristics of the one or more display generation components, and/or the location and/or orientation of the one or more display generation components relative to the eyes of the user). The viewport and viewport boundary typically move as the one or more display generation components move (e.g., moving with a head of the user for a head mounted device or moving with a hand of a user for a handheld device such as a tablet or smartphone). A viewpoint of a user determines what content is visible in the viewport, a viewpoint generally specifies a location and a direction relative to the three-dimensional environment, and as the viewpoint shifts, the view of the three-dimensional environment will also shift in the viewport. For a head mounted device, a viewpoint is typically based on a location an direction of the head, face, and/or eyes of a user to provide a view of the three-dimensional environment that is perceptually accurate and provides an immersive experience when the user is using the head-mounted device. For a handheld or stationed device, the viewpoint shifts as the handheld or stationed device is moved and/or as a position of a user relative to the handheld or stationed device changes (e.g., a user moving toward, away from, up, down, to the right, and/or to the left of the device). For devices that include display generation components with virtual passthrough, portions of the physical environment that are visible (e.g., displayed, and/or projected) via the one or more display generation components are based on a field of view of one or more cameras in communication with the display generation components which typically move with the display generation components (e.g., moving with a head of the user for a head mounted device or moving with a hand of a user for a handheld device such as a tablet or smartphone) because the viewpoint of the user moves as the field of view of the one or more cameras moves (and the appearance of one or more virtual objects displayed via the one or more display generation components is updated based on the viewpoint of the user (e.g., displayed positions and poses of the virtual objects are updated based on the movement of the viewpoint of the user)). For display generation components with optical passthrough, portions of the physical environment that are visible (e.g., optically visible through one or more partially or fully transparent portions of the display generation component) via the one or more display generation components are based on a field of view of a user through the partially or fully transparent portion(s) of the display generation component (e.g., moving with a head of the user for a head mounted device or moving with a hand of a user for a handheld device such as a tablet or smartphone) because the viewpoint of the user moves as the field of view of the user through the partially or fully transparent portions of the display generation components moves (and the appearance of one or more virtual objects is updated based on the viewpoint of the user).

In some embodiments a representation of a physical environment (e.g., displayed via virtual passthrough or optical passthrough) can be partially or fully obscured by a virtual environment. In some embodiments, the amount of virtual environment that is displayed (e.g., the amount of physical environment that is not displayed) is based on an immersion level for the virtual environment (e.g., with respect to the representation of the physical environment). For example, increasing the immersion level optionally causes more of the virtual environment to be displayed, replacing and/or obscuring more of the physical environment, and reducing the immersion level optionally causes less of the virtual environment to be displayed, revealing portions of the physical environment that were previously not displayed and/or obscured. In some embodiments, at a particular immersion level, one or more first background objects (e.g., in the representation of the physical environment) are visually de-emphasized (e.g., dimmed, blurred, and/or displayed with increased transparency) more than one or more second background objects, and one or more third background objects cease to be displayed. In some embodiments, a level of immersion includes an associated degree to which the virtual content displayed by the computer system (e.g., the virtual environment and/or the virtual content) obscures background content (e.g., content other than the virtual environment and/or the virtual content) around/behind the virtual content, optionally including the number of items of background content displayed and/or the visual characteristics (e.g., colors, contrast, and/or opacity) with which the background content is displayed, the angular range of the virtual content displayed via the display generation component (e.g., 60 degrees of content displayed at low immersion, 120 degrees of content displayed at medium immersion, or 180 degrees of content displayed at high immersion), and/or the proportion of the field of view displayed via the display generation component that is consumed by the virtual content (e.g., 33% of the field of view consumed by the virtual content at low immersion, 66% of the field of view consumed by the virtual content at medium immersion, or 100% of the field of view consumed by the virtual content at high immersion). In some embodiments, the background content is included in a background over which the virtual content is displayed (e.g., background content in the representation of the physical environment). In some embodiments, the background content includes user interfaces (e.g., user interfaces generated by the computer system corresponding to applications), virtual objects (e.g., files or representations of other users generated by the computer system) not associated with or included in the virtual environment and/or virtual content, and/or real objects (e.g., pass-through objects representing real objects in the physical environment around the user that are visible such that they are displayed via the display generation component and/or a visible via a transparent or translucent component of the display generation component because the computer system does not obscure/prevent visibility of them through the display generation component). In some embodiments, at a low level of immersion (e.g., a first level of immersion), the background, virtual and/or real objects are displayed in an unobscured manner. For example, a virtual environment with a low level of immersion is optionally displayed concurrently with the background content, which is optionally displayed with full brightness, color, and/or translucency. In some embodiments, at a higher level of immersion (e.g., a second level of immersion higher than the first level of immersion), the background, virtual and/or real objects are displayed in an obscured manner (e.g., dimmed, blurred, or removed from display). For example, a respective virtual environment with a high level of immersion is displayed without concurrently displaying the background content (e.g., in a full screen or fully immersive mode). As another example, a virtual environment displayed with a medium level of immersion is displayed concurrently with darkened, blurred, or otherwise de-emphasized background content. In some embodiments, the visual characteristics of the background objects vary among the background objects. For example, at a particular immersion level, one or more first background objects are visually de-emphasized (e.g., dimmed, blurred, and/or displayed with increased transparency) more than one or more second background objects, and one or more third background objects cease to be displayed. In some embodiments, a null or zero level of immersion corresponds to the virtual environment ceasing to be displayed and instead a representation of a physical environment is displayed (optionally with one or more virtual objects such as application, windows, or virtual three-dimensional objects) without the representation of the physical environment being obscured by the virtual environment. Adjusting the level of immersion using a physical input element provides for quick and efficient method of adjusting immersion, which enhances the operability of the computer system and makes the user-device interface more efficient.

Viewpoint-locked virtual object: A virtual object is viewpoint-locked when a computer system displays the virtual object at the same location and/or position in the viewpoint of the user, even as the viewpoint of the user shifts (e.g., changes). In embodiments where the computer system is a head-mounted device, the viewpoint of the user is locked to the forward facing direction of the user's head (e.g., the viewpoint of the user is at least a portion of the field-of-view of the user when the user is looking straight ahead); thus, the viewpoint of the user remains fixed even as the user's gaze is shifted, without moving the user's head. In embodiments where the computer system has a display generation component (e.g., a display screen) that can be repositioned with respect to the user's head, the viewpoint of the user is the augmented reality view that is being presented to the user on a display generation component of the computer system. For example, a viewpoint-locked virtual object that is displayed in the upper left corner of the viewpoint of the user, when the viewpoint of the user is in a first orientation (e.g., with the user's head facing north) continues to be displayed in the upper left corner of the viewpoint of the user, even as the viewpoint of the user changes to a second orientation (e.g., with the user's head facing west). In other words, the location and/or position at which the viewpoint-locked virtual object is displayed in the viewpoint of the user is independent of the user's position and/or orientation in the physical environment. In embodiments in which the computer system is a head-mounted device, the viewpoint of the user is locked to the orientation of the user's head, such that the virtual object is also referred to as a "head-locked virtual object."

Environment-locked virtual object: A virtual object is environment-locked (alternatively, "world-locked") when a computer system displays the virtual object at a location and/or position in the viewpoint of the user that is based on (e.g., selected in reference to and/or anchored to) a location and/or object in the three-dimensional environment (e.g., a physical environment or a virtual environment). As the viewpoint of the user shifts, the location and/or object in the environment relative to the viewpoint of the user changes, which results in the environment-locked virtual object being displayed at a different location and/or position in the viewpoint of the user. For example, an environment-locked virtual object that is locked onto a tree that is immediately in front of a user is displayed at the center of the viewpoint of the user. When the viewpoint of the user shifts to the right (e.g., the user's head is turned to the right) so that the tree is now left-of-center in the viewpoint of the user (e.g., the tree's position in the viewpoint of the user shifts), the environment-locked virtual object that is locked onto the tree is displayed left-of-center in the viewpoint of the user. In other words, the location and/or position at which the environment-locked virtual object is displayed in the viewpoint of the user is dependent on the position and/or orientation of the location and/or object in the environment onto which the virtual object is locked. In some embodiments, the computer system uses a stationary frame of reference (e.g., a coordinate system that is anchored to a fixed location and/or object in the physical environment) in order to determine the position at which to display an environment-locked virtual object in the viewpoint of the user. An environment-locked virtual object can be locked to a stationary part of the environment (e.g., a floor, wall, table, or other stationary object) or can be locked to a moveable part of the environment (e.g., a vehicle, animal, person, or even a representation of portion of the users body that moves independently of a viewpoint of the user, such as a user's hand, wrist, arm, or foot) so that the virtual object is moved as the viewpoint or the portion of the environment moves to maintain a fixed relationship between the virtual object and the portion of the environment.

In some embodiments a virtual object that is environment-locked or viewpoint-locked exhibits lazy follow behavior which reduces or delays motion of the environment-locked or viewpoint-locked virtual object relative to movement of a point of reference which the virtual object is following. In some embodiments, when exhibiting lazy follow behavior the computer system intentionally delays movement of the virtual object when detecting movement of a point of reference (e.g., a portion of the environment, the viewpoint, or a point that is fixed relative to the viewpoint, such as a point that is between 5-300 cm from the viewpoint) which the virtual object is following. For example, when the point of reference (e.g., the portion of the environment or the viewpoint) moves with a first speed, the virtual object is moved by the device to remain locked to the point of reference but moves with a second speed that is slower than the first speed (e.g., until the point of reference stops moving or slows down, at which point the virtual object starts to catch up to the point of reference). In some embodiments, when a virtual object exhibits lazy follow behavior the device ignores small amounts of movement of the point of reference (e.g., ignoring movement of the point of reference that is below a threshold amount of movement such as movement by 0-5 degrees or movement by 0-50 cm). For example, when the point of reference (e.g., the portion of the environment or the viewpoint to which the virtual object is locked) moves by a first amount, a distance between the point of reference and the virtual object increases (e.g., because the virtual object is being displayed so as to maintain a fixed or substantially fixed position relative to a viewpoint or portion of the environment that is different from the point of reference to which the virtual object is locked) and when the point of reference (e.g., the portion of the environment or the viewpoint to which the virtual object is locked) moves by a second amount that is greater than the first amount, a distance between the point of reference and the virtual object initially increases (e.g., because the virtual object is being displayed so as to maintain a fixed or substantially fixed position relative to a viewpoint or portion of the environment that is different from the point of reference to which the virtual object is locked) and then decreases as the amount of movement of the point of reference increases above a threshold (e.g., a "lazy follow" threshold) because the virtual object is moved by the computer system to maintain a fixed or substantially fixed position relative to the point of reference. In some embodiments the virtual object maintaining a substantially fixed position relative to the point of reference includes the virtual object being displayed within a threshold distance (e.g., 1, 2, 3, 5, 15, 20, 50 cm) of the point of reference in one or more dimensions (e.g., up/down, left/right, and/or forward/backward relative to the position of the point of reference).

Hardware: There are many different types of electronic systems that enable a person to sense and/or interact with various XR environments. Examples include head-mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback (e.g., 1-356)), smartphones, tablets, and desktop/laptop computers. A head-mounted system may have one or more speaker (s) and an integrated opaque display. Alternatively, a head-mounted system may be configured to accept an external opaque display (e.g., a smartphone). The head-mounted system may incorporate one or more imaging sensors to capture images or video of the physical environment, and/or one or more microphones to capture audio of the physical environment. Rather than an opaque display, a head-mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface. In some embodiments, the controller 110 is configured to manage and coordinate a XR experience for the user. In some embodiments, the controller 110 includes a suitable combination of software, firmware, and/or hardware. The controller 110 is described in greater detail below with respect to FIG. 2. In some embodiments, the controller 110 is a computing device that is local or remote relative to the scene 105 (e.g., a physical environment). For example, the controller 110 is a local server located within the scene 105. In another example, the controller 110 is a remote server located outside of the scene 105 (e.g., a cloud server, central server, etc.). In some embodiments, the controller 110 is communicatively coupled with the display generation component 120 (e.g., an HMD, a display, a projector, a touch-screen, etc.) via one or more wired or wireless communication channels 144 (e.g., BLUETOOTH, IEEE 802.11x, IEEE 802.16x, IEEE 802.3x, etc.). In another example, the controller 110 is included within the enclosure (e.g., a physical housing) of the display generation component 120 (e.g., an HMD, or a portable electronic device that includes a display and one or more processors, etc.), one or more of the input devices 125, one or more of the output devices 155, one or more of the sensors 190, and/or one or more of the peripheral devices 195, or share the same physical enclosure or support structure with one or more of the above.

In some embodiments, the display generation component 120 is configured to provide the XR experience (e.g., at least a visual component of the XR experience) to the user. In some embodiments, the display generation component 120 includes a suitable combination of software, firmware, and/or hardware. The display generation component 120 is described in greater detail below with respect to FIG. 3. In some embodiments, the functionalities of the controller 110 are provided by and/or combined with the display generation component 120.

According to some embodiments, the display generation component 120 provides an XR experience to the user while the user is virtually and/or physically present within the scene 105.

In some embodiments, the display generation component is worn on a part of the user's body (e.g., on his/her head, on his/her hand, etc.). As such, the display generation component 120 includes one or more XR displays provided to display the XR content. For example, in various embodiments, the display generation component 120 encloses the field-of-view of the user. In some embodiments, the display generation component 120 is a handheld device (such as a smartphone or tablet) configured to present XR content, and the user holds the device with a display directed towards the field-of-view of the user and a camera directed towards the scene 105. In some embodiments, the handheld device is optionally placed within an enclosure that is worn on the head of the user. In some embodiments, the handheld device is optionally placed on a support (e.g., a tripod) in front of the user. In some embodiments, the display generation component 120 is a XR chamber, enclosure, or room configured to present XR content in which the user does not wear or hold the display generation component 120. Many user interfaces described with reference to one type of hardware for displaying XR content (e.g., a handheld device or a device on a tripod) could be implemented on another type of hardware for displaying XR content (e.g., an HMD or other wearable computing device). For example, a user interface showing interactions with XR content triggered based on interactions that happen in a space in front of a handheld or tripod mounted device could similarly be implemented with an HMD where the interactions happen in a space in front of the HMD and the responses of the XR content are displayed via the HMD. Similarly, a user interface showing interactions with XR content triggered based on movement of a handheld or tripod mounted device relative to the physical environment (e.g., the scene 105 or a part of the user's body (e.g., the user's eye(s), head, or hand)) could similarly be implemented with an HMD where the movement is caused by movement of the HMD relative to the physical environment (e.g., the scene 105 or a part of the user's body (e.g., the user's eye(s), head, or hand)).

While pertinent features of the operating environment 100 are shown in FIG. 1A, those of ordinary skill in the art will appreciate from the present disclosure that various other features have not been illustrated for the sake of brevity and so as not to obscure more pertinent aspects of the example embodiments disclosed herein.

Figure 1B:
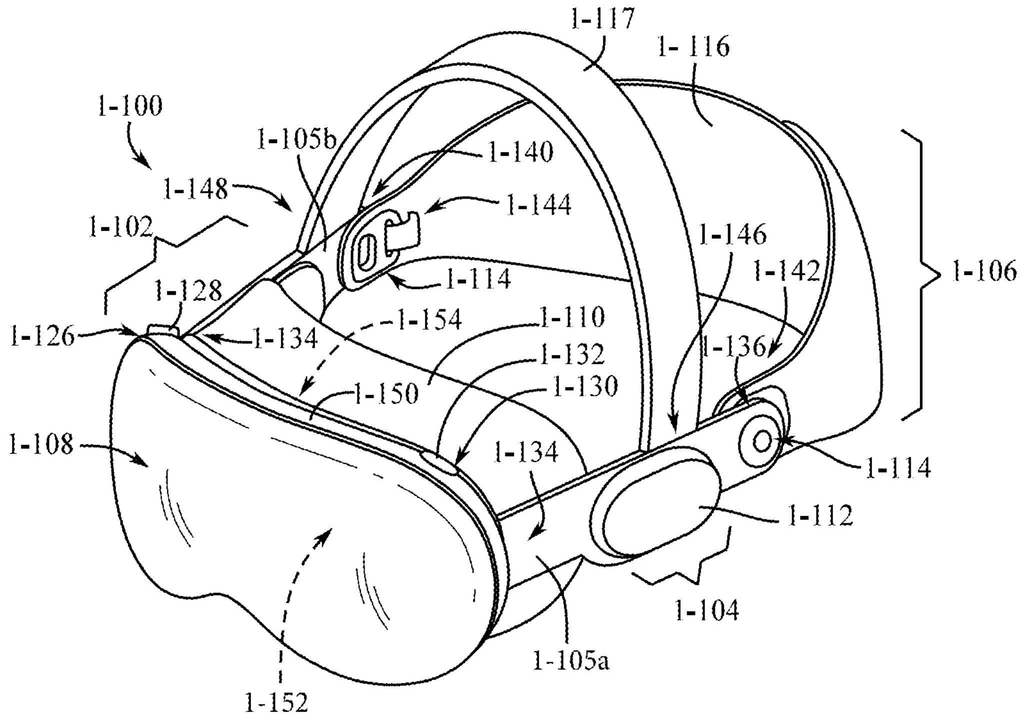
FIGS. 1B-1P are examples of a computer system for providing XR experiences in the operating environment of FIG. 1A.
Figure 1C:
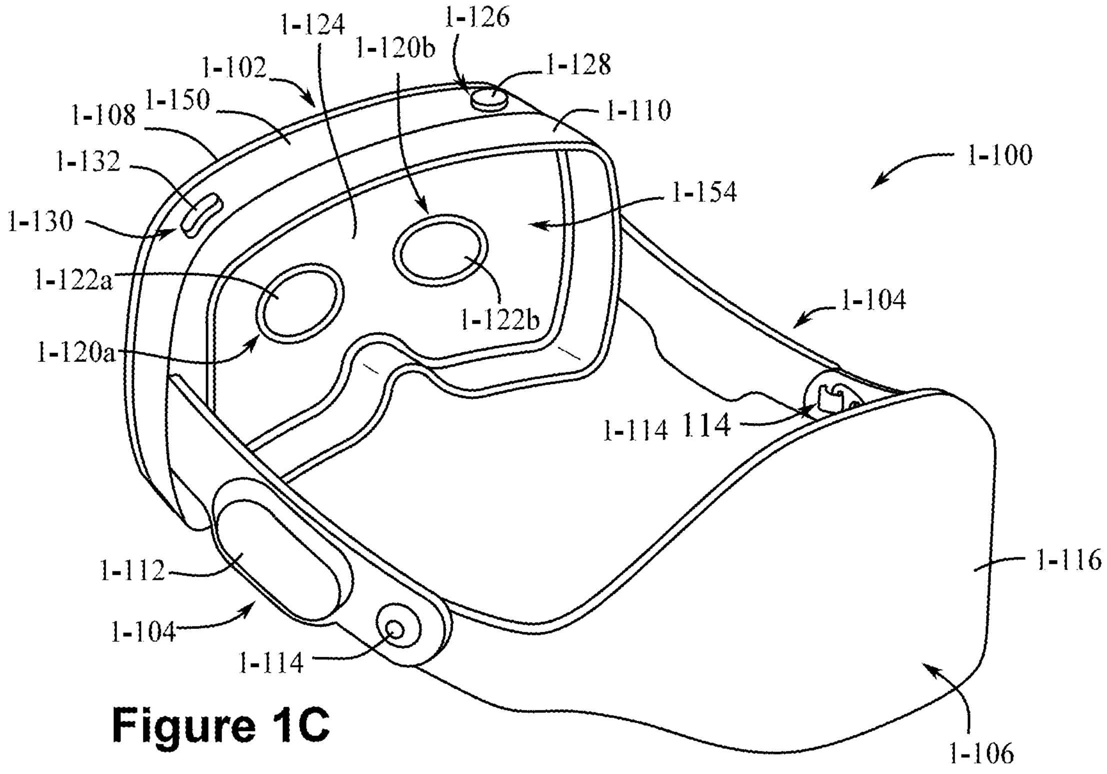
Figure 1D:
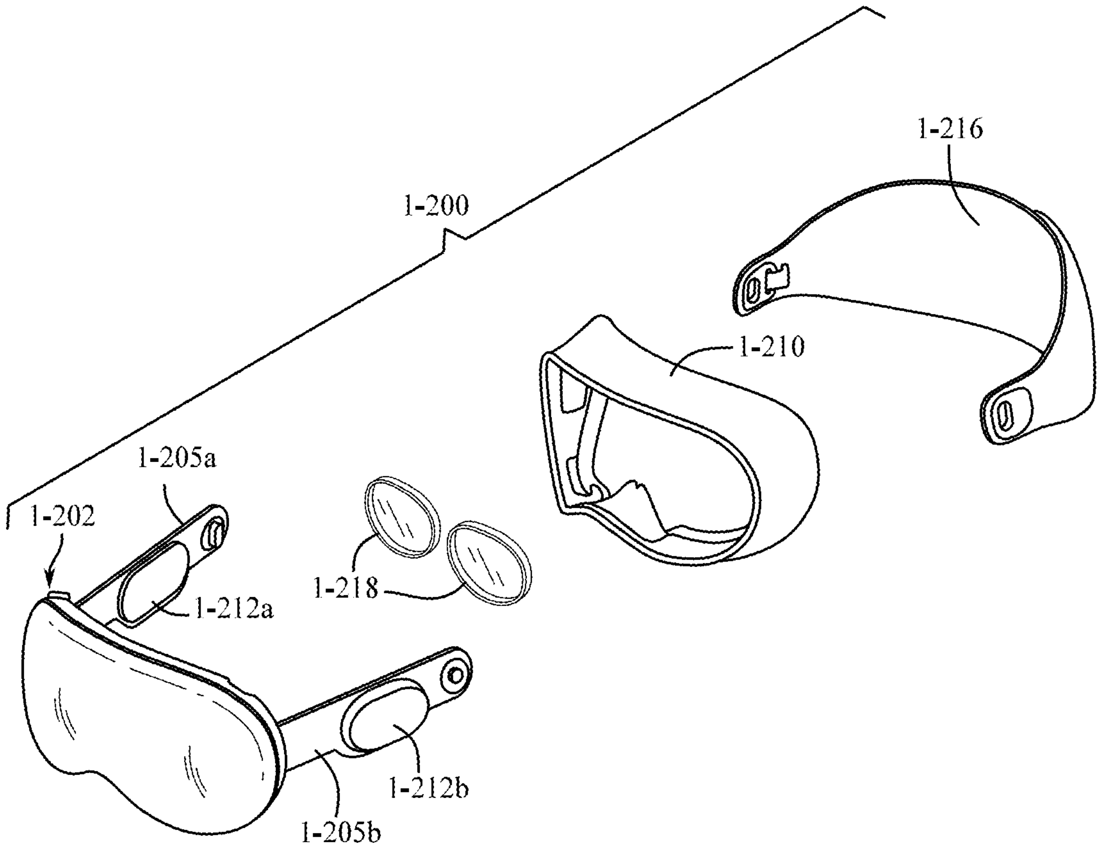
Figure 1E:
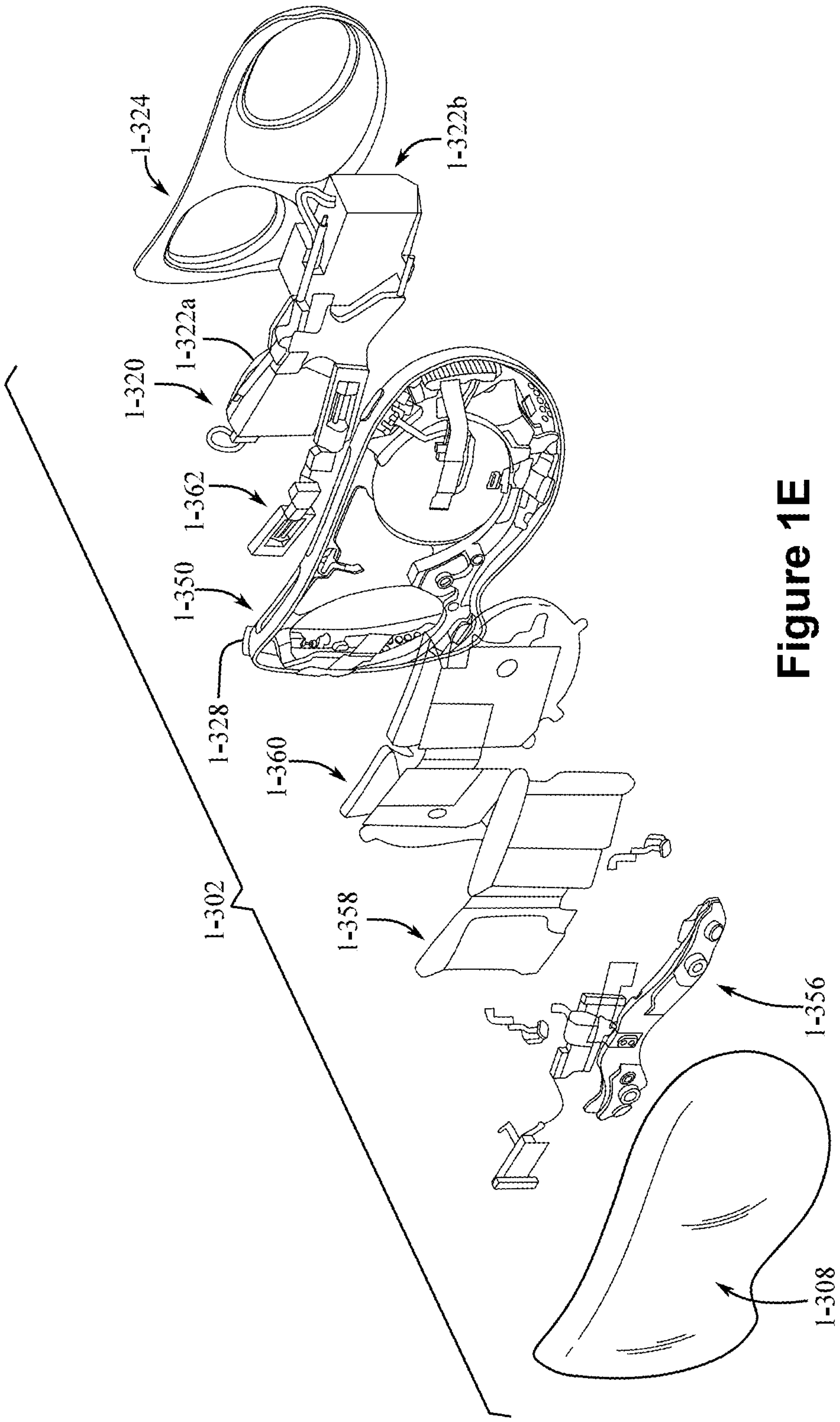
Figure 1F:
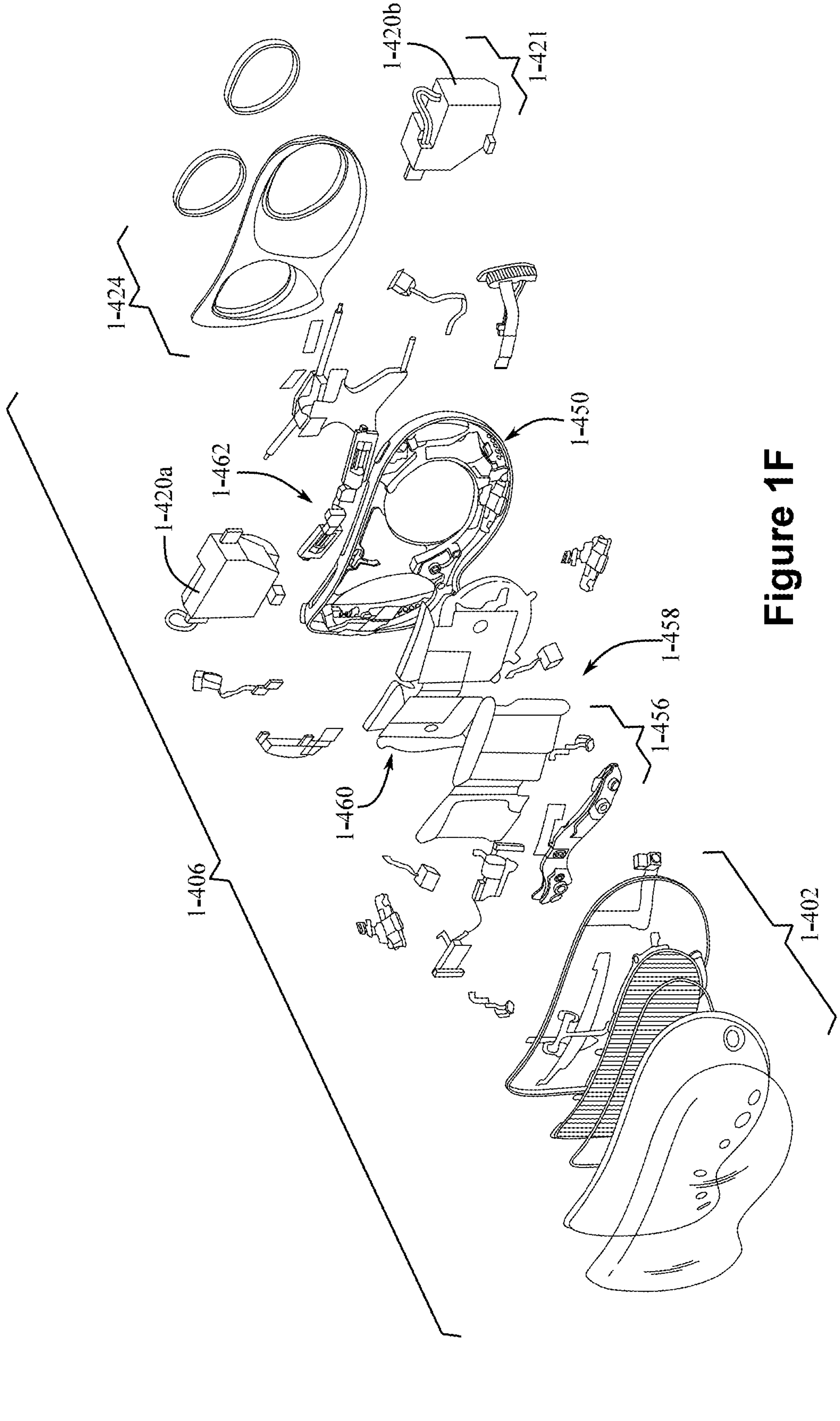
Figure 1G:
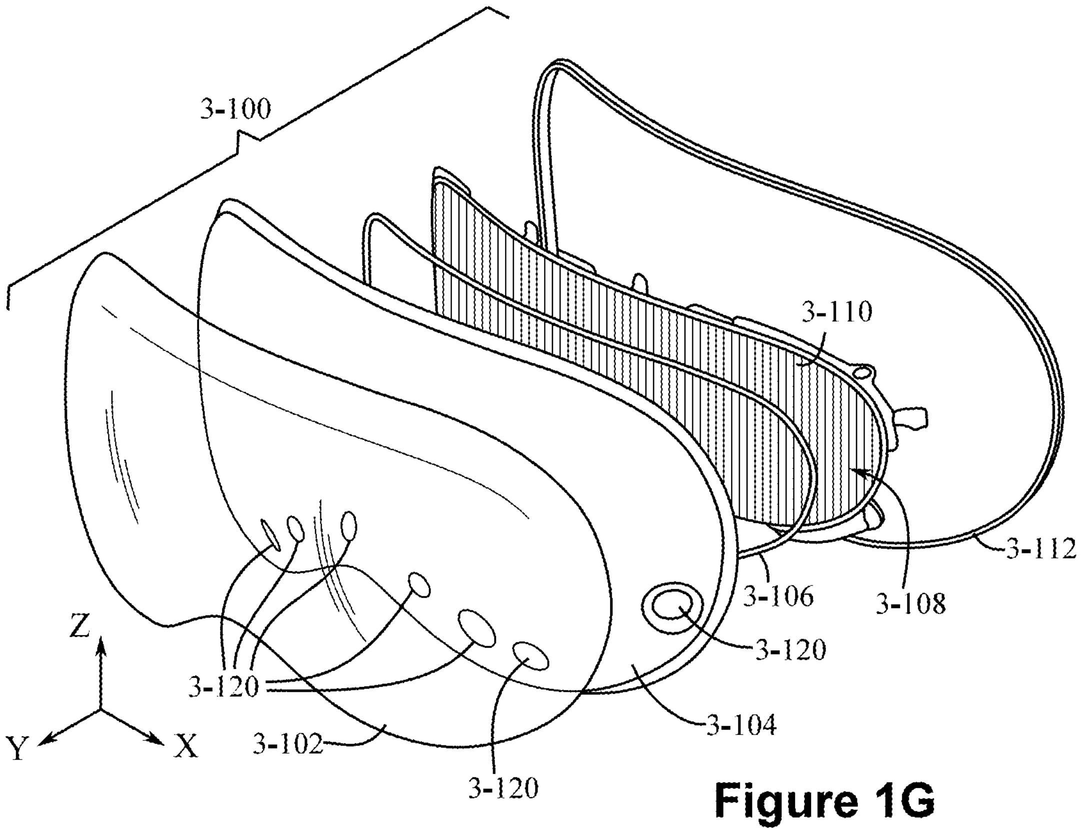
Figure 1H:
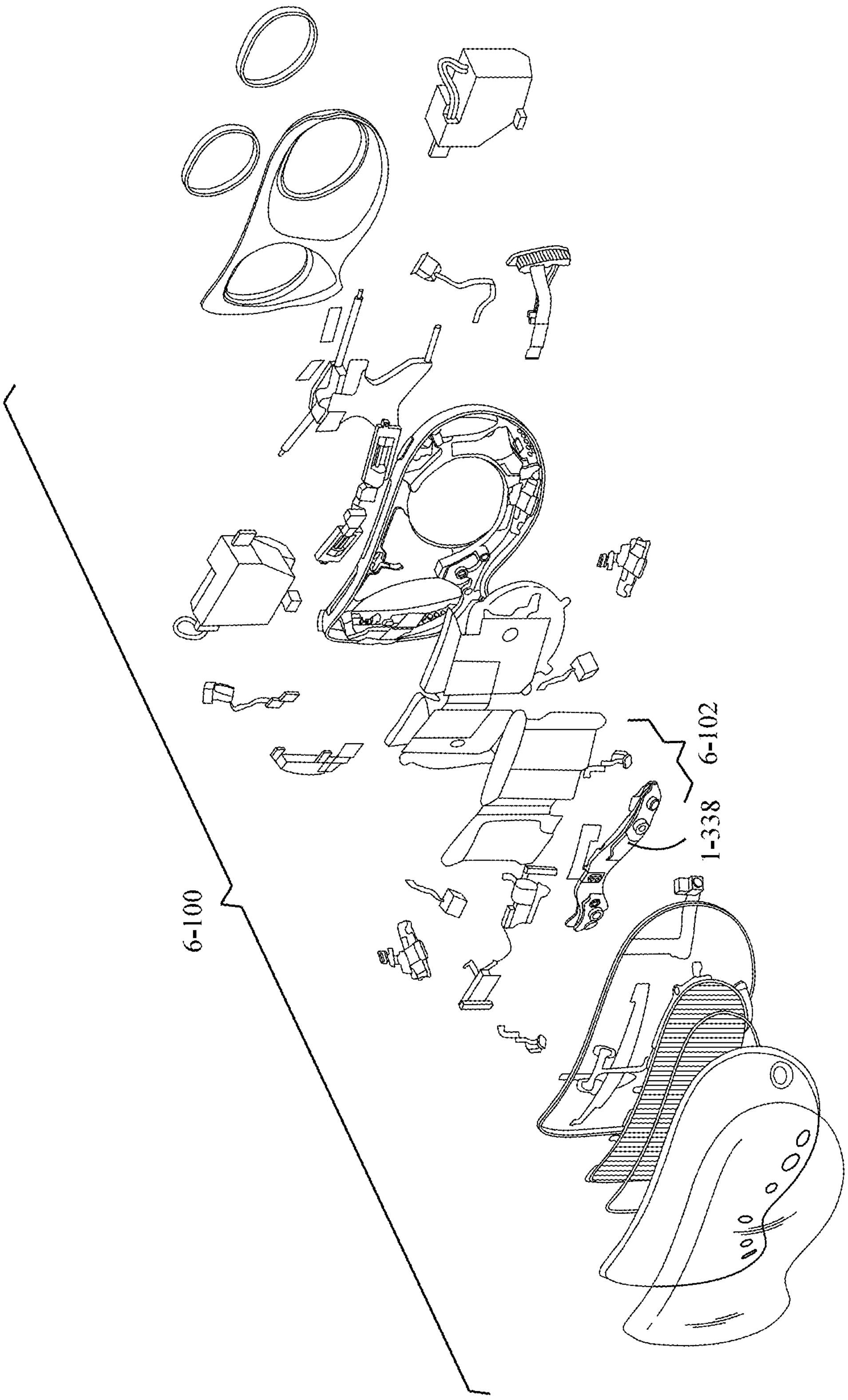
Figure 1I:
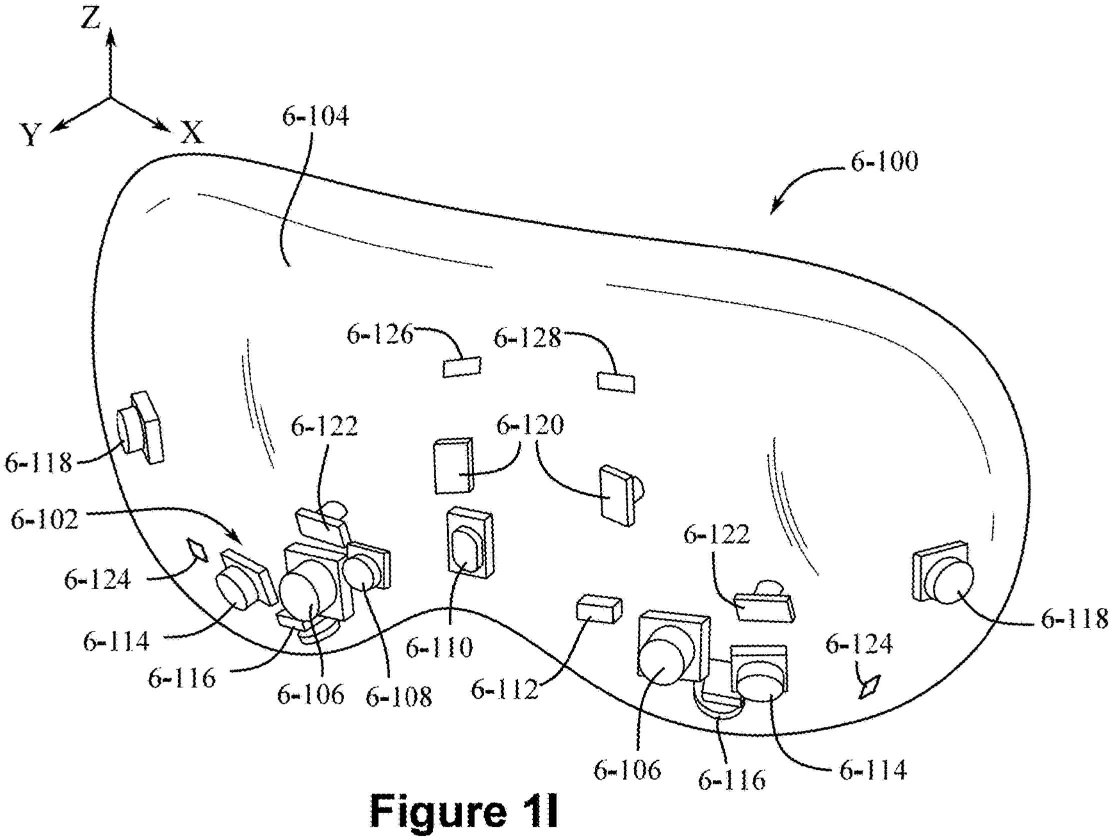
Figure 1J:
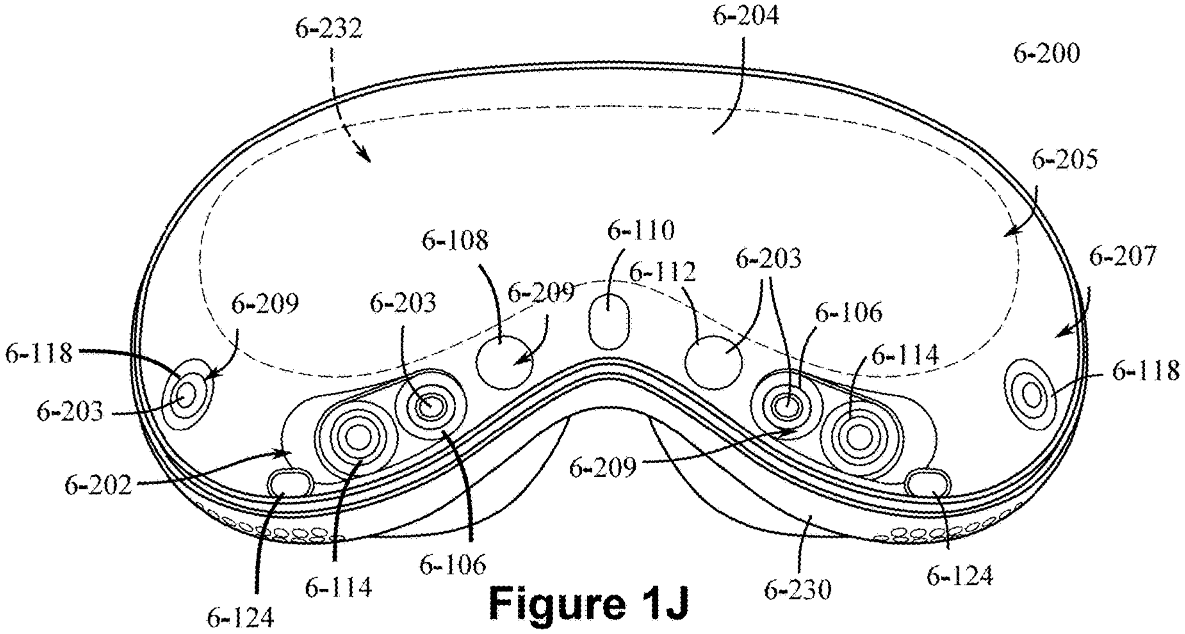
Figure 1K:
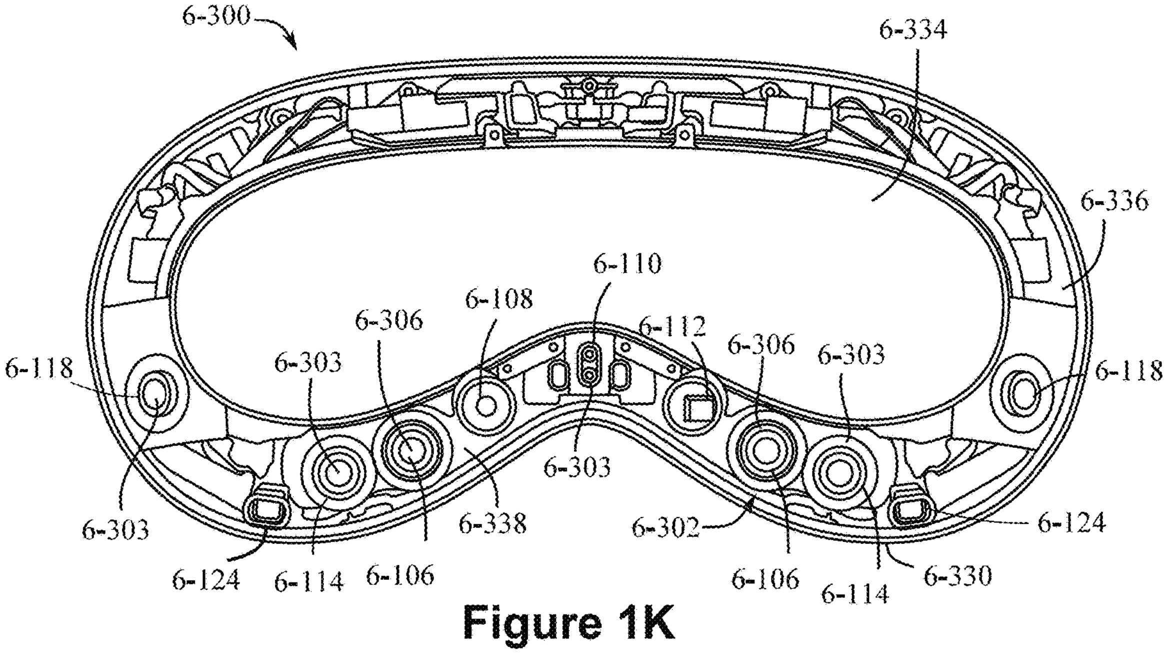
Figure 1L:
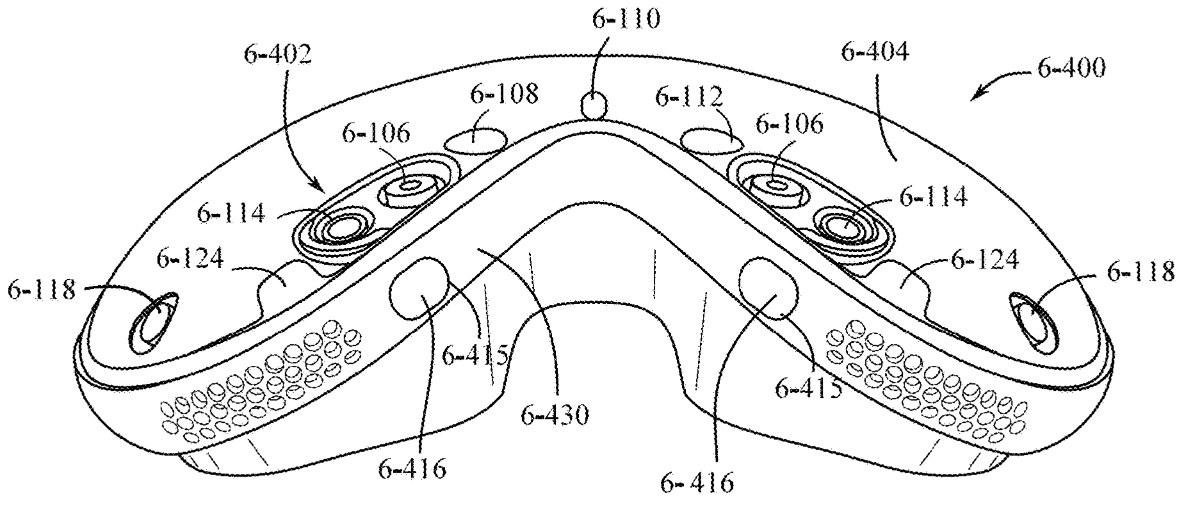
Figure 1M:
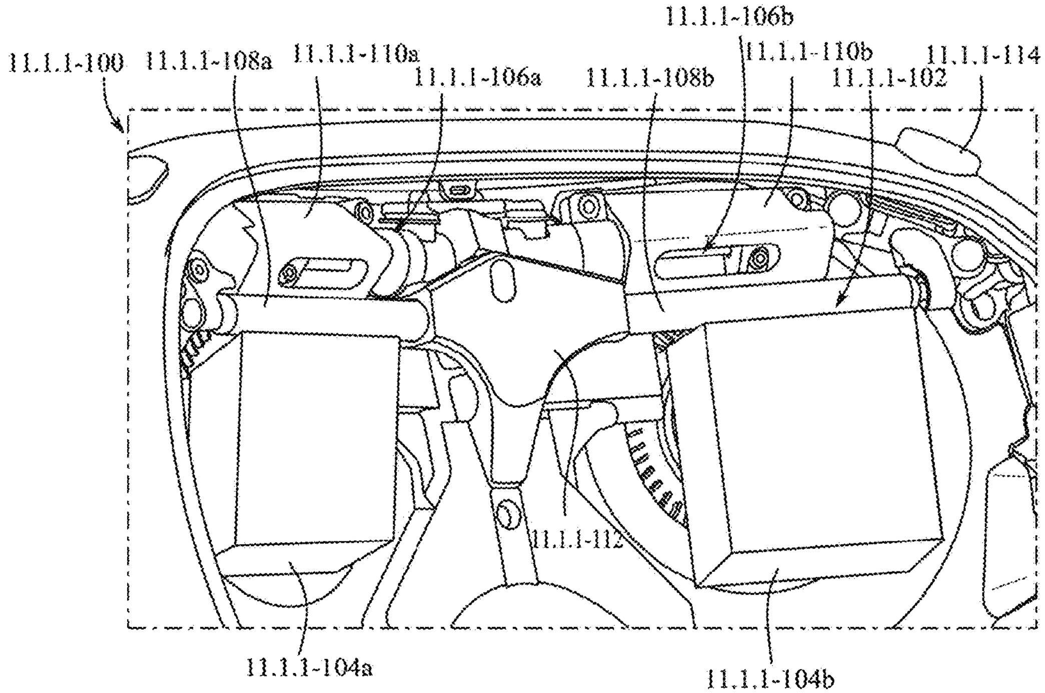
Figure 1N:
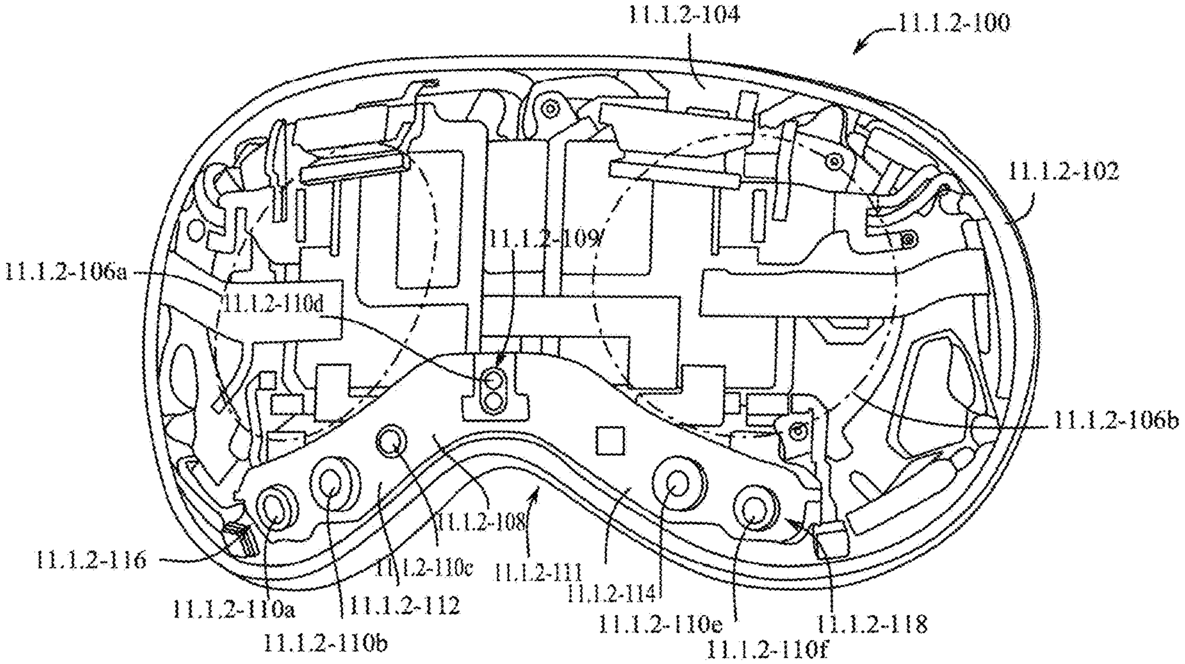
Figure 1O:
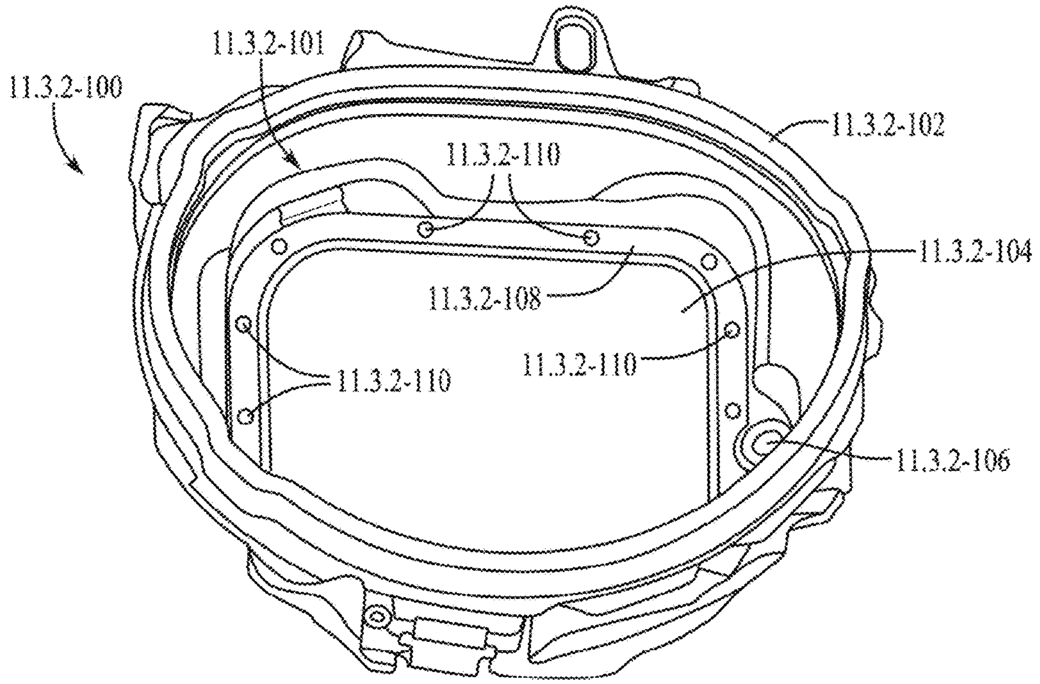
Figure 1P:
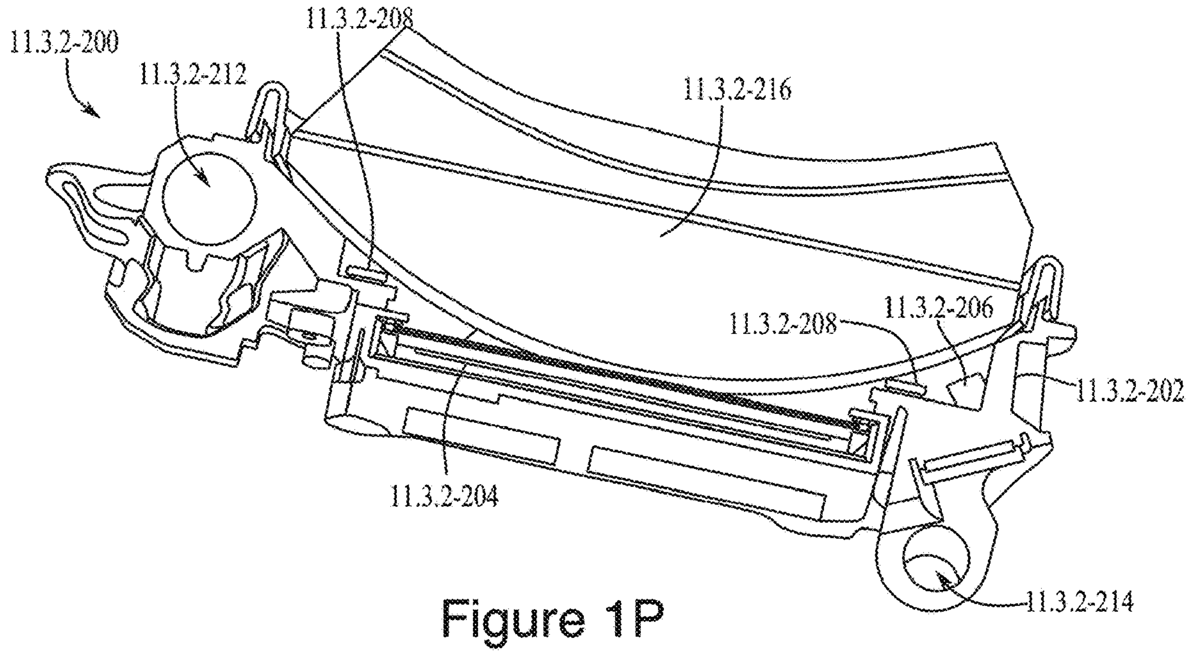

FIGS. 1A-1P illustrate various examples of a computer system that is used to perform the methods and provide audio, visual and/or haptic feedback (e.g., 1-356) as part of user interfaces described herein. In some embodiments, the computer system includes one or more display generation components (e.g., first and second display assemblies 1-120*a*, 1-120*b* and/or first and second optical modules 11.1.1-104*a* and 11.1.1-104*b*) for displaying virtual elements and/or a representation of a physical environment to a user of the computer system, optionally generated based on detected events and/or user inputs detected by the computer system. User interfaces generated by the computer system are optionally corrected by one or more corrective lenses 11.3.2-216 that are optionally removably attached to one or more of the optical modules to enable the user interfaces to be more easily viewed by users who would otherwise use glasses or contacts to correct their vision. While many user interfaces illustrated herein show a single view of a user interface, user interfaces in a HMD are optionally displayed using two optical modules (e.g., first and second display assemblies 1-120*a*, 1-120*b* and/or first and second optical modules 11.1.1-104*a* and 11.1.1-104*b*), one for a user's right eye and a different one for a user's left eye, and slightly different images are presented to the two different eyes to generate the illusion of stereoscopic depth, the single view of the user interface would typically be either a right-eye or left-eye view and the depth effect is explained in the text or using other schematic charts or views. In some embodiments, the computer system includes one or more external displays (e.g., display assembly 1-108) for displaying status information for the computer system to the user of the computer system (when the computer system is not being worn) and/or to other people who are near the computer system, optionally generated based on detected events and/or user inputs detected by the computer system. In some embodiments, the computer system includes one or more audio output components (e.g., electronic component 1-112) for generating audio feedback, optionally generated based on detected events and/or user inputs detected by the computer system. In some embodiments, the computer system includes one or more input devices for detecting input such as one or more sensors (e.g., one or more sensors in sensor assembly 1-356, and/or FIG. 1I) for detecting information about a physical environment of the device which can be used (optionally in conjunction with one or more illuminators such as the illuminators described in FIG. 1I) to generate a digital passthrough image, capture visual media corresponding to the physical environment (e.g., photos and/or video), or determine a pose (e.g., position and/or orientation) of physical objects and/or surfaces in the physical environment so that virtual objects ban be placed based on a detected pose of physical objects and/or surfaces. In some embodiments, the computer system includes one or more input devices for detecting input such as one or more sensors for detecting hand position and/or movement (e.g., one or more sensors in sensor assembly 1-356, and/or FIG. 1I) that can be used (optionally in conjunction with one or more illuminators such as the illuminators 6-124 described in FIG. 1I) to determine when one or more air gestures have been performed. In some embodiments, the computer system includes one or more input devices for detecting input such as one or more sensors for detecting eye movement (e.g., eye tracking and gaze tracking sensors in FIG. 1I) which can be used (optionally in conjunction with one or more lights such as lights 11.3.2-110 in FIG. 1O) to determine attention or gaze position and/or gaze movement which can optionally be used to detect gaze-only inputs based on gaze movement and/or dwell. A combination of the various sensors described above can be used to determine user facial expressions and/or hand movements for use in generating an avatar or representation of the user such as an anthropomorphic avatar or representation for use in a real-time communication session where the avatar has facial expressions, hand movements, and/or body movements that are based on or similar to detected facial expressions, hand movements, and/or body movements of a user of the device. Gaze and/or attention information is, optionally, combined with hand tracking information to determine interactions between the user and one or more user interfaces based on direct and/or indirect inputs such as air gestures or inputs that use one or more hardware input devices such as one or more buttons (e.g., first button 1-128, button 11.1.1-114, second button 1-132, and or dial or button 1-328), knobs (e.g., first button 1-128, button 11.1.1-114, and/or dial or button 1-328), digital crowns (e.g., first button 1-128 which is depressible and twistable or rotatable, button 11.1.1-114, and/or dial or button 1-328), trackpads, touch screens, keyboards, mice and/or other input devices. One or more buttons (e.g., first button 1-128, button 11.1.1-114, second button 1-132, and or dial or button 1-328) are optionally used to perform system operations such as recentering content in three-dimensional environment that is visible to a user of the device, displaying a home user interface for launching applications, starting real-time communication sessions, or initiating display of virtual three-dimensional backgrounds. Knobs or digital crowns (e.g., first button 1-128 which is depressible and twistable or rotatable, button 11.1.1-114, and/or dial or button 1-328) are optionally rotatable to adjust parameters of the visual content such as a level of immersion of a virtual three-dimensional environment (e.g., a degree to which virtual-content occupies the viewport of the user into the three-dimensional environment) or other parameters associated with the three-dimensional environment and the virtual content that is displayed via the optical modules (e.g., first and second display assemblies 1-120*a*, 1-120*b* and/or first and second optical modules 11.1.1-104*a* and 11.1.1-104*b*).

FIG. 1B illustrates a front, top, perspective view of an example of a head-mountable display (HMD) device 1-100 configured to be donned by a user and provide virtual and altered/mixed reality (VR/AR) experiences. The HMD 1-100 can include a display unit 1-102 or assembly, an electronic strap assembly 1-104 connected to and extending from the display unit 1-102, and a band assembly 1-106 secured at either end to the electronic strap assembly 1-104. The electronic strap assembly 1-104 and the band 1-106 can be part of a retention assembly configured to wrap around a user's head to hold the display unit 1-102 against the face of the user.

In at least one example, the band assembly 1-106 can include a first band 1-116 configured to wrap around the rear side of a user's head and a second band 1-117 configured to extend over the top of a user's head. The second strap can extend between first and second electronic straps 1-105*a*, 1-105*b* of the electronic strap assembly 1-104 as shown. The strap assembly 1-104 and the band assembly 1-106 can be part of a securement mechanism extending rearward from the display unit 1-102 and configured to hold the display unit 1-102 against a face of a user.

In at least one example, the securement mechanism includes a first electronic strap 1-105*a* including a first proximal end 1-134 coupled to the display unit 1-102, for example a housing 1-150 of the display unit 1-102, and a first distal end 1-136 opposite the first proximal end 1-134. The securement mechanism can also include a second electronic strap 1-105*b* including a second proximal end 1-138 coupled to the housing 1-150 of the display unit 1-102 and a second distal end 1-140 opposite the second proximal end 1-138. The securement mechanism can also include the first band 1-116 including a first end 1-142 coupled to the first distal end 1-136 and a second end 1-144 coupled to the second distal end 1-140 and the second band 1-117 extending between the first electronic strap 1-105*a* and the second electronic strap 1-105*b*. The straps 1-105*a-b* and band 1-116 can be coupled via connection mechanisms or assemblies 1-114. In at least one example, the second band 1-117 includes a first end 1-146 coupled to the first electronic strap 1-105*a* between the first proximal end 1-134 and the first distal end 1-136 and a second end 1-148 coupled to the second electronic strap 1-105*b* between the second proximal end 1-138 and the second distal end 1-140.

In at least one example, the first and second electronic straps 1-105*a-b* include plastic, metal, or other structural materials forming the shape the substantially rigid straps 1-105*a-b*. In at least one example, the first and second bands 1-116, 1-117 are formed of elastic, flexible materials including woven textiles, rubbers, and the like. The first and second bands 1-116, 1-117 can be flexible to conform to the shape of the user' head when donning the HMD 1-100.

In at least one example, one or more of the first and second electronic straps 1-105*a-b* can define internal strap volumes and include one or more electronic components disposed in the internal strap volumes. In one example, as shown in FIG. 1B, the first electronic strap 1-105*a* can include an electronic component 1-112. In one example, the electronic component 1-112 can include a speaker. In one example, the electronic component 1-112 can include a computing component such as a processor.

In at least one example, the housing 1-150 defines a first, front-facing opening 1-152. The front-facing opening is labeled in dotted lines at 1-152 in FIG. 1B because the display assembly 1-108 is disposed to occlude the first opening 1-152 from view when the HMD 1-100 is assembled. The housing 1-150 can also define a rear-facing second opening 1-154. The housing 1-150 also defines an internal volume between the first and second openings 1-152, 1-154. In at least one example, the HMD 1-100 includes the display assembly 1-108, which can include a front cover and display screen (shown in other figures) disposed in or across the front opening 1-152 to occlude the front opening 1-152. In at least one example, the display screen of the display assembly 1-108, as well as the display assembly 1-108 in general, has a curvature configured to follow the curvature of a user's face. The display screen of the display assembly 1-108 can be curved as shown to compliment the user's facial features and general curvature from one side of the face to the other, for example from left to right and/or from top to bottom where the display unit 1-102 is pressed.

In at least one example, the housing 1-150 can define a first aperture 1-126 between the first and second openings 1-152, 1-154 and a second aperture 1-130 between the first and second openings 1-152, 1-154. The HMD 1-100 can also include a first button 1-128 disposed in the first aperture 1-126 and a second button 1-132 disposed in the second aperture 1-130. The first and second buttons 1-128, 1-132 can be depressible through the respective apertures 1-126, 1-130. In at least one example, the first button 1-126 and/or second button 1-132 can be twistable dials as well as depressible buttons. In at least one example, the first button

1-128 is a depressible and twistable dial button and the second button 1-132 is a depressible button.

FIG. 1C illustrates a rear, perspective view of the HMD 1-100. The HMD 1-100 can include a light seal 1-110 extending rearward from the housing 1-150 of the display assembly 1-108 around a perimeter of the housing 1-150 as shown. The light seal 1-110 can be configured to extend from the housing 1-150 to the user's face around the user's eyes to block external light from being visible. In one example, the HMD 1-100 can include first and second display assemblies 1-120*a*, 1-120*b* disposed at or in the rearward facing second opening 1-154 defined by the housing 1-150 and/or disposed in the internal volume of the housing 1-150 and configured to project light through the second opening 1-154. In at least one example, each display assembly 1-120*a-b* can include respective display screens 1-122*a*, 1-122*b* configured to project light in a rearward direction through the second opening 1-154 toward the user's eyes.

In at least one example, referring to both FIGS. 1B and 1C, the display assembly 1-108 can be a front-facing, forward display assembly including a display screen configured to project light in a first, forward direction and the rear facing display screens 1-122*a-b* can be configured to project light in a second, rearward direction opposite the first direction. As noted above, the light seal 1-110 can be configured to block light external to the HMD 1-100 from reaching the user's eyes, including light projected by the forward-facing display screen of the display assembly 1-108 shown in the front perspective view of FIG. 1B. In at least one example, the HMD 1-100 can also include a curtain 1-124 occluding the second opening 1-154 between the housing 1-150 and the rear-facing display assemblies 1-120*a-b*. In at least one example, the curtain 1-124 can be elastic or at least partially clastic.

Any of the features, components, and/or parts, including the arrangements and configurations thereof shown in FIGS. 1B and 1C can be included, either alone or in any combination, in any of the other examples of devices, features, components, and parts shown in FIGS. 1D-1F and described herein. Likewise, any of the features, components, and/or parts, including the arrangements and configurations thereof shown and described with reference to FIGS. 1D-1F can be included, either alone or in any combination, in the example of the devices, features, components, and parts shown in FIGS. 1B and 1C.

FIG. 1D illustrates an exploded view of an example of an HMD 1-200 including various portions or parts thereof separated according to the modularity and selective coupling of those parts. For example, the HMD 1-200 can include a band 1-216 which can be selectively coupled to first and second electronic straps 1-205*a*, 1-205*b*. The first securement strap 1-205*a* can include a first electronic component 1-212*a* and the second securement strap 1-205*b* can include a second electronic component 1-212*b*. In at least one example, the first and second straps 1-205*a-b* can be removably coupled to the display unit 1-202.

In addition, the HMD 1-200 can include a light seal 1-210 configured to be removably coupled to the display unit 1-202. The HMD 1-200 can also include lenses 1-218 which can be removably coupled to the display unit 1-202, for example over first and second display assemblies including display screens. The lenses 1-218 can include customized prescription lenses configured for corrective vision. As noted, each part shown in the exploded view of FIG. 1D and described above can be removably coupled, attached, re-attached, and changed out to update parts or swap out parts for different users. For example, bands such as the band 1-216, light seals such as the light seal 1-210, lenses such as the lenses 1-218, and electronic straps such as the straps 1-205*a-b* can be swapped out depending on the user such that these parts are customized to fit and correspond to the individual user of the HMD 1-200.

Any of the features, components, and/or parts, including the arrangements and configurations thereof shown in FIG. 1D can be included, either alone or in any combination, in any of the other examples of devices, features, components, and parts shown in FIGS. 1B, 1C, and 1E-IF and described herein. Likewise, any of the features, components, and/or parts, including the arrangements and configurations thereof shown and described with reference to FIGS. 1B, 1C, and 1E-IF can be included, cither alone or in any combination, in the example of the devices, features, components, and parts shown in FIG. 1D.

FIG. 1E illustrates an exploded view of an example of a display unit 1-306 of a HMD. The display unit 1-306 can include a front display assembly 1-308, a frame/housing assembly 1-350, and a curtain assembly 1-324. The display unit 1-306 can also include a sensor assembly 1-356, logic board assembly 1-358, and cooling assembly 1-360 disposed between the frame assembly 1-350 and the front display assembly 1-308. In at least one example, the display unit 1-306 can also include a rear-facing display assembly 1-320 including first and second rear-facing display screens 1-322*a*, 1-322*b* disposed between the frame 1-350 and the curtain assembly 1-324.

In at least one example, the display unit 1-306 can also include a motor assembly 1-362 configured as an adjustment mechanism for adjusting the positions of the display screens 1-322*a-b* of the display assembly 1-320 relative to the frame 1-350. In at least one example, the display assembly 1-320 is mechanically coupled to the motor assembly 1-362, with at least one motor for each display screen 1-322*a-b*, such that the motors can translate the display screens 1-322*a-b* to match an interpupillary distance of the user's eyes.

In at least one example, the display unit 1-306 can include a dial or button 1-328 depressible relative to the frame 1-350 and accessible to the user outside the frame 1-350. The button 1-328 can be electronically connected to the motor assembly 1-362 via a controller such that the button 1-328 can be manipulated by the user to cause the motors of the motor assembly 1-362 to adjust the positions of the display screens 1-322*a-b*.

Any of the features, components, and/or parts, including the arrangements and configurations thereof shown in FIG. 1E can be included, either alone or in any combination, in any of the other examples of devices, features, components, and parts shown in FIGS. 1B-1D and IF and described herein. Likewise, any of the features, components, and/or parts, including the arrangements and configurations thereof shown and described with reference to FIGS. 1B-ID and IF can be included, either alone or in any combination, in the example of the devices, features, components, and parts shown in FIG. 1E.

FIG. 1F illustrates an exploded view of another example of a display unit 1-406 of a HMD device similar to other HMD devices described herein. The display unit 1-406 can include a front display assembly 1-402, a sensor assembly 1-456, a logic board assembly 1-458, a cooling assembly 1-460, a frame assembly 1-450, a rear-facing display assembly 1-421, and a curtain assembly 1-424. The display unit 1-406 can also include a motor assembly 1-462 for adjusting the positions of first and second display sub-assemblies 1-420*a*, 1-420*b* of the rear-facing display assembly 1-421, including first and second respective display screens for interpupillary adjustments, as described above.

The various parts, systems, and assemblies shown in the exploded view of FIG. 1F are described in greater detail herein with reference to FIGS. 1B-1E as well as subsequent figures referenced in the present disclosure. The display unit 1-406 shown in FIG. 1F can be assembled and integrated with the securement mechanisms shown in FIGS. 1B-1E, including the electronic straps, bands, and other components including light seals, connection assemblies, and so forth.

Any of the features, components, and/or parts, including the arrangements and configurations thereof shown in FIG. 1F can be included, either alone or in any combination, in any of the other examples of devices, features, components, and parts shown in FIGS. 1B-1E and described herein. Likewise, any of the features, components, and/or parts, including the arrangements and configurations thereof shown and described with reference to FIGS. 1B-1E can be included, cither alone or in any combination, in the example of the devices, features, components, and parts shown in FIG. 1F.

FIG. 1G illustrates a perspective, exploded view of a front cover assembly 3-100 of an HMD device described herein, for example the front cover assembly 3-1 of the HMD 3-100 shown in FIG. 1G or any other HMD device shown and described herein. The front cover assembly 3-100 shown in FIG. 1G can include a transparent or semi-transparent cover 3-102, shroud 3-104 (or "canopy"), adhesive layers 3-106, display assembly 3-108 including a lenticular lens panel or array 3-110, and a structural trim 3-112. The adhesive layer 3-106 can secure the shroud 3-104 and/or transparent cover 3-102 to the display assembly 3-108 and/or the trim 3-112. The trim 3-112 can secure the various components of the front cover assembly 3-100 to a frame or chassis of the HMD device.

In at least one example, as shown in FIG. 1G, the transparent cover 3-102, shroud 3-104, and display assembly 3-108, including the lenticular lens array 3-110, can be curved to accommodate the curvature of a user's face. The transparent cover 3-102 and the shroud 3-104 can be curved in two or three dimensions, e.g., vertically curved in the Z-direction in and out of the Z-X plane and horizontally curved in the X-direction in and out of the Z-X plane. In at least one example, the display assembly 3-108 can include the lenticular lens array 3-110 as well as a display panel having pixels configured to project light through the shroud 3-104 and the transparent cover 3-102. The display assembly 3-108 can be curved in at least one direction, for example the horizontal direction, to accommodate the curvature of a user's face from one side (e.g., left side) of the face to the other (e.g., right side). In at least one example, each layer or component of the display assembly 3-108, which will be shown in subsequent figures and described in more detail, but which can include the lenticular lens array 3-110 and a display layer, can be similarly or concentrically curved in the horizontal direction to accommodate the curvature of the user's face.

In at least one example, the shroud 3-104 can include a transparent or semi-transparent material through which the display assembly 3-108 projects light. In one example, the shroud 3-104 can include one or more opaque portions, for example opaque ink-printed portions or other opaque film portions on the rear surface of the shroud 3-104. The rear surface can be the surface of the shroud 3-104 facing the user's eyes when the HMD device is donned. In at least one example, opaque portions can be on the front surface of the shroud 3-104 opposite the rear surface. In at least one example, the opaque portion or portions of the shroud 3-104 can include perimeter portions visually hiding any components around an outside perimeter of the display screen of the display assembly 3-108. In this way, the opaque portions of the shroud hide any other components, including electronic components, structural components, and so forth, of the HMD device that would otherwise be visible through the transparent or semi-transparent cover 3-102 and/or shroud 3-104.

In at least one example, the shroud 3-104 can define one or more apertures transparent portions 3-120 through which sensors can send and receive signals. In one example, the portions 3-120 are apertures through which the sensors can extend or send and receive signals. In one example, the portions 3-120 are transparent portions, or portions more transparent than surrounding semi-transparent or opaque portions of the shroud, through which sensors can send and receive signals through the shroud and through the transparent cover 3-102. In one example, the sensors can include cameras, IR sensors, LUX sensors, or any other visual or non-visual environmental sensors of the HMD device.

Any of the features, components, and/or parts, including the arrangements and configurations thereof shown in FIG. 1G can be included, either alone or in any combination, in any of the other examples of devices, features, components, and parts described herein. Likewise, any of the features, components, and/or parts, including the arrangements and configurations thereof shown and described herein can be included, either alone or in any combination, in the example of the devices, features, components, and parts shown in FIG. 1G.

FIG. 1H illustrates an exploded view of an example of an HMD device 6-100. The HMD device 6-100 can include a sensor array or system 6-102 including one or more sensors, cameras, projectors, and so forth mounted to one or more components of the HMD 6-100. In at least one example, the sensor system 6-102 can include a bracket 1-338 on which one or more sensors of the sensor system 6-102 can be fixed/secured.

FIG. 1I illustrates a portion of an HMD device 6-100 including a front transparent cover 6-104 and a sensor system 6-102. The sensor system 6-102 can include a number of different sensors, emitters, receivers, including cameras, IR sensors, projectors, and so forth. The transparent cover 6-104 is illustrated in front of the sensor system 6-102 to illustrate relative positions of the various sensors and emitters as well as the orientation of each sensor/emitter of the system 6-102. As referenced herein, "sideways," "side," "lateral," "horizontal," and other similar terms refer to orientations or directions as indicated by the X-axis shown in FIG. 1J. Terms such as "vertical," "up," "down," and similar terms refer to orientations or directions as indicated by the Z-axis shown in FIG. 1J. Terms such as "frontward," "rearward," "forward," backward," and similar terms refer to orientations or directions as indicated by the Y-axis shown in FIG. 1J.

In at least one example, the transparent cover 6-104 can define a front, external surface of the HMD device 6-100 and the sensor system 6-102, including the various sensors and components thereof, can be disposed behind the cover 6-104 in the Y-axis/direction. The cover 6-104 can be transparent or semi-transparent to allow light to pass through the cover 6-104, both light detected by the sensor system 6-102 and light emitted thereby.

As noted elsewhere herein, the HMD device 6-100 can include one or more controllers including processors for electrically coupling the various sensors and emitters of the sensor system 6-102 with one or more mother boards, processing units, and other electronic devices such as display screens and the like. In addition, as will be shown in more detail below with reference to other figures, the various sensors, emitters, and other components of the sensor system 6-102 can be coupled to various structural frame members, brackets, and so forth of the HMD device 6-100 not shown in FIG. 1I. FIG. 1I shows the components of the sensor system 6-102 unattached and un-coupled electrically from other components for the sake of illustrative clarity.

In at least one example, the device can include one or more controllers having processors configured to execute instructions stored on memory components electrically coupled to the processors. The instructions can include, or cause the processor to execute, one or more algorithms for self-correcting angles and positions of the various cameras described herein overtime with use as the initial positions, angles, or orientations of the cameras get bumped or deformed due to unintended drop events or other events.

In at least one example, the sensor system 6-102 can include one or more scene cameras 6-106. The system 6-102 can include two scene cameras 6-102 disposed on either side of the nasal bridge or arch of the HMD device 6-100 such that each of the two cameras 6-106 correspond generally in position with left and right eyes of the user behind the cover 6-103. In at least one example, the scene cameras 6-106 are oriented generally forward in the Y-direction to capture images in front of the user during use of the HMD 6-100. In at least one example, the scene cameras are color cameras and provide images and content for MR video pass through to the display screens facing the user's eyes when using the HMD device 6-100. The scene cameras 6-106 can also be used for environment and object reconstruction.

In at least one example, the sensor system 6-102 can include a first depth sensor 6-108 pointed generally forward in the Y-direction. In at least one example, the first depth sensor 6-108 can be used for environment and object reconstruction as well as user hand and body tracking. In at least one example, the sensor system 6-102 can include a second depth sensor 6-110 disposed centrally along the width (e.g., along the X-axis) of the HMD device 6-100. For example, the second depth sensor 6-110 can be disposed above the central nasal bridge or accommodating features over the nose of the user when donning the HMD 6-100. In at least one example, the second depth sensor 6-110 can be used for environment and object reconstruction as well as hand and body tracking. In at least one example, the second depth sensor can include a LIDAR sensor.

In at least one example, the sensor system 6-102 can include a depth projector 6-112 facing generally forward to project electromagnetic waves, for example in the form of a predetermined pattern of light dots, out into and within a field of view of the user and/or the scene cameras 6-106 or a field of view including and beyond the field of view of the user and/or scene cameras 6-106. In at least one example, the depth projector can project electromagnetic waves of light in the form of a dotted light pattern to be reflected off objects and back into the depth sensors noted above, including the depth sensors 6-108, 6-110. In at least one example, the depth projector 6-112 can be used for environment and object reconstruction as well as hand and body tracking.

In at least one example, the sensor system 6-102 can include downward facing cameras 6-114 with a field of view pointed generally downward relative to the HDM device 6-100 in the Z-axis. In at least one example, the downward cameras 6-114 can be disposed on left and right sides of the HMD device 6-100 as shown and used for hand and body tracking, headset tracking, and facial avatar detection and creation for display a user avatar on the forward facing display screen of the HMD device 6-100 described elsewhere herein. The downward cameras 6-114, for example, can be used to capture facial expressions and movements for the face of the user below the HMD device 6-100, including the checks, mouth, and chin.

In at least one example, the sensor system 6-102 can include jaw cameras 6-116. In at least one example, the jaw cameras 6-116 can be disposed on left and right sides of the HMD device 6-100 as shown and used for hand and body tracking, headset tracking, and facial avatar detection and creation for display a user avatar on the forward-facing display screen of the HMD device 6-100 described elsewhere herein. The jaw cameras 6-116, for example, can be used to capture facial expressions and movements for the face of the user below the HMD device 6-100, including the user's jaw, cheeks, mouth, and chin. for hand and body tracking, headset tracking, and facial avatar In at least one example, the sensor system 6-102 can include side cameras 6-118. The side cameras 6-118 can be oriented to capture side views left and right in the X-axis or direction relative to the HMD device 6-100. In at least one example, the side cameras 6-118 can be used for hand and body tracking, headset tracking, and facial avatar detection and re-creation.

In at least one example, the sensor system 6-102 can include a plurality of eye tracking and gaze tracking sensors for determining an identity, status, and gaze direction of a user's eyes during and/or before use. In at least one example, the eye/gaze tracking sensors can include nasal eye cameras 6-120 disposed on either side of the user's nose and adjacent the user's nose when donning the HMD device 6-100. The eye/gaze sensors can also include bottom eye cameras 6-122 disposed below respective user eyes for capturing images of the eyes for facial avatar detection and creation, gaze tracking, and iris identification functions.

In at least one example, the sensor system 6-102 can include infrared illuminators 6-124 pointed outward from the HMD device 6-100 to illuminate the external environment and any object therein with IR light for IR detection with one or more IR sensors of the sensor system 6-102. In at least one example, the sensor system 6-102 can include a flicker sensor 6-126 and an ambient light sensor 6-128. In at least one example, the flicker sensor 6-126 can detect overhead light refresh rates to avoid display flicker. In one example, the infrared illuminators 6-124 can include light emitting diodes and can be used especially for low light environments for illuminating user hands and other objects in low light for detection by infrared sensors of the sensor system 6-102.

In at least one example, multiple sensors, including the scene cameras 6-106, the downward cameras 6-114, the jaw cameras 6-116, the side cameras 6-118, the depth projector 6-112, and the depth sensors 6-108, 6-110 can be used in combination with an electrically coupled controller to combine depth data with camera data for hand tracking and for size determination for better hand tracking and object recognition and tracking functions of the HMD device 6-100. In at least one example, the downward cameras 6-114, jaw cameras 6-116, and side cameras 6-118 described above and shown in FIG. 1I can be wide angle cameras operable in the visible and infrared spectrums. In at least one example, these cameras 6-114, 6-116, 6-118 can operate only in black and white light detection to simplify image processing and gain sensitivity.

Any of the features, components, and/or parts, including the arrangements and configurations thereof shown in FIG. 1I can be included, either alone or in any combination, in any of the other examples of devices, features, components, and parts shown in FIGS. 1J-1L and described herein. Likewise, any of the features, components, and/or parts, including the arrangements and configurations thereof shown and described with reference to FIGS. 1J-1L can be included, either alone or in any combination, in the example of the devices, features, components, and parts shown in FIG. 1I.

FIG. 1J illustrates a lower perspective view of an example of an HMD 6-200 including a cover or shroud 6-204 secured to a frame 6-230. In at least one example, the sensors 6-203 of the sensor system 6-202 can be disposed around a perimeter of the HDM 6-200 such that the sensors 6-203 are outwardly disposed around a perimeter of a display region or area 6-232 so as not to obstruct a view of the displayed light. In at least one example, the sensors can be disposed behind the shroud 6-204 and aligned with transparent portions of the shroud allowing sensors and projectors to allow light back and forth through the shroud 6-204. In at least one example, opaque ink or other opaque material or films/layers can be disposed on the shroud 6-204 around the display area 6-232 to hide components of the HMD 6-200 outside the display area 6-232 other than the transparent portions defined by the opaque portions, through which the sensors and projectors send and receive light and electromagnetic signals during operation. In at least one example, the shroud 6-204 allows light to pass therethrough from the display (e.g., within the display region 6-232) but not radially outward from the display region around the perimeter of the display and shroud 6-204.

In some examples, the shroud 6-204 includes a transparent portion 6-205 and an opaque portion 6-207, as described above and elsewhere herein. In at least one example, the opaque portion 6-207 of the shroud 6-204 can define one or more transparent regions 6-209 through which the sensors 6-203 of the sensor system 6-202 can send and receive signals. In the illustrated example, the sensors 6-203 of the sensor system 6-202 sending and receiving signals through the shroud 6-204, or more specifically through the transparent regions 6-209 of the (or defined by) the opaque portion 6-207 of the shroud 6-204 can include the same or similar sensors as those shown in the example of FIG. 1I, for example depth sensors 6-108 and 6-110, depth projector 6-112, first and second scene cameras 6-106, first and second downward cameras 6-114, first and second side cameras 6-118, and first and second infrared illuminators 6-124. These sensors are also shown in the examples of FIGS. 1K and 1L. Other sensors, sensor types, number of sensors, and relative positions thereof can be included in one or more other examples of HMDs.

Any of the features, components, and/or parts, including the arrangements and configurations thereof shown in FIG. 1J can be included, either alone or in any combination, in any of the other examples of devices, features, components, and parts shown in FIGS. 1I and 1K-1L and described herein. Likewise, any of the features, components, and/or parts, including the arrangements and configurations thereof shown and described with reference to FIGS. 1I and 1K-1L can be included, either alone or in any combination, in the example of the devices, features, components, and parts shown in FIG. 1J.

FIG. 1K illustrates a front view of a portion of an example of an HMD device 6-300 including a display 6-334, brackets 6-336, 6-338, and frame or housing 6-330. The example shown in FIG. 1K does not include a front cover or shroud in order to illustrate the brackets 6-336, 6-338. For example, the shroud 6-204 shown in FIG. 1J includes the opaque portion 6-207 that would visually cover/block a view of anything outside (e.g., radially/peripherally outside) the display/display region 6-334, including the sensors 6-303 and bracket 6-338.

In at least one example, the various sensors of the sensor system 6-302 are coupled to the brackets 6-336, 6-338. In at least one example, the scene cameras 6-306 include tight tolerances of angles relative to one another. For example, the tolerance of mounting angles between the two scene cameras 6-306 can be 0.5 degrees or less, for example 0.3 degrees or less. In order to achieve and maintain such a tight tolerance, in one example, the scene cameras 6-306 can be mounted to the bracket 6-338 and not the shroud. The bracket can include cantilevered arms on which the scene cameras 6-306 and other sensors of the sensor system 6-302 can be mounted to remain un-deformed in position and orientation in the case of a drop event by a user resulting in any deformation of the other bracket 6-226, housing 6-330, and/or shroud.

Any of the features, components, and/or parts, including the arrangements and configurations thereof shown in FIG. 1K can be included, either alone or in any combination, in any of the other examples of devices, features, components, and parts shown in FIGS. 11-1J and 1L and described herein. Likewise, any of the features, components, and/or parts, including the arrangements and configurations thereof shown and described with reference to FIGS. 1I-1J and 1L can be included, either alone or in any combination, in the example of the devices, features, components, and parts shown in FIG. 1K.

FIG. 1L illustrates a bottom view of an example of an HMD 6-400 including a front display/cover assembly 6-404 and a sensor system 6-402. The sensor system 6-402 can be similar to other sensor systems described above and elsewhere herein, including in reference to FIGS. 11-1K. In at least one example, the jaw cameras 6-416 can be facing downward to capture images of the user's lower facial features. In one example, the jaw cameras 6-416 can be coupled directly to the frame or housing 6-430 or one or more internal brackets directly coupled to the frame or housing 6-430 shown. The frame or housing 6-430 can include one or more apertures/openings 6-415 through which the jaw cameras 6-416 can send and receive signals.

Any of the features, components, and/or parts, including the arrangements and configurations thereof shown in FIG. 1L can be included, either alone or in any combination, in any of the other examples of devices, features, components, and parts shown in FIGS. 1I-1K and described herein. Likewise, any of the features, components, and/or parts, including the arrangements and configurations thereof shown and described with reference to FIGS. 1I-1K can be included, either alone or in any combination, in the example of the devices, features, components, and parts shown in FIG. 1L.

FIG. 1M illustrates a rear perspective view of an inter-pupillary distance (IPD) adjustment system 11.1.1-102 including first and second optical modules 11.1.1-104*a-b* slidably engaging/coupled to respective guide-rods 11.1.1-108*a-b* and motors 11.1.1-110*a-b* of left and right adjustment subsystems 11.1.1-106*a-b*. The IPD adjustment system 11.1.1-102 can be coupled to a bracket 11.1.1-112 and include a button 11.1.1-114 in electrical communication with the motors 11.1.1-110*a-b*. In at least one example, the button 11.1.1-114 can electrically communicate with the first and second motors 11.1.1-110*a-b* via a processor or other circuitry components to cause the first and second motors 11.1.1-110*a-b* to activate and cause the first and second optical modules 11.1.1-104*a-b*, respectively, to change position relative to one another.

In at least one example, the first and second optical modules 11.1.1-104*a-b* can include respective display screens configured to project light toward the user's eyes when donning the HMD 11.1.1-100. In at least one example, the user can manipulate (e.g., depress and/or rotate) the button 11.1.1-114 to activate a positional adjustment of the optical modules 11.1.1-104*a-b* to match the inter-pupillary distance of the user's eyes. The optical modules 11.1.1-104*a-b* can also include one or more cameras or other sensors/sensor systems for imaging and measuring the IPD of the user such that the optical modules 11.1.1-104*a-b* can be adjusted to match the IPD.

In one example, the user can manipulate the button 11.1.1-114 to cause an automatic positional adjustment of the first and second optical modules 11.1.1-104*a-b*. In one example, the user can manipulate the button 11.1.1-114 to cause a manual adjustment such that the optical modules 11.1.1-104*a-b* move further or closer away, for example when the user rotates the button 11.1.1-114 one way or the other, until the user visually matches her/his own IPD. In one example, the manual adjustment is electronically communicated via one or more circuits and power for the movements of the optical modules 11.1.1-104*a-b* via the motors 11.1.1-110*a-b* is provided by an electrical power source. In one example, the adjustment and movement of the optical modules 11.1.1-104*a-b* via a manipulation of the button 11.1.1-114 is mechanically actuated via the movement of the button 11.1.1-114.

Any of the features, components, and/or parts, including the arrangements and configurations thereof shown in FIG. 1M can be included, either alone or in any combination, in any of the other examples of devices, features, components, and parts shown in any other figures shown and described herein. Likewise, any of the features, components, and/or parts, including the arrangements and configurations thereof shown and described with reference to any other figure shown and described herein, either alone or in any combination, in the example of the devices, features, components, and parts shown in FIG. 1M.

FIG. 1N illustrates a front perspective view of a portion of an HMD 11.1.2-100, including an outer structural frame 11.1.2-102 and an inner or intermediate structural frame 11.1.2-104 defining first and second apertures 11.1.2-106*a*, 11.1.2-106*b*. The apertures 11.1.2-106*a-b* are shown in dotted lines in FIG. 1N because a view of the apertures 11.1.2-106*a-b* can be blocked by one or more other components of the HMD 11.1.2-100 coupled to the inner frame 11.1.2-104 and/or the outer frame 11.1.2-102, as shown. In at least one example, the HMD 11.1.2-100 can include a first mounting bracket 11.1.2-108 coupled to the inner frame 11.1.2-104. In at least one example, the mounting bracket 11.1.2-108 is coupled to the inner frame 11.1.2-104 between the first and second apertures 11.1.2-106*a-b*.

The mounting bracket 11.1.2-108 can include a middle or central portion 11.1.2-109 coupled to the inner frame 11.1.2-104. In some examples, the middle or central portion 11.1.2-109 may not be the geometric middle or center of the bracket 11.1.2-108. Rather, the middle/central portion 11.1.2-109 can be disposed between first and second cantilevered extension arms extending away from the middle portion 11.1.2-109. In at least one example, the mounting bracket 108 includes a first cantilever arm 11.1.2-112 and a second cantilever arm 11.1.2-114 extending away from the middle portion 11.1.2-109 of the mount bracket 11.1.2-108 coupled to the inner frame 11.1.2-104.

As shown in FIG. 1N, the outer frame 11.1.2-102 can define a curved geometry on a lower side thereof to accommodate a user's nose when the user dons the HMD 11.1.2-100. The curved geometry can be referred to as a nose bridge 11.1.2-111 and be centrally located on a lower side of the HMD 11.1.2-100 as shown. In at least one example, the mounting bracket 11.1.2-108 can be connected to the inner frame 11.1.2-104 between the apertures 11.1.2-106*a-b* such that the cantilevered arms 11.1.2-112, 11.1.2-114 extend downward and laterally outward away from the middle portion 11.1.2-109 to compliment the nose bridge 11.1.2-111 geometry of the outer frame 11.1.2-102. In this way, the mounting bracket 11.1.2-108 is configured to accommodate the user's nose as noted above. The nose bridge 11.1.2-111 geometry accommodates the nose in that the nose bridge 11.1.2-111 provides a curvature that curves with, above, over, and around the user's nose for comfort and fit.

The first cantilever arm 11.1.2-112 can extend away from the middle portion 11.1.2-109 of the mounting bracket 11.1.2-108 in a first direction and the second cantilever arm 11.1.2-114 can extend away from the middle portion 11.1.2-109 of the mounting bracket 11.1.2-10 in a second direction opposite the first direction. The first and second cantilever arms 11.1.2-112, 11.1.2-114 are referred to as "cantilevered" or "cantilever" arms because each arm 11.1.2-112, 11.1.2-114, includes a distal free end 11.1.2-116, 11.1.2-118, respectively, which are free of affixation from the inner and outer frames 11.1.2-102, 11.1.2-104. In this way, the arms 11.1.2-112, 11.1.2-114 are cantilevered from the middle portion 11.1.2-109, which can be connected to the inner frame 11.1.2-104, with distal ends 11.1.2-102, 11.1.2-104 unattached.

In at least one example, the HMD 11.1.2-100 can include one or more components coupled to the mounting bracket 11.1.2-108. In one example, the components include a plurality of sensors 11.1.2-110*a-f*. Each sensor of the plurality of sensors 11.1.2-110*a-f* can include various types of sensors, including cameras, IR sensors, and so forth. In some examples, one or more of the sensors 11.1.2-110*a-f* can be used for object recognition in three-dimensional space such that it is important to maintain a precise relative position of two or more of the plurality of sensors 11.1.2-110*a-f*. The cantilevered nature of the mounting bracket 11.1.2-108 can protect the sensors 11.1.2-110*a-f* from damage and altered positioning in the case of accidental drops by the user. Because the sensors 11.1.2-110*a-f* are cantilevered on the arms 11.1.2-112, 11.1.2-114 of the mounting bracket 11.1.2-108, stresses and deformations of the inner and/or outer frames 11.1.2-104, 11.1.2-102 are not transferred to the cantilevered arms 11.1.2-112, 11.1.2-114 and thus do not affect the relative positioning of the sensors 11.1.2-110*a-f* coupled/mounted to the mounting bracket 11.1.2-108.

Any of the features, components, and/or parts, including the arrangements and configurations thereof shown in FIG. 1N can be included, either alone or in any combination, in any of the other examples of devices, features, components, and described herein. Likewise, any of the features, components, and/or parts, including the arrangements and configurations thereof shown and described herein can be included, either alone or in any combination, in the example of the devices, features, components, and parts shown in FIG. 1N.

FIG. 1O illustrates an example of an optical module 11.3.2-100 for use in an electronic device such as an HMD, including HDM devices described herein. As shown in one or more other examples described herein, the optical module 11.3.2-100 can be one of two optical modules within an HMD, with each optical module aligned to project light toward a user's eye. In this way, a first optical module can project light via a display screen toward a user's first eye and a second optical module of the same device can project light via another display screen toward the user's second eye.

In at least one example, the optical module 11.3.2-100 can include an optical frame or housing 11.3.2-102, which can also be referred to as a barrel or optical module barrel. The optical module 11.3.2-100 can also include a display 11.3.2-104, including a display screen or multiple display screens, coupled to the housing 11.3.2-102. The display 11.3.2-104 can be coupled to the housing 11.3.2-102 such that the display 11.3.2-104 is configured to project light toward the eye of a user when the HMD of which the display module 11.3.2-100 is a part is donned during use. In at least one example, the housing 11.3.2-102 can surround the display 11.3.2-104 and provide connection features for coupling other components of optical modules described herein.

In one example, the optical module 11.3.2-100 can include one or more cameras 11.3.2-106 coupled to the housing 11.3.2-102. The camera 11.3.2-106 can be positioned relative to the display 11.3.2-104 and housing 11.3.2-102 such that the camera 11.3.2-106 is configured to capture one or more images of the user's eye during use. In at least one example, the optical module 11.3.2-100 can also include a light strip 11.3.2-108 surrounding the display 11.3.2-104. In one example, the light strip 11.3.2-108 is disposed between the display 11.3.2-104 and the camera 11.3.2-106. The light strip 11.3.2-108 can include a plurality of lights 11.3.2-110. The plurality of lights can include one or more light emitting diodes (LEDs) or other lights configured to project light toward the user's eye when the HMD is donned. The individual lights 11.3.2-110 of the light strip 11.3.2-108 can be spaced about the strip 11.3.2-108 and thus spaced about the display 11.3.2-104 uniformly or non-uniformly at various locations on the strip 11.3.2-108 and around the display 11.3.2-104.

In at least one example, the housing 11.3.2-102 defines a viewing opening 11.3.2-101 through which the user can view the display 11.3.2-104 when the HMD device is donned. In at least one example, the LEDs are configured and arranged to emit light through the viewing opening 11.3.2-101 and onto the user's eye. In one example, the camera 11.3.2-106 is configured to capture one or more images of the user's eye through the viewing opening 11.3.2-101.

As noted above, each of the components and features of the optical module 11.3.2-100 shown in FIG. 1O can be replicated in another (e.g., second) optical module disposed with the HMD to interact (e.g., project light and capture images) of another eye of the user.

Any of the features, components, and/or parts, including the arrangements and configurations thereof shown in FIG. 1O can be included, either alone or in any combination, in any of the other examples of devices, features, components, and parts shown in FIG. 1P or otherwise described herein. Likewise, any of the features, components, and/or parts, including the arrangements and configurations thereof shown and described with reference to FIG. 1P or otherwise described herein can be included, either alone or in any combination, in the example of the devices, features, components, and parts shown in FIG. 1O.

FIG. 1P illustrates a cross-sectional view of an example of an optical module 11.3.2-200 including a housing 11.3.2-202, display assembly 11.3.2-204 coupled to the housing 11.3.2-202, and a lens 11.3.2-216 coupled to the housing 11.3.2-202. In at least one example, the housing 11.3.2-202 defines a first aperture or channel 11.3.2-212 and a second aperture or channel 11.3.2-214. The channels 11.3.2-212, 11.3.2-214 can be configured to slidably engage respective rails or guide rods of an HMD device to allow the optical module 11.3.2-200 to adjust in position relative to the user's eyes for match the user's interpapillary distance (IPD). The housing 11.3.2-202 can slidably engage the guide rods to secure the optical module 11.3.2-200 in place within the HMD.

In at least one example, the optical module 11.3.2-200 can also include a lens 11.3.2-216 coupled to the housing 11.3.2-202 and disposed between the display assembly 11.3.2-204 and the user's eyes when the HMD is donned. The lens 11.3.2-216 can be configured to direct light from the display assembly 11.3.2-204 to the user's eye. In at least one example, the lens 11.3.2-216 can be a part of a lens assembly including a corrective lens removably attached to the optical module 11.3.2-200. In at least one example, the lens 11.3.2-216 is disposed over the light strip 11.3.2-208 and the one or more eye-tracking cameras 11.3.2-206 such that the camera 11.3.2-206 is configured to capture images of the user's eye through the lens 11.3.2-216 and the light strip 11.3.2-208 includes lights configured to project light through the lens 11.3.2-216 to the users' eye during use.

Any of the features, components, and/or parts, including the arrangements and configurations thereof shown in FIG. 1P can be included, either alone or in any combination, in any of the other examples of devices, features, components, and parts and described herein. Likewise, any of the features, components, and/or parts, including the arrangements and configurations thereof shown and described herein can be included, either alone or in any combination, in the example of the devices, features, components, and parts shown in FIG. 1P.

Figure 2:
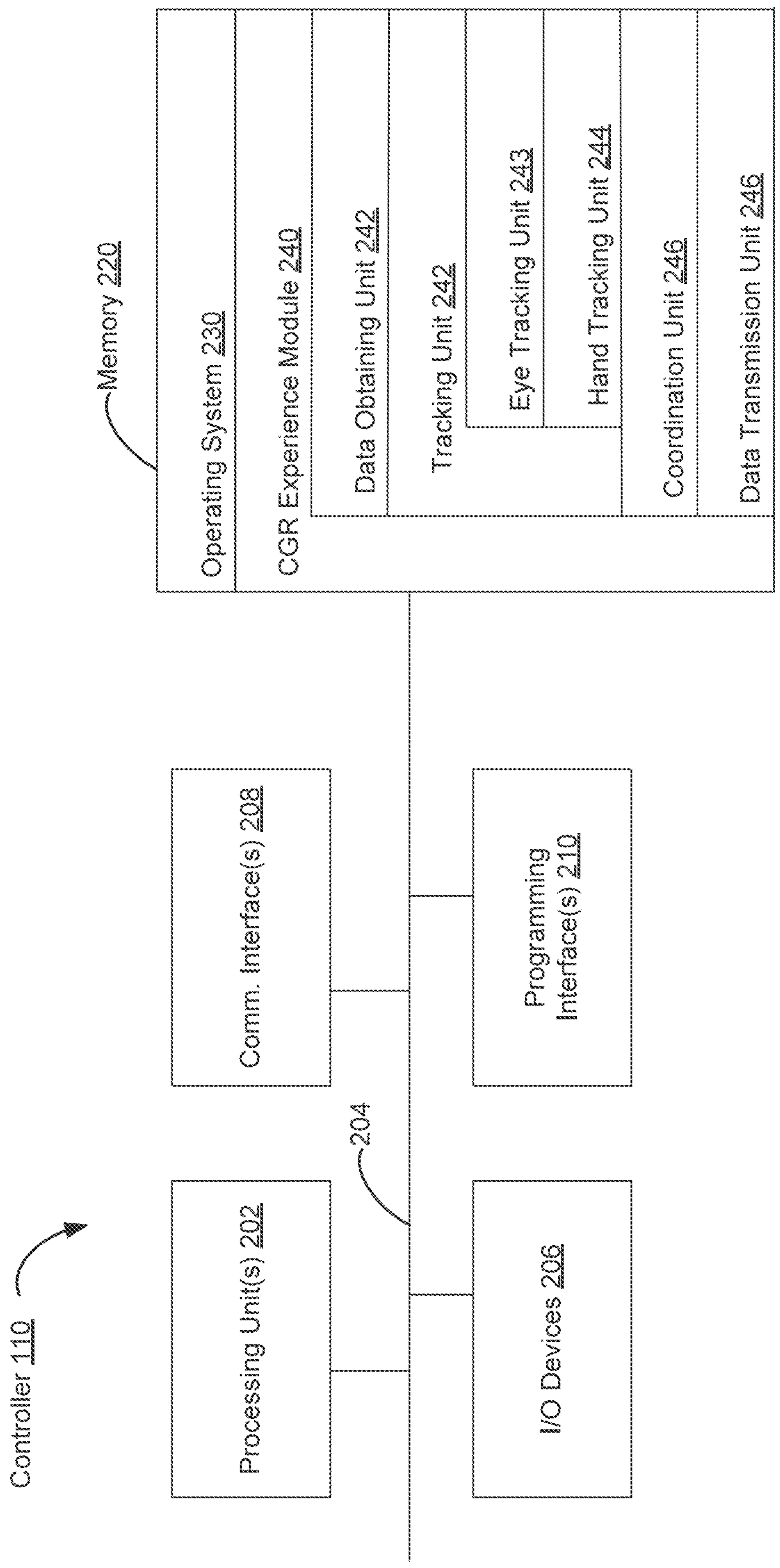
FIG. 2 is a block diagram illustrating a controller of a computer system that is configured to manage and coordinate a XR experience for the user in accordance with some examples.

FIG. 2 is a block diagram of an example of the controller 110 in accordance with some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments, the controller 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some embodiments, the one or more communication buses 204 include circuitry that interconnects and controls communications between system components. In some embodiments, the one or more I/O devices 206 include at least one of a keyboard, a mouse, a touchpad, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some embodiments, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some embodiments, the memory 220 or the non-transitory computer readable storage medium of the memory 220 stores the following programs, modules and data structures, or a subset thereof including an optional operating system 230 and a XR experience module 240.

The operating system 230 includes instructions for handling various basic system services and for performing hardware dependent tasks. In some embodiments, the XR experience module 240 is configured to manage and coordinate one or more XR experiences for one or more users (e.g., a single XR experience for one or more users, or multiple XR experiences for respective groups of one or more users). To that end, in various embodiments, the XR experience module 240 includes a data obtaining unit 241, a tracking unit 242, a coordination unit 246, and a data transmitting unit 248.

In some embodiments, the data obtaining unit 241 is configured to obtain data (e.g., presentation data, interaction data, sensor data, location data, etc.) from at least the display generation component 120 of FIG. 1A, and optionally one or more of the input devices 125, output devices 155, sensors 190, and/or peripheral devices 195. To that end, in various embodiments, the data obtaining unit 241 includes instructions and/or logic therefor, and heuristics and metadata therefor.

In some embodiments, the tracking unit 242 is configured to map the scene 105 and to track the position/location of at least the display generation component 120 with respect to the scene 105 of FIG. 1A, and optionally, to one or more of the input devices 125, output devices 155, sensors 190, and/or peripheral devices 195. To that end, in various embodiments, the tracking unit 242 includes instructions and/or logic therefor, and heuristics and metadata therefor. In some embodiments, the tracking unit 242 includes hand tracking unit 244 and/or eye tracking unit 243. In some embodiments, the hand tracking unit 244 is configured to track the position/location of one or more portions of the user's hands, and/or motions of one or more portions of the user's hands with respect to the scene 105 of FIG. 1A, relative to the display generation component 120, and/or relative to a coordinate system defined relative to the user's hand. The hand tracking unit 244 is described in greater detail below with respect to FIG. 4. In some embodiments, the eye tracking unit 243 is configured to track the position and movement of the user's gaze (or more broadly, the user's eyes, face, or head) with respect to the scene 105 (e.g., with respect to the physical environment and/or to the user (e.g., the user's hand)) or with respect to the XR content displayed via the display generation component 120. The eye tracking unit 243 is described in greater detail below with respect to FIG. 5.

In some embodiments, the coordination unit 246 is configured to manage and coordinate the XR experience presented to the user by the display generation component 120, and optionally, by one or more of the output devices 155 and/or peripheral devices 195. To that end, in various embodiments, the coordination unit 246 includes instructions and/or logic therefor, and heuristics and metadata therefor.

In some embodiments, the data transmitting unit 248 is configured to transmit data (e.g., presentation data, location data, etc.) to at least the display generation component 120, and optionally, to one or more of the input devices 125, output devices 155, sensors 190, and/or peripheral devices 195. To that end, in various embodiments, the data transmitting unit 248 includes instructions and/or logic therefor, and heuristics and metadata therefor.

Although the data obtaining unit 241, the tracking unit 242 (e.g., including the eye tracking unit 243 and the hand tracking unit 244), the coordination unit 246, and the data transmitting unit 248 are shown as residing on a single device (e.g., the controller 110), it should be understood that in other embodiments, any combination of the data obtaining unit 241, the tracking unit 242 (e.g., including the eye tracking unit 243 and the hand tracking unit 244), the coordination unit 246, and the data transmitting unit 248 may be located in separate computing devices.

Moreover, FIG. 2 is intended more as functional description of the various features that may be present in a particular implementation as opposed to a structural schematic of the embodiments described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various embodiments. The actual number of modules and the division of particular functions and how features are allocated among them will vary from one implementation to another and, in some embodiments, depends in part on the particular combination of hardware, software, and/or firmware chosen for a particular implementation.

Figure 3:
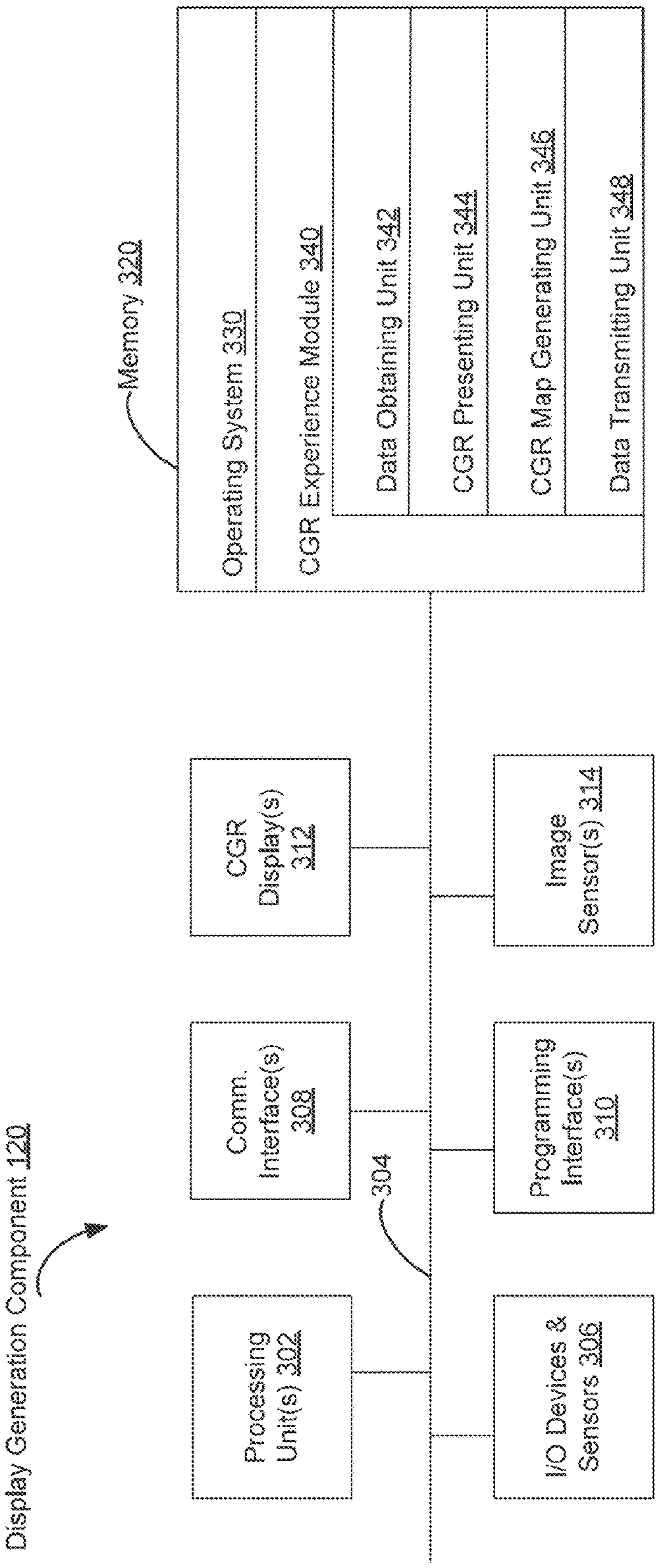
FIG. 3 is a block diagram illustrating a display generation component of a computer system that is configured to provide a visual component of the XR experience to the user in accordance with some examples.

FIG. 3 is a block diagram of an example of the display generation component 120 in accordance with some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments the display generation component 120 (e.g., HMD) includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 310, one or more XR displays 312, one or more optional interior- and/or exterior-facing image sensors 314, a memory 320, and one or more communication buses 304 for interconnecting these and various other components.

In some embodiments, the one or more communication buses 304 include circuitry that interconnects and controls communications between system components. In some embodiments, the one or more I/O devices and sensors 306 include at least one of an inertial measurement unit (IMU), an accelerometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some embodiments, the one or more XR displays 312 are configured to provide the XR experience to the user. In some embodiments, the one or more XR displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some embodiments, the one or more XR displays 312 correspond to diffractive, reflective, polarized, holographic, etc. waveguide displays. For example, the display generation component 120 (e.g., HMD) includes a single XR display. In another example, the display generation component 120 includes a XR display for each eye of the user. In some embodiments, the one or more XR displays 312 are capable of presenting MR and VR content. In some embodiments, the one or more XR displays 312 are capable of presenting MR or VR content.

In some embodiments, the one or more image sensors 314 are configured to obtain image data that corresponds to at least a portion of the face of the user that includes the eyes of the user (and may be referred to as an eye-tracking camera). In some embodiments, the one or more image sensors 314 are configured to obtain image data that corresponds to at least a portion of the user's hand(s) and optionally arm(s) of the user (and may be referred to as a hand-tracking camera). In some embodiments, the one or more image sensors 314 are configured to be forward-facing so as to obtain image data that corresponds to the scene as would be viewed by the user if the display generation component 120 (e.g., HMD) was not present (and may be referred to as a scene camera). The one or more optional image sensors 314 can include one or more RGB cameras (e.g., with a complimentary metal-oxide-semiconductor (CMOS) image sensor or a charge-coupled device (CCD) image sensor), one or more infrared (IR) cameras, one or more event-based cameras, and/or the like.

The memory 320 includes high-speed random-access memory, such as DRAM, SRAM, DDR RAM, or other random-access solid-state memory devices. In some embodiments, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some embodiments, the memory 320 or the non-transitory computer readable storage medium of the memory 320 stores the following programs, modules and data structures, or a subset thereof including an optional operating system 330 and a XR presentation module 340.

The operating system 330 includes instructions for handling various basic system services and for performing hardware dependent tasks. In some embodiments, the XR presentation module 340 is configured to present XR content to the user via the one or more XR displays 312. To that end, in various embodiments, the XR presentation module 340 includes a data obtaining unit 342, a XR presenting unit 344, a XR map generating unit 346, and a data transmitting unit 348.

In some embodiments, the data obtaining unit 342 is configured to obtain data (e.g., presentation data, interaction data, sensor data, location data, etc.) from at least the controller 110 of FIG. 1A. To that end, in various embodiments, the data obtaining unit 342 includes instructions and/or logic therefor, and heuristics and metadata therefor.

In some embodiments, the XR presenting unit 344 is configured to present XR content via the one or more XR displays 312. To that end, in various embodiments, the XR presenting unit 344 includes instructions and/or logic therefor, and heuristics and metadata therefor.

In some embodiments, the XR map generating unit 346 is configured to generate a XR map (e.g., a 3D map of the mixed reality scene or a map of the physical environment into which computer-generated objects can be placed to generate the extended reality) based on media content data. To that end, in various embodiments, the XR map generating unit 346 includes instructions and/or logic therefor, and heuristics and metadata therefor.

In some embodiments, the data transmitting unit 348 is configured to transmit data (e.g., presentation data, location data, etc.) to at least the controller 110, and optionally one or more of the input devices 125, output devices 155, sensors 190, and/or peripheral devices 195. To that end, in various embodiments, the data transmitting unit 348 includes instructions and/or logic therefor, and heuristics and metadata therefor.

Although the data obtaining unit 342, the XR presenting unit 344, the XR map generating unit 346, and the data transmitting unit 348 are shown as residing on a single device (e.g., the display generation component 120 of FIG. 1A), it should be understood that in other embodiments, any combination of the data obtaining unit 342, the XR presenting unit 344, the XR map generating unit 346, and the data transmitting unit 348 may be located in separate computing devices.

Moreover, FIG. 3 is intended more as a functional description of the various features that could be present in a particular implementation as opposed to a structural schematic of the embodiments described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various embodiments. The actual number of modules and the division of particular functions and how features are allocated among them will vary from one implementation to another and, in some embodiments, depends in part on the particular combination of hardware, software, and/or firmware chosen for a particular implementation.

Figure 4:
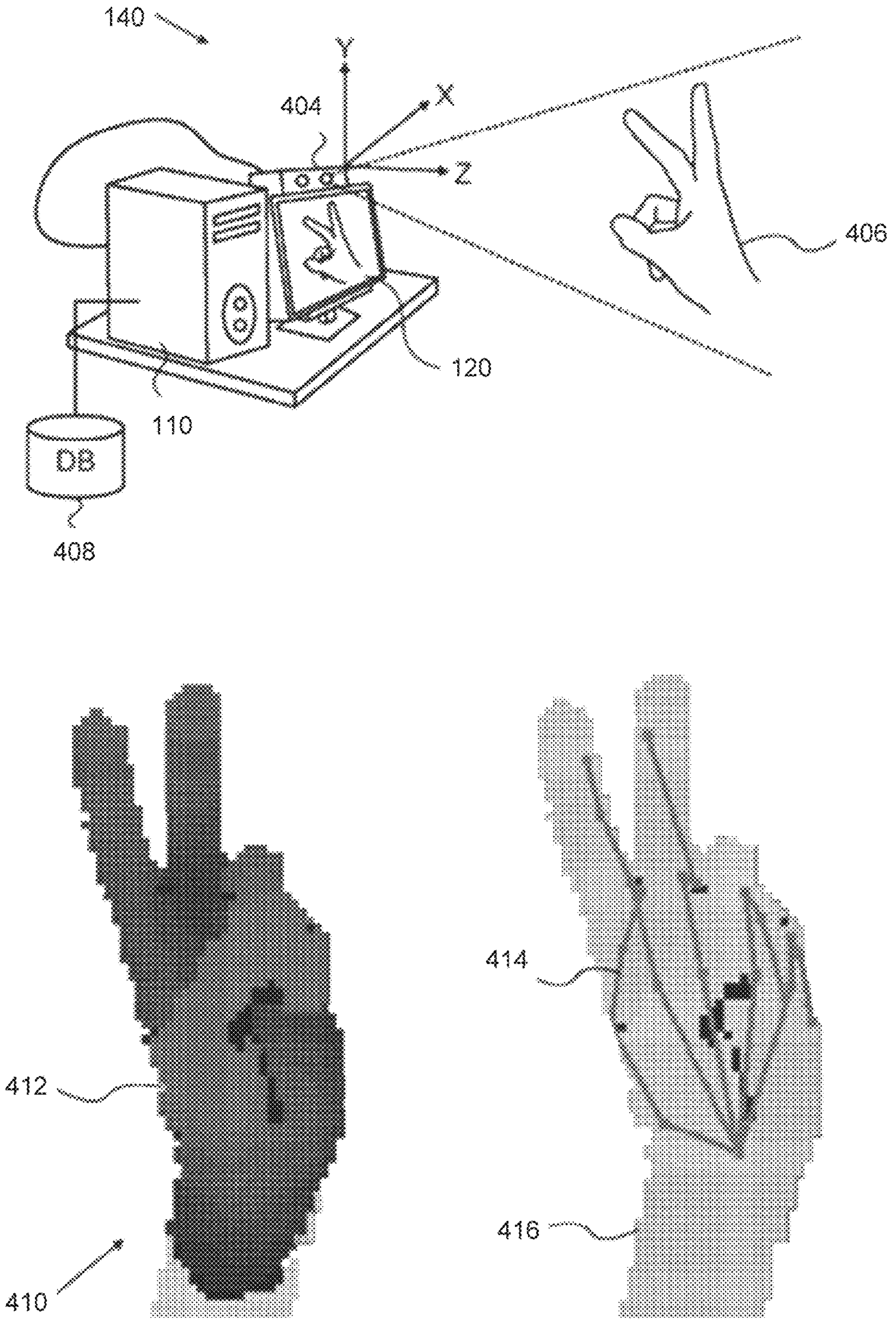
FIG. 4 is a block diagram illustrating a hand tracking unit of a computer system that is configured to capture gesture inputs of the user in accordance with some examples.

FIG. 4 is a schematic, pictorial illustration of an example embodiment of the hand tracking device 140. In some embodiments, hand tracking device 140 (FIG. 1A) is controlled by hand tracking unit 244 (FIG. 2) to track the position/location of one or more portions of the user's hands, and/or motions of one or more portions of the user's hands with respect to the scene 105 of FIG. 1A (e.g., with respect to a portion of the physical environment surrounding the user, with respect to the display generation component 120, or with respect to a portion of the user (e.g., the user's face, eyes, or head), and/or relative to a coordinate system defined relative to the user's hand. In some embodiments, the hand tracking device 140 is part of the display generation component 120 (e.g., embedded in or attached to a head-mounted device). In some embodiments, the hand tracking device 140 is separate from the display generation component 120 (e.g., located in separate housings or attached to separate physical support structures).

In some embodiments, the hand tracking device 140 includes image sensors 404 (e.g., one or more IR cameras, 3D cameras, depth cameras, and/or color cameras, etc.) that capture three-dimensional scene information that includes at least a hand 406 of a human user. The image sensors 404 capture the hand images with sufficient resolution to enable the fingers and their respective positions to be distinguished. The image sensors 404 typically capture images of other parts of the user's body, as well, or possibly all of the body, and may have either zoom capabilities or a dedicated sensor with enhanced magnification to capture images of the hand with the desired resolution. In some embodiments, the image sensors 404 also capture 2D color video images of the hand 406 and other elements of the scene. In some embodiments, the image sensors 404 are used in conjunction with other image sensors to capture the physical environment of the scene 105, or serve as the image sensors that capture the physical environments of the scene 105. In some embodiments, the image sensors 404 are positioned relative to the user or the user's environment in a way that a field of view of the image sensors or a portion thereof is used to define an interaction space in which hand movement captured by the image sensors are treated as inputs to the controller 110.

In some embodiments, the image sensors 404 output a sequence of frames containing 3D map data (and possibly color image data, as well) to the controller 110, which extracts high-level information from the map data. This high-level information is typically provided via an Application Program Interface (API) to an application running on the controller, which drives the display generation component 120 accordingly. For example, the user may interact with software running on the controller 110 by moving his hand 406 and changing his hand posture.

In some embodiments, the image sensors 404 project a pattern of spots onto a scene containing the hand 406 and capture an image of the projected pattern. In some embodiments, the controller 110 computes the 3D coordinates of points in the scene (including points on the surface of the user's hand) by triangulation, based on transverse shifts of the spots in the pattern. This approach is advantageous in that it does not require the user to hold or wear any sort of beacon, sensor, or other marker. It gives the depth coordinates of points in the scene relative to a predetermined reference plane, at a certain distance from the image sensors 404. In the present disclosure, the image sensors 404 are assumed to define an orthogonal set of x, y, z axes, so that depth coordinates of points in the scene correspond to z components measured by the image sensors. Alternatively, the image sensors 404 (e.g., a hand tracking device) may use other methods of 3D mapping, such as stereoscopic imaging or time-of-flight measurements, based on single or multiple cameras or other types of sensors.

In some embodiments, the hand tracking device 140 captures and processes a temporal sequence of depth maps containing the user's hand, while the user moves his hand (e.g., whole hand or one or more fingers). Software running on a processor in the image sensors 404 and/or the controller 110 processes the 3D map data to extract patch descriptors of the hand in these depth maps. The software matches these descriptors to patch descriptors stored in a database 408, based on a prior learning process, in order to estimate the pose of the hand in each frame. The pose typically includes 3D locations of the user's hand joints and fingertips.

The software may also analyze the trajectory of the hands and/or fingers over multiple frames in the sequence in order to identify gestures. The pose estimation functions described herein may be interleaved with motion tracking functions, so that patch-based pose estimation is performed only once in every two (or more) frames, while tracking is used to find changes in the pose that occur over the remaining frames. The pose, motion, and gesture information are provided via the above-mentioned API to an application program running on the controller 110. This program may, for example, move and modify images presented on the display generation component 120, or perform other functions, in response to the pose and/or gesture information.

In some embodiments, a gesture includes an air gesture. An air gesture is a gesture that is detected without the user touching (or independently of) an input element that is part of a device (e.g., computer system 101, one or more input device 125, and/or hand tracking device 140) and is based on detected motion of a portion (e.g., the head, one or more arms, one or more hands, one or more fingers, and/or one or more legs) of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

In some embodiments, input gestures used in the various examples and embodiments described herein include air gestures performed by movement of the user's finger(s) relative to other finger(s) or part(s) of the user's hand) for interacting with an XR environment (e.g., a virtual or mixed-reality environment), in accordance with some embodiments. In some embodiments, an air gesture is a gesture that is detected without the user touching an input element that is part of the device (or independently of an input element that is a part of the device) and is based on detected motion of a portion of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

In some embodiments in which the input gesture is an air gesture (e.g., in the absence of physical contact with an input device that provides the computer system with information about which user interface element is the target of the user input, such as contact with a user interface element displayed on a touchscreen, or contact with a mouse or trackpad to move a cursor to the user interface element), the gesture takes into account the user's attention (e.g., gaze) to determine the target of the user input (e.g., for direct inputs, as described below). Thus, in implementations involving air gestures, the input gesture is, for example, detected attention (e.g., gaze) toward the user interface element in combination (e.g., concurrent) with movement of a user's finger(s) and/or hands to perform a pinch and/or tap input, as described in more detail below.

In some embodiments, input gestures that are directed to a user interface object are performed directly or indirectly with reference to a user interface object. For example, a user input is performed directly on the user interface object in accordance with performing the input gesture with the user's hand at a position that corresponds to the position of the user interface object in the three-dimensional environment (e.g., as determined based on a current viewpoint of the user). In some embodiments, the input gesture is performed indirectly on the user interface object in accordance with the user performing the input gesture while a position of the user's hand is not at the position that corresponds to the position of the user interface object in the three-dimensional environment while detecting the user's attention (e.g., gaze) on the user interface object. For example, for direct input gesture, the user is enabled to direct the user's input to the user interface object by initiating the gesture at, or near, a position corresponding to the displayed position of the user interface object (e.g., within 0.5 cm, 1 cm, 5 cm, or a distance between 0-5 cm, as measured from an outer edge of the option or a center portion of the option). For an indirect input gesture, the user is enabled to direct the user's input to the user interface object by paying attention to the user interface object (e.g., by gazing at the user interface object) and, while paying attention to the option, the user initiates the input gesture (e.g., at any position that is detectable by the computer system) (e.g., at a position that does not correspond to the displayed position of the user interface object).

In some embodiments, input gestures (e.g., air gestures) used in the various examples and embodiments described herein include pinch inputs and tap inputs, for interacting with a virtual or mixed-reality environment, in accordance with some embodiments. For example, the pinch inputs and tap inputs described below are performed as air gestures.

In some embodiments, a pinch input is part of an air gesture that includes one or more of: a pinch gesture, a long pinch gesture, a pinch and drag gesture, or a double pinch gesture. For example, a pinch gesture that is an air gesture includes movement of two or more fingers of a hand to make contact with one another, that is, optionally, followed by an immediate (e.g., within 0-1 seconds) break in contact from each other. A long pinch gesture that is an air gesture includes movement of two or more fingers of a hand to make contact with one another for at least a threshold amount of time (e.g., at least 1 second), before detecting a break in contact with one another. For example, a long pinch gesture includes the user holding a pinch gesture (e.g., with the two or more fingers making contact), and the long pinch gesture continues until a break in contact between the two or more fingers is detected. In some embodiments, a double pinch gesture that is an air gesture comprises two (e.g., or more) pinch inputs (e.g., performed by the same hand) detected in immediate (e.g., within a predefined time period) succession of each other. For example, the user performs a first pinch input (e.g., a pinch input or a long pinch input), releases the first pinch input (e.g., breaks contact between the two or more fingers), and performs a second pinch input within a predefined time period (e.g., within 1 second or within 2 seconds) after releasing the first pinch input.

In some embodiments, a pinch and drag gesture that is an air gesture (e.g., an air drag gesture or an air swipe gesture) includes a pinch gesture (e.g., a pinch gesture or a long pinch gesture) performed in conjunction with (e.g., followed by) a drag input that changes a position of the user's hand from a first position (e.g., a start position of the drag) to a second position (e.g., an end position of the drag). In some embodiments, the user maintains the pinch gesture while performing the drag input, and releases the pinch gesture (e.g., opens their two or more fingers) to end the drag gesture (e.g., at the second position). In some embodiments, the pinch input and the drag input are performed by the same hand (e.g., the user pinches two or more fingers to make contact with one another and moves the same hand to the second position in the air with the drag gesture). In some embodiments, the pinch input is performed by a first hand of the user and the drag input is performed by the second hand of the user (e.g., the user's second hand moves from the first position to the second position in the air while the user continues the pinch input with the user's first hand. In some embodiments, an input gesture that is an air gesture includes inputs (e.g., pinch and/or tap inputs) performed using both of the user's two hands. For example, the input gesture includes two (e.g., or more) pinch inputs performed in conjunction with (e.g., concurrently with, or within a predefined time period of) each other. For example, a first pinch gesture performed using a first hand of the user (e.g., a pinch input, a long pinch input, or a pinch and drag input), and, in conjunction with performing the pinch input using the first hand, performing a second pinch input using the other hand (e.g., the second hand of the user's two hands).

In some embodiments, a tap input (e.g., directed to a user interface element) performed as an air gesture includes movement of a user's finger(s) toward the user interface element, movement of the user's hand toward the user interface element optionally with the user's finger(s) extended toward the user interface element, a downward motion of a user's finger (e.g., mimicking a mouse click motion or a tap on a touchscreen), or other predefined movement of the user's hand. In some embodiments a tap input that is performed as an air gesture is detected based on movement characteristics of the finger or hand performing the tap gesture movement of a finger or hand away from the viewpoint of the user and/or toward an object that is the target of the tap input followed by an end of the movement. In some embodiments the end of the movement is detected based on a change in movement characteristics of the finger or hand performing the tap gesture (e.g., an end of movement away from the viewpoint of the user and/or toward the object that is the target of the tap input, a reversal of direction of movement of the finger or hand, and/or a reversal of a direction of acceleration of movement of the finger or hand).

In some embodiments, attention of a user is determined to be directed to a portion of the three-dimensional environment based on detection of gaze directed to the portion of the three-dimensional environment (optionally, without requiring other conditions). In some embodiments, attention of a user is determined to be directed to a portion of the three-dimensional environment based on detection of gaze directed to the portion of the three-dimensional environment with one or more additional conditions such as requiring that gaze is directed to the portion of the three-dimensional environment for at least a threshold duration (e.g., a dwell duration) and/or requiring that the gaze is directed to the portion of the three-dimensional environment while the viewpoint of the user is within a distance threshold from the portion of the three-dimensional environment in order for the device to determine that attention of the user is directed to the portion of the three-dimensional environment, where if one of the additional conditions is not met, the device determines that attention is not directed to the portion of the three-dimensional environment toward which gaze is directed (e.g., until the one or more additional conditions are met).

In some embodiments, the detection of a ready state configuration of a user or a portion of a user is detected by the computer system. Detection of a ready state configuration of a hand is used by a computer system as an indication that the user is likely preparing to interact with the computer system using one or more air gesture inputs performed by the hand (e.g., a pinch, tap, pinch and drag, double pinch, long pinch, or other air gesture described herein). For example, the ready state of the hand is determined based on whether the hand has a predetermined hand shape (e.g., a pre-pinch shape with a thumb and one or more fingers extended and spaced apart ready to make a pinch or grab gesture or a pre-tap with one or more fingers extended and palm facing away from the user), based on whether the hand is in a predetermined position relative to a viewpoint of the user (e.g., below the user's head and above the user's waist and extended out from the body by at least 15, 20, 25, 30, or 50 cm), and/or based on whether the hand has moved in a particular manner (e.g., moved toward a region in front of the user above the user's waist and below the user's head or moved away from the user's body or leg). In some embodiments, the ready state is used to determine whether interactive elements of the user interface respond to attention (e.g., gaze) inputs.

In scenarios where inputs are described with reference to air gestures, it should be understood that similar gestures could be detected using a hardware input device that is attached to or held by one or more hands of a user, where the position of the hardware input device in space can be tracked using optical tracking, one or more accelerometers, one or more gyroscopes, one or more magnetometers, and/or one or more inertial measurement units and the position and/or movement of the hardware input device is used in place of the position and/or movement of the one or more hands in the corresponding air gesture(s). In scenarios where inputs are described with reference to air gestures, it should be understood that similar gestures could be detected using a hardware input device that is attached to or held by one or more hands of a user. User inputs can be detected with controls contained in the hardware input device such as one or more touch-sensitive input elements, one or more pressure-sensitive input elements, one or more buttons, one or more knobs, one or more dials, one or more joysticks, one or more hand or finger coverings that can detect a position or change in position of portions of a hand and/or fingers relative to each other, relative to the user's body, and/or relative to a physical environment of the user, and/or other hardware input device controls, where the user inputs with the controls contained in the hardware input device are used in place of hand and/or finger gestures such as air taps or air pinches in the corresponding air gesture(s). For example, a selection input that is described as being performed with an air tap or air pinch input could be alternatively detected with a button press, a tap on a touch-sensitive surface, a press on a pressure-sensitive surface, or other hardware input. As another example, a movement input that is described as being performed with an air pinch and drag (e.g., an air drag gesture or an air swipe gesture) could be alternatively detected based on an interaction with the hardware input control such as a button press and hold, a touch on a touch-sensitive surface, a press on a pressure-sensitive surface, or other hardware input that is followed by movement of the hardware input device (e.g., along with the hand with which the hardware input device is associated) through space. Similarly, a two-handed input that includes movement of the hands relative to each other could be performed with one air gesture and one hardware input device in the hand that is not performing the air gesture, two hardware input devices held in different hands, or two air gestures performed by different hands using various combinations of air gestures and/or the inputs detected by one or more hardware input devices that are described above.

In some embodiments, the software may be downloaded to the controller 110 in electronic form, over a network, for example, or it may alternatively be provided on tangible, non-transitory media, such as optical, magnetic, or electronic memory media. In some embodiments, the database 408 is likewise stored in a memory associated with the controller 110. Alternatively or additionally, some or all of the described functions of the computer may be implemented in dedicated hardware, such as a custom or semi-custom integrated circuit or a programmable digital signal processor (DSP). Although the controller 110 is shown in FIG. 4, by way of example, as a separate unit from the image sensors 404, some or all of the processing functions of the controller may be performed by a suitable microprocessor and software or by dedicated circuitry within the housing of the image sensors 404 (e.g., a hand tracking device) or otherwise associated with the image sensors 404. In some embodiments, at least some of these processing functions may be carried out by a suitable processor that is integrated with the display generation component 120 (e.g., in a television set, a handheld device, or head-mounted device, for example) or with any other suitable computerized device, such as a game console or media player. The sensing functions of image sensors 404 may likewise be integrated into the computer or other computerized apparatus that is to be controlled by the sensor output.

FIG. 4 further includes a schematic representation of a depth map 410 captured by the image sensors 404, in accordance with some embodiments. The depth map, as explained above, comprises a matrix of pixels having respective depth values. The pixels 412 corresponding to the hand 406 have been segmented out from the background and the wrist in this map. The brightness of each pixel within the depth map 410 corresponds inversely to its depth value, i.e., the measured z distance from the image sensors 404, with the shade of gray growing darker with increasing depth. The controller 110 processes these depth values in order to identify and segment a component of the image (i.e., a group of neighboring pixels) having characteristics of a human hand. These characteristics, may include, for example, overall size, shape and motion from frame to frame of the sequence of depth maps.

FIG. 4 also schematically illustrates a hand skeleton 414 that controller 110 ultimately extracts from the depth map 410 of the hand 406, in accordance with some embodiments. In FIG. 4, the hand skeleton 414 is superimposed on a hand background 416 that has been segmented from the original depth map. In some embodiments, key feature points of the hand (e.g., points corresponding to knuckles, fingertips, center of the palm, end of the hand connecting to wrist, etc.) and optionally on the wrist or arm connected to the hand are identified and located on the hand skeleton 414. In some embodiments, location and movements of these key feature points over multiple image frames are used by the controller 110 to determine the hand gestures performed by the hand or the current state of the hand, in accordance with some embodiments.

Figure 5:
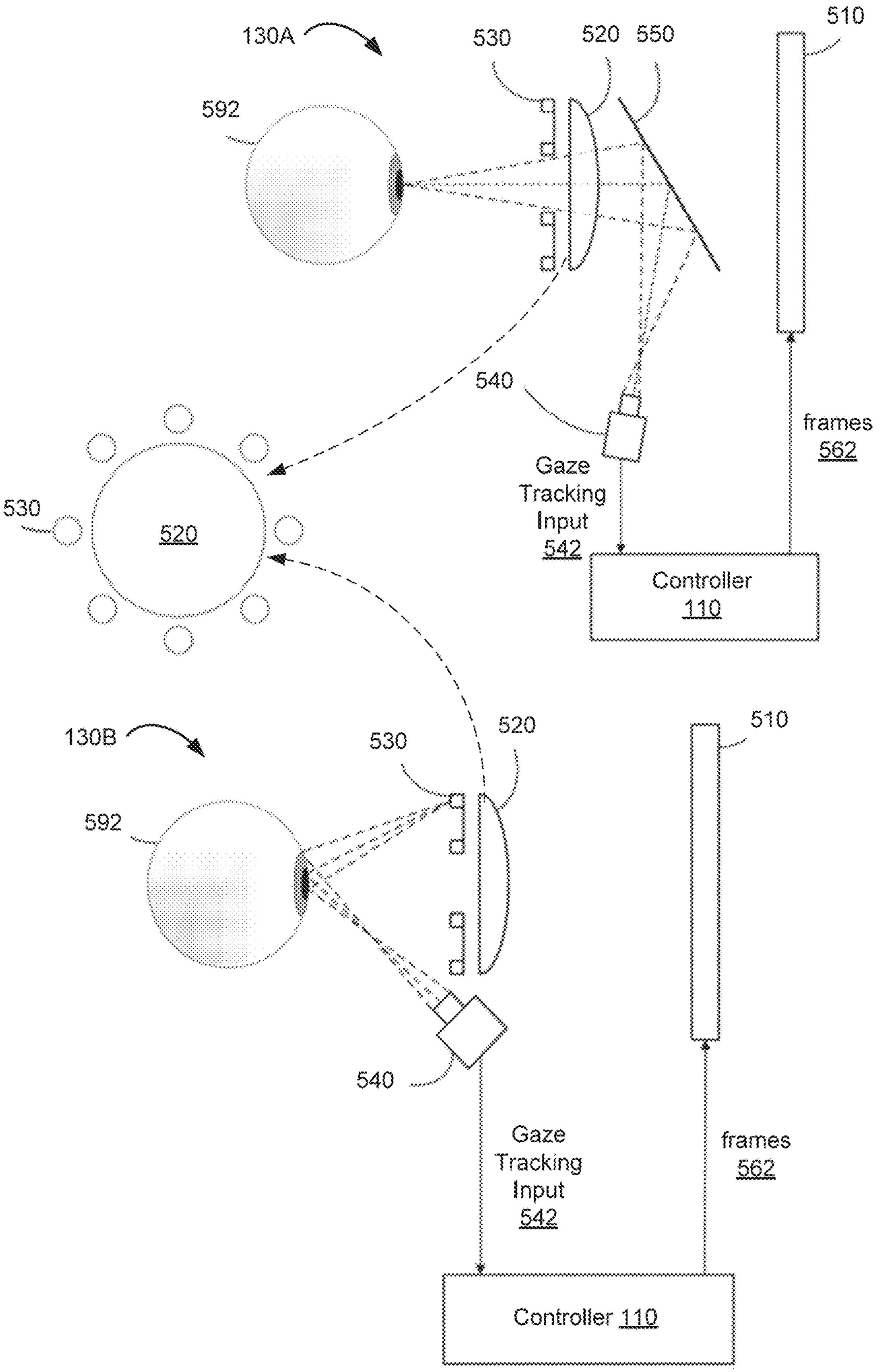
FIG. 5 is a block diagram illustrating an eye tracking unit of a computer system that is configured to capture gaze inputs of the user in accordance with some examples.

FIG. 5 illustrates an example embodiment of the eye tracking device 130 (FIG. 1A). In some embodiments, the eye tracking device 130 is controlled by the eye tracking unit 243 (FIG. 2) to track the position and movement of the user's gaze with respect to the scene 105 or with respect to the XR content displayed via the display generation component 120. In some embodiments, the eye tracking device 130 is integrated with the display generation component 120. For example, in some embodiments, when the display generation component 120 is a head-mounted device such as headset, helmet, goggles, or glasses, or a handheld device placed in a wearable frame, the head-mounted device includes both a component that generates the XR content for viewing by the user and a component for tracking the gaze of the user relative to the XR content. In some embodiments, the eye tracking device 130 is separate from the display generation component 120. For example, when display generation component is a handheld device or a XR chamber, the eye tracking device 130 is optionally a separate device from the handheld device or XR chamber. In some embodiments, the eye tracking device 130 is a head-mounted device or part of a head-mounted device. In some embodiments, the head-mounted eye-tracking device 130 is optionally used in conjunction with a display generation component that is also head-mounted, or a display generation component that is not head-mounted. In some embodiments, the eye tracking device 130 is not a head-mounted device, and is optionally used in conjunction with a head-mounted display generation component. In some embodiments, the eye tracking device 130 is not a head-mounted device, and is optionally part of a non-head-mounted display generation component.

In some embodiments, the display generation component 120 uses a display mechanism (e.g., left and right near-eye display panels) for displaying frames including left and right images in front of a user's eyes to thus provide 3D virtual views to the user. For example, a head-mounted display generation component may include left and right optical lenses (referred to herein as eye lenses) located between the display and the user's eyes. In some embodiments, the display generation component may include or be coupled to one or more external video cameras that capture video of the user's environment for display. In some embodiments, a head-mounted display generation component may have a transparent or semi-transparent display through which a user may view the physical environment directly and display virtual objects on the transparent or semi-transparent display. In some embodiments, the display generation component projects virtual objects into the physical environment. The virtual objects may be projected, for example, on a physical surface or as a holograph, so that an individual, using the system, observes the virtual objects superimposed over the physical environment. In such cases, separate display panels and image frames for the left and right eyes may not be necessary.

As shown in FIG. 5, in some embodiments, eye tracking device 130 (e.g., a gaze tracking device) includes at least one eye tracking camera (e.g., infrared (IR) or near-IR (NIR) cameras), and illumination sources (e.g., IR or NIR light sources such as an array or ring of LEDs) that emit light (e.g., IR or NIR light) towards the user's eyes. The eye tracking cameras may be pointed towards the user's eyes to receive reflected IR or NIR light from the light sources directly from the eyes, or alternatively may be pointed towards "hot" mirrors located between the user's eyes and the display panels that reflect IR or NIR light from the eyes to the eye tracking cameras while allowing visible light to pass. The eye tracking device 130 optionally captures images of the user's eyes (e.g., as a video stream captured at 60-120 frames per second (fps)), analyze the images to generate gaze tracking information, and communicate the gaze tracking information to the controller 110. In some embodiments, two eyes of the user are separately tracked by respective eye tracking cameras and illumination sources. In some embodiments, only one eye of the user is tracked by a respective eye tracking camera and illumination sources.

In some embodiments, the eye tracking device 130 is calibrated using a device-specific calibration process to determine parameters of the eye tracking device for the specific operating environment 100, for example the 3D geometric relationship and parameters of the LEDs, cameras, hot mirrors (if present), eye lenses, and display screen. The device-specific calibration process may be performed at the factory or another facility prior to delivery of the AR/VR equipment to the end user. The device-specific calibration process may be an automated calibration process or a manual calibration process. A user-specific calibration process may include an estimation of a specific user's eye parameters, for example the pupil location, fovea location, optical axis, visual axis, eye spacing, etc. Once the device-specific and user-specific parameters are determined for the eye tracking device 130, images captured by the eye tracking cameras can be processed using a glint-assisted method to determine the current visual axis and point of gaze of the user with respect to the display, in accordance with some embodiments.

As shown in FIG. 5, the eye tracking device 130 (e.g., 130A or 130B) includes eye lens(es) 520, and a gaze tracking system that includes at least one eye tracking camera 540 (e.g., infrared (IR) or near-IR (NIR) cameras) positioned on a side of the user's face for which eye tracking is performed, and an illumination source 530 (e.g., IR or NIR light sources such as an array or ring of NIR light-emitting diodes (LEDs)) that emit light (e.g., IR or NIR light) towards the user's eye(s) 592. The eye tracking cameras 540 may be pointed towards mirrors 550 located between the user's eye(s) 592 and a display 510 (e.g., a left or right display panel of a head-mounted display, or a display of a handheld device, a projector, etc.) that reflect IR or NIR light from the eye(s) 592 while allowing visible light to pass (e.g., as shown in the top portion of FIG. 5), or alternatively may be pointed towards the user's eye(s) 592 to receive reflected IR or NIR light from the eye(s) 592 (e.g., as shown in the bottom portion of FIG. 5).

In some embodiments, the controller 110 renders AR or VR frames 562 (e.g., left and right frames for left and right display panels) and provides the frames 562 to the display 510. The controller 110 uses gaze tracking input 542 from the eye tracking cameras 540 for various purposes, for example in processing the frames 562 for display. The controller 110 optionally estimates the user's point of gaze on the display 510 based on the gaze tracking input 542 obtained from the eye tracking cameras 540 using the glint-assisted methods or other suitable methods. The point of gaze estimated from the gaze tracking input 542 is optionally used to determine the direction in which the user is currently looking.

The following describes several possible use cases for the user's current gaze direction and is not intended to be limiting. As an example use case, the controller 110 may render virtual content differently based on the determined direction of the user's gaze. For example, the controller 110 may generate virtual content at a higher resolution in a foveal region determined from the user's current gaze direction than in peripheral regions. As another example, the controller may position or move virtual content in the view based at least in part on the user's current gaze direction. As another example, the controller may display particular virtual content in the view based at least in part on the user's current gaze direction. As another example use case in AR applications, the controller 110 may direct external cameras for capturing the physical environments of the XR experience to focus in the determined direction. The autofocus mechanism of the external cameras may then focus on an object or surface in the environment that the user is currently looking at on the display 510. As another example use case, the eye lenses 520 may be focusable lenses, and the gaze tracking information is used by the controller to adjust the focus of the eye lenses 520 so that the virtual object that the user is currently looking at has the proper vergence to match the convergence of the user's eyes 592. The controller 110 may leverage the gaze tracking information to direct the eye lenses 520 to adjust focus so that close objects that the user is looking at appear at the right distance.

In some embodiments, the eye tracking device is part of a head-mounted device that includes a display (e.g., display 510), two eye lenses (e.g., eye lens(es) 520), eye tracking cameras (e.g., eye tracking camera(s) 540), and light sources (e.g., illumination sources 530 (e.g., IR or NIR LEDs), mounted in a wearable housing. The light sources emit light (e.g., IR or NIR light) towards the user's eye(s) 592. In some embodiments, the light sources may be arranged in rings or circles around each of the lenses as shown in FIG. 5. In some embodiments, eight illumination sources 530 (e.g., LEDs) are arranged around each lens 520 as an example. However, more or fewer illumination sources 530 may be used, and other arrangements and locations of illumination sources 530 may be used.

In some embodiments, the display 510 emits light in the visible light range and does not emit light in the IR or NIR range, and thus does not introduce noise in the gaze tracking system. Note that the location and angle of eye tracking camera(s) 540 is given by way of example and is not intended to be limiting. In some embodiments, a single eye tracking camera 540 is located on each side of the user's face. In some embodiments, two or more NIR cameras 540 may be used on each side of the user's face. In some embodiments, a camera 540 with a wider field of view (FOV) and a camera 540 with a narrower FOV may be used on each side of the user's face. In some embodiments, a camera 540 that operates at one wavelength (e.g., 850 nm) and a camera 540 that operates at a different wavelength (e.g., 940 nm) may be used on each side of the user's face.

Embodiments of the gaze tracking system as illustrated in FIG. 5 may, for example, be used in computer-generated reality, virtual reality, and/or mixed reality applications to provide computer-generated reality, virtual reality, augmented reality, and/or augmented virtuality experiences to the user.

Figure 6:
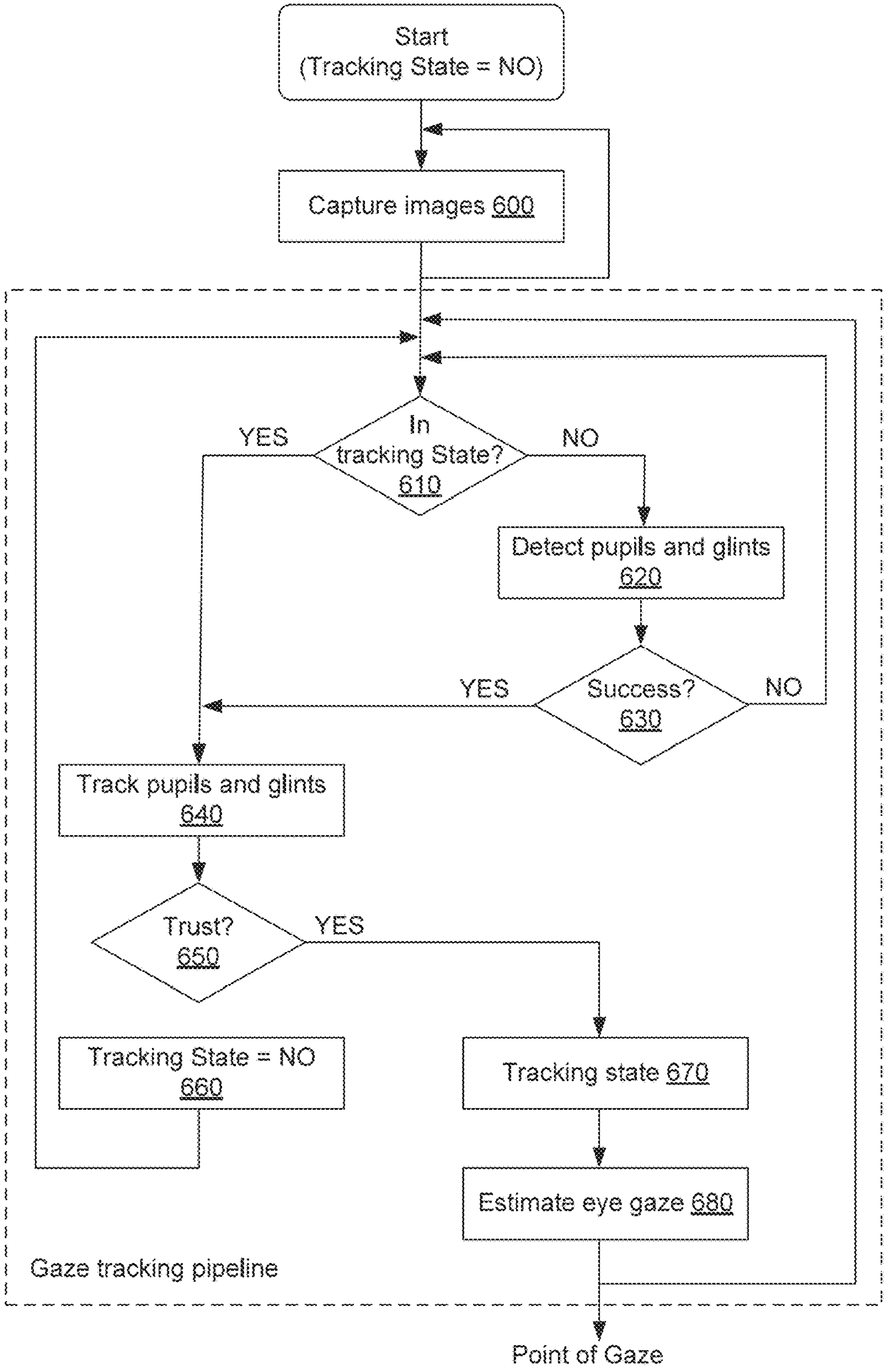
FIG. 6 is a flow diagram illustrating a glint-assisted gaze tracking pipeline in accordance with some examples.
Figure 7A:
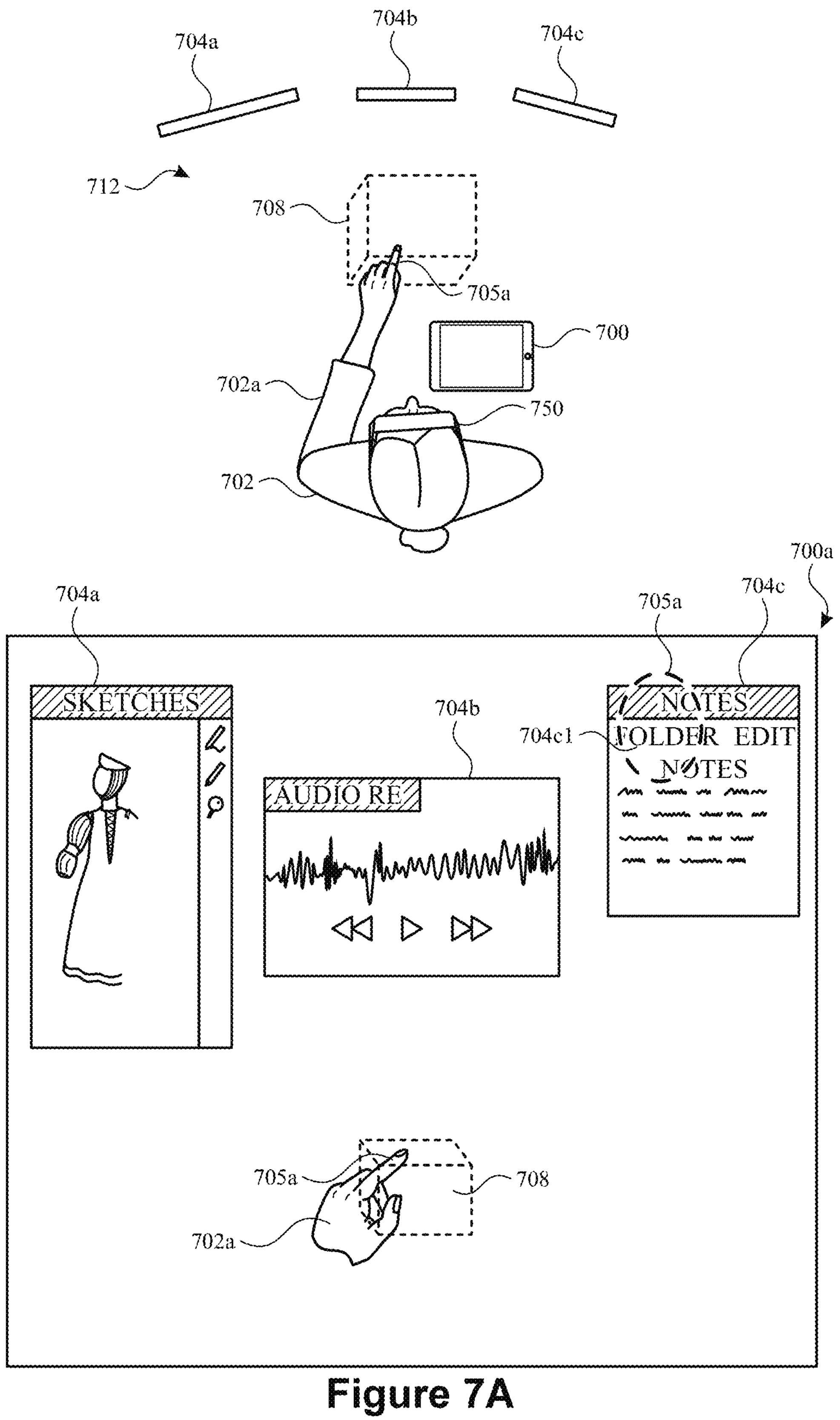
FIGS. 7A-7G illustrate exemplary user interfaces for location-based inputs in accordance with some embodiments.

FIG. 6 illustrates a glint-assisted gaze tracking pipeline, in accordance with some embodiments. In some embodiments, the gaze tracking pipeline is implemented by a glint-assisted gaze tracking system (e.g., eye tracking device 130 as illustrated in FIGS. 1A and 5). The glint-assisted gaze tracking system may maintain a tracking state. Initially, the tracking state is off or "NO". When in the tracking state, the glint-assisted gaze tracking system uses prior information from the previous frame when analyzing the current frame to track the pupil contour and glints in the current frame. When not in the tracking state, the glint-assisted gaze tracking system attempts to detect the pupil and glints in the current frame and, if successful, initializes the tracking state to "YES" and continues with the next frame in the tracking state.

As shown in FIG. 6, the gaze tracking cameras may capture left and right images of the user's left and right eyes. The captured images are then input to a gaze tracking pipeline for processing beginning at 610. As indicated by the arrow returning to element 600, the gaze tracking system may continue to capture images of the user's eyes, for example at a rate of 60 to 120 frames per second. In some embodiments, each set of captured images may be input to the pipeline for processing. However, in some embodiments or under some conditions, not all captured frames are processed by the pipeline.

At 610, for the current captured images, if the tracking state is YES, then the method proceeds to element 640. At 610, if the tracking state is NO, then as indicated at 620 the images are analyzed to detect the user's pupils and glints in the images. At 630, if the pupils and glints are successfully detected, then the method proceeds to element 640. Otherwise, the method returns to element 610 to process next images of the user's eyes.

At 640, if proceeding from element 610, the current frames are analyzed to track the pupils and glints based in part on prior information from the previous frames. At 640, if proceeding from element 630, the tracking state is initialized based on the detected pupils and glints in the current frames. Results of processing at element 640 are checked to verify that the results of tracking or detection can be trusted. For example, results may be checked to determine if the pupil and a sufficient number of glints to perform gaze estimation are successfully tracked or detected in the current frames. At 650, if the results cannot be trusted, then the tracking state is set to NO at element 660, and the method returns to element 610 to process next images of the user's eyes. At 650, if the results are trusted, then the method proceeds to element 670. At 670, the tracking state is set to YES (if not already YES), and the pupil and glint information is passed to element 680 to estimate the user's point of gaze.

FIG. 6 is intended to serve as one example of eye tracking technology that may be used in a particular implementation. As recognized by those of ordinary skill in the art, other eye tracking technologies that currently exist or are developed in the future may be used in place of or in combination with the glint-assisted eye tracking technology describe herein in the computer system 101 for providing XR experiences to users, in accordance with various embodiments.

In some embodiments, the captured portions of real-world environment 602 are used to provide a XR experience to the user, for example, a mixed reality environment in which one or more virtual objects are superimposed over representations of real world environment 602.

Thus, the description herein describes some embodiments of three-dimensional environments (e.g., XR environments) that include representations of real-world objects and representations of virtual objects. For example, a three-dimensional environment optionally includes a representation of a table that exists in the physical environment, which is captured and displayed in the three-dimensional environment (e.g., actively via cameras and displays of a computer system, or passively via a transparent or translucent display of the computer system). As described previously, the three-dimensional environment is optionally a mixed reality system in which the three-dimensional environment is based on the physical environment that is captured by one or more sensors of the computer system and displayed via a display generation component. As a mixed reality system, the computer system is optionally able to selectively display portions and/or objects of the physical environment such that the respective portions and/or objects of the physical environment appear as if they exist in the three-dimensional environment displayed by the computer system. Similarly, the computer system is optionally able to display virtual objects in the three-dimensional environment to appear as if the virtual objects exist in the real world (e.g., physical environment) by placing the virtual objects at respective locations in the three-dimensional environment that have corresponding locations in the real world. For example, the computer system optionally displays a vase such that it appears as if a real vase is placed on top of a table in the physical environment. In some embodiments, a respective location in the three-dimensional environment has a corresponding location in the physical environment. Thus, when the computer system is described as displaying a virtual object at a respective location with respect to a physical object (e.g., such as a location at or near the hand of the user, or at or near a physical table), the computer system displays the virtual object at a particular location in the three-dimensional environment such that it appears as if the virtual object is at or near the physical object in the physical world (e.g., the virtual object is displayed at a location in the three-dimensional environment that corresponds to a location in the physical environment at which the virtual object would be displayed if it were a real object at that particular location).

In some embodiments, real world objects that exist in the physical environment that are displayed in the three-dimensional environment (e.g., and/or visible via the display generation component) can interact with virtual objects that exist only in the three-dimensional environment. For example, a three-dimensional environment can include a table and a vase placed on top of the table, with the table being a view of (or a representation of) a physical table in the physical environment, and the vase being a virtual object.

In a three-dimensional environment (e.g., a real environment, a virtual environment, or an environment that includes a mix of real and virtual objects), objects are sometimes referred to as having a depth or simulated depth, or objects are referred to as being visible, displayed, or placed at different depths. In this context, depth refers to a dimension other than height or width. In some embodiments, depth is defined relative to a fixed set of coordinates (e.g., where a room or an object has a height, depth, and width defined relative to the fixed set of coordinates). In some embodiments, depth is defined relative to a location or viewpoint of a user, in which case, the depth dimension varies based on the location of the user and/or the location and angle of the viewpoint of the user. In some embodiments where depth is defined relative to a location of a user that is positioned relative to a surface of an environment (e.g., a floor of an environment, or a surface of the ground), objects that are further away from the user along a line that extends parallel to the surface are considered to have a greater depth in the environment, and/or the depth of an object is measured along an axis that extends outward from a location of the user and is parallel to the surface of the environment (e.g., depth is defined in a cylindrical or substantially cylindrical coordinate system with the position of the user at the center of the cylinder that extends from a head of the user toward feet of the user). In some embodiments where depth is defined relative to viewpoint of a user (e.g., a direction relative to a point in space that determines which portion of an environment that is visible via a head mounted device or other display), objects that are further away from the viewpoint of the user along a line that extends parallel to the direction of the viewpoint of the user are considered to have a greater depth in the environment, and/or the depth of an object is measured along an axis that extends outward from a line that extends from the viewpoint of the user and is parallel to the direction of the viewpoint of the user (e.g., depth is defined in a spherical or substantially spherical coordinate system with the origin of the viewpoint at the center of the sphere that extends outwardly from a head of the user). In some embodiments, depth is defined relative to a user interface container (e.g., a window or application in which application and/or system content is displayed) where the user interface container has a height and/or width, and depth is a dimension that is orthogonal to the height and/or width of the user interface container. In some embodiments, in circumstances where depth is defined relative to a user interface container, the height and or width of the container are typically orthogonal or substantially orthogonal to a line that extends from a location based on the user (e.g., a viewpoint of the user or a location of the user) to the user interface container (e.g., the center of the user interface container, or another characteristic point of the user interface container) when the container is placed in the three-dimensional environment or is initially displayed (e.g., so that the depth dimension for the container extends outward away from the user or the viewpoint of the user). In some embodiments, in situations where depth is defined relative to a user interface container, depth of an object relative to the user interface container refers to a position of the object along the depth dimension for the user interface container. In some embodiments, multiple different containers can have different depth dimensions (e.g., different depth dimensions that extend away from the user or the viewpoint of the user in different directions and/or from different starting points). In some embodiments, when depth is defined relative to a user interface container, the direction of the depth dimension remains constant for the user interface container as the location of the user interface container, the user and/or the viewpoint of the user changes (e.g., or when multiple different viewers are viewing the same container in the three-dimensional environment such as during an in-person collaboration session and/or when multiple participants are in a real-time communication session with shared virtual content including the container). In some embodiments, for curved containers (e.g., including a container with a curved surface or curved content region), the depth dimension optionally extends into a surface of the curved container. In some situations, z-separation (e.g., separation of two objects in a depth dimension), z-height (e.g., distance of one object from another in a depth dimension), z-position (e.g., position of one object in a depth dimension), z-depth (e.g., position of one object in a depth dimension), or simulated z dimension (e.g., depth used as a dimension of an object, dimension of an environment, a direction in space, and/or a direction in simulated space) are used to refer to the concept of depth as described above.

In some embodiments, a user is optionally able to interact with virtual objects in the three-dimensional environment using one or more hands as if the virtual objects were real objects in the physical environment. For example, as described above, one or more sensors of the computer system optionally capture one or more of the hands of the user and display representations of the hands of the user in the three-dimensional environment (e.g., in a manner similar to displaying a real world object in three-dimensional environment described above), or in some embodiments, the hands of the user are visible via the display generation component via the ability to see the physical environment through the user interface due to the transparency/translucency of a portion of the display generation component that is displaying the user interface or due to projection of the user interface onto a transparent/translucent surface or projection of the user interface onto the user's eye or into a field of view of the user's eye. Thus, in some embodiments, the hands of the user are displayed at a respective location in the three-dimensional environment and are treated as if they were objects in the three-dimensional environment that are able to interact with the virtual objects in the three-dimensional environment as if they were physical objects in the physical environment. In some embodiments, the computer system is able to update display of the representations of the user's hands in the three-dimensional environment in conjunction with the movement of the user's hands in the physical environment.

In some of the embodiments described below, the computer system is optionally able to determine the "effective" distance between physical objects in the physical world and virtual objects in the three-dimensional environment, for example, for the purpose of determining whether a physical object is directly interacting with a virtual object (e.g., whether a hand is touching, grabbing, holding, etc. a virtual object or within a threshold distance of a virtual object). For example, a hand directly interacting with a virtual object optionally includes one or more of a finger of a hand pressing a virtual button, a hand of a user grabbing a virtual vase, two fingers of a hand of the user coming together and pinching/holding a user interface of an application, and any of the other types of interactions described here. For example, the computer system optionally determines the distance between the hands of the user and virtual objects when determining whether the user is interacting with virtual objects and/or how the user is interacting with virtual objects. In some embodiments, the computer system determines the distance between the hands of the user and a virtual object by determining the distance between the location of the hands in the three-dimensional environment and the location of the virtual object of interest in the three-dimensional environment. For example, the one or more hands of the user are located at a particular position in the physical world, which the computer system optionally captures and displays at a particular corresponding position in the three-dimensional environment (e.g., the position in the three-dimensional environment at which the hands would be displayed if the hands were virtual, rather than physical, hands). The position of the hands in the three-dimensional environment is optionally compared with the position of the virtual object of interest in the three-dimensional environment to determine the distance between the one or more hands of the user and the virtual object. In some embodiments, the computer system optionally determines a distance between a physical object and a virtual object by comparing positions in the physical world (e.g., as opposed to comparing positions in the three-dimensional environment). For example, when determining the distance between one or more hands of the user and a virtual object, the computer system optionally determines the corresponding location in the physical world of the virtual object (e.g., the position at which the virtual object would be located in the physical world if it were a physical object rather than a virtual object), and then determines the distance between the corresponding physical position and the one of more hands of the user. In some embodiments, the same techniques are optionally used to determine the distance between any physical object and any virtual object. Thus, as described herein, when determining whether a physical object is in contact with a virtual object or whether a physical object is within a threshold distance of a virtual object, the computer system optionally performs any of the techniques described above to map the location of the physical object to the three-dimensional environment and/or map the location of the virtual object to the physical environment.

In some embodiments, the same or similar technique is used to determine where and what the gaze (e.g., via eye tracking device 130) of the user is directed to and/or where and at what a physical stylus held by a user is pointed. For example, if the gaze of the user is directed to a particular position in the physical environment, the computer system optionally determines the corresponding position in the three-dimensional environment (e.g., the virtual position of the gaze), and if a virtual object is located at that corresponding virtual position, the computer system optionally determines that the gaze of the user is directed to that virtual object. Similarly, the computer system is optionally able to determine, based on the orientation of a physical stylus, to where in the physical environment the stylus is pointing. In some embodiments, based on this determination, the computer system determines the corresponding virtual position in the three-dimensional environment that corresponds to the location in the physical environment to which the stylus is pointing, and optionally determines that the stylus is pointing at the corresponding virtual position in the three-dimensional environment.

Similarly, the embodiments described herein may refer to the location of the user (e.g., the user of the computer system) and/or the location of the computer system in the three-dimensional environment. In some embodiments, the user of the computer system is holding, wearing, or otherwise located at or near the computer system. Thus, in some embodiments, the location of the computer system is used as a proxy for the location of the user. In some embodiments, the location of the computer system and/or user in the physical environment corresponds to a respective location in the three-dimensional environment. For example, the location of the computer system would be the location in the physical environment (and its corresponding location in the three-dimensional environment) from which, if a user were to stand at that location facing a respective portion of the physical environment that is visible via the display generation component, the user would see the objects in the physical environment in the same positions, orientations, and/or sizes as they are displayed by or visible via the display generation component of the computer system in the three-dimensional environment (e.g., in absolute terms and/or relative to each other). Similarly, if the virtual objects displayed in the three-dimensional environment were physical objects in the physical environment (e.g., placed at the same locations in the physical environment as they are in the three-dimensional environment, and having the same sizes and orientations in the physical environment as in the three-dimensional environment), the location of the computer system and/or user is the position from which the user would see the virtual objects in the physical environment in the same positions, orientations, and/or sizes as they are displayed by the display generation component of the computer system in the three-dimensional environment (e.g., in absolute terms and/or relative to each other and the real world objects).

In the present disclosure, various input methods are described with respect to interactions with a computer system. When an example is provided using one input device or input method and another example is provided using another input device or input method, it is to be understood that each example may be compatible with and optionally utilizes the input device or input method described with respect to another example. Similarly, various output methods are described with respect to interactions with a computer system. When an example is provided using one output device or output method and another example is provided using another output device or output method, it is to be understood that each example may be compatible with and optionally utilizes the output device or output method described with respect to another example. Similarly, various methods are described with respect to interactions with a virtual environment or a mixed reality environment through a computer system. When an example is provided using interactions with a virtual environment and another example is provided using mixed reality environment, it is to be understood that each example may be compatible with and optionally utilizes the methods described with respect to another example. As such, the present disclosure discloses embodiments that are combinations of the features of multiple examples, without exhaustively listing all features of an embodiment in the description of each example embodiment.

User Interfaces and Associated Processes

Attention is now directed towards embodiments of user interfaces ("UI") and associated processes that may be implemented on a computer system, such as portable multifunction device or a head-mounted device, with a display generation component, one or more input devices, and (optionally) one or cameras.

FIGS. 7A-7G illustrate exemplary user interfaces for managing inputs in accordance with some examples. The user interfaces in these figures are used to illustrate the processes described below, including the processes in FIG. 8. FIGS. 7A-7G illustrate computer system 700 positioned relative to user 702 in environment 712, which is an XR environment (e.g., that extends into the physical space around user 702). In some examples, user 702 is wearing computer system 700. In some examples, computer system 700 is positioned to be able to detect gaze (e.g., via 6-120) of the user (e.g., the user is holding the device in their hands) through one or more sensors of computer system 700. In some examples, computer system 700 is a fitness tracking device, smart watch, tablet, personal computing system, laptop, HMD, and/or a set of AR, VR, and/or XR glasses. In some examples, computer system 700 includes one or more components of devices (e.g., 1-112).

FIGS. 7A-7G illustrate several scenarios in which user 702 performs a hand input, and the hand input is either detected and responded to, detected and not responded to, and/or ignored based on whether the hand input occurs in a predefined zone. In some examples, the predefined zone is a "safe zone" or an "accept zone," where detection of one or more inputs (e.g., a gesture and/or another type of input) in the predefined zone causes computer system 700 to perform one or more operations. In some examples, the predefined zone is a "deny zone" or an "ignore zone," where one or more inputs in the predefined zone do not cause computer system 700 to perform one or more operations. In some examples, when an input is detected outside of a "safe zone" or an "accept zone," computer system 700 ignores the input, and/or does not respond to, and/or does not perform one or more operations based on the input. In some examples, when an input is detected outside of a "ignore zone" or a "deny zone," computer system 700 detects the input, and responds to the input, and/or performs one or more operations based on the input.

As illustrated in FIG. 7A, in addition to computer system 700 and user 702, environment 712 includes virtual object **704*a*, virtual object 704*b*, and virtual object 704*c*, which computer system 700 presents via viewpoint 700*a*. In some examples, computer system 700 presents content included in viewpoint 700*a* via display generation component 700*a* (e.g., 120, 1-122*a* and/or 1-122*b*). In some examples, display generation component 700*a* is a translucent and/or transparent display that allows one or more physical objects to "pass-through," such that the one or more physical objects are visible to the user (e.g., in an AR environment or an XR environment). In some examples, display generation component 700*a*** is not a translucent and/or transparent display and does not allow the physical object to "pass-through" (e.g., in a VR environment).

At FIG. 7A, environment 712 also includes gesture ignore zone, which is a "deny zone" or "ignore zone," as described above. As illustrated in FIG. 7A, air gesture **705*a* is performed in a physical space by left hand 702*a* and is directed to folder control 704*c*1 (e.g., illustrated in viewpoint 700*a*) of notes application virtual object 704*c* in environment 712. In some examples, air gestures can be performed by user's right hand, head, eyes, legs, other body parts, and/or prosthetics. It should be understood that while FIGS. 7A-7G use the detection of air gestures to explain the one or more techniques described herein, one or more other types of gestures, such as mouse clicks, voice commands, touch gestures, and/or gaze inputs can be substituted for and/or added to the one or more air gestured described herein, where computer system 700 would perform one or more similar operations in response to the detection of one or more of the other types of gestures. At FIG. 7A, computer system 700 detects that air gesture 705*a* is performed inside of gesture ignore zone 708 while being directed to folder control 704*c*1**.

Figure 7B:
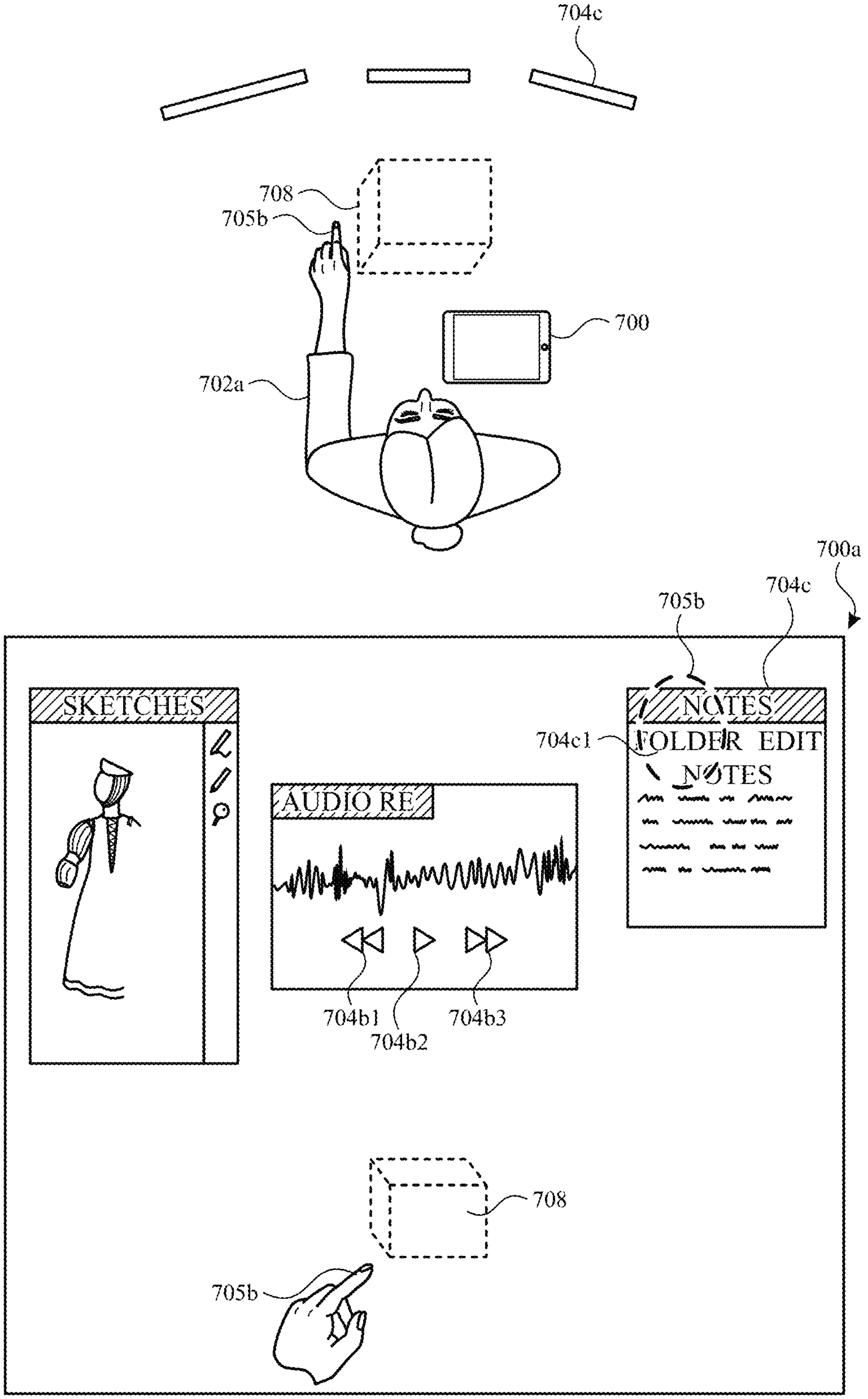
Figure 8:
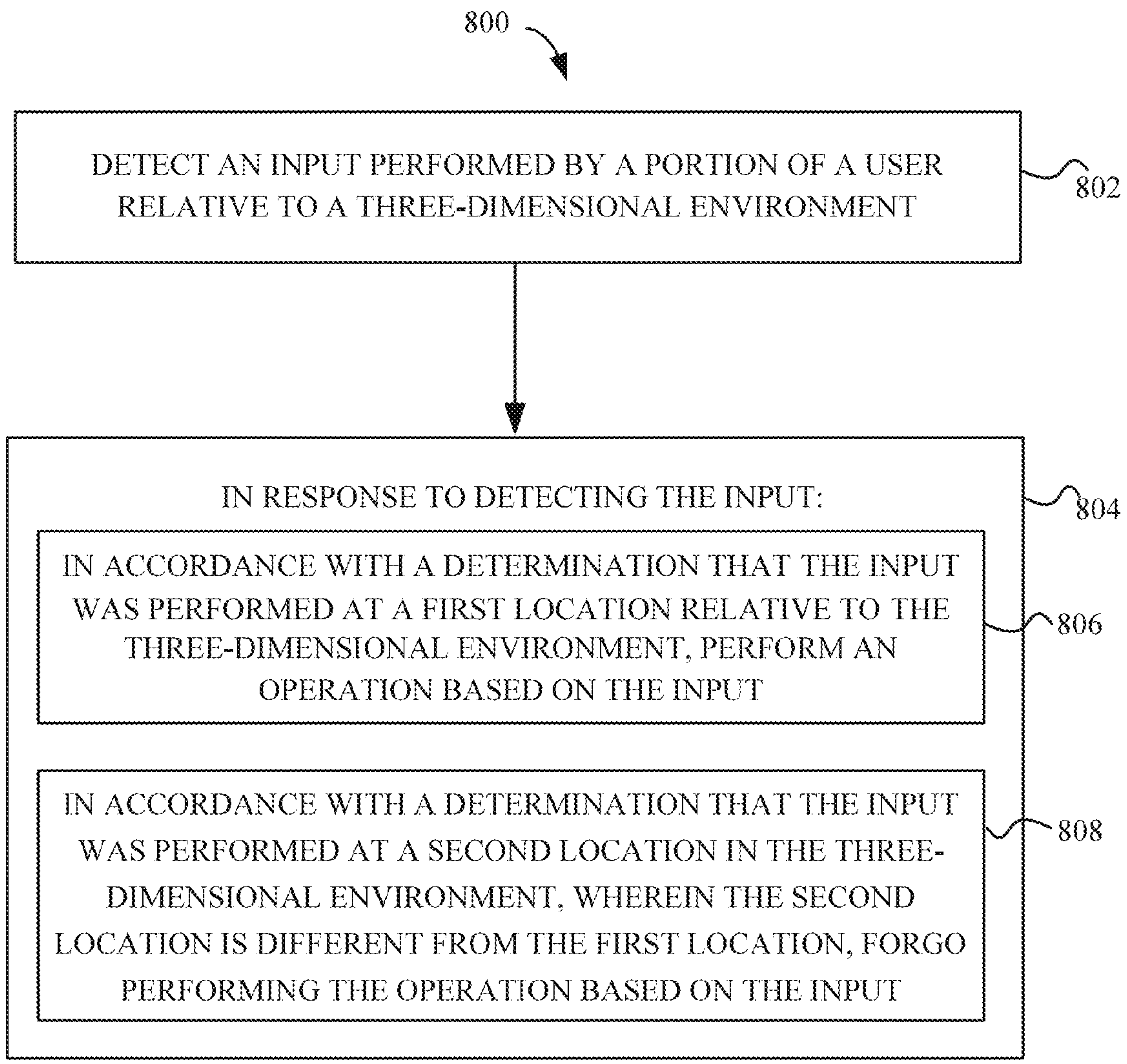
FIG. 8 is a flow diagram illustrating a method for location-based inputs in accordance with some embodiments.

As illustrated in FIG. 7B, in response to detecting air gesture **705*a* performed inside of gesture ignore zone 708 while being directed to folder control 704*c*1, computer system 700 does not execute an operation corresponding to folder control 704*c*1, which is indicated by viewpoint 700*a* of FIG. 7B being the same as viewpoint 700*a* of FIG. 7A. In some examples, computer system 700 registers air gesture 705*a* while air gesture 705*a* is performed in gesture ignore zone 708. In some examples, computer system 700 ignores or does not register air gesture 705*a* while air gesture 705*a* is performed in gesture ignore zone 708. At FIG. 7B, computer system 700 detects that air gesture 705*b* is performed outside of gesture ignore zone 708 while being directed to folder control 704*c*1**.

Figure 7C:
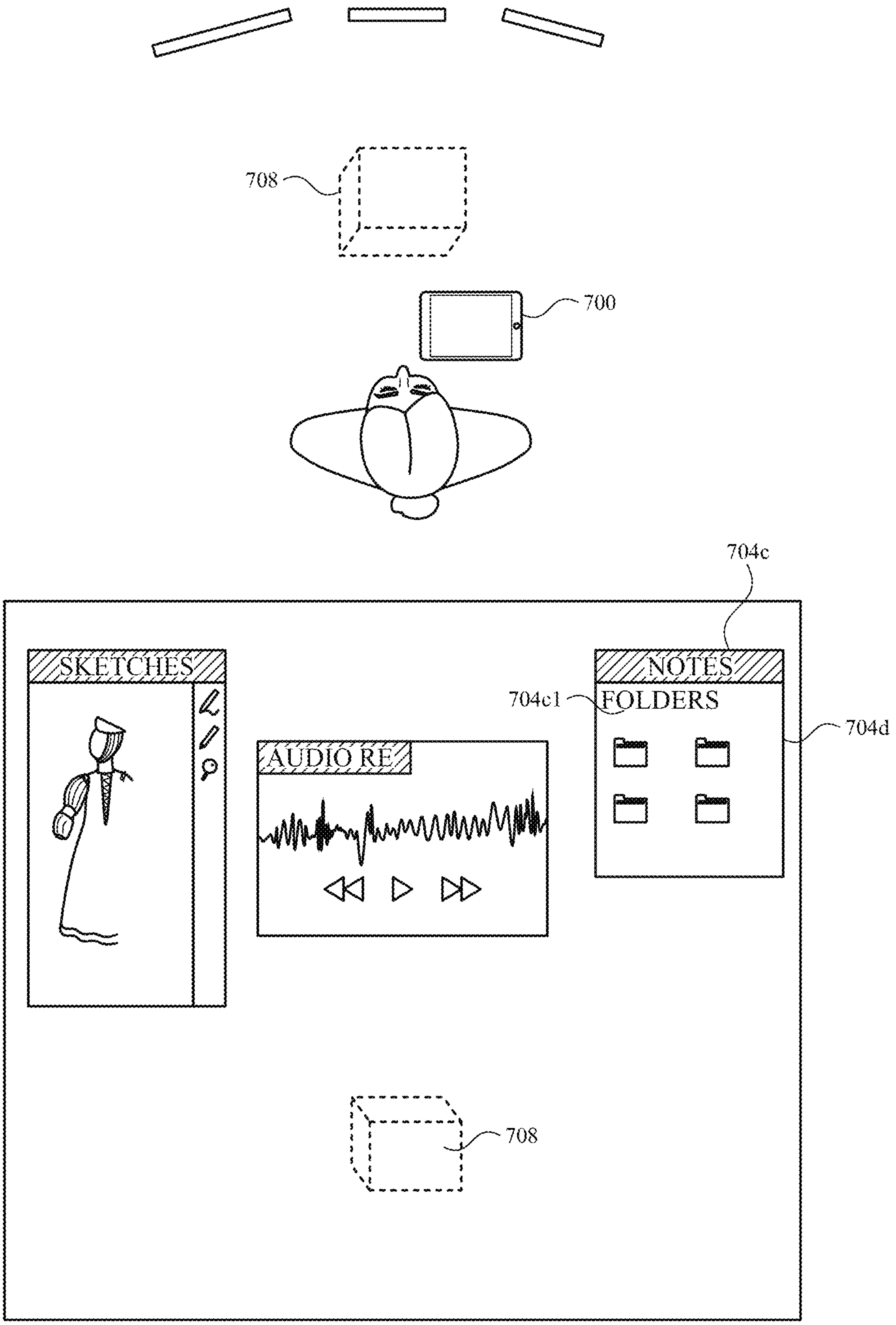

As illustrated in FIG. 7C, in response to detecting that air gesture **705*b* is performed outside of gesture ignore zone 708 while being directed to folder control 704*c*1, computer system 700 displays folder user interface 704*d*. Thus, at FIG. 7C, computer system 700 performs an operation because computer system 700 detected that air gesture 705*b* was performed outside of gesture ignore zone 708 and is directed to folder control 704*c*1 at FIG. 7B. Looking back at FIGS. 7A-7C, computer system 700 performs one or more operations in response to detecting a gesture performed outside of an ignore gesture zone and does not perform the one or more operations in response to detecting a gesture performed inside of the ignore gesture zone. In some examples, computer system 700 allows a user to control whether one or more operations are performed based on whether or not the air gesture is performed in a particular predefined zone in an environment. In some examples, computer system 700 detects input 705***b* which is an indirect type of input (e.g., a gaze (e.g., via 6-120) or pinch) directed to folder control 704*c*1, and computer system 700 does not perform the operation.

Figure 7D:
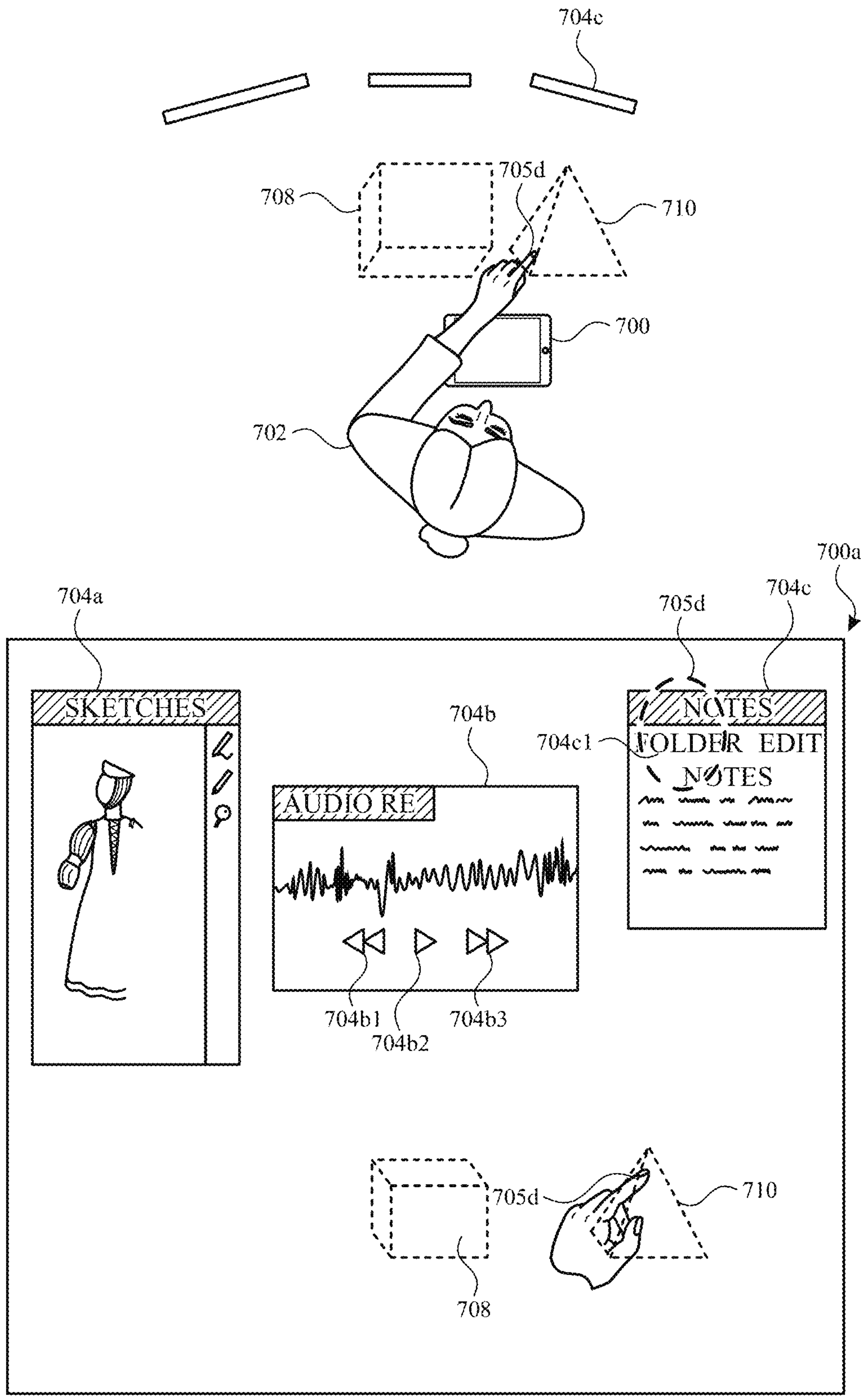

FIG. 7D illustrates computer system 700 displaying gesture ignore zone 708 concurrently with gesture accept zone 710. As illustrated in FIG. 7D, gesture ignore zone 708 has a different shape than gesture accept zone 710, and gesture ignore zone 708 is a different size than gesture accept zone 710. In some examples, computer system 700 makes gesture ignore zone 708 and/or gesture accept zone 710 visible or invisible in the environment (e.g., via the viewpoint of the user) (and/or displays the respective zones or ceases display of the respective gesture zones via the display generation component (e.g., 120, 1-122*a* and/or 1-122*b*)) in response to detecting one or more inputs (e.g., an air gesture, a mouse click, and/or a voice command) from a user. In some examples, computer system 700 displays an indicator of whether a hand of the user is within a particular zone. In some examples, computer system 700 displays gesture ignore zone 708 and/or gesture accept zone 710 dependent on user's 702 viewpoint being directed to a particular location, such computer system 700 displays gesture ignore zone 708 and/or gesture accept zone 710 when the viewpoint is in the direction of gesture ignore zone 708 and/or gesture accept zone 710 and not displayed when the viewpoint is not in the direction of gesture ignore zone 708 and/or gesture accept zone 710. At FIG. 7D, computer system 700 detects that air gesture 705*d* is performed inside of gesture accept zone 710 while being directed to folder control 704*c*1.

Figure 7E:
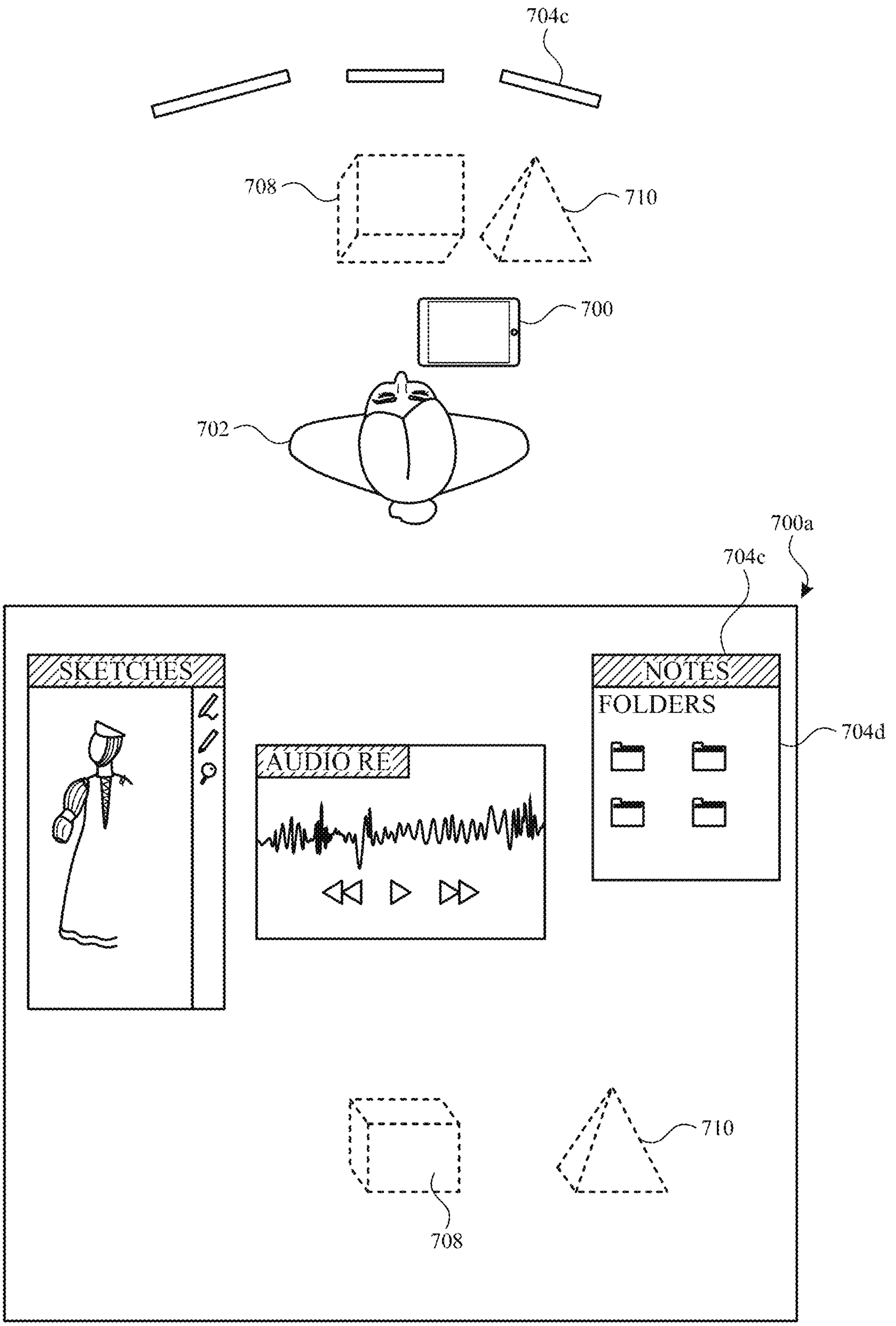

As illustrated in FIG. 7E, in response to detecting that air gesture 705*d* is performed inside of gesture accept zone 710 while being directed to folder control 704*c*1, computer system 700 displays folder user interface 704*d*. Notably, at FIG. 7E, computer system 700 performs an operation in response to detecting a gesture inside of gesture accept zone 710 unlike in FIGS. 7A-7B where computer system 700 did not perform the operation in response to detecting gesture 705*a* inside of gesture ignore zone 708. Thus, in some examples, computer system 700 performs an operation in response to detecting gestures in gesture accept zones but does not perform an operation in response to detecting gestures in gesture ignore zones.

Figure 7F:
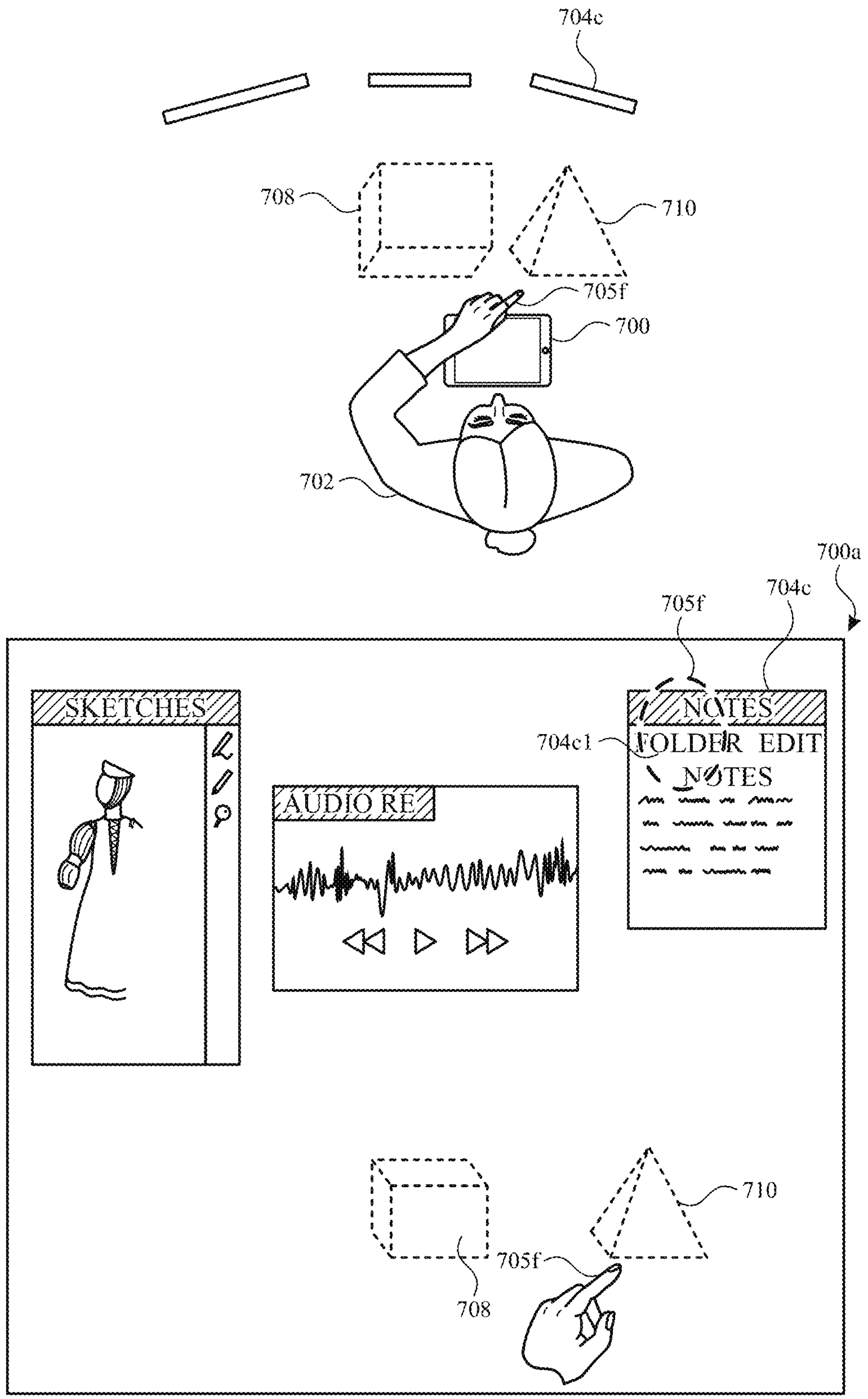
Figure 7G:
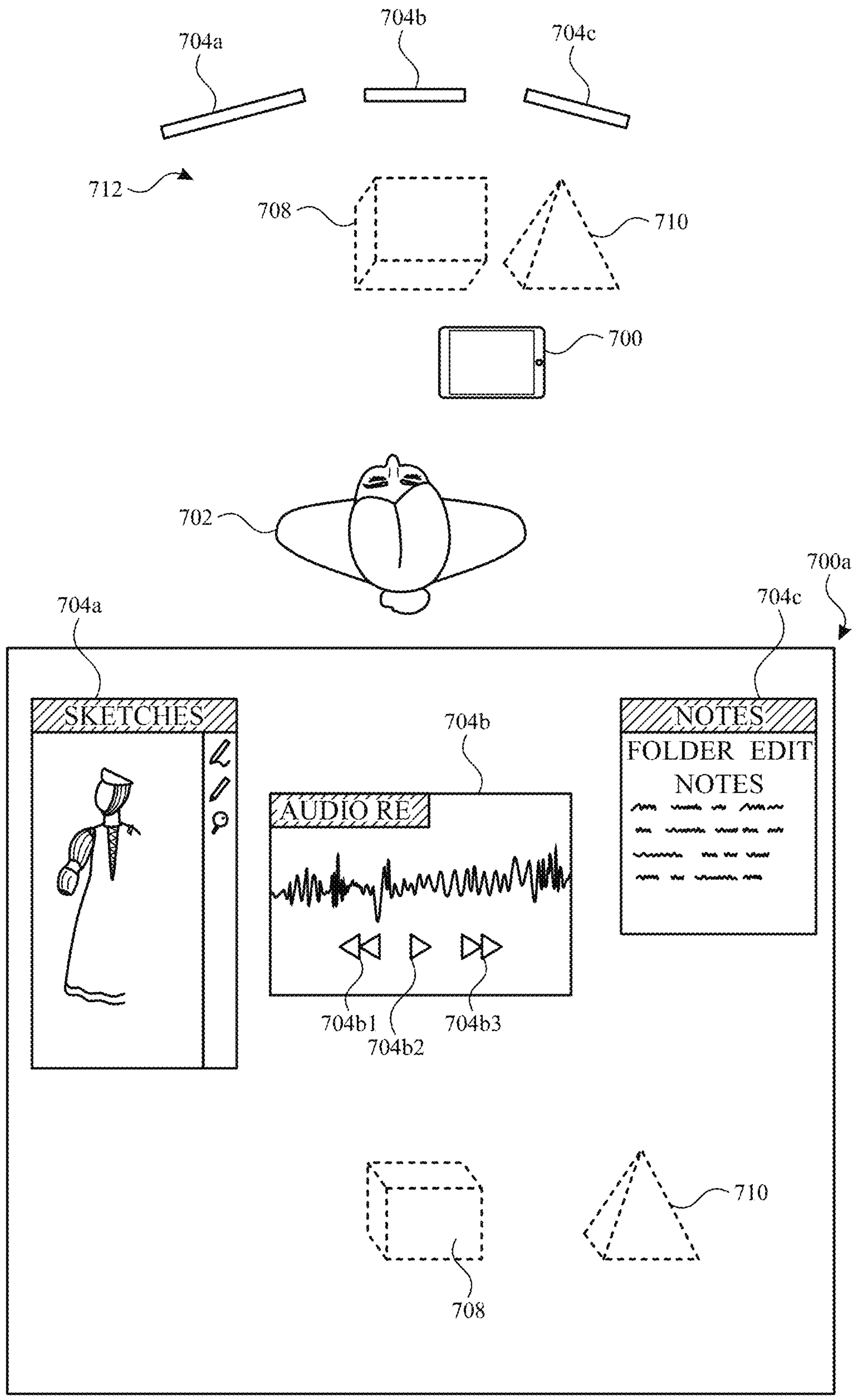

FIGS. 7F-7G illustrate an alternative scenario to FIGS. 7D-7E. At FIG. 7F, computer system 700 detects air gesture 705*f* outside of gesture accept zone 710 while being directed to folder control 704*c*1. As illustrated in FIG. 7G, in response to detecting that air gesture 705*f* is performed outside of gesture accept zone 710 while being directed to folder control 704*c*1, computer system 700 does not perform an operation. Notably, at FIG. 7D, computer system 700 performs an operation in response to detecting a gesture inside of gesture accept zone 710.

In some examples, a user can create a respective zone (e.g., an ignore zone and/or an accept zone). In some examples, in response to detecting one or more inputs, computer system 700 creates gesture ignore zone 708 and/or gesture accept zone 710. In some examples, computer system 700 detects one or more inputs (e.g., freeform inputs and/or non-restricted input) from user 702 and draws and/or shapes gesture ignore zone 708 and/or gesture accept zone 710 based on the movement of the one or more inputs. In some examples, computer system 700 copies characteristics such as size and/or shape of gesture ignore zone 708 and/or gesture accept zone 710 and duplicates it at a new location in response to detecting one or more inputs.

In some examples, a user can see or modify a respective zone. In some examples, computer system 700 resizes a respective zone in response to detecting one or more inputs from a user. In some examples, computer system 700 adds and/or deletes a respective zone in response to detecting one or more inputs from a user. In some examples, computer system 700 changes gesture ignore zone 708 to be a gesture accept zone in response to detecting one or more inputs from a user. In some examples, computer system 700 configures gesture accept zone 710 to be a gesture ignore zone in response to detecting one or more inputs from the user.

In some examples, a user can move a gesture zone. In some examples, computer system 700 moves gesture ignore zone 708 and/or gesture accept zone 710 from one position in environment 712 to another position in environment 712 in response to detecting one or more inputs from a user. In some examples, computer system 700 places gesture ignore zone 708 and/or gesture accept zone 710 at a specific location in environment 712 in response to detecting one or more inputs from a user.

In some examples, computer system 700 temporarily makes gesture ignore zone 708 and/or gesture accept zone 710 visible in the environment 712 based on user input to computer system 700. In some examples, computer system 700 permanently makes gesture ignore zone 708 and/or gesture accept zone 710 visible in environment 712 based on user input to computer system 700. In some examples, computer system 700 displays at predefined locations information about displayed gesture ignore zone 708 and/or gesture accept zone 710, such as whether computer system 700 executes and/or does not execute operations in relation to the hand gesture position relative to gesture ignore zone 708 and/or gesture accept zone 710.

In some examples, a user can designate a respective zone for each hand. In some examples, computer system 700 can be configured to ignore gestures performed by a right hand inside of a respective zone and accept gestures performed by a left hand inside of the respective zone, or vice-versa. In some examples, computer system 700 can be configured to ignore gestures performed by a right hand outside of a respective zone and accept gestures performed by a left hand outside of the respective zone, or vice-versa.

In some examples, computer system can perform one or more operations involving one or more gestures zones automatically (e.g., without further user input). In some examples, computer system 700 deletes gesture ignore zone 708 and/or gesture accept zone 710 based on user 702 usage (e.g., lack of usage) of gesture ignore zone 708 and/or gesture accept zone 710 over a predetermined period of time (e.g., 1-600 seconds) (e.g., without further user input). In some examples, computer system 700 deletes gesture ignore zone 708 and/or gesture accept zone 710 once computer system 700 is turned off and/or reset. In some examples, computer system 700 stores gesture ignore zone 708 and/or gesture accept zone 710 in nonvolatile memory so that gesture ignore zone 708 and/or gesture accept zone 710 are retained and/or are re-displayed when computer system 700 is turned off. In some examples, computer system 700 displays ignore zone 708 and/or gesture accept zone 710 that are assigned for specific application, so that one or more inputs received at gesture ignore zone 708 and/or gesture accept zone are executed or not executed for the specification application based on type of zone in which the one or more inputs are detected.

FIG. 8 is a flow diagram illustrating a method (e.g., method 800) for location defined inputs in accordance with some examples. Some operations in method 800 are, optionally, combined, the orders of some operations are, optionally, changed, and some operations are, optionally, omitted.

As described below, method 800 provides an intuitive way for location defined inputs. Method 800 reduces the cognitive burden on a user for location defined inputs, thereby creating a more efficient human-machine interface. For battery-operated computing devices, enabling a user to location defined inputs faster and more efficiently conserves power and increases the time between battery charges.

In some examples, method 800 is performed at a computer system (e.g., 700). In some examples, the computer system is in communication with a set of one or more cameras (e.g., a telephoto camera, a wide-angle camera, and/or an ultra-wide-angle camera). In some examples, the computer system is a phone, a watch, a tablet, a fitness tracking device, a wearable device, a television, a multimedia device, an accessory, a speaker, a head-mounted display (HMD), and/or a personal computing device. In some examples, the computer system is in communication with input/output devices, such as one or more cameras, speakers, microphones, sensors (e.g., heart rate sensor, monitors, antennas (e.g., using Bluetooth and/or Wi-Fi), fitness tracking devices (e.g., a smart watch and/or a smart ring), and/or near-field communication sensors).

At 802, the computer system detects an input (e.g., 705*a*, 705*b*, 705*d*, and/or 705*f*) performed by a portion (e.g., 702*a* and/or 702*b*) (e.g., a body part of the user, head, hand, finger, eye, and/or foot) of a user (e.g., 702) (e.g., a body part input, a hand input, a finger input, a head input, a palm input, an arm input, and/or a foot input) relative to (e.g., in and/or within) a three-dimensional environment (e.g., 712). In some examples, the computer system displays and/or presents one or more portions of a representation of the field-of-view (e.g., while, before, and/or after detecting the input performed by the portion of the user).

At 804, in response to detecting the input (e.g., 705*a*, 705*b*, 705*d*, and/or 705*f*), in accordance with (at 806) a determination that (e.g., at least a portion of, all, and/or most of) the input (e.g., 705*a*, 705*b*, 705*d*, and/or 705*f*) was performed at a first location relative to (e.g., and/or a first portion of, a first subset of, and/or a first area of) (e.g., a location inside of a zone (e.g., a preselected and/or user-selected zone) (e.g., region (e.g., a two-dimensional region and/or a three-dimensional region) of the field-of-view and/or a region of an environment) that when an input is detected in the zone, the computer system is allowed to cause an operation to be performed in response to detecting the input) the three-dimensional environment (e.g., 712), the computer system performs an operation (e.g., an operation to move a user interface element (e.g., a virtual object and/or an object corresponding to an application) from one position to another position, an operation to interact (e.g., play music, close window, open window, and/or select a virtual object and/or user interface element) with a user interface element, and/or a system operation (e.g., adjust volume, adjust brightness, and/or turn on/off Wi-Fi, Bluetooth, and/or airplane mode)) based on the input (e.g., based on the type of input performed by the portion of the user, based on the speed of the input performed by the portion of the user, based on the direction of the input performed by the portion of the user, and/or based on the acceleration of the input performed by the portion of the user).

At 804, in response to detecting the input (e.g., 705*a*, 705*b*, 705*d*, and/or 705*f*), in accordance with (at 808) a determination that (e.g., at least a portion of, all, and/or most of) the input (e.g., 705*a*, 705*b*, 705*d*, and/or 705*f*) was performed at a second location (e.g., a location inside of a zone (e.g., a preselected and/or user-selected zone) that when an input is detected in the zone, the computer system is not allowed to cause an operation to be performed in response to detecting the input) in (e.g., and/or a second portion of, a second subset of, and/or a second area of) the three-dimensional environment (e.g., 712), wherein the second location is different from the first location, the computer system forgoes performing the operation based on the input (and/or, in some examples, forgoes performing any operation and/or forgoing performing a respective operation based on the input). In some examples, the entirety of the input performed by the portion of the user is performed in the first location and none of the input performed by the portion of the user is performed in the second location. In some examples, the portion of the input performed by the portion of the user is performed in the first location and a portion of the input performed by the portion of the user is performed in the second location. In some examples, performing the operation includes causing another device to perform another operation and/or the operation. Performing an operation based on whether an input was performed at a first location and forgoing performing the operation based on whether the input was performed at a second location enables a computer system to reduce the performances of operations based on unintentional inputs by a user, thereby reducing the number of inputs needed to perform an operation and performing an operation when a set of conditions has been met without requiring further user input.

In some examples, before detecting the input (e.g., 705*a*, 705*b*, 705*d*, and/or 705*f*) performed by the portion (e.g., 702*a* and/or 702*b*) of the user (e.g., 702), the computer system receives (e.g., via an external device and/or the computer system) data representative of (e.g., defining and/or indicating) a first predefined zone (e.g., 710) (e.g., an input zone, a zone where the computer system detecting inputs performed inside of the zone causes the computer system to perform a set of operations and detecting inputs performed outside of the zone does not cause the computer system to perform a set of one or more operations (and/or the computer system ignores inputs performed outside of the zone), a user defined plurality of locations in the three-dimensional environment, an automatically defined plurality of locations in the three-dimensional environment, and/or a plurality of locations relative to the three-dimensional environment) that includes the first location (e.g., a representation and/or definition of the first location) and does not include the second location. In some examples, before, while, and/or after detecting the input performed by the portion of the user, the computer system displays a representation of the first predefined zone and/or a representation of the first predefined zone is visible in the three-dimensional environment (e.g., visible when a viewpoint of the user is directed to the first predefined zone). In some examples, the first predefined zone is environment-locked (e.g., at fixed locations and/or regions relative to the three-dimensional environment). In some examples, the first predefined zone is head-locked (e.g., based on the field-of-view of one or more cameras of the computer system). In some examples, the first predefined zone is body-locked (e.g., at fixed locations and/or regions relative to a user's body). In some examples, in response to detecting the input (e.g., 705*a*, 705*b*, 705*d*, and/or 705*f*): In some examples, in accordance with a determination that the input (e.g., 705*a*, 705*b*, 705*d*, and/or 705*f*) was performed at a location inside of the first predefined zone (e.g., 710), the computer system performs the operation based on the input, wherein the operation is not performed when the input occurs at a location outside of the predefined zone. In some examples, in response to detecting inputs at different locations (e.g., that are the same as the input) inside of the first predefined zone, the computer system performs the operation based on the input. In some examples, in accordance with a determination that the input was performed at a location outside of the first predefined zone (e.g., different from the location inside of the first predefined zone), the computer system does not perform the operation based on the input. In some examples, in response to detecting inputs at different locations (e.g., that are the same as the input and/or that are the same type of inputs as the input) outside of the first predefined zone, the computer system forgoes performing the operation based on the input. Performing the operation based on the input being performed at a location inside of a first predefined zone (e.g., designated by a user) enables a computer system to customize an input zone so that the user can perform tasks (e.g., inputs, gestures) not intended for the computer system without the task being mishandled as an input intended for the computer system and enables a computer system to reduce the performances of operations based on unintentional inputs by a user, thereby reducing the number of inputs needed to perform an operation inputs by the user and performing an operation when a set of conditions has been met without requiring further user input.

In some examples, before detecting the input (e.g., 705*a*, 705*b*, 705*d*, and/or 705*f*) performed by the portion (e.g., 702*a* and/or 702*b*) of the user (e.g., 702), the computer system receives (e.g., via an external device and/or the computer system) data representative of a second predefined zone (e.g., 708) (e.g., an input zone, a zone where the computer system detecting inputs performed outside of the zone causes the computer system to perform a set of operations and detecting inputs performed inside of the zone are does not cause the computer system to perform a set of one or more operations (and/or the computer system ignores inputs performed inside of the zone), a user defined plurality of locations in the three-dimensional environment, an automatically defined plurality of locations in the three-dimensional environment, and/or a plurality of locations relative to the three-dimensional environment) that includes the second location and does not include the first location. In some examples, before, while, and/or after detecting the input performed by the portion of the user, the computer system displays a representation of the first predefined zone and/or a representation of the first predefined zone is visible in the three-dimensional environment (e.g., visible when a viewpoint of the user is directed to the first predefined zone). In some examples, the second predefined zone is environment-locked (e.g., at fixed locations and/or regions relative to the three-dimensional environment). In some examples, the second predefined zone is head-locked (e.g., based on the field-of-view of one or more cameras of the computer system). In some examples, the second predefined zone is body-locked (e.g., at fixed locations and/or regions relative to a user's body). In some examples, in response to detecting the input (e.g., 705*a*, 705*b*, 705*d*, and/or 705*f*), in accordance with a determination that the input (e.g., 705*a*, 705*b*, 705*d*, and/or 705*f*) was performed at a location outside of the second predefined zone (e.g., 708), the computer system performs the operation based on the input, wherein the operation is not performed when the input occurs at a location inside of the second predefined zone. In some examples, in response to detecting inputs at different locations (e.g., that are the same as the input and/or the same type of input as the input) outside of the first predefined zone, the computer system performs the operation based on the input. In some examples, in accordance with a determination that the input was performed at a location inside of the second predefined zone (e.g., different from the location outside of the second predefined zone), the computer system does not perform the operation based on the input. In some examples, in response to detecting inputs at different locations (e.g., that are the same as the input and/or the same type of input as the input) inside of the first predefined zone, the computer system forgoes performing the operation based on the input. Performing the operation based on the input being performed at a location outside of a second predefined zone (e.g., designated by a user) enables the computer system to ignore tasks performed by the user not intended for the computer system and enables a computer system to reduce the performances of operations based on unintentional inputs by a user, thereby reducing the number of inputs needed to perform an operation and performing an operation when a set of conditions has been met without requiring further user input.

In some examples, the input (e.g., 705*a*, 705*b*, 705*d*, and/or 705*f*) performed by the portion (e.g., 702*a* and/or 702*b*) of the user (e.g., 702) relative to the three-dimensional environment (e.g., 712) is detected while displaying a user interface object (e.g., 704*cl*). In some examples, in response to detecting the input (e.g., 705*a*, 705*b*, 705*d*, and/or 705*f*), in accordance with a determination that the input (e.g., 705*a*, 705*b*, 705*d*, and/or 705*f*) was performed at a third location (e.g., that corresponds to a location of the user interface object and/or another location) and the input corresponds to an input directed to the user interface object (e.g., 704*cl*) (e.g., a touch input, an input in space at a location that corresponds to the location of the user interface object (e.g., an input at a location corresponding to the surface and/or directed to a location corresponding the surface of the virtual object), an input within a predetermined distance from the user interface object, and/or a touch-input on the user interface object), the computer system performs the operation based on the input. In some examples, in accordance with a determination that the input was performed at the third location and the input does not correspond to the input directed to the user interface object (e.g., a trackpad input, an air gesture (e.g., a pinch gesture and/or a swipe gesture), and/or an air gesture made while gaze is detected being directed to a location corresponding to the surface of the virtual object), the computer system does not perform the operation based on the input. In some examples, the third location is inside of the predefined zone. In some examples, the third location is outside the predefined zone. Performing the operation based on the input being performed at a third location and the input corresponding to the input directed to an object enables the computer system ignore unintended gestures by the user and enables the computer system to reduce the performances of operations based on unintentional inputs by a user, thereby reducing the number of inputs needed to perform an operation and performing an operation when a set of conditions has been met without requiring further user input.

In some examples, the computer system (e.g., 700) is in communication with a first display generation component (e.g., 120, 1-122*a* and/or 1-122*b*). In some examples, in conjunction with (e.g., while, after, and/or before) detecting the input (e.g., 705*a*, 705*b*, 705*d*, and/or 705*f*) performed by the portion (e.g., 702*a* and/or 702*b*) of the user (e.g., 702), the computer system displays, via the first display generation component, a first visual indication (e.g., 708 and/or 710) corresponding to a third predefined zone (e.g., 708 and/or 710), wherein a determination of whether one or inputs (e.g., 705*a*, 705*b*, 705*d*, and/or 705*f*) are detected within the third predefined zone causes the computer system (e.g., 700) to perform the operation or not perform the operation. In some examples, a visual indication of a predefined zone indicates a spatial extent of the zone either by indicating a volume of the zone, a boundary of the predefined zone, and/or a depth of the predefined. In some examples, a separate indication from the visual indication indicate the spatial external extent of the zone, such as a number, text, and/or a symbol. In some examples, an indication of the spatial extent is displayed. In some examples, a visual indication has a volume that indicates the spatial extent of the predefined zone and/or has a boundary corresponds to the boundary of the predefined zone. In some examples, in conjunction with (e.g., while, after, and/or before) detecting the input (e.g., 705*a*, 705*b*, 705*d*, and/or 705*f*) performed by the portion (e.g., 702*a* and/or 702*b*) of the user (e.g., 702), the computer system displays, via the first display generation component, a second visual indication (e.g., 708 and/or 710) corresponding to a fourth predefined zone (e.g., 708 and/or 710) different from the third predefined zone (e.g., 708 and/or 710), wherein a determination of whether one or more inputs (e.g., 705*a*, 705*b*, 705*d*, and/or 705*f*) are detected within the fourth predefined zone (e.g., 708 and/or 710) causes the computer system (e.g., 700) to perform the operation or not perform the operation. In some examples, in response to detecting one or more inputs performed in the third predefined zone, the computer system performs the operation, and in response to detecting one or more inputs performed in the fourth predefined zone, the computer system does not perform the operation. In some examples, in response to detecting one or more inputs performed in the third predefined zone, the computer system does not perform the operation, and in response to detecting one or more inputs performed in the fourth predefined zone, the computer system performs the operation. In some examples, the first visual indication and/or the second visual indication is environment-locked (e.g., at fixed locations and/or regions relative to the three-dimensional environment). In some examples, the first visual indication and/or the second visual indication is head-locked (e.g., based on the field-of-view of one or more cameras of the computer system). In some examples, the first visual indication and/or the second visual indication is body-locked (e.g., at fixed locations and/or regions relative to a user's body). In some examples, the first visual indicator is environment-locked while the second indication is head-locked or body-locked, and/or vice-versa. Displaying a first visual indication corresponding to a third predefined zone and a second visual indication corresponding to a fourth predefined zone in conjunction with detecting the input performed by a portion of the user enables a computer system to display to the user predefined zones so that the user can ascertain the zone in which an input can be provided to perform an operation, thereby providing improved visual feedback to the user and reducing the number of inputs needed to perform an operation.

In some examples, the first visual indication (e.g., 708 and/or 710) and the second visual indication (e.g., 708 and/or 710) continue to be displayed, irrespective of a period of time expiring (e.g., as described above in FIG. 7D) (e.g., since displaying the second indication and the third indication) (e.g., the second indication and the third indication are permanently displayed). Continuing displaying the first visual indication corresponding to the third predefined zone and the second visual indication corresponding to the fourth predefined zone, irrespective of a period of time expiring, enables a computer system to display to the user predefined zones permanently, thereby providing improved visual feedback to the user and reducing the number of inputs needed to perform an operation.

In some examples, while displaying the first visual indication (e.g., 708 and/or 710) and the second visual indication (e.g., 708 and/or 710), the computer system detects that a threshold period of time has expired. In some examples, in response to detecting the threshold period of time has expired, the computer system ceases to display the first visual indication and the second visual indication (e.g., as described above in FIG. 7D) (e.g., before detecting the threshold period of time has expired, the computer system continues to display the first indication and the second indication). In some examples, in response to detecting a first threshold period of time has expired, the computer system ceases to display the first visual indication. In some examples, in response to detecting a second threshold period of time (e.g., different from the first threshold period of time) has expired, the computer system ceases to display the second visual indication. Displaying the first visual indication corresponding to the third predefined zone and the second visual indication corresponding to the fourth predefined zone in conjunction with detecting the input performed by a portion of the user enables a computer system to display to the user predefined zones and ceasing to displaying the third predefined zone and the fourth predefined zone when a threshold period of time expires, thereby providing improved visual feedback to the user and performing an operation when a set of conditions has been met without requiring further user input.

In some examples, before displaying the first visual indication (e.g., 708 and/or 710) and the second visual indication (e.g., 708 and/or 710) (and, in some examples, after, while, and/or before detecting the input performed by the portion of the user), the computer system detects a first set of one or more inputs (e.g., 705*a*, 705*b*, 705*d*, and/or 705*f*) (e.g., one or more tap inputs and/or air gestures directed to one or more virtual objects, one or more air gestures detected while gaze (e.g., via 6-120) is detected to be directed to one or more virtual objects, one or more mouse clicks, one or more voice commands, and/or one or more presses and/or swipes on a physical hardware controller, device, and/or button). In some examples, in response to detecting the first set of one or more inputs (e.g., 705*a*, 705*b*, 705*d*, and/or 705*f*), the computer system displays the first visual indication of the third predefined zone (e.g., 708 and/or 710) and the second visual indication of the fourth predefined zone (e.g., 708 and/or 710) (e.g., where the first visual indication of the third predefined zone and the second visual indication of the fourth predefined zone were not previously displayed before the first set of one or more inputs were detected). In some examples, the first visual indication of the third predefined zone and the second visual indication of the fourth predefined zone are displayed in relation to the area of the three-dimensional environment to which each respective visual indication corresponds. In some examples, the first visual indication of the third predefined zone and the second visual indication of the fourth predefined zone are not displayed in relation to the area of the three-dimensional environment to which each respective visual indication corresponds. In some examples, the orientation and/or arrangement of the first visual indication of the third predefined zone and the second visual indication of the fourth predefined zone corresponds to the orientation and/or arrangement of the third predefined zone and/or the fourth predefined zone in the three-dimensional environment. In some examples, the first visual indication changes while the third predefined zone is being redefined by a user. In some examples, the second indication changes while the fourth predefined zone is being redefined by the user. In some examples, the computer system ceases to display the first visual indication while continuing to display the second indication (or vice-versa) in response to detecting input and/or in accordance with a determination that the third predefined zone has been disabled. In some examples, in response to a first input, the first computer system displays the first visual indication of the third predefined zone. In some examples, in response to a second input (e.g., different from the first input), the first computer system displays the second visual indication of the fourth predefined zone. Displaying the first visual indication corresponding to the third predefined zone and the second visual indication corresponding to the fourth predefined zone in response to detecting a first set of one or more inputs enables a computer system to provide a user with a control option to display to the user predefined zones, thereby providing additional control options without cluttering the user interface, providing improved visual feedback to the user, and reducing the number of inputs needed to perform an operation.

In some examples, the computer system (e.g., 700) is in communication with a second display generation component (e.g., 120, 1-122*a* and/or 1-122*b*). In some examples, in conjunction with (e.g., while, after, and/or before) detecting the input (e.g., 705*a*, 705*b*, 705*d*, and/or 705*f*) performed by the portion (e.g., 702*a* and/or 702*b*) of the user (e.g., 702), the computer system displays, via the first display generation component, a third visual indication (e.g., 708 and/or 710) of a fifth predefined zone (e.g., 708 and/or 710), wherein the fifth predefined zone (e.g., 708 and/or 710) is associated with a fourth location in the three-dimensional environment (e.g., 712), and wherein the third visual indication of the fifth predefined zone is displayed at a location in the three-dimensional environment (e.g., 712) that is based on at least the fourth location. In some examples, while displaying the third visual indication of the fifth predefined zone (e.g., 708 and/or 710) at the location in the three-dimensional environment (e.g., 712) that is based on at least the fourth location, the computer system detects a second set of one or more inputs (e.g., 705*a*, 705*b*, 705*d*, and/or 705*f*). In some examples, the second set of one or more inputs is detected without the third visual indication of the fifth predefined zone being displayed at the location in the three-dimensional environment that is based on at least the fourth location. In some examples, the second set of one or more inputs include one or more tap inputs and/or air gestures directed to one or more virtual objects, one or more air gestures detected while gaze (e.g., via 6-120) is detected to be directed to one or more virtual objects, one or more mouse clicks, one or more voice commands, and/or one or more presses and/or swipes on a physical hardware controller, device, and/or button. In some examples, in response to detecting the second set of one or more inputs (e.g., 705*a*, 705*b*, 705*d*, and/or 705*f*), the computer system changes the fifth predefined zone (e.g., 708 and/or 710) from being associated with the fourth location to be associated with a fifth location different from the fourth location. In some examples, in response to detecting the second set of one or more inputs (e.g., 705*a*, 705*b*, 705*d*, and/or 705*f*), the computer system moves display of the third visual indication of the fifth predefined zone (e.g., 708 and/or 710) from the location in the three-dimensional environment (e.g., 712) that is based on at least the fourth location to a location in the three-dimensional environment that is based on at least the fifth location. In some examples, the location in the three-dimensional environment that is based on at least the fourth location is different from the location in the three-dimensional environment that is based on at least the fifth location. In some examples, the computer system changes the fifth predefined zone from being associated with the fourth location to be associated with a fifth location different from the fourth location without the third visual indication being displayed and/or any indication of a zone being displayed. Changing a fifth predefined zone from being associated with a fourth location to be associated with a fifth location different and moving a display of a third visual indication of the fifth predefined zone from the location in a three-dimensional environment that is based on at least the fourth location to a location in the three-dimensional environment that is based on at least the fifth location in response to detecting the second set of one or more inputs enables a computer system to provide a user with additional control options to customize the positions of predefined zones and display the customized predefined zones, thereby providing additional control options without cluttering the user interface, providing improved visual feedback to the user, and reducing the number of inputs needed to perform an operation.

In some examples, in conjunction with (e.g., while, after, and/or before) detecting the input (e.g., 705*a*, 705*b*, 705*d*, and/or 705*f*) performed by the portion (e.g., 702*a* and/or 702*b*) of the user (e.g., 702), the computer system displays, via the first display generation component (e.g., 120, 1-122*a* and/or 1-122*b*), a fourth visual indication (e.g., 708 and/or 710) of a sixth predefined zone (e.g., 708 and/or 710), wherein the sixth predefined zone is a first size, and wherein the fourth visual indication is displayed at a size that is based on (e.g., corresponding to, is, and/or proportional to) the first size. In some examples, while displaying the fourth visual indication at a size that is based on the first size, the computer system detects a third set of one or more inputs (e.g., 705*a*, 705*b*, 705*d*, and/or 705*f*). In some examples, the third set of one or more inputs are detected without the fourth visual indication at a size that is based on the first size being displayed. In some examples, the third set of one or more inputs include one or more tap inputs and/or air gestures directed to one or more virtual objects, one or more air gestures detected while gaze (e.g., via 6-120) is detected to be directed to one or more virtual objects, one or more mouse clicks, one or more voice commands, and/or one or more presses and/or swipes on a physical hardware controller, device, and/or button. In some examples, in response to detecting the third set of one or more inputs (e.g., 705*a*, 705*b*, 705*d*, and/or 705*f*), the computer system changes a size (e.g., increasing and/or decreasing the size) of the sixth predefined zone (e.g., 708 and/or 710) from the first size to a second size different from the first size. In some examples, in response to detecting the third set of one or more inputs (e.g., 705*a*, 705*b*, 705*d*, and/or 705*f*), the computer system changes a size (e.g., increasing and/or decreasing the size) of the fourth visual indication from a size that is at least based on the first size to a size that is at least based on the second size. In some examples, the computer system changing a size (e.g., increasing and/or decreasing the size) of the sixth predefined zone without the fourth visual indication being displayed. In some examples, Changing a size of a sixth predefined zone from a first size to a second size different from the first size and changing a size of a fourth visual indication from a size that is at least based on the first size to a size that is at least based on the second size in response to detecting the third set of one or more inputs enables the computer system to customize the size of predefined zones and then display the customized predefined zones, thereby providing additional control options without cluttering the user interface, providing additional control options without cluttering the user interface, providing improved visual feedback to the user, and reducing the number of inputs needed to perform an operation.

In some examples, after detecting the input (e.g., 705*a*, 705*b*, 705*d*, and/or 705*f*) performed by the portion (e.g., 702*a* and/or 702*b*) of the user (e.g., 702), the computer system detects a second input. In some examples, in response to detecting the second input (e.g., 705*a*, 705*b*, 705*d*, and/or 705*f*), in accordance with a determination that the second input (e.g., 705*a*, 705*b*, 705*d*, and/or 705*f*) is directed to the first location, the computer system performs a second operation based on the second input. In some examples, in response to detecting the second input (e.g., 705*a*, 705*b*, 705*d*, and/or 705*f*), in accordance with a determination that the second input (e.g., 705*a*, 705*b*, 705*d*, and/or 705*f*) is directed to the second location and that the second input includes (e.g., is and/or comprises) a gaze input (e.g., as described above at FIG. 7A) (and/or does not include an input performed by the portion of the user (e.g., a hand input)) (e.g., a first type of input), the computer system performs a third operation based on the second input (e.g., as described above in FIG. 7C). In some examples, the third operation is the same as the second operation. In some examples, the third operation is different from the second operation. In some examples, in accordance with a determination that the second input is directed to the second location and that the second input does not include a gaze input (and/or includes an input performed by the portion of the user (e.g., a hand input)), the computer system does not perform the third operation based on the fifth input. In some examples, even while an input performed by a body part is disabled for a respective location, the computer system performs the operation in response to detecting only a gaze input at the respective location.

Note that details of the processes described above with respect to method 800 (e.g., FIG. 8) are also applicable in an analogous manner to other methods described herein. For example, method 1000 optionally includes one or more of the characteristics of the various methods described above with reference to method 800. For example, one or more steps of method 800 can be used to accept inputs of a first type in a location and not accept inputs of a second type in the same location using one or more steps of method 1000. For brevity, these details are not repeated below.

FIGS. 9A-9H illustrate exemplary user interfaces for managing additional inputs in accordance with some examples. The user interfaces in these figures are used to illustrate the processes described below, including the processes in FIG. 10.

FIGS. 9A-9H illustrate computer system 700 positioned relative to user 702 in environment 712, which is an XR environment, using one or more techniques described above in relation to FIGS. 7A-7G. In some examples, FIGS. 9A-9H are provided to illustrate one or more scenarios, where user 702 performs a hand input and a determination is made as to whether or not the particular hand (e.g., left hand or right hand) is enabled to be used as input. In some examples, computer system 700 performs an operation based on a determination that the particular hand is enabled to be used as input. In some examples, computer system 700 does not perform the operation based on a determination that the particular hand is not enabled to be used as input. In some examples, computer system 700 can be configured different for each individual hand of the user, such that a right hand can be enabled to be used as input while a left hand is not enabled to be used as input. In some examples, allowing different hands to enabled and/or not enabled to be used as input, provides computer system 700 with a mechanism for deciding whether a gesture and/or input (e.g., by a user) should be interpreted as an intention to provide an input to computer system 700 or not.

Figure 9A:
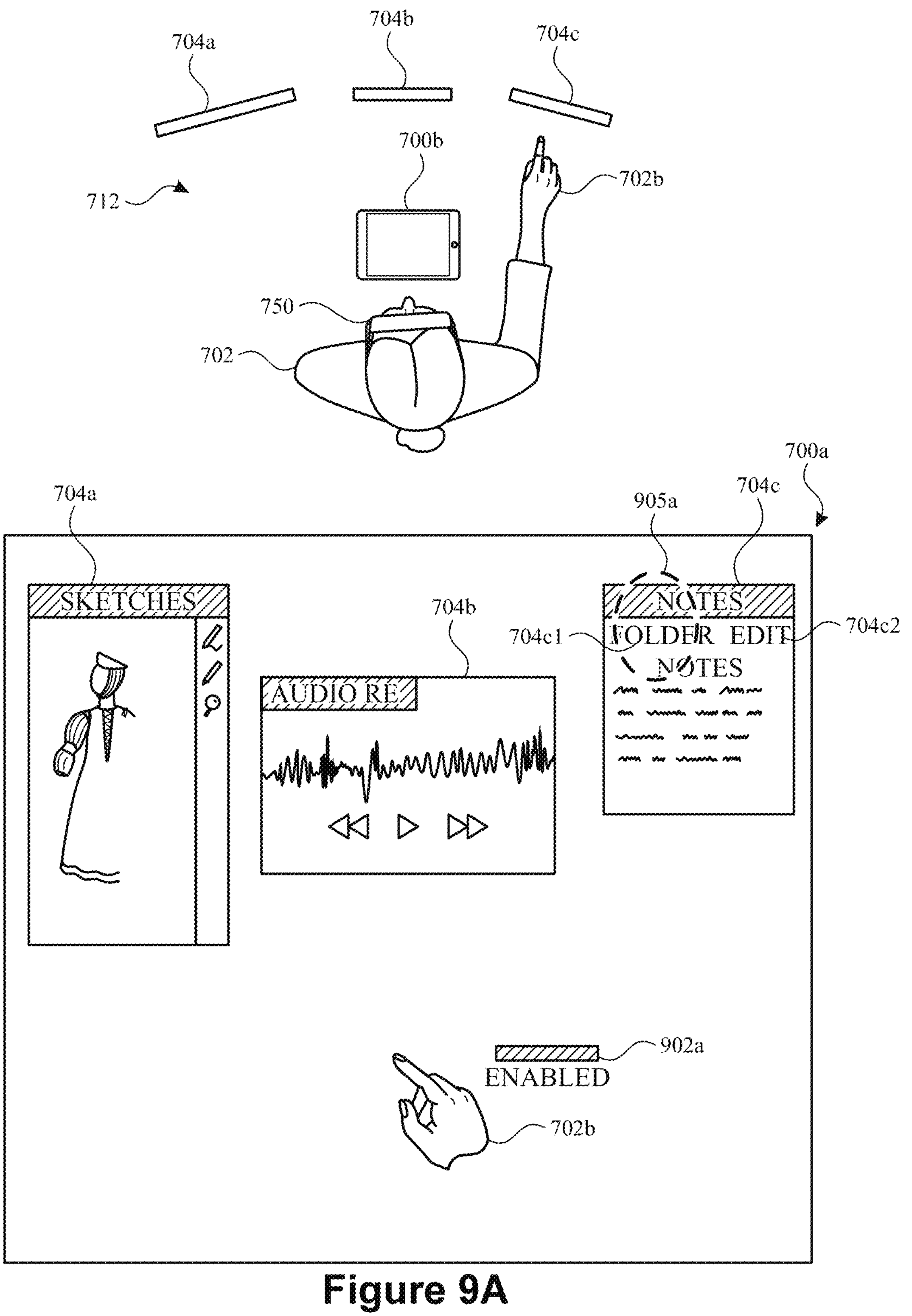
FIGS. 9A-9H illustrate exemplary user interfaces for enabling certain inputs in accordance with some embodiments.
Figure 10:
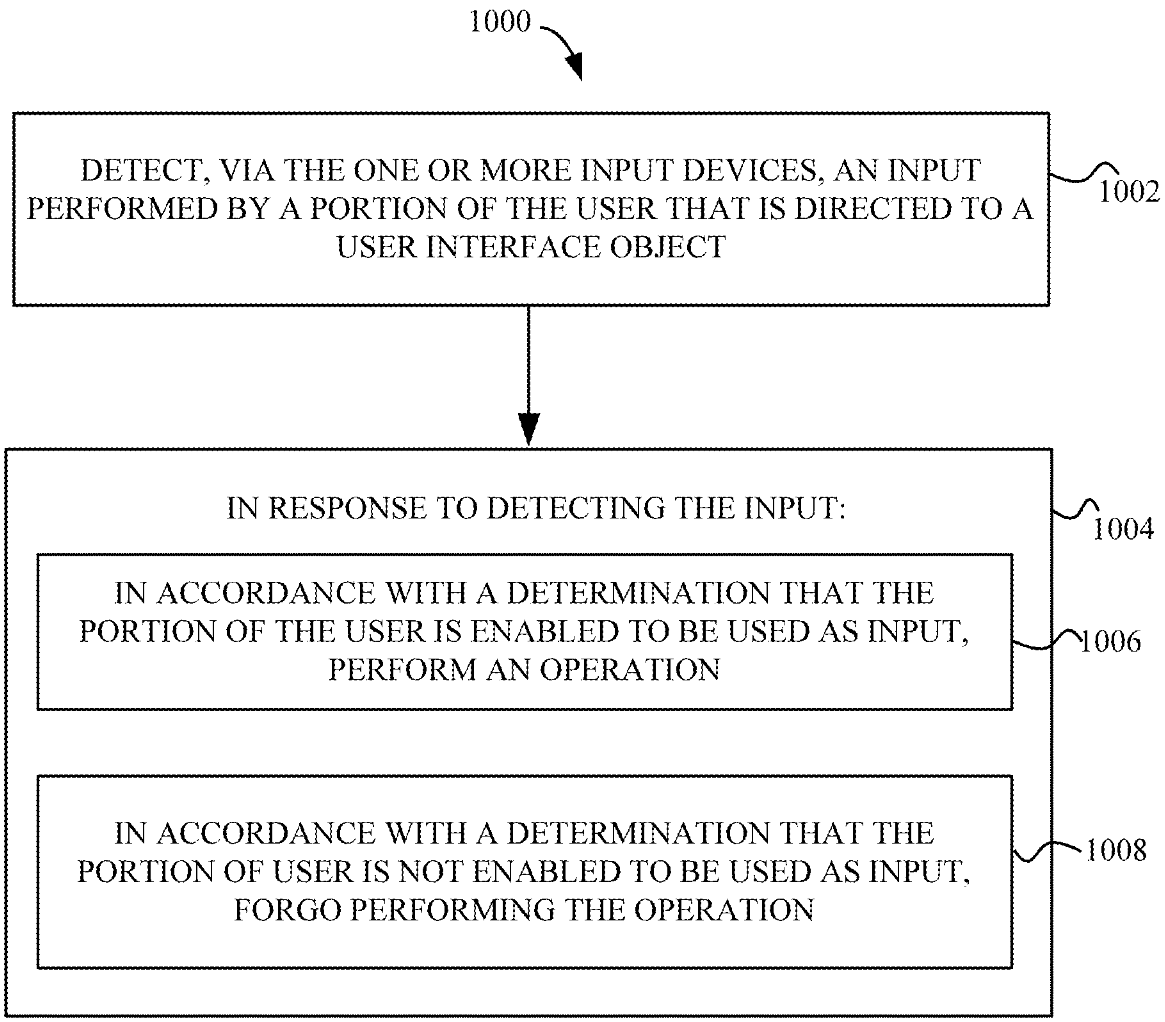
FIG. 10 is a flow diagram illustrating a method for enabling certain inputs in accordance with some embodiments.

As illustrated in FIG. 9A, in addition to computer system 700 and user 702, environment 712 includes virtual object 704*a*, virtual object 704*b*, and virtual object 704*c*, computer system 700 presents the virtual objects (e.g., virtual object 704*a*, virtual object 704*b*, and virtual object 704*c*) via viewpoint 700*a*. In some examples, computer system 700 presents content included in viewpoint 700*a* via a display generation component 700*b* (e.g., 120, 1-122*a* and/or 1-122*b*). In some examples, the display generation component is a translucent and/or transparent display that allows one or more physical objects to "pass-through," such that the one or more physical objects are visible to the user (e.g., in an AR environment). In some examples, the displaying generation component is not a translucent and/or transparent display and does not allow the physical object to "pass-through" (e.g., in a VR environment).

Figure 9B:
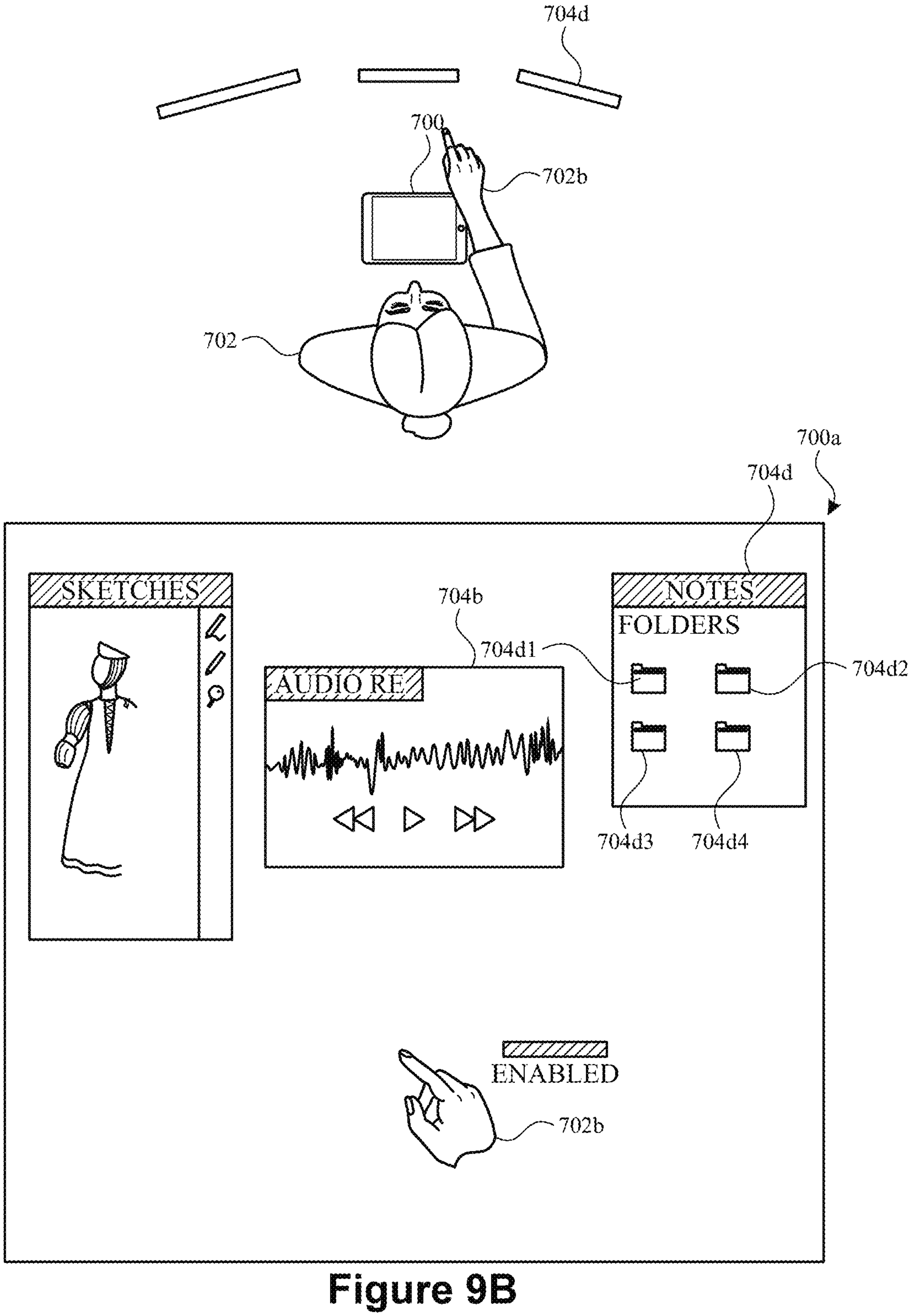

FIGS. 9A-9B illustrate a scenario in which an operation is performed in response to detecting input performed by a hand that is enabled to be used as an input. At FIG. 9A, computer system 700 detects right hand input 905*a* performed by right hand 702*b*, where right hand input 905*a* is directed to folder control 704*c*1 of notes application virtual object 704*c*. As illustrated in FIG. 9A, right hand input 905*a* includes right hand 702*b* directed to notes application virtual object 704*c* in environment 712. In some examples, right hand input 905*a* is not directed to note application virtual object 704*c* but is detected while a gaze (e.g., via 6-120) of user 702 is directed to folder control 704*cl*. It should be understood that hand inputs are being described for exemplary purposes only and, in some examples, other types of inputs and/or inputs performed by other body parts of user 702 can be detected and cause (or not cause) computer system 700 to perform operations using techniques similar to those described in relation to FIGS. 9A-9H. It should also be understood that hand inputs are being described one at a time for exemplary purposes only, in some examples, additional hand inputs can be detected simultaneously (and/or as a combination) and cause (or not cause) computer system 700 to perform operations using techniques similar to those described in relation to FIGS. 9A-9H.

At FIG. 9A, in response to computer system 700 detecting right hand input 905*a* directed to folder control 704*c*1, a determination is made that right hand 702*b* of user 702 is enabled to be used as input (e.g., as indicated by enabled hand indicator 902*a*). In some examples, computer system 700 displays enabled hand indicator 902*a* in viewpoint 700*a* as a part of environment 712. In some examples, right hand 702*b* is enabled to be used as input in response to computer system 700 detecting a request (e.g., via one or more inputs, as described below in relation to FIGS. 9E-9H) to enable inputs from right hand 702*b*. In some examples, right hand

702*b* is automatically enabled to be used as input in response to computer system 700 detecting a particular gesture corresponding to a request to enable inputs from right hand 702*b*.

As illustrated in FIG. 9B, because the determination was made that right hand 702*b* of user 702 is enabled to be used as input, computer system 700 performs an operation, which includes displaying in viewpoint 700*a* notes application virtual object 704*d*. Notes application virtual object 704*d* includes folders 704*d*1-704*d*4, which are folders that contain different notes files for notes application virtual object 704*c*.

Figure 9C:
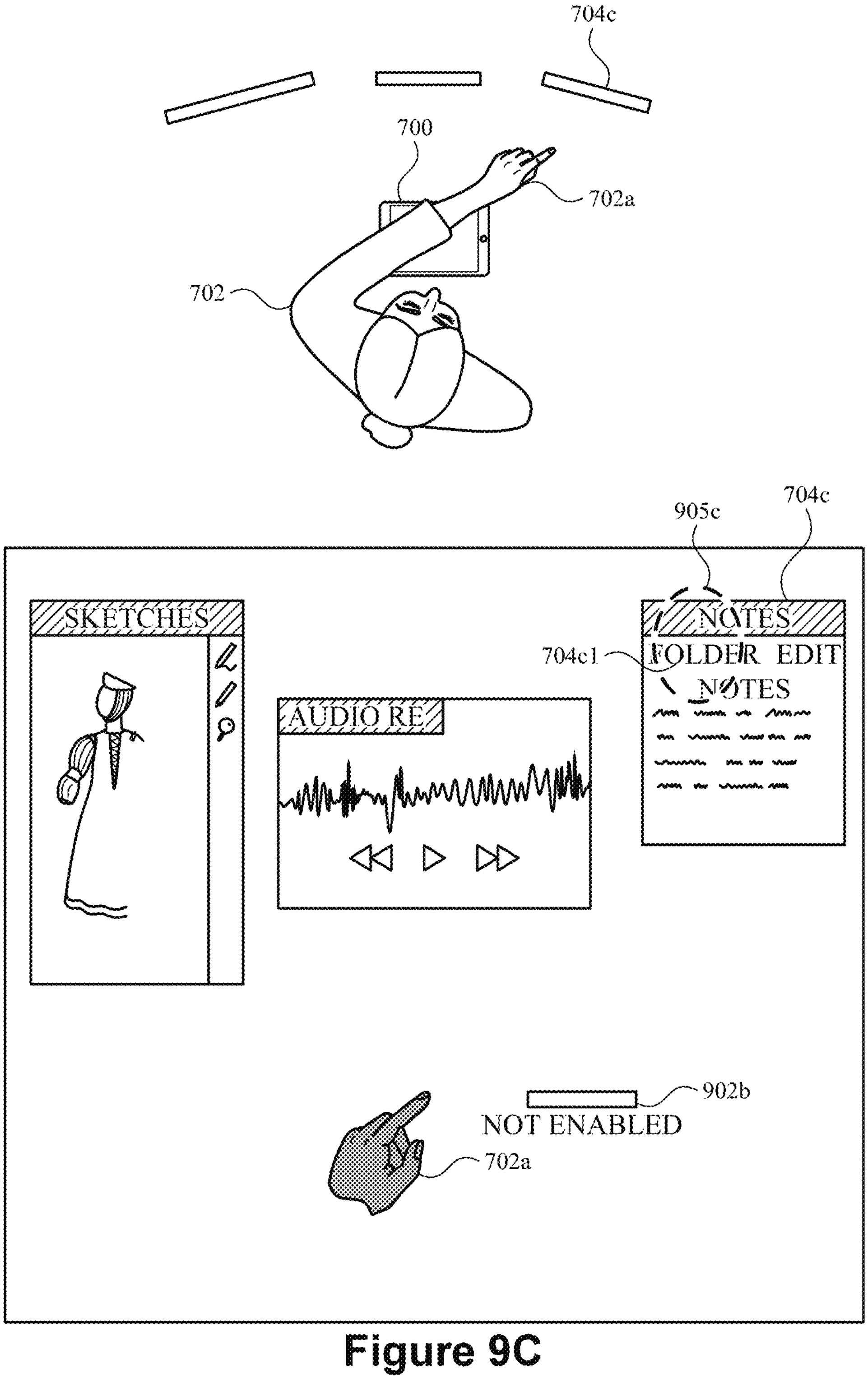
Figure 9D:
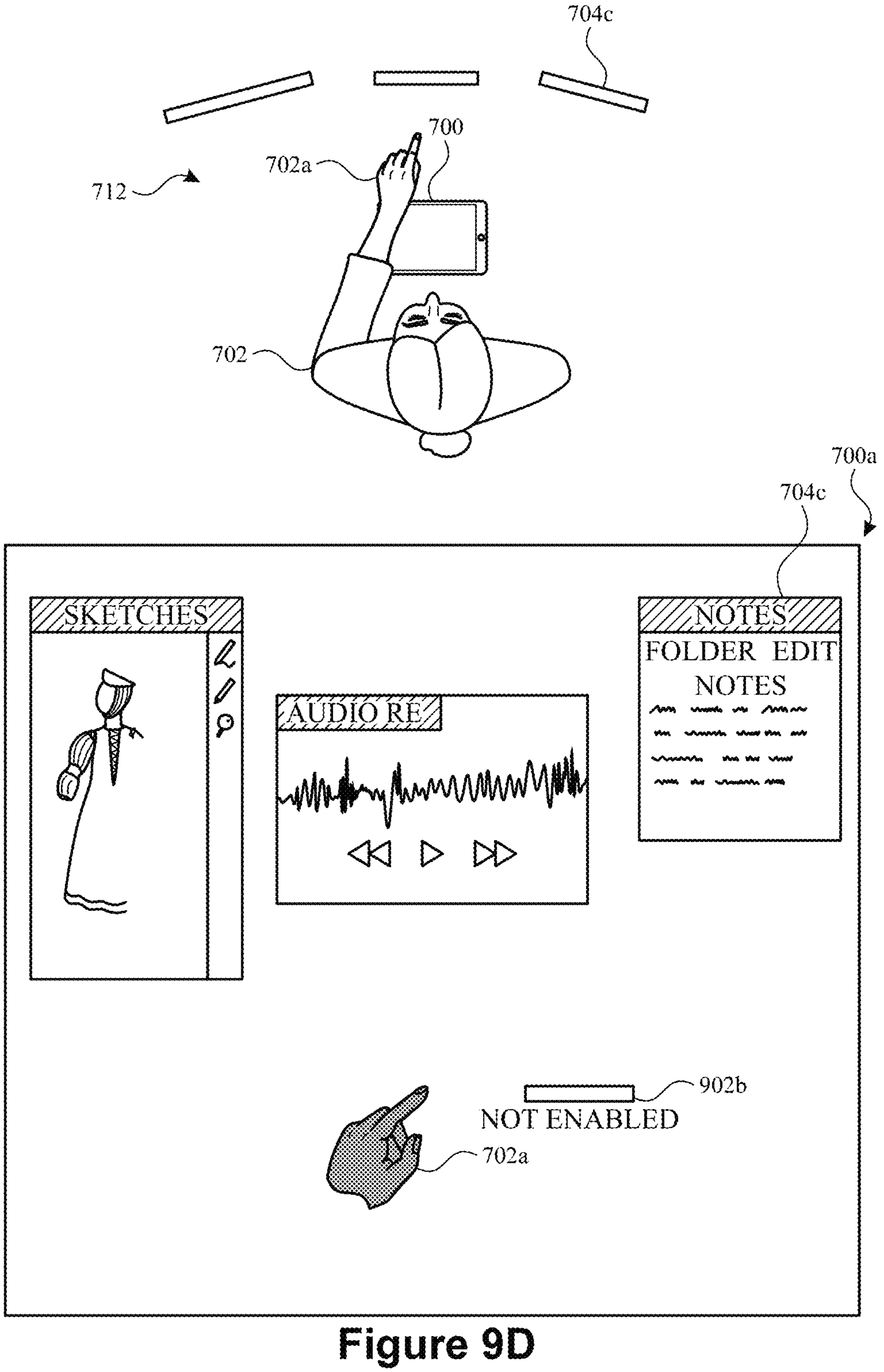

FIGS. 9C-9D illustrate an alternative scenario (e.g., to FIGS. 7A-7D) in which an operation is not performed in response to detecting input performed by a hand that is not enabled (e.g., is configured to be disabled for the purpose of input) to be used as an input. At FIG. 9C, computer system 700 detects left hand input 905*c* performed by left hand 702*a*, where left hand input 905*c* is directed to folder control 704*c*1 of notes application virtual object 704*c*. In some examples, while detecting left hand input 905*c* computer system 700 displays left hand 702*a* performing the input in viewpoint 700*a*. In some examples, left hand input 905*c* is not directed to notes application virtual object 704*c* but left hand input 905*c* is detected while a gaze (e.g., via 6-120) of user 702 is directed to folder control 704*c*1. At FIG. 9C, in response to detecting left hand input 905*c* directed to folder control 704*c*1, a determination is made that left hand 702*a* of user 702 is not enabled to be used as input (e.g., as indicated by not enabled hand indicator 902*b*). In some examples, computer system 600 displays not enabled hand indicator 902*b* in environment 712 as a part of environment 712. In some examples, left hand 702*a* is not enabled to be used as input in response to computer system 700 detecting a request to not enable inputs from left hand 702*a*. In some examples, left hand 702*a* is automatically not enabled to be used as input in response to computer system 700 detecting a particular gesture corresponding to a request to not enable inputs from right hand 702*b*.

As illustrated in FIG. 9D, because the determination was made that left hand 702*a* of user 702 is not enabled to be used as input, computer system 700 does not perform an operation corresponding to left hand input 905*c*, which includes not performing the operation discussed above at FIG. 9B (e.g., selecting folder control 704*c*1 and/or displaying folders 704*d*1-704*d*4). Instead, computer system 700 maintains visibility of notes application virtual object 704*c*.

As can be seen throughout FIGS. 9A-9D, computer system 600 displays in viewpoint 700*a* left hand 702*a* with a different visual appearance than right hand 702*b* to indicate whether or not a particular hand is enabled or not enabled to be used as input. In this example, left hand 702*a* of FIG. 9D is not enabled to be used as input and therefore computer system 700 displays left hand 702*a* as being shaded gray. Also in this example, right hand 702*b* of FIG. 9B is enabled to be as input and therefore computer system 700 displays right hand 702*b* as not being shaded gray (e.g., is displayed with white fill as in FIG. 9B). It should be understood that the particular colors represented in FIGS. 9A-9D to indicate whether a hand is enabled or not enabled to be used as input are merely examples and one or more other colors can be used in addition to and/or in lieu of the colors presented in FIGS. 9A-9D. In some examples, computer system 700 indicates whether a hand is enabled or not enabled to be used as input different, such as by emphasizing (e.g., bolding, highlighting, and/or enlarging) a representation of a hand that is enabled to be used as input and/or emphasizing (e.g., not bolding, not highlighting, and/or shrinking) a representation of a hand that is not enabled to be used as input.

As described above, at FIG. 9D, left hand 702*a* of user 702 includes not enabled hand indicator 902*b* indicating the input of left hand 702*a* is not enabled to be used as input as "NOT ENABLED," and right hand 702*b* of user 702 includes enabled hand indicator 902*a* indicating the input of right hand 702*b* is enabled to be used as input as "ENABLED" at FIG. 9B. As illustrated in FIGS. 9B and 9D, computer system 700 displays enabled hand indicator 902*a* near (e.g., 0-100 centimeters from the center and/or surface of) right hand 702*b* and not enabled hand indicator 902*b* and left hand 702*a* so each hand indicator is displayed in viewpoint 900*a* near a particular to hand to represent whether or not the hand is enabled or not enabled to be used as input. In some examples, enabled hand indicator 902*a* or not enabled hand indicator 902*b* hover adjacent to a particular hand. In some examples, computer system 700 displays enabled hand indicator 902*a* and/or not enabled hand indicator 902*b* in a tool bar and/or a heads-up display (e.g., "HUD") area of viewpoint 900*a* that is not near a particular hand (e.g., the hand to which the hand indicator corresponds). In some examples, computer system 700 does not display one or more of enabled hand indicator 902*a* or not enabled hand indicator 902*b* when viewpoint 700*a* is not directed towards the hands of user 702. In some examples, computer system 700 displays information on whether a particular body part is enabled to be used as input by displaying a graphical indicator on each application virtual object for which the body part is enabled to be used as input or not enabled to be used as input. In some examples, in response to detecting right hand 702*b* or left hand 702*a* of user 702 performing an input, computer system 700 displays a not enabled hand indicator or an enabled hand indicator. It should also be understood that although right hand 702*b* and left hand 702*a* are described above with enabled hand indicator 902*a* or not enabled hand indicator 902*b*, in some examples, either and/or both hands can be enabled to be used as input with corresponding indicators. In some examples, other outputs can be used by computer system 700, including a haptic (via one or more haptic sensors) or audio output (e.g., via one or more audio output devices) when a corresponding hand is detected by computer system 700 to indicate whether the corresponding hand enabled or not enabled to be used as input. In some examples, the haptic or audio output is different depending on whether the corresponding hand is enabled to be used as input or is not enabled to be used as input.

In some examples, user 702 can select a particular input (e.g., left hand 702*a* and/or right hand 702*b*) to be enabled or not enabled to be used as input. In some examples, computer system 700 detects a request to enable a hand to be used as input, which includes detecting the same type of input (e.g., an input from left hand 702*a* and/or right hand 702*b*) as the request to not enable the use of the input. In some examples, despite computer system 700 not enabling a respective hand to be used as input (e.g., left hand 702*a*) for a period of time, computer system 700 enables the respective hand to be used as input when computer system 700 detects the hand making a particular hand input.

While FIGS. 9A-9D describe inputs from left hand 702*a* and right hand 702*b* for notes application virtual object 704*c*. However, in some examples, computer system 700 enables a hand to be used as input or disables a hand to be used as input for a particular application, including sketches application virtual object 704*a*, and audio application virtual object 704*b*, or generally (e.g., to work with multiple applications). In some examples, the inputs enabled to be used as inputs for each application are unique (e.g., customized for and/or specific to an application). In some examples, computer system 700 is configured such that computer system 700 performs one or more operations in response to detecting a right hand input directed to sketches application virtual object 704*a* but does not perform one or more operations in response to detecting a left hand input directed to sketches application virtual object 704*a*. In some examples, computer system 700 is configured such that computer system 700 performs one or more operations in response to detecting a left hand input directed to audio application virtual object 704*b* but does not perform one or more operations in response to detecting a right hand input directed to audio application virtual object 704*b*.

Figure 9E:
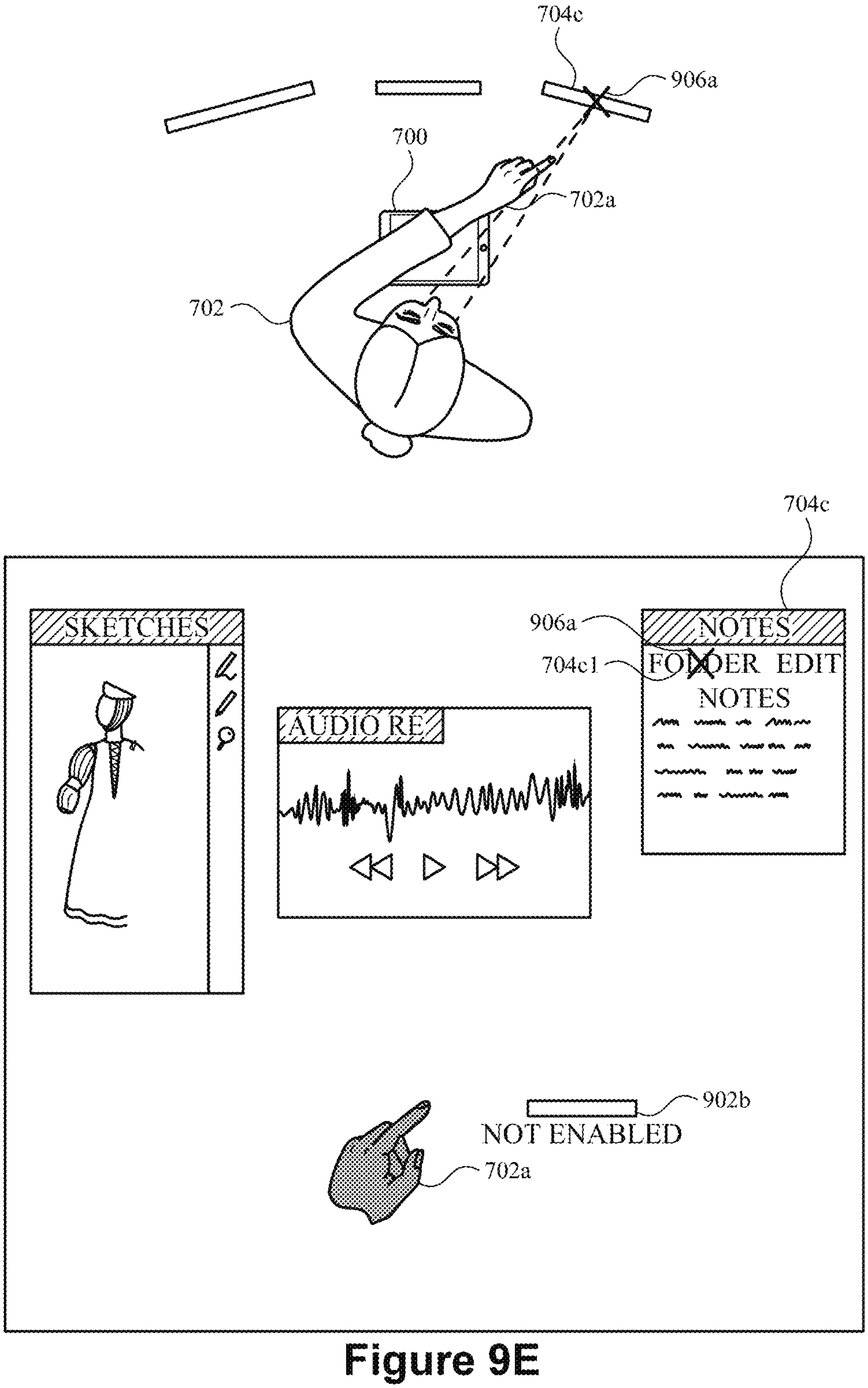

FIG. 9E illustrates a scenario where computer system 700 detects a gaze (e.g., via 6-120) input, irrespective of whether one or more of the hands of a user are enabled to be used as input. At FIG. 9E, computer system 700 detects a gaze (e.g., via 6-120) input 905*e* at gaze position 906*a* directed to folder control 704*c*1 of notes application virtual object 704*c*. As illustrated in FIG. 9E, gaze input includes the gaze (e.g., via 6-120) of user 702 directed to folder control 704*c*1 (e.g., as indicated by gaze position indicator 906*a*) while user 702 is performing a gesture with left hand 702*a*. At FIG. 9E, computer system 700 has not enabled left hand 702*a* to be used as input, as indicated by not enabled hand indicator 902*b* and shaded left hand 702*a*. At FIG. 9E, in response to detecting the gaze (e.g., via 6-120) of user 702 directed to folder control 704*c*1, a determination is made that the gaze (e.g., via 6-120) of user 702 is enabled to be used as input.

Figure 9F:
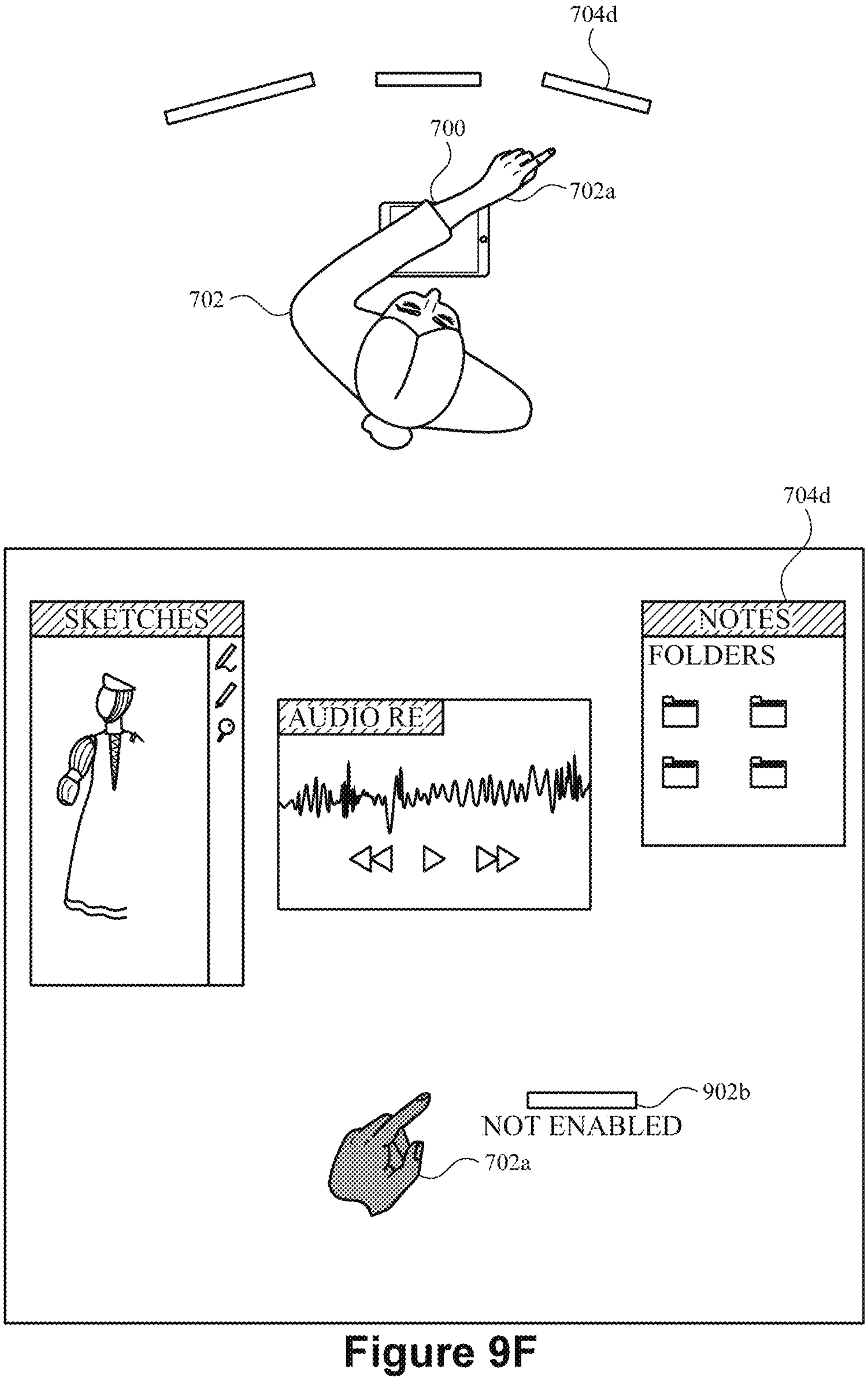

As illustrated in FIG. 9F, because the determination was made that a gaze of user 702 is enabled to be used as input, computer system 700 performs an operation, which includes making visible notes application virtual object 704*d*, despite left hand 702*a* not being enabled to be used as input. Notably, at FIGS. 9E-9F, computer system 700 detected a gaze and performed the corresponding operation even though left hand 702*a* was not enabled to be used as input.

Figure 9G:
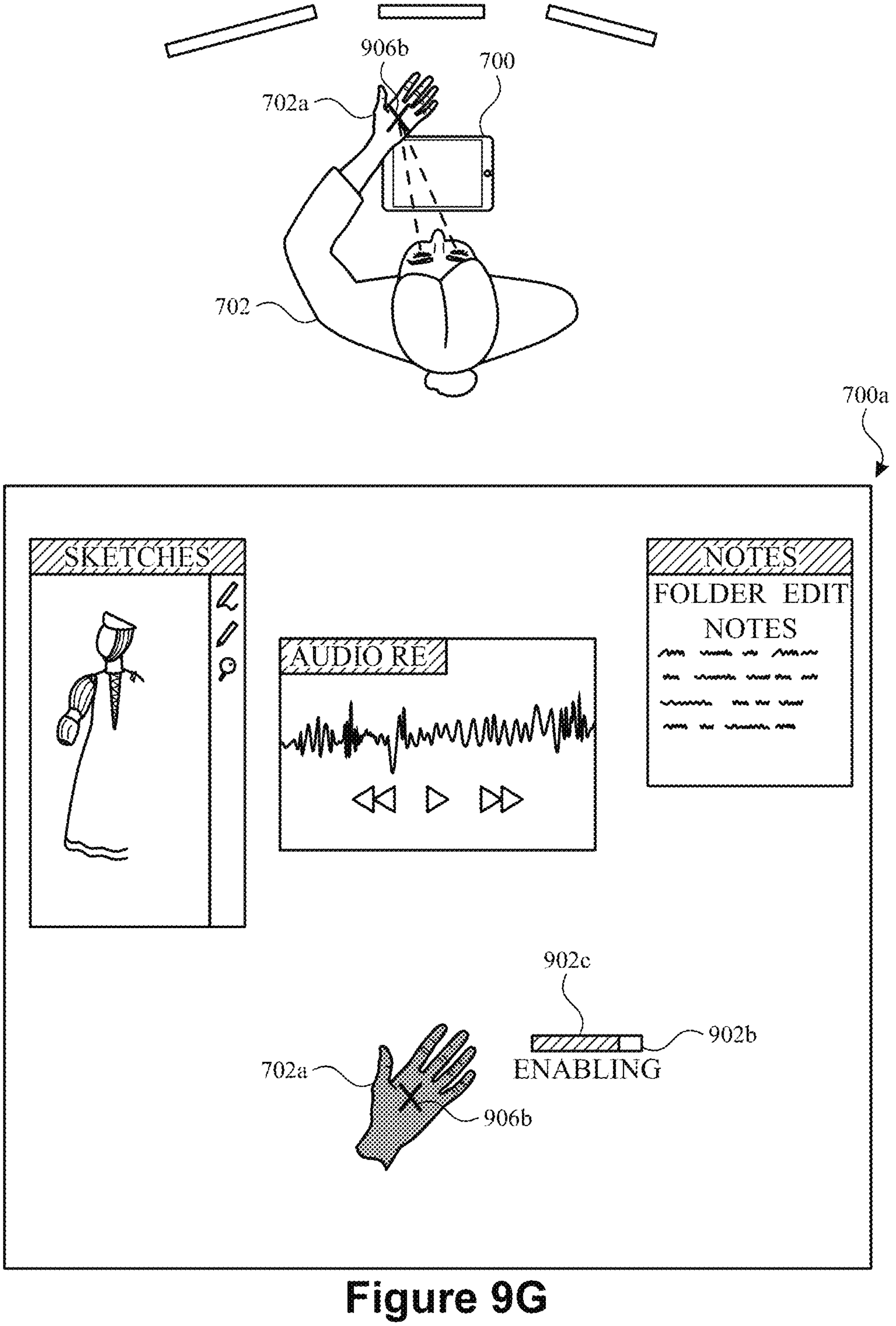

At FIG. 9G, computer system 700 detects gaze input at gaze position 906*b* directed to left hand 702*a* (e.g., as indicated by gaze position indicator 906*b*) while the palm of left hand 702*a* is visible via viewpoint 700*a*. At FIG. 9G, computer system 700 has not enabled left hand 702*a* to be used as input, as indicated by not enabled hand indicator 902*b* and shaded left hand 702*a*. However, at FIG. 9G, computer system 700 has begun to fill a progress bar (e.g., 902*c*) for not enabled hand indicator 902*b*, where the amount of fill in the progress bar indicates the length of time and/or an amount of processing before left hand 702*a* is enabled. In some examples, progress bar 902*c* indicates that computer system 700 is enabling left hand 702*a* to be used as input after a predetermined period of time has passed.

Figure 9H:
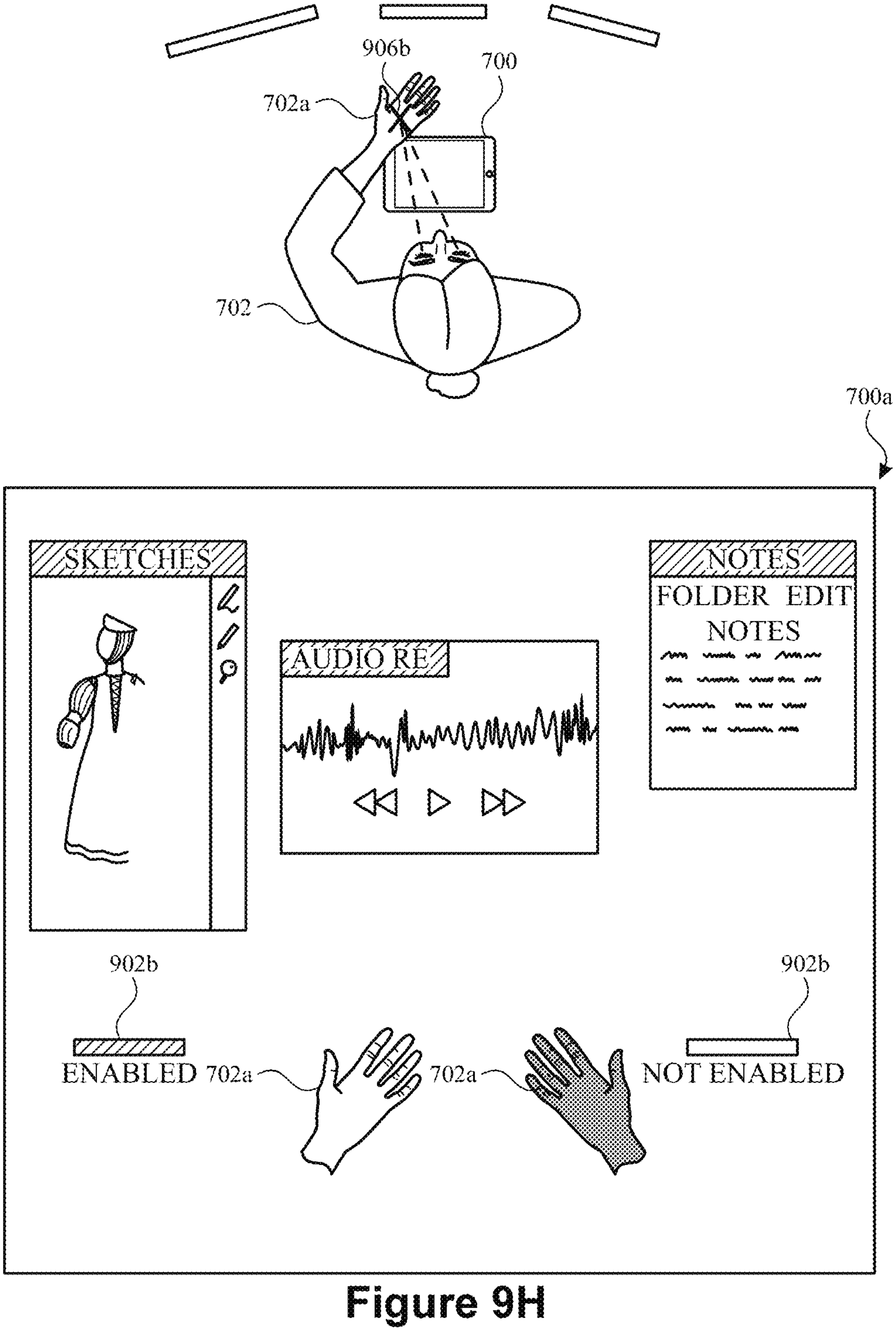

As illustrated in FIG. 9H, in response to detecting that user 702 has gazed at left hand 702*a* for the predetermined period of time, computer system 700 enables left hand 702*a* to be used as input, as indicated by enabled hand indicator 902*a* and the not shaded left hand 702*a*. In some examples, computer system 700 enables left hand 702*a* to be used as input in response to detecting that the gaze of user 702 is detected at left hand 702*a* for an uninterrupted predetermined period of time. In some examples, computer system 700 enables left hand 702*a* to be used as input in response to detecting the gaze of user 702 directed to left hand 702*a* at intervals over an interrupted (e.g., gaze wanders off from being directed to left hand 702*a*). In some examples, computer system 700 resets the predetermined period of time when a determination is made that the gaze of user 702 is detected at intervals that exceed the second predetermined period of time and user 702 has not gazed for the predetermined period of time. In some examples, after detecting that user 702 has gazed at left hand 702*a* for the predetermined period of time, computer system 700 enables left hand 702*a* to be used as input and changes the visible shading for left hand 702*a* to have less shading. In some examples, in response to detecting that the gaze of user 702 is not directed to the palm of a hand of user 702 and/or the palm of the hand of user 702 is not visible via viewpoint 700*a*, computer system 700 does not begin or continue the process of enabling the hand to be used as input and the progress bar is not displayed.

Notably, at FIG. 9H, computer system 700 displays, via viewpoint 700*a*, both the enabled left hand 702*a* and a not enabled right hand 702*b* as indicated by not enabled hand indicator 902*b* and shaded right hand 702*b*. In some examples, in response to enabling left hand 702*a*, computer system 700 changes right hand 702*b* to be not enabled. In some examples, one of left hand 702*a* and right hand 702*b* can be enabled. In some examples, both left hand 702*a* and right hand 702*b*. In some examples, in response to enabling left hand 702*a*, both left hand 702*a* are enabled and right hand 702*b*.

FIG. 10 is a flow diagram illustrating a method (e.g., method 1000) for enabling certain inputs in accordance with some examples. Some operations in method 1000 are, optionally, combined, the orders of some operations are, optionally, changed, and some operations are, optionally, omitted.

As described below, method 1000 provides an intuitive way for enabling certain inputs. Method 1000 reduces the cognitive burden on a user for enabling certain inputs, thereby creating a more efficient human-machine interface. For battery-operated computing devices, enabling a user to enable certain inputs faster and more efficiently conserves power and increases the time between battery charges.

In some examples, method 1000 is performed at a computer system (e.g., 700) (e.g., as described above in relation to method 800) that is in communication with one or more input devices (e.g., as described above in relation to method 800).

At 1002, the computer system detects, via the one or more input devices, an input (e.g., 905*a* and/or 905*c*) (e.g., an air gesture and/or a hand gesture) performed by a portion of the user (e.g., 702) (e.g., as described above in relation to method 800) that is directed to a user interface object (704*a*, 704*b*, 704*c*, and/or 704*d*).

At 1004, in response to detecting the input (e.g., 905*a* and/or 905*c*), in accordance with (at 1006) a determination that the portion of the user (e.g., 702) (and/or, in some examples, the input) is enabled (e.g., via the computer system and/or another computer system, via one computer system and/or another computer system, at the computer system and/or another computer system, by the request of a user, and/or via one or more settings) to be used as input (e.g., input to cause the computer system and/or another device to perform one or more operations) (e.g., via one or more settings and/or commands (e.g., performed by a user (e.g., a user of the computer system) and/or a user of another computer system)), the computer system performs an operation (e.g., as described above in FIGS. 9A-9B) (e.g., as described above in relation to method 800). In some examples, a body part is enabled, registered, and/or configured to cause the computer system to perform one or more operations when the body part is detected in one or more poses and/or positions (e.g., in the field-of-view of one or more cameras of the computer system and/or detected by one or more input devices), such as a first pose, a pointing finger pose, a hand wave pose, and/or a first unclench pose. In some examples, the body part can be enabled for input or not enabled (and/or disabled) for input by a user.

At 1004, in response to detecting the input (e.g., 905*a* and/or 905*c*), in accordance with (at 1008) a determination that the portion of the user (e.g., 702) (and/or, in some examples, the input) is not enabled (e.g., via the computer system and/or another computer system, via one computer system and/or another computer system, at the computer system and/or another computer system, by the request of the user, and/or via one or more settings) to be used as input, the computer system forgoes performing the operation (e.g., as described above in FIG. 9C-9D). Performing an operation in accordance with a determination that the portion of the user is enabled to be used as input and/or not performing the operation in accordance with a determination that the portion of the user is not enabled allows the computer system to automatically perform the operation as directed based on whether or not the portion of the user is enabled and allows the computer system to reduce unintentional performance of the operation, thereby performing an operation when a set of conditions has been met without requiring further user input and providing additional control options without cluttering the user interface.

In some examples, before detecting the input (e.g., 905*a* and/or 905*c*) performed by the portion of the user (e.g., 702*a* and/or 702*b*), the computer system detects a first set of one or more inputs (e.g., 905*a* and/or 905*c*) (e.g., one or more tap inputs and/or air gestures directed to one or more virtual objects, one or more air gestures detected while gaze (e.g., via 6-120) is detected to be directed to one or more virtual objects, one or more mouse clicks, one or more voice commands, and/or one or more presses and/or swipes on a physical hardware controller, device, and/or button). In some examples, detecting the first set of one or more inputs includes detecting a gaze input at a location of a representation of a hand of the user with or without the representation of the hand being displayed and/or visible and/or detecting a gaze input on the actual hand of the user. In some examples, in response to detecting the first set of one or more inputs, in accordance with a determination that the first set of one or more inputs corresponds to a request to enable a first hand (702*a* and/or 702*b*) (e.g., left hand and/or right hand) (and/or, in some examples, a first body part of the user) of the user to be used as input, the computer system enables the first hand of the user to be used as input without enabling a second hand (702*a* and/or 702*b*) (e.g., left hand and/or right hand) (and/or, in some examples, a second body part of the user) (e.g., a hand that is opposite of the first hand and/or a body part that is opposite of the first body part) of the user to be used as input. In some examples, in response to detecting the first set of one or more inputs, in accordance with a determination that the set of one or more inputs corresponds to a request to enable the second hand of the user, the computer system enables the second hand of the user to be used as input without enabling the first hand of the user to be used as input. In some examples, the request to enable the first hand of the user to be used as input includes detecting the same type of input as detecting the request to disable the first hand of the user to be used as input. In some examples, the request to enable the second hand of the user to be used as input includes detecting the same type of input as detecting the request to disable the second hand of the user to be used as input. In some examples, in accordance with a determination that the set of one or more inputs corresponds to a request to disable the first hand of the user to be used as input, the computer system disables the first hand of the user to be used as input without disabling the second hand of the user to be used as input. In some examples, in accordance with a determination that the set of one or more inputs corresponds to a request to disable the second hand of the user, the computer system disables the second hand of the user to be used as input without disabling the first hand of the user to be used as input. In some examples, the computer system can disable the first hand of the user while enabling the second hand of the user, or vice-versa. Enabling the first hand of the user to be used as input without enabling the second hand of the user to be used as input in accordance with a determination that the set of one or more inputs corresponds to a request to enable the first hand of the user to be used as input and/or enabling the second hand of the user to be used as input without enabling the first hand of the user to be used as input in accordance with a determination that the set of one or more inputs corresponds to a request to enable the second hand of the user allows the computer system to automatically enable the individual hands to be used as input as directed and allows the computer system to reduce unintentional performance of the operation, thereby performing an operation when a set of conditions has been met without requiring further user input and providing additional control options without cluttering the user interface.

In some examples, after detecting the first set of one or more inputs (e.g., 905*a* and/or 905*c*), the computer system detects a second input (e.g., 905*a* and/or 905*c*) (e.g., a hand input and/or an air gesture) performed by the portion of the user (e.g., 702*a* and/or 702*b*) that is directed to the user interface object (704*a*, 704*b*, 704*c*, and/or 704*d*). In some examples, in response to detecting the second input, in accordance with a determination that the portion of the user is the first hand (702*a* and/or 702*b*) of the user and the first hand of the user is enabled to be used as input, the computer system performs the operation (e.g., irrespective of a determination of whether the second hand of the user is enabled or not enabled to be used as input). In some examples, in response to detecting the second input, in accordance with a determination that the portion of the user is the first hand of the user and the first hand of the user is not enabled to be used as input, the computer system forgoes performing the operation (e.g., irrespective of a determination of whether the second hand of the user is enabled or not enabled to be used as input). In some examples, in response to detecting the second input, in accordance with a determination that the portion of the user is the second hand (702*a* and/or 702*b*) of the user and the second hand of the user is enabled to be used as input, the computer system performs the operation (e.g., irrespective of a determination of whether the first hand of the user is enabled or not enabled to be used as input). In some examples, in response to detecting the second input, in accordance with a determination that the portion of the user is the second hand of the user and the second hand of the user is not enabled to be used as input, the computer system forgoes performing the operation (e.g., irrespective of a determination of whether the first hand of the user is enabled or not enabled to be used as input). Performing the operation in accordance with a determination that the portion of the user is the first hand of the user and the first hand of the user is enabled to be used as input, not performing the operation in accordance with a determination that the portion of the user is the first hand of the user and the first hand of the user is not enabled to be used as input, performing the operation in accordance with a determination that the portion of the user is the second hand of the user and the second hand of the user is enabled to be used as input, and/or not performing the operation in accordance with a determination that the portion of the user is the second hand of the user and the second hand of the user is not enabled to be used as input allows the computer system to automatically perform the operation when the individual hand that provided the input is enabled to be used as input and allows the computer system to reduce unintentional performance of the operation, thereby performing an operation when a set of conditions has been met without requiring further user input and providing additional control options without cluttering the user interface.

In some examples, the request to enable the first hand (702*a* and/or 702*b*) of the user to be used as input occurs when a determination is made that the first hand of the user performed a particular type of input (e.g., a distinct input and/or a registered input) (e.g., an input that is a part of the first set of one or more inputs) after the first hand of the user has been inactive for more than a threshold amount of time. In some examples, the request to enable the second hand (702*a* and/or 702*b*) of the user to be used as input occurs when a determination is made that the second hand of the user performed a particular type of input after the second hand of the user has been inactive for more than the threshold amount of time (e.g., 30-1000 seconds). Enabling the first hand of the user to be used as input when a determination is made that the first hand of the user performed a particular type of input after the first hand of the user has been inactive for more than a threshold amount of time enables the computer system to enable a hand to be used as input after the hand has become active, thereby providing additional control options without cluttering the user interface and reducing the number of inputs needed to perform an operation.

In some examples, before detecting the input (e.g., 905*a* and/or 905*c*) performed by the portion of the user (e.g., 702*a* and/or 702*b*), the computer system detects a second set of one or more inputs. In some examples, in response to detecting the second set of one or more inputs (e.g., 905*a* and/or 905*c*), in accordance with a determination that the set of one or more inputs corresponds to a request to enable a respective hand (702*a* and/or 702*b*) of the user (e.g., the first hand or the second hand) to be used as input for a first application (704*a*, 704*b*, and/or 704*c*), the computer system enables the first hand (702*a* and/or 702*b*) of the user to be used as input for the first application without enabling the first hand of the user to be used as input for a second application (704*a*, 704*b*, and/or 704*c*) different from the first application. In some examples, in response to detecting the second set of one or more inputs (e.g., 905*a* and/or 905*c*), in accordance with a determination that the set of one or more inputs corresponds to a request to enable the first hand of the user to be used as input for the second application, the computer system enables the first hand of the user to be used as input for the second application without enabling the first hand of the user to be used as input for the first application different from the first application. In some examples, in response to detecting the second set of one or more inputs (e.g., 905*a* and/or 905*c*), in accordance with a determination that the set of one or more inputs corresponds to a request to disable the first hand of the user to be used as input for the first application, the computer system disables the first hand of the user to be used as input for the first application without disabling the first hand of the user to be used as input for the second application different from the first application. In some examples, in response to detecting the second set of one or more inputs (e.g., 905*a* and/or 905*c*), in accordance with a determination that the set of one or more inputs corresponds to a request to disable the first hand of the user to be used as input for the second application, the computer system disables the first hand of the user to be used as input for the second application without disabling the first hand of the user to be used as input for the first application different from the first application. In some examples, a user can enable/disable input for individual hands in a particular zone (e.g., as described above in relation to method 800). In some examples, in accordance with a determination that the set of one or more inputs corresponds to a request to enable a second hand of the user to be used as input for the first application, the computer system enables the second hand of the user to be used as input for the first application without enabling the second hand of the user to be used as input for a second application different from the first application.). In some examples, in accordance with a determination that the set of one or more inputs corresponds to a request to enable the second hand of the user to be used as input for the second application, the computer system enables the second hand of the user to be used as input for the second application without enabling the second hand of the user to be used as input for the first application different from the first application.). In some examples, in accordance with a determination that the set of one or more inputs corresponds to a request to disable the second hand of the user to be used as input for the first application, the computer system disables the second hand of the user to be used as input for the first application without disabling the second hand of the user to be used as input for the second application different from the first application.). In some examples, in accordance with a determination that the set of one or more inputs corresponds to a request to disable the second hand of the user to be used as input for the second application, the computer system disables the second hand of the user to be used as input for the second application without disabling the second hand of the user to be used as input for the first application different from the first application. Enabling and/or disabling the first hand of the user to be used as input for a respective application when prescribed conditions are met allows the computer system to automatically allow individual hands to be enabled/disabled to be used as input on a per application basis, thereby performing an operation when a set of conditions has been met without requiring further user input and providing additional control options without cluttering the user interface.

In some examples, before detecting the input (e.g., 905*a* and/or 905*c*), the computer system detects, via the one or more input devices, a first gaze input (e.g., as indicated by gaze position 906*a* and/or gaze position 906*b*) (e.g., at a location that corresponds to a representation of a hand and/or the actual hand of the user). In some examples, in response to detecting the first gaze input, in accordance with a determination that the portion of the user (e.g., 702*a* and/or 702*b*) is not enabled to be used as input while detecting the first gaze input, the computer system enables the portion of the user to be used as input. In some examples, in accordance with a determination that the portion of the user is not enabled to be used as input while detecting the first gaze input, the computer system displays an indication that the portion of the user is enabled to be used as input. In some examples, in accordance with a determination that the portion of the user is not enabled to be used as input while detecting the first gaze input, the computer system ceases to display an indication that the portion of the user is disabled to be used as input. In some examples, in accordance with a determination that the portion of the user was enabled to be used as input while detecting the first gaze input, the computer system disables the portion of the user to be used as input. In some examples, while the portion of the user is enabled to be used as input, the computer system detects a hand input and, in response to detecting the hand input, disables the portion of the user to be used as input. In some examples, in accordance with a determination that the portion of the user was enabled to be used as input while detecting the first gaze input, the computer system displays an indication that the portion of the user is disabled to be used as input. In some examples, in accordance with a determination that the portion of the user was enabled to be used as input while detecting the first gaze input, the computer system ceases to display an indication that the portion of the user is enabled to be used as input. Enabling or disabling the portion of the user to be used as input in response to detecting the first gaze input allows the computer system to automatically enable portions of the user based on gaze input, thereby providing additional control options without cluttering the user interface and performing an operation when a set of conditions has been met without requiring further user input.

In some examples, the computer system (e.g., 700) is in communication with a first display generation component (e.g., 120, 1-122*a* and/or 1-122*b*). In some examples, in response to detecting the first gaze input (e.g., as indicated by gaze position 906*a* and/or gaze position 906*b*) and before enabling or disabling the portion of the user (e.g., 702*a* and/or 702*b*) to be used as input, at a first period of time while (e.g., since initially and/or continuously) detecting the first gaze input, the computer system displays, via the first display generation component, a progress indicator (e.g., 902*c*) in a visual state that represents a first amount of progress of transitioning from the portion of the user not being enabled to be used as input or the portion of the user being enabled to be used as input. In some examples, in response to detecting the first gaze input (e.g., as indicated by gaze position 906*a* and/or gaze position 906*b*) and before enabling or disabling the portion of the user (e.g., 702*a* and/or 702*b*) to be used as input, at a second period of time (e.g., different from the first period of time) (e.g., since initially and/or continuously) while detecting the first gaze (e.g., via 6-120) input, the computer system displays, via the first display generation component, the progress indicator in a visual state that represents a second amount of progress, different from the first amount of progress, of transitioning from the portion of the user not being enabled to be used as input or the portion of the user being enabled to be used as input. In some examples, the visual state that represents the first amount of progress is a color (e.g., red, blue, and/or green) and the visual state that represents the second amount of progress is another color. In some examples, the visual state that represents the first amount of progress is a first size (e.g., width, height, and/or number of indications and/or indicator) and the visual state that represents the second amount of progress is another size. In some examples, the visual state that represents the first amount of progress is displayed with a first amount of emphasis (e.g., size, boldness, opacity, and/or movement), and the visual state that represents the second amount of progress is displayed with a second amount of emphasis. Displaying a progress indicator in a visual state that represents a first amount of progress at a second period of time while detecting the first gaze (e.g., via 6-120) input and displaying the progress indicator in a visual state that represents a second amount of progress at a second period of time while detecting the first gaze (e.g., via 6-120) input allows the computer system to provide feedback to the user concerning the amount of progress for a hand to enabled/disabled and provides a control option to the user to display a progress indicator, thereby reducing the number of inputs needed to perform an operation, providing improved feedback to the user, and providing additional control options without cluttering the user interface.

In some examples, before detecting the input (e.g., 905*a* and/or 905*c*), the computer system detects, via the one or more input devices, a second gaze input (e.g., as indicated by gaze position 906*a* and/or gaze position 906*b*). In some examples, in response to detecting the second gaze input, in accordance with a determination that the second gaze (e.g., via 6-120) input is directed to the portion of the user (e.g., 702*a* and/or 702*b*) and the portion of the user was not enabled to be used as input while detecting the second gaze input, the computer system enables the portion of the user to be used as input. In some examples, in response to detecting the second gaze input, in accordance with a determination that the second gaze input is not directed to the portion of the user and the portion of the user was not enabled to be used as input while detecting the second gaze input, the computer system forgoes enabling the portion of the user to be used as input. In some examples, in accordance with a determination that the second gaze input is directed to the portion of the user (e.g., and/or while detecting that the gaze input is at a location corresponding to and/or on the portion of the user) and the portion of the user was enabled to be used as input while detecting the second gaze input, the computer system disables the portion of the user to be used as input. In some examples, in accordance with a determination that the second gaze input is not directed to the portion of the user (e.g., and/or while detecting that the gaze input is not at a location corresponding to and/or not on the portion of the user) and the portion of the user was enabled to be used as input while detecting the second gaze input, the computer system does not disable the portion of the user to be used as input. Enabling the portion of the user to be used as input in response to detecting the second gaze input allows the computer system to provide the user with control over whether the portion of the user is enabled or disabled to be used as input by providing a gaze input, thereby reducing the number of inputs needed to perform an operation, performing an operation when a set of conditions has been met without requiring further user input, and providing additional control options without cluttering the user interface.

In some examples, before detecting the input, the computer system detects, via the one or more input devices, a third gaze input (e.g., as indicated by gaze position 906*a* and/or gaze position 906*b*). In some examples, in response to detecting the third gaze (e.g., via 6-120) input, in accordance with a determination that the second gaze input is directed to the portion of the user (e.g., 702*a* and/or 702*b*) while the portion of the user is in a first orientation (e.g., in the three-dimensional environment and/or relative to a viewpoint of the user) (e.g., palm facing toward the user and/or fingers pointed towards ceiling) and the portion of the user was not enabled to be used as input while detecting the second gaze input, the computer system enables the portion of the user to be used as input. In some examples, in response to detecting the third gaze input, in accordance with a determination that the second gaze input is directed to the portion of the user while the portion of the user is in a second orientation (e.g., in the three-dimensional environment and/or relative to a viewpoint of the user) (e.g., palm facing toward the user and/or fingers pointed towards ceiling), different from the first orientation, and the portion of the user was not enabled to be used as input while detecting the second gaze input, the computer system forgoes enabling the portion of the user to be used as input. In some examples, in accordance with a determination that the third gaze input is directed to the portion of the user while the portion of the user is in the first orientation (e.g., in the three-dimensional environment and/or relative to a viewpoint of the user) (e.g., palm facing toward the user and/or fingers pointed towards ceiling) and the portion of the user was enabled to be used as input while detecting the third gaze input, the computer system disables the portion of the user to be used as input. In some examples, in accordance with a determination that the second gaze input is directed to the portion of the user while the portion of the user is in a second orientation (e.g., in the three-dimensional environment and/or relative to a viewpoint of the user) (e.g., palm facing away from the user and/or fingers not pointed towards ceiling) different from the first orientation and the portion of the user was enabled to be used as input while detecting the third gaze input, the computer system does not disable the portion of the user to be used as input. Enabling or not enabling the portion of the user to be used as input in response to detecting the second gaze input and based on prescribed conditions being met (e.g., whether or not the portion of the user is in a respective orientation) allows the computer system to provide the user with control over whether the portion of the user is enabled or disabled to be used as input by providing a gaze input and placing the portion of the user in a particular orientation, thereby reducing the number of inputs needed to perform an operation, performing an operation when a set of conditions has been met without requiring further user input, and providing additional control options without cluttering the user interface.

In some examples, the computer system (e.g., 700) is in communication with a second display generation component (e.g., 120, 1-122*a* and/or 1-122*b*). In some examples, the computer system displays, via the third display generation component (e.g., 120, 1-122*a* and/or 1-122*b*), a first representation (e.g., 702*a* and/or 702*b*) (e.g., a cartoon style representation and/or a photo-realistic representation of the portion of the user), a representation that is displayed with a particular color (e.g., black, red, white, and/or grey) (and, in some examples, the color of the representation and/or one or more other characteristics of the representation (e.g., size, highlighting, emphasis, and/or boldness) of the representation is an indication of whether the portion of the user is enabled or disabled (e.g., not enabled), and/or outline of the portion of the user) of the portion of the user (e.g., 702*a* and/or 702*b*), including: in accordance with the determination that the portion of the user is not enabled to be used as input, the computer system displays an indication (e.g., 902*a*) that the portion of the user is not enabled within a second predetermined distance (e.g., 0.1-100 cm) from the first representation of the portion of the user (e.g., the indication that the portion of the user is not enabled is displayed adjacent to, near, and/or overlaid over the first representation and/or without another user interface object being between the first representation and the indication that the portion of the user is not enabled). In some examples, the first predetermined distance is the same as the second predetermined distance. In some examples, the first predetermined distance is different from the second predetermined distance. In some examples, in accordance with the determination that the portion of the user is enabled to be used as input, the computer system does not display the indication that the portion of the user is not enabled. In some examples, in accordance with the determination that the portion of the user is not enabled to be used as input, the computer system does not display the indication that the portion of the user is enabled. In some examples, the first predetermined distance is the same, less than, or greater than the second predetermined distance. In some examples, in accordance with the determination that the portion of the user is enabled to be used as input, the computer system displays an indication that the portion of the user is enabled within a first predetermined distance (e.g., 0.1-100 cm) from the first representation of the portion of the user (e.g., the indication that the portion of the user is enabled is displayed adjacent to, near, and/or overlaid over the first representation and/or without another user interface object being between the first representation and the indication that the portion of the user is enabled). Displaying an indication that the portion of the user is enabled within a first predetermined distance from the first representation of the portion of the user in accordance with the determination that the portion of the user is enabled to be used as input or displaying an indication that the portion of the user is not enabled within a second predetermined distance from the first representation of the portion of the user in accordance with the determination that the portion of the user is not enabled to be used as input allows the computer system to automatically display whether the portion of the user is enabled or not enabled, thereby providing improved visual feedback to the user and performing an operation when a set of conditions has been met without requiring further user input.

In some examples, the computer system (e.g., 700) is in communication with a third display generation component (e.g., 120, 1-122*a* and/or 1-122*b*). In some examples, the computer system displays, via the third display generation component, a second representation (e.g., 702*a* and/or 702*b*) (e.g., a cartoon style representation and/or a photo-realistic representation of the portion of the user), a representation that is displayed with a particular color (e.g., black, red, white, and/or grey) (and, in some examples, the color of the representation and/or one or more other characteristics of the representation (e.g., size, highlighting, emphasis, and/or boldness) of the representation is an indication of whether the portion of the user is enabled or not enabled, and/or outline of the portion of the user) of the portion of the user (e.g., 702*a* and/or 702*b*), wherein in accordance with the determination that the portion of the user is enabled to be used as input, the second representation of the portion of the user has a first visual appearance (e.g., as indicated by shading of right hand 702*b* at FIG. 9B), and wherein in accordance with the determination that the portion of the user is not enabled to be used as input, the second representation of the portion of the user has a second visual appearance (e.g., as indicated by shading of left hand 702*a* at FIG. 9D) different from the first visual appearance. In some examples, in accordance with the determination that the portion of the user is not enabled to be used as input, the second representation of the portion of the user does not have the second visual appearance. In some examples, in accordance with the determination that the portion of the user is enabled to be used as input, the second representation of the portion of the user has the second visual appearance. Displaying the second representation of the portion of the user has a first visual appearance in accordance with the determination that the portion of the user is enabled to be used as input and/or displaying the second representation of the portion of the user has a second visual appearance different from the first visual appearance in accordance with the determination that the portion of the user is not enabled to be used as input allows the computer system to automatically visually distinguish the portion of the user as enabled or not enabled, thereby reducing the number of inputs needed to perform an operation, providing improved visual feedback to the user, and performing an operation when a set of conditions has been met without requiring further user input.

In some examples, after detecting the input (e.g., 905*a* and/or 905*c*), the computer system detects a respective input. In some examples, in response to detecting the respective input, in accordance with a determination that detecting the respective input includes detecting that the portion of the user (e.g., 702*a* and/or 702*b*) performed at least the portion of the respective input while the fourth gaze input (e.g., as indicated by gaze position 906*a* and/or gaze position 906*b*) was detected and the portion of the user is not enabled to be used as input, the computer system performs the operation. In some examples, as a part of detecting the fourth gaze input, the computer system detects a movement pattern of the gaze of the user (e.g., the gaze (e.g., via 6-120) of the user moving in a particular direction and/or pattern) and/or detects a gaze (e.g., via 6-120) input at a location for a predetermined period of time (e.g., a non-zero period of time and/or 0.0-60 seconds). In some examples, in response to detecting the respective input, in accordance with a determination that detecting the respective input includes detecting that the portion of the user performed at least the portion of the respective input while the fourth gaze input was not detected and the portion of the user is not enabled to be used as input while the fourth gaze input was not detected, the computer system forgoes performing the operation. In some examples, in accordance with a determination that detecting the respective input includes detecting that the portion of the user performed at least a portion of the respective input while a fourth gaze input was detected and the portion of the user is enabled to be used as input, the computer system performs the operation. In some examples, in accordance with a determination that detecting the respective input includes detecting that the portion of the user performed at least the portion of the respective input while the fourth gaze input was not detected and the portion of the user is enabled to be used as input, the computer system performs the operation. Performing the operation in accordance with a determination that detecting the respective input includes detecting that the portion of the user performed at least the portion of the respective input while the fourth gaze input was detected and the portion of the user is not enabled to be used as input or not performing the operation in accordance with a determination that detecting the respective input includes detecting that the portion of the user performed at least the portion of the respective input while the fourth gaze input was not detected and the portion of the user is not enabled to be used as input while the fourth gaze input was not detected allows the computer system to automatically perform operations while a gaze (e.g., via 6-120) input is detected irrespective of whether the portion of the user is enabled or not, thereby providing improved feedback and providing additional control options without cluttering the user interface. Heuristic for deciding whether input should be used as input for application and performing operation based on the decision.

In some examples, the computer system detects an input (e.g., 905*a* and/or 905*c*) (e.g., an air gesture and/or a hand gesture) performed by the portion of the user (e.g., 702*a* and/or 702*b*) that corresponds to a request to interact with a respective application (704*a*, 704*b*, and/or 704*c*) (before or after detecting the input performed by the portion of the user). In some examples, in response to detecting the input performed by the portion of the user that corresponds to the request to interact with the respective application, in accordance with a determination that the respective application is a fifth application (704*a*, 704*b*, and/or 704*c*) and the portion of the user is enabled to be used as input for the fifth application, the computer system performs an operation in response to detecting the input performed by the portion of the user that corresponds to the request to interact with the respective application. In some examples, performing an operation in response to detecting the input performed by the portion of the user that corresponds to the request to interact with the respective application includes causing the fifth application to perform an operation, such as closing, selecting a link, moving, navigating to a next page, and/or selecting a text box for input. In some examples, in response to detecting the input performed by the portion of the user that corresponds to the request to interact with the respective application, in accordance with a determination that the respective application is the fifth application and the portion of the user is not enabled to be used as input for the fifth application, the computer system forgoes performing the operation in response to detecting the input performed by the portion of the user that corresponds to the request to interact with the respective application. In some examples, in accordance with a determination the portion of the user is enabled to be used as input for a fifth application and the respective application is the fifth application, the computer system performs an operation based on the input performed by the portion of the user that corresponds to the request to interact with the fifth application. In some examples, in accordance with a determination the portion of the user is enabled to be used as input for the fifth application and the respective application is not the fifth application, the computer system does not perform the operation based on the input performed by the portion of the user that corresponds to the request to interact with the fifth application. Performing or not performing an operation based on whether a portion of the user is enabled to be used as input for a respective application allows the computer system to automatically decided to perform an operation on per app basis, thereby providing improved feedback and providing additional control options without cluttering the user interface.

Note that details of the processes described above with respect to method 1000 (e.g., FIG. 10) are also applicable in an analogous manner to other methods described herein. For example, method 1200 optionally includes one or more of the characteristics of the various methods described above with reference to method 1000. For example, one or more steps of method 1000 can be used to accept a type of input and not accept a different type of input for specific applications that are either enabled or not enabled using one or more steps of method 1200. For brevity, these details are not repeated below.

FIGS. 11A-11I illustrate exemplary user interfaces for managing additional inputs in accordance with some examples. The user interfaces in these figures are used to illustrate the processes described below, including the processes in FIG. 12. FIGS. 11A-11I illustrate computer system 700 positioned relative to user 702 in environment 712, which is an XR environment, using one or more techniques described above with respect to FIGS. 7A-7G.

In some examples, FIGS. 11A-11I are provided to illustrate one or more scenarios, where user 702 performs an input directed to a virtual object (e.g., an application and/or a window corresponding to an application) and a determination is made as to whether the virtual object (and/or the virtual object corresponds to an application) is in a locked input state or an unlocked input state. When a determination is made that the virtual object is in an unlocked input state, computer system 700 performs an operation based on the detected input. However, when a determination is made that the virtual object is in a locked input state, computer system 700 does not perform an operation based on the detected input. In some examples, computer system 700 allows a user to change whether the virtual object is in the locked input state or the unlocked input state. In some examples, perform or not performing an operation based on whether computer system 700 is operating in a locked input state or unlocked input state, provides computer system 700 with mechanism for deciding whether a user intends to provide an input to computer system 700 or not.

Figure 11A:
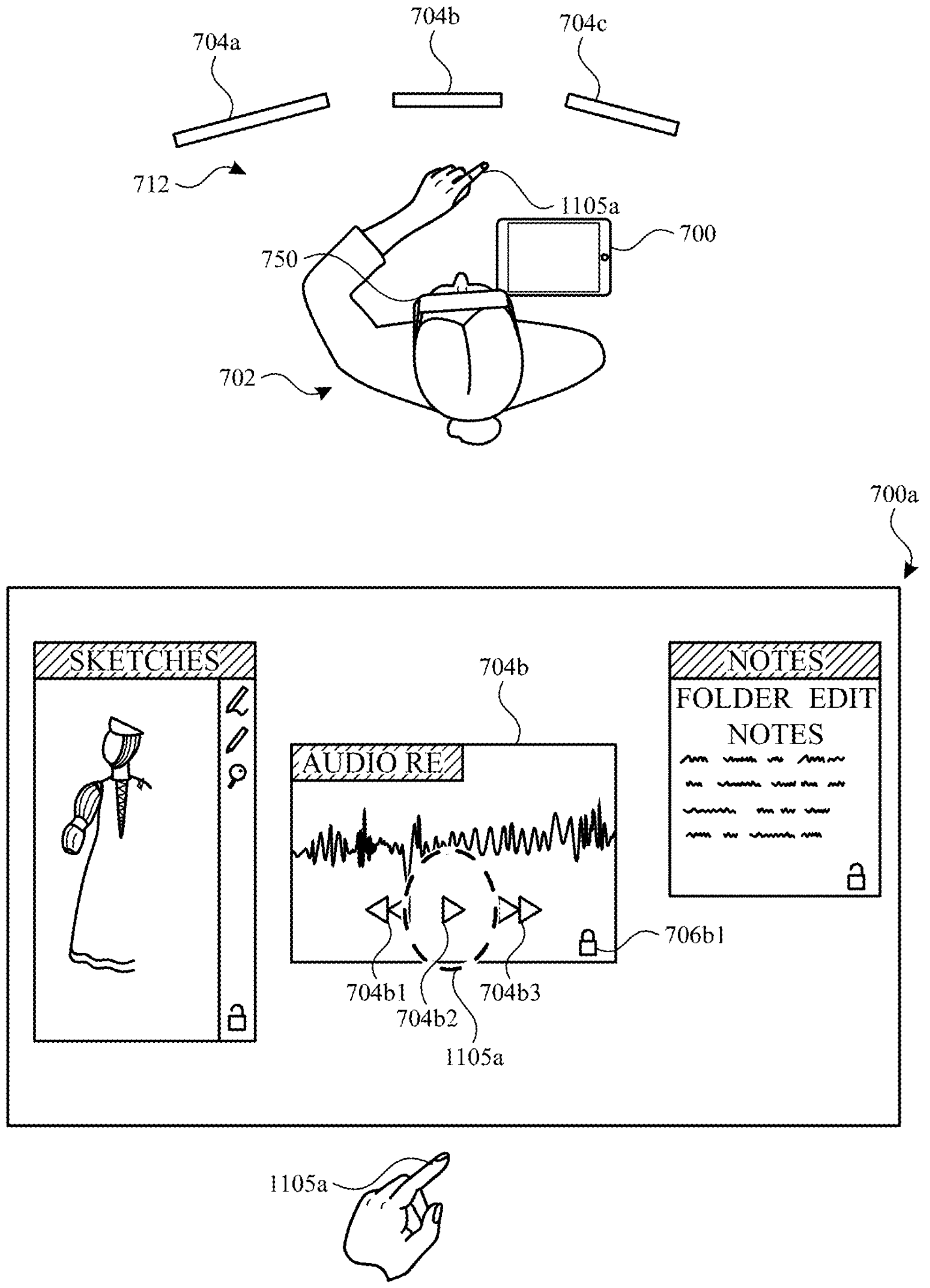
FIGS. 11A-11I illustrate exemplary user interfaces for interacting with locked objects in accordance with some embodiments.

As illustrated in FIG. 11A, in addition to computer system 700 and user 702, environment 712 includes virtual object 704*a*, virtual object 704*b*, and virtual object 704*c*, computer system 700 presents via viewpoint 700*a*. Audio application virtual object 704*b* includes rewind control 704*b*1, play control 704*b*2, fast forward control 704*b*3, and lock icon 706*b*1. Computer system 700 displays lock icon 706*b*1 with audio application virtual object 704*b* to indicate to user 702 that audio application virtual object 704*b* is in a locked input state. In some examples, in a locked input state, operations corresponding to predetermined types of inputs (e.g., air gestures, gaze input, and/or voice commands) directed to audio application virtual object 704*b* are ignored by computer system 700 (e.g., while other predetermined types of inputs are not ignored by computer system 700). At FIG. 11A, computer system 700 detects left hand input 1105*a* directed to play control 704*b*2 while computer system 700 is operating in a locked input state with respect to audio application virtual object 704*b*. In some examples, computer system 700 is operating in a locked input state with respect to one or more virtual objects while concurrently being in an unlocked input state relative to one or more other virtual objects. For example, computer system 700 can be configured to perform one or more operations in response to detecting one or more inputs directed towards some virtual objects while concurrently being configured to perform one or more operations in response to detecting one or more inputs directed to some other virtual objects.

Figure 11B:
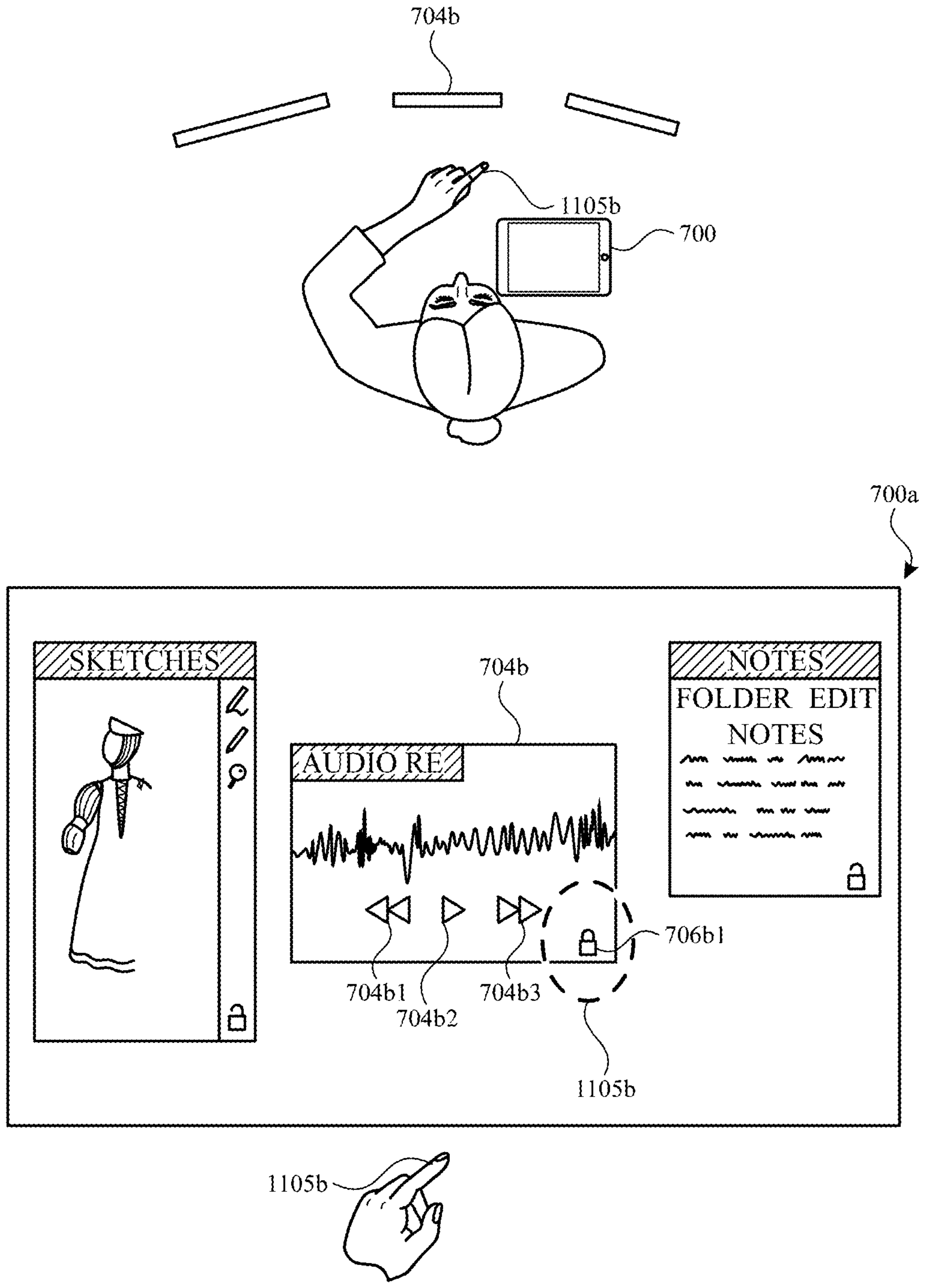

As illustrated in FIG. 11B, in response to detecting left hand input 1105*a* directed to play control 704*b*2 while computer system 700 is in a locked state with respect to audio application virtual object 704*b*, computer system 700 does not execute or perform an operation corresponding to play control 704*b*2, which is indicated by viewpoint 700*a* not updating (e.g., input on a paly button did not a play operation (as shown by the play button being still displayer) between FIGS. 11A-11B. In some examples, computer system 700 registers left hand input 1105*a* while left hand input 1105*a* is directed to play control 704*b*2, and computer system 700 is operating in a locked input state with respect to audio application virtual object 704*b*. In some examples, computer system 700 ignores left hand input 1105*a* while left hand input 1105*a* is directed to play control 704*b*2, and computer system 700 is operating in a locked input state with respect to audio application virtual object 704*b*. In some examples, computer system 700 displays a visual indicator for an operation corresponding to play control 704*b*2 that is not executed, to notify user 702 of a failed attempt. In some examples, computer system 700 displays an animation (e.g., on, of, and/or corresponding to play control 704*b*2) for an operation corresponding to play control 704*b*2 that is not executed, to notify user 702 of a failed attempt. In some examples, computer system 700 outputs a haptic signal (e.g., 1-356) and/or audio signal for an operation corresponding to play control 704*b*2 that is not executed, to notify user 702 of a failed attempt. At FIG. 11B, computer system 700 detects left hand input 1105*b* directed to lock icon 706*b*1 while computer system 700 is operating in a locked input state with respect to audio application virtual object 704*b*.

Figure 11C:
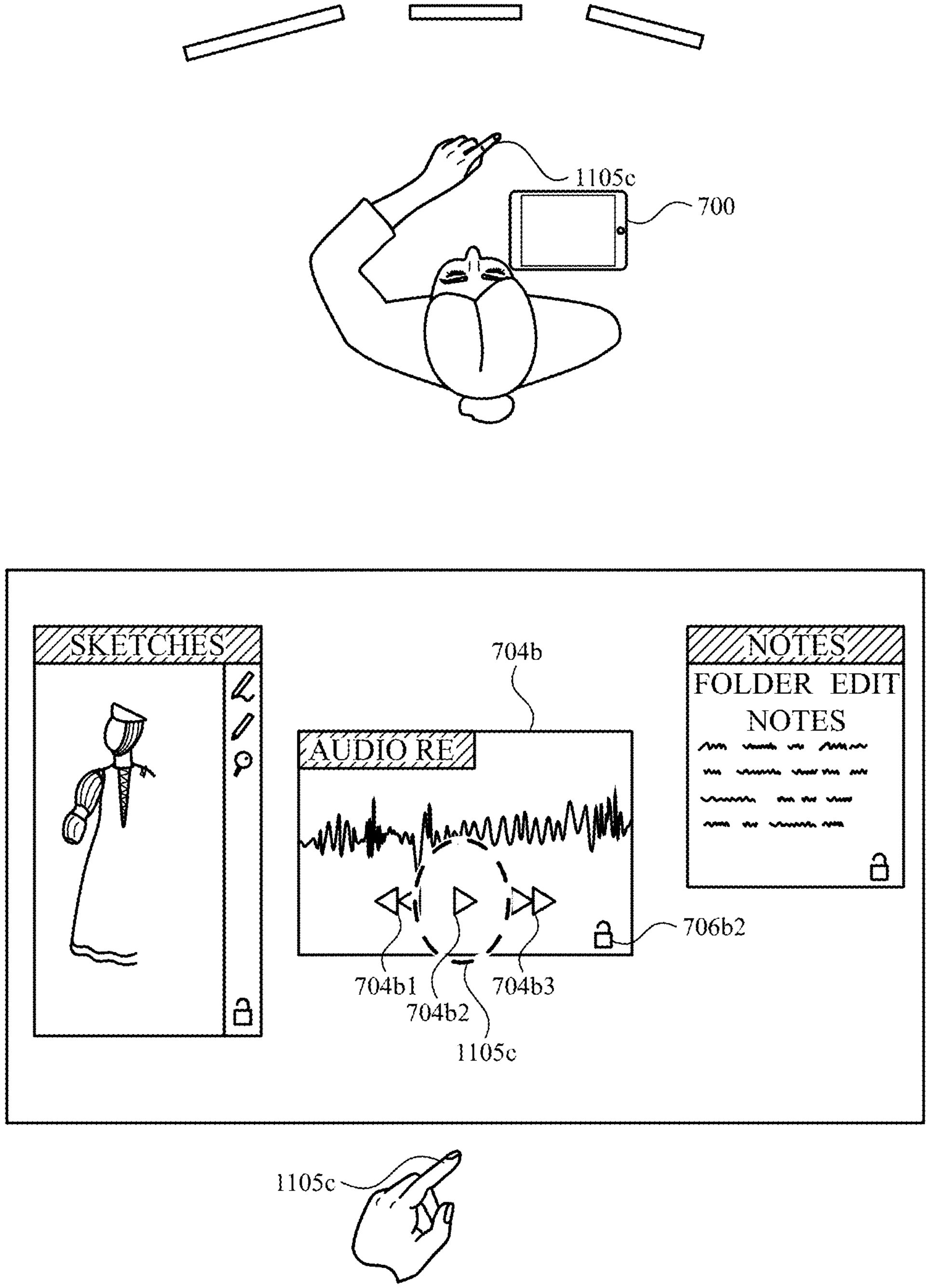

As illustrated in FIG. 11C, in response to detecting left hand input 1105*b* directed to lock icon 706*b*1 while computer system 700 is operating in a locked input state with respect to audio application virtual object 704*b*, computer system 700 displays unlocked icon 706*b*2. Unlocked icon 706*b*2 indicates that computer system 700 is operating in an unlocked input state with respect to audio application virtual object 704*b*. In some examples, instead of detecting a hand input, computer system 700 detects a gaze input directed to lock icon 706*b*1 (e.g., for longer than a threshold period of time (e.g., 0.01-60 seconds) and performs the one or more operations described below in relation to detecting left hand input 1105*b*.

Figure 11D:
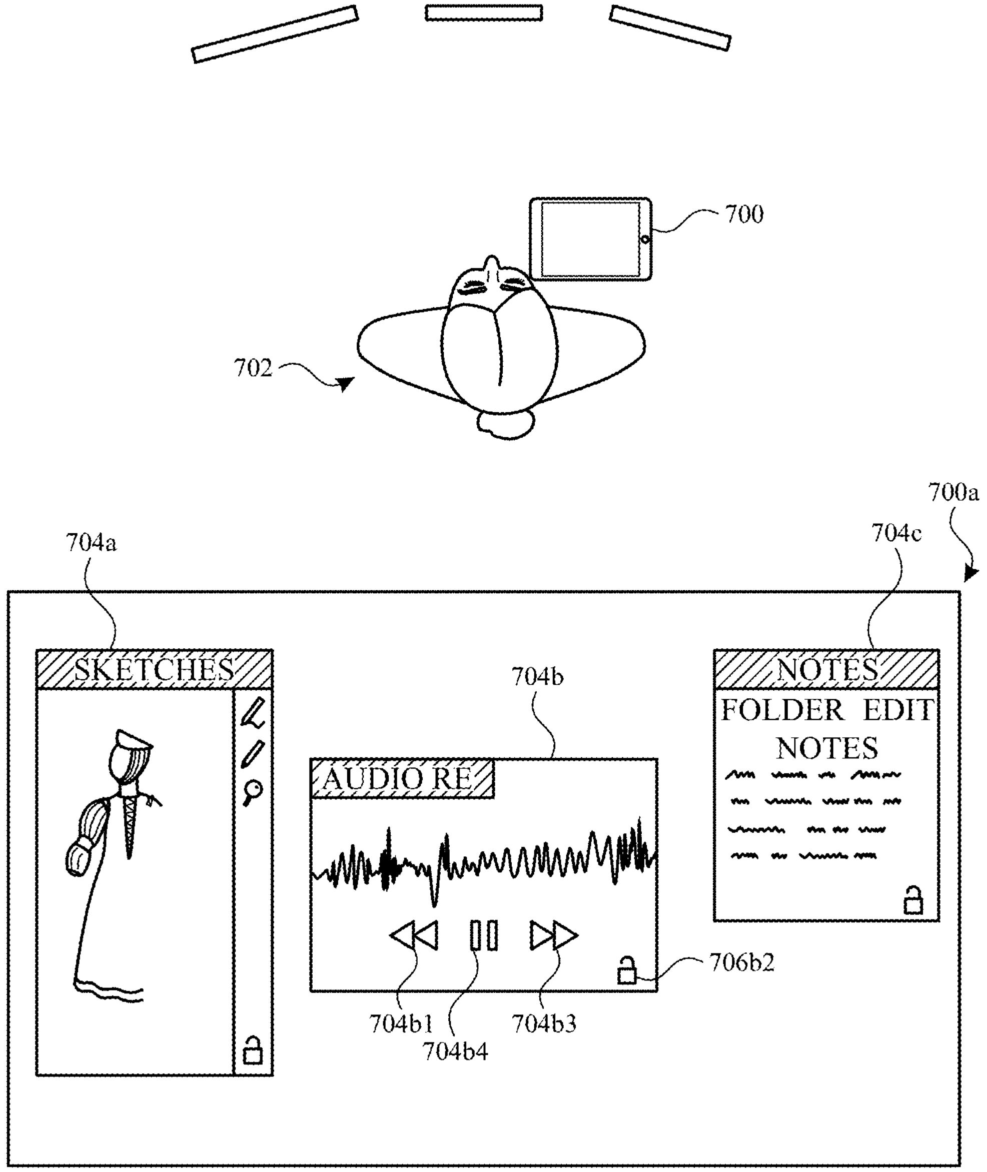

In some examples, in an unlocked input state, one or more predetermined types of inputs are executed or performed by the computer system 700 while the computer system 700 is operating in an unlocked input state with respect to audio application virtual object 704*b*. At FIG. 11C, computer system 700 detects left hand input 1105*c* directed to play control 704*b*2 while computer system 700 is operating in an unlocked input state with respect to audio application virtual object 704*b*. As illustrated in FIG. 11D, in response to detecting left hand input 1105*c* directed to play control 704*b*2 while computer system 700 is operating in an unlocked input state with respect to audio application virtual object 704*b*, computer system 700 displays pause control 704*b*4. The display of pause control 704*b*4 indicates that computer system performed an operation in response to detecting left hand input 1105*c*. Here, computer system 700 initiates a playback of media (e.g., playback of a voice file) via an application that corresponds to the audio application virtual object 704*b*. Notably, at FIG. 11D, computer system 700 performs an operation in response to detecting 1105*c* left hand input while computer system 700 is operating in an unlocked input state with respect to audio application virtual object 704*b* (e.g., unlike in FIG. 11B where computer system 700 did not perform the operation in response to detecting left hand input 1105*a* directed to play control 704*b*2 while computer system 700 was in a locked input state with respect to audio application virtual object 704*b*).

Figure 11E:
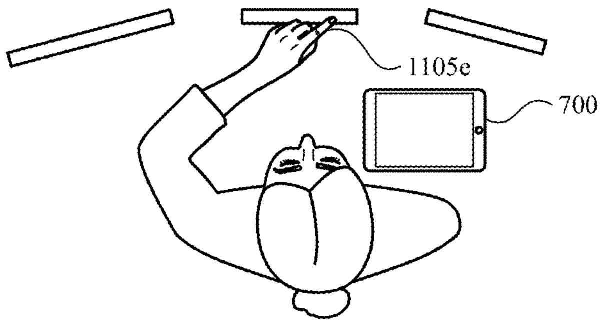
Figure 11E:
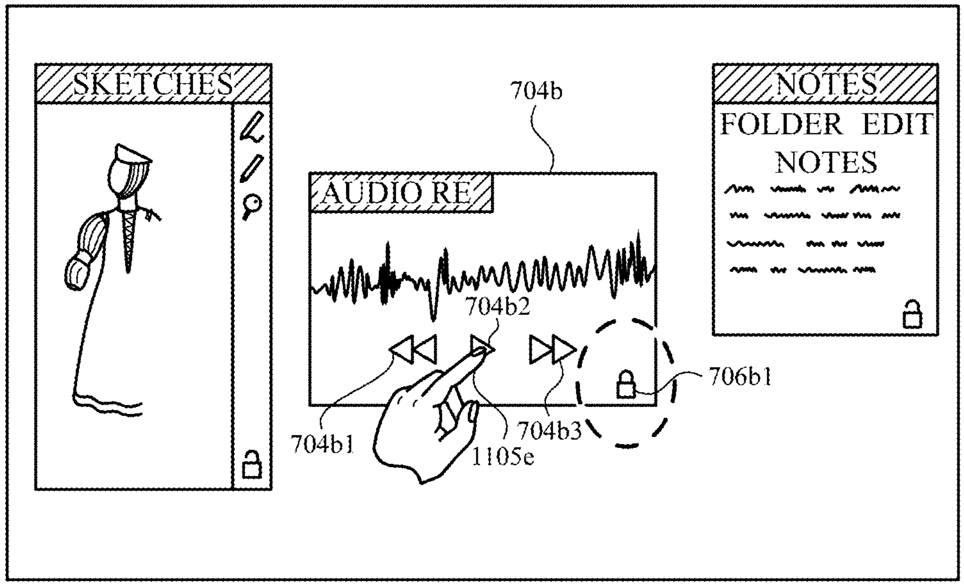
Figure 11F:
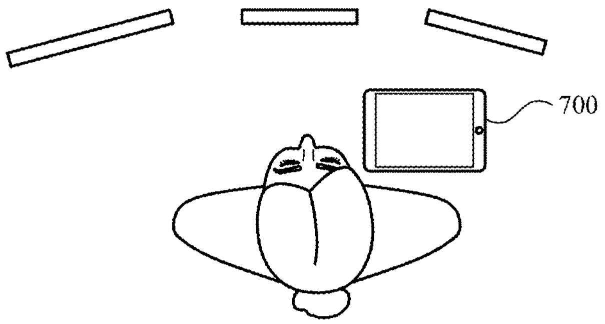
Figure 11F:
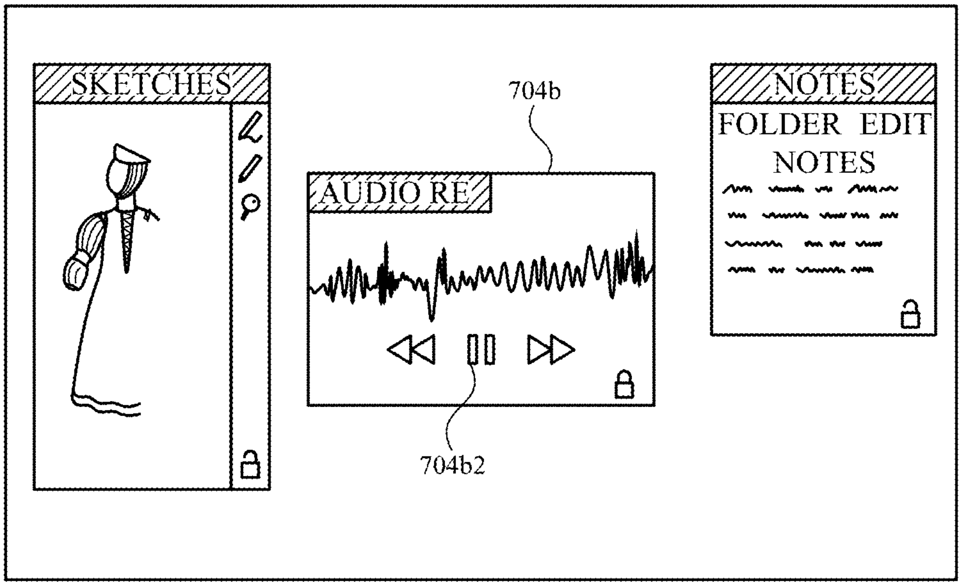

FIG. 11E illustrates computer system 700 displaying audio application virtual object 704*b* with rewind control 704*b*1, play control 704*b*2, fast forward control 704*b*3, and lock icon 706*b*1 in viewpoint 700*a*. At FIG. 11E, computer system 700 detects left hand input 1105*e* at a location of play control 704*b*2 in environment 712. Left hand input 1105*e* corresponds to a touch input (e.g., a tap input and/or a direct input) on play control 704*b*2. Notably, computer system 700 detects left hand input 1105*e* while computer system 700 is operating in a locked input state with respect to audio application virtual object 704*b*.

As illustrated in 11F, in response to detecting left hand input 1105*e* while computer system 700 is operating in a locked input state with respect to audio application virtual object 704*b*, computer system 700 displays pause control 704*b*4. Notably, at FIG. 11F, computer system 700 performs an operation in response to detecting left hand input 1105*e* while computer system 700 is operating in a locked input state with respect to audio application virtual object **704*b* because the left hand input 1105*e* corresponds to a touch input opposed to an air gesture (and/or the input corresponds to a direct input rather than an indirect input) (e.g., unlike in FIG. 11B where computer system 700 did not perform the operation in response to detecting left hand input 1105*a* while left hand input 1105*a* is directed to play control 704*b*2 and computer system 700 is operating in a locked input state with respect to audio application virtual object 704*b*). Thus, in some examples, computer system 700 performs one or more operations for a virtual object while the virtual object is in a locked state. In order words, computer system 700 requires a "high intent," "more accurate," "more confident," and/or "more direct" input while the virtual object is operating in the locked state than while the virtual object is in a locked state. In some examples, certain buttons and/or controls require a "high intent," "more accurate," "more confident," and/or "more direct" input, irrespective of whether computer system 700 is operating in a locked input state or unlocked input state with respect to a virtual object and/or application. In some examples, a "high intent" input is an input that has to be detected for longer than the duration that another input could normally be used to perform the operation, such as an air pinch gesture, where the pinch portion has to be detected for longer than the period time that the computer system 600 usually takes to register an input as being an air pinch. In some examples, a "more accurate" input is an input that computer system 700 has determined to be performed with a threshold amount of accuracy (e.g., a slow pinch versus a fast pinch). In some examples, a "more confident" is an input that computer system 700 is more confident in determining that the user is intentionally making (e.g., a longer versus a shorter gaze) and/or an input that computer system 700 can more easily capture (e.g., a non-obstructed input versus an obstructed input and/or an input that is performed at the edge of a viewport versus an input that is performed at the center of the viewpoint). In some examples, a "more direct" input is an input that is more directed to a virtual object (e.g., such as an input that corresponds to a touch input as compared to an air tap, a voice command that mentions the virtual object versus a voice command does not mention the virtual object, and/or a mouse click input versus an air tap input that does not correspond to a touch input). In some examples, computer system 700** can exclude some inputs, such as air taps and/or air flicks, as being a high intent," "more accurate," "more confident," and/or "more direct" input and/or include some inputs as being, such as touch inputs and/or gaze and dwell inputs, as being a high intent," "more accurate," "more confident," and/or "more direct" input.

Figure 11G:
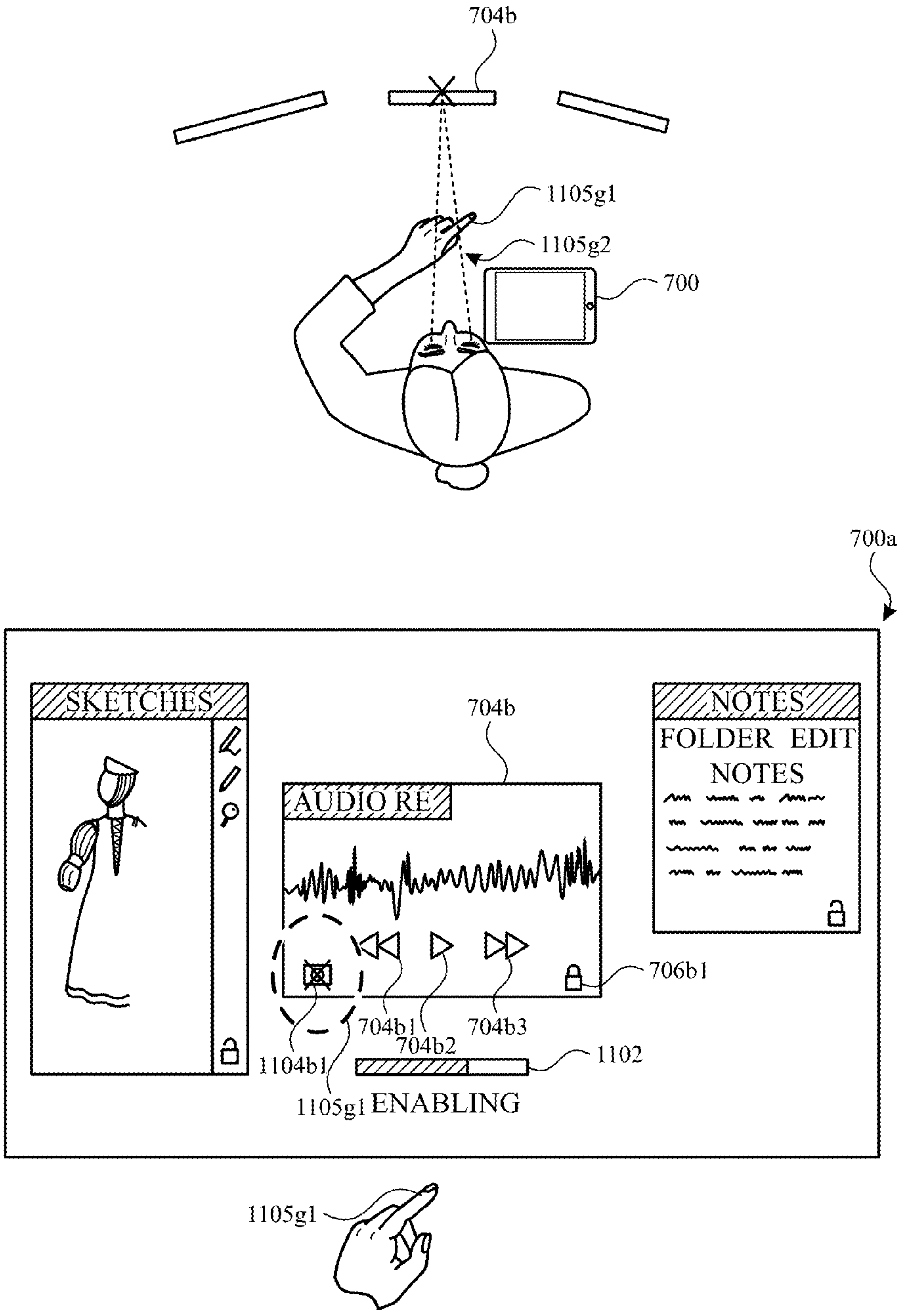

FIG. 11G illustrates computer system 700 displaying audio application virtual object **704*b* with rewind control 704*b*1, play control 704*b*2, fast forward control 704*b*3, lock icon 706*b*1, record control 1104*b*1, and progress indicator 1102 in viewpoint 700*a*. At FIG. 11G, computer system 700 detects gaze input 1105*g*2 while left hand input 1105*g*1 is being performed and the computer system 700 is operating in a locked input state relative to audio application virtual object 704*b*. At FIG. 11G, gaze input 1105*g*2 is directed to record control 1104*b*1 and a determination is made that gaze input 1105*g*2 has been directed to record control 1104*b*1 for less than the predetermined amount of time at a time when left hand input 1105*g*1 was detected. As illustrated in FIG. 11G, computer system 700 displays progress indicator 1102, which indicates how long gaze input 1105*g*2 has been directed to record control 1104*b*1** for less than the predetermined amount of time.

Figure 11H:
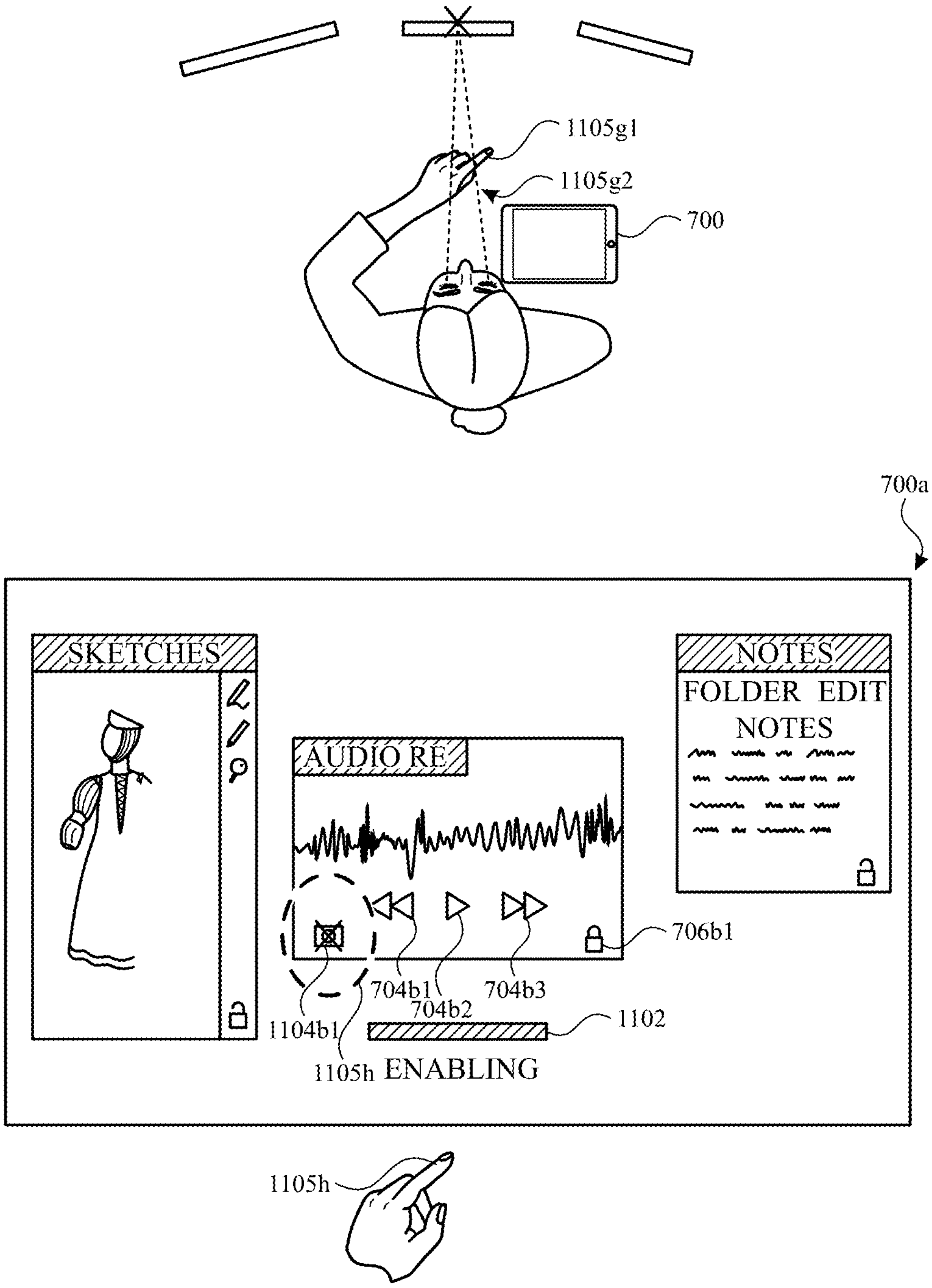

At FIG. 11G, because the determination was made that gaze input **1105*g*2 has been directed to record control 1104*b*1 for less than the predetermined amount of time before left hand input 1105*g*1 was detected, computer system 700 does not perform an operation corresponding to gaze input 1105*g*2 and/or left hand input 1104*g*1, which is indicated by viewpoint 700*a* of not being updated in FIGS. 11G-11H. At FIG. 11H, computer system 700 continues to detect gaze input 1105*g*2 directed to record control 1104*b*1 while detecting left hand input 1105*h*1 (e.g., another hand input). As illustrated in FIG. 11H, computer system 700 displays progress indicator 1102 to indicate gaze input 1105*g*2 has been directed to record control 1104*b*1** for the required threshold amount of time needed for to perform one or more operations in response to detecting a hand input.

Figure 11I:
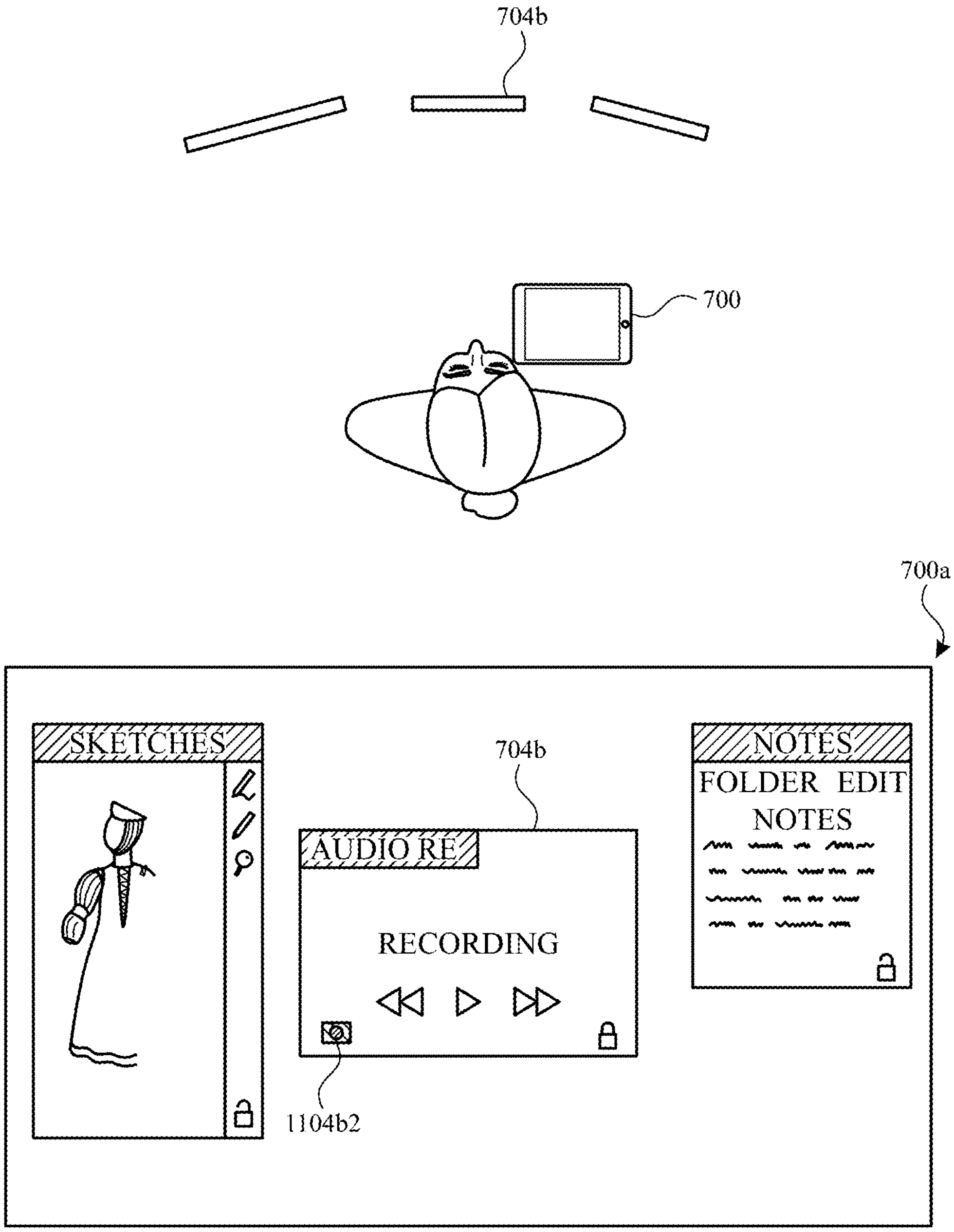

As illustrated in FIG. 11I, in response to detecting gaze input **1105*g*2 directed to record control 1104*b*1 while detecting left hand input 1105*h*1 and because the determination is made that required threshold has been met, computer system 700 performs an operation corresponding to record control 1104*b*1, which is indicated by viewpoint 700*a* of FIG. 11I. In some examples, computer system 700 transitions to operate an unlocked input state with respect to audio application virtual object 740*b* (e.g., from operating in a locked input state with respect to audio application virtual object 740*b*) when the determination was made that the required threshold (e.g., gaze threshold) had been met. In some examples, computer system 700 performs a respective operation even when the required threshold has not been met in response to detecting certain types of gestures and/or inputs, such as the "high intent," "more accurate," "more confident," and/or "more direct" inputs described above. However, in some examples, computer system 700 does not perform the operation when the required threshold has not been met for other types of gestures and/or inputs (e.g., as described in relation to FIG. 11G-11**I).

FIG. 12 is a flow diagram illustrating a method (e.g., method 1200) for interacting with locked interface objects in accordance with some examples. Some operations in method 1200 are, optionally, combined, the orders of some operations are, optionally, changed, and some operations are, optionally, omitted.

As described below, method 1200 provides an intuitive way for interacting with locked interface objects. Method 1200 reduces the cognitive burden on a user for interacting with locked interface objects, thereby creating a more efficient human-machine interface. For battery-operated computing devices, enabling a user to interact with locked interface objects faster and more efficiently conserves power and increases the time between battery charges.

In some examples, method 1200 is performed at a computer system (e.g., 700) (e.g., as described above in relation to method 800) that is in communication with one or more input devices (e.g., as described above in relation to method 800).

At 1202, the computer system detects, via the one or more input devices, a first input performed by a portion of a user that is directed to a user interface object (**704*a*, 704*b*, and/or 704*c*) in a three-dimensional environment (e.g., 712) (e.g., a virtual window, a window corresponding to an application, a window for an application that includes one or more virtual objects corresponding to an application, and/or a virtual object), wherein the first input (e.g., 1105*a*, 1105*b*, and/or 1105*c***) is an air gesture.

At 1204, in response to detecting the first input (e.g., **1105*a*, 1105*b*, and/or 1105*c*), in accordance with (at 1206) a determination that the user interface object (704*a*, 704*b*, and/or 704***c*) is operating in an unlocked state (e.g., with respect to the environment, the object can be moved in the environment, and/or the object can be removed from the environment without being configured to be in a state other than the unlocked state), the computer system performs an operation (e.g., as described above in relation to method 800) based on the first input (e.g., 1105*a*, 1105*b*, and/or 1105*c*) (e.g., performance of the input performed by the portion of the user).

At 1204, in response to detecting the first input (e.g., 1105*a*, 1105*b*, and/or 1105*c*), in accordance with (at 1208) a determination that the user interface object (704*a*, 704*b*, and/or 704*c*) is operating in a locked state (e.g., with respect to the environment, the object can be moved in the environment, and/or the object can be removed from the environment without being configured to be in a state other than the unlocked state), the computer system forgoes performing the operation. Performing an operation based on the first input in accordance with a determination that the user interface object is operating in an unlocked state and/or not performing the operation in accordance with a determination that the user interface object is operating in a locked state allows the computer system to automatically perform or not perform an operation based on the state of the user interface object and enables the computer system to avoid performing operations in response to unintentional user inputs, thereby reducing the number of inputs needed to perform an operation, and performing an operation when a set of conditions has been met without requiring further user input, and providing additional control options without cluttering the user interface.

In some examples, the computer system (e.g., 700) is in communication with a first display generation component (e.g., 120, 1-122*a* and/or 1-122*b*). In some examples, in accordance with a determination that the user interface object (704*a*, 704*b*, and/or 704*c*) is operating in the locked state (and, in some examples, before, while and/or after detecting the input directed to the user interface object in the three-dimensional environment), the computer system displays, via the first display generation component, an indication (e.g., 706*b*1) that the user interface object is operating in the locked state. In some examples, in accordance with a determination that the user interface object is operating in the unlocked state, the computer system displays an indication that the user interface object is operating in the unlocked state, where the indication that the user interface object is operating in the unlocked state is different from the indication that the user interface object is operating in the locked state. In some examples, in accordance with a determination that the user interface object is operating in the locked state, the computer system does not display the indication that the user interface object is operating in the unlocked state. In some examples, in accordance with a determination that the user interface object is operating in the unlocked state, the computer system does not display the indication that the user interface object is operating in the locked state. Displaying an indication that the user interface object is operating in the locked state in accordance with a determination that the user interface object is operating in the locked state allows the computer system to automatically display lock state information to a user when certain conditions are met, thereby providing improved feedback to the user and performing an operation when a set of conditions has been met without requiring further user input.

In some examples, while displaying the indication (e.g., 706*b*1) that the user interface object (704*a*, 704*b*, and/or 704*c*) is operating in the locked state, the computer system detects an input (e.g., 1105*a*, 1105*b*, and/or 1105*c*) directed to the indication that the user interface object is operating in the locked state. In some examples, in response to detecting the input directed to the indication (e.g., 706*b*1) that the user interface object is operating in the locked state, the computer system configures the user interface object to operate in the unlocked state. In some examples, in response to detecting the input directed to the indication that the user interface object is operating in the locked state, the computer system ceases displaying the indication that the user interface object is operating in the locked state. In some examples, in response to detecting the input directed to the indication that the user interface object is operating in the locked state, the computer system displays the indication that the user interface object is operating in the unlocked state. Configuring the user interface object to operate in the unlocked state in response to detecting the input directed to the indication that the user interface object is operating in the locked state allows the computer system to provide a control option for the user to cause the computer system to unlock the user interface, thereby providing additional control options without cluttering the user interface.

In some examples, while displaying the indication (e.g., 706*b*1) that the user interface object (704*a*, 704*b*, and/or 704*c*) is operating in the locked state, the computer system detects a first gaze input (e.g., 1105 *g*2) directed to the user interface object (and/or, in some examples, directed to the indication that the user interface object is operating in the locked state). In some examples, in response to detecting the first gaze input directed to the user interface object, in accordance with a determination that the first gaze input is directed to the indication (e.g., 706*b*1) that the user interface object for more than a first threshold amount of time, the computer system configures the user interface object to operate in the unlocked state. In some examples, in response to detecting the input directed to the user interface object and in accordance with a determination that the first gaze input is directed to the user interface object for more than the first threshold amount of time, the computer system ceases displaying the indication that the user interface object is operating in the locked state. In some examples, in response to detecting the input directed to the user interface object is operating and in accordance with a determination that the first gaze input is directed to the user interface object for more than the first threshold amount of time, the computer system displays the indication that the user interface object is operating in the unlocked state. In some examples, in response to detecting the input directed to the user interface object and in accordance with a determination that the first gaze input is directed to the user interface object for less than the first threshold amount of time, the computer system does not configure the user interface object to operate in the unlocked state. In some examples, in response to detecting the input directed to the user interface object and in accordance with a determination that the first gaze input is directed to the user interface object for less than the first threshold amount of time, the computer system continues to display the indication that the user interface object is operating in the locked state. Configuring the user interface object to operate in the unlocked state in accordance with a determination that the first gaze input is directed to the indication that the user interface object for more than a first threshold amount of time allows the computer system to provide the user with a control option to unlock the user interface object with a gaze (e.g., via 6-120) input, thereby providing additional control options without cluttering the user interface and performing an operation when a set of conditions has been met without requiring further user input.

In some examples, while displaying the indication (e.g., **706*b*1) that the user interface object (704*a*, 704*b*, and/or 704*c*) is operating in the locked state, the computer system detects a second input (e.g., 1105*a*, 1105*b*, and/or 1105*c*). In some examples, in response to detecting the second input, in accordance with a determination that the second input is detected while a second gaze (e.g., via 6-120) input (e.g., 1105*g*2) is directed to the user interface object (and, in some examples, directed to the indication that the user interface object is operating in the locked state), the computer system configures the user interface object to operate in the unlocked state. In some examples, in response to detecting the second input and in accordance with a determination that the second input is detected while a second gaze input is directed to the user interface object, the computer system ceases displaying the indication that the user interface object is operating in the locked state. In some examples, in response to detecting the second input and in accordance with a determination that the second input is detected while a second gaze input is directed to the user interface object, the computer system displays the indication that the user interface object is operating in the unlocked state. In some examples, in response to detecting the second input and in accordance with a determination that the second input is detected while the second gaze input is not directed to the user interface object, the computer system does not configure the user interface object to operate in the unlocked state. In some examples, in response to detecting the second input and in accordance with a determination that the second input is detected while the second gaze input is not directed to the user interface object, the computer system continues to display the indication that the user interface object is operating in the locked state. Configuring the user interface object to operate in the unlocked state in accordance with a determination that the second input is detected while a second gaze (e.g., via 6-120**) input is directed to the user interface object allows the computer system to provide the user with a control option to unlock the user interface object with a gaze input and an additional input, thereby providing additional control options without cluttering the user interface and performing an operation when a set of conditions has been met without requiring further user input.

In some examples, the computer system (e.g., 700) is in communication with a second display generation component. In some examples, before (and/or, in some examples, while and/or after) detecting, via the one or more input devices, the first input (e.g., **1105*a*, 1105*b*, and/or 1105*c*), the computer system concurrently displays, via the second display generation component (e.g., 120, 1-122*a* and/or 1-122*b*), a first user interface object (704*a*, 704*b*, and/or 704*c*) (and/or a first one or more user interface objects) with an indication (e.g., 706*b*1) that the first user interface object is operating in the locked state and a second user interface object (and/or a second one or more user interface objects) with an indication (e.g., 706*b*2) that the second user interface object (704*a*, 704*b*, and/or 704*c***) is operating in the unlocked state. Concurrently displaying a first user interface object with an indication that the first user interface object is operating in the locked state and a second user interface object with an indication that the second user interface object is operating in the unlocked state, thereby providing additional control options without cluttering the user interface with additional displayed controls, reducing the number of inputs needed to perform an operation and providing improved visual feedback to the user.

In some examples, after forgoing performing the operation in accordance with a determination that the user interface object (**704*a*, 704*b*, and/or 704*c*) is operating in the locked state (e.g., with respect to the environment, the object can be moved in the environment, and/or the object can be removed from the environment without being configured to be in a state other than the unlocked state) and in response to detecting the first input (e.g., 1105*a*, 1105*b*, and/or 1105*c*), the computer system detects a request to configure the user interface object (704*a*, 704*b*, and/or 704*c*) to operate in the unlocked state. In some examples, in response to detecting the request to configure the user interface object (704*a*, 704*b*, and/or 704*c*) to operate in the unlocked state, the computer system configures the user interface object to operate in the unlocked state (and de-configuring the user interface object to operate in the unlocked state). In some examples, while the user interface object (704*a*, 704*b*, and/or 704*c*) is configured to operate in the locked state, the computer system detects, via the one or more input devices, a third input performed by the portion of the user that is directed to the user interface object in the three-dimensional environment (e.g., 712), wherein the third input is the air gesture. In some examples, in response to detecting the third input directed to the user interface object (704*a*, 704*b*, and/or 704*c***), the computer system performs the operation (e.g., based on the second input). Performing the operation in response to detecting the third input directed to the user interface object after the user interface object is configured to operate in the unlocked state in response to detecting the request to configure the user interface object to operate in the unlocked stat allows the computer system to provide user with controls options to unlock the user interface object, such that a subsequent input directed to the user interface object will cause the computer system to perform an operation, thereby providing additional control options without cluttering the user interface with additional displayed controls.

In some examples, the computer system detects, via the one or more input devices, a fourth input (e.g., **1105*a*, 1105*b*, and/or 1105*c*) (e.g., performed by the portion of the user that is directed to the user interface object in the three-dimensional environment), wherein the fourth input is the air gesture, and wherein the fourth input is different from the first input. In some examples, the fourth input is a more distinct, complex (e.g., takes longer to perform and/or requires more movements and/or poses), and/or longer input than the first input. In some examples, in response to detecting the fourth input, in accordance with a determination that the user interface object (704*a*, 704*b*, and/or 704*c***) is operating in the locked state (e.g., with respect to the environment, the object can be moved in the environment, and/or the object can be removed from the environment without being configured to be in a state other than the unlocked state), the computer system performs the operation based on the fourth input. In some examples, in accordance with a determination that the user interface object is operating in an unlocked state, the computer system performs the operation (e.g., based on the third input). In some examples, in response to detecting the fourth input and in accordance with a determination that the user interface object is operating in the unlocked state, the computer system performs the operation based on the fourth input. Performing the operation based on the fourth input in accordance with a determination that the user interface object is operating in the locked state and in response to detecting a fourth input that is an air gesture allows the computer system to perform operations as directed when particular inputs are detected despite being in the locked state, thereby reducing the number of inputs needed to perform an operation, performing an operation when a set of conditions has been met without requiring further user input, and providing additional control options without cluttering the user interface with additional displayed controls.

In some examples, the fourth input (e.g., 1105*a*, 1105*b*, and/or 1105*c*) is performed by the portion of the user for a longer period of time than the first input is performed by the portion of the user. In some examples, the fourth input is a longer pinch gesture than the first input. In some examples, the fourth input is a long-press, and the first input is a tap. In some examples, an input for a same period of time as the first input does not cause the operation to be performed when the user interface object is operating in the locked state. Performing the operation based on the fourth input in accordance with a determination that the user interface object is operating in the locked state and in response to detecting a fourth input that is performed by the portion of the user for a longer period of time than the first input is performed by the portion of the user allows the computer system to perform operations as directed when particular inputs are detected despite being in the locked state, thereby reducing the number of inputs needed to perform an operation, performing an operation when a set of conditions has been met without requiring further user input, and providing additional control options without cluttering the user interface with additional displayed controls.

In some examples, the fourth input (e.g., 1105*a*, 1105*b*, and/or 1105*c*) includes a first portion and a second portion. In some examples, the first portion of the fourth input includes a third gaze (e.g., via 6-120) input (e.g., 1105*g*2) that is detected for longer than a second threshold period of time (e.g., longer than 1-30 seconds). In some examples, the third gaze input is a dwell gaze input. In some examples, while detecting the third gaze input, the computer system displays an indication that the third gaze input is being detected and/or a progress indicator concerning how long the third gaze input has been detected relative to the second threshold period of time. In some examples, the second portion of the fourth input includes the air gesture. In some examples, the first portion of the fourth input occurs before the second portion of the fourth input (e.g., as described above in FIG. 11G). Performing the operation based on the fourth input in accordance with a determination that the user interface object is operating in the locked state and in response to detecting a fourth input that has a first portion (e.g., that includes a gaze that is detected for longer than a threshold period of time) of the fourth input that occurs before a second portion (e.g., air gesture) of the fourth input allows the computer system to perform operations as directed when particular sequence of inputs are detected despite being in the locked state, thereby reducing the number of inputs needed to perform an operation, performing an operation when a set of conditions has been met without requiring further user input, and providing additional control options without cluttering the user interface with additional displayed controls.

In some examples, the fourth input (e.g., 1105*a*, 1105*b*, and/or 1105*c*) is detected in a predefined region of the three-dimensional environment (e.g., 712). In some examples, the first input is not detected in the predefined region of the three-dimensional environment. Performing the operation based on the fourth input in accordance with a determination that the user interface object is operating in the locked state and in response to detecting a fourth input that is detected in a predefined region of the three-dimensional environment allows the computer system to perform operations as directed when particular inputs are detected despite being in the locked state, thereby reducing the number of inputs needed to perform an operation, performing an operation when a set of conditions has been met without requiring further user input, and providing additional control options without cluttering the user interface with additional displayed controls.

In some examples, the computer system detects, via the one or more input devices, an input (e.g., 1105*a*, 1105*b*, and/or 1105*c*) corresponding to a touch input at a location corresponding to the user interface object (704*a*, 704*b*, and/or 704*c*), different from the first input. In some examples, in response to detecting the input corresponding to the touch input at the location corresponding to the user interface object (704*a*, 704*b*, and/or 704*c*) and in accordance with a determination that the user interface object is operating in the locked state, the computer system performs a respective operation based on the input corresponding to the touch input. In some examples, in response to detecting the input corresponding to the touch input at the location corresponding to the user interface object and in accordance with a determination that the user interface object is operating in the locked state, the computer system performs the respective operation based on the input corresponding to the touch input. Performing a respective operation based on the input corresponding to the touch input in response to detecting the input corresponding to the touch input at the location corresponding to the user interface object and in accordance with a determination that the user interface object is operating in the locked state, allows the computer system to perform operations as directed when particular inputs are received despite being in the locked state, thereby providing additional control options without cluttering the user interface with additional displayed controls and performing an operation when a set of conditions has been met without requiring further user input.

Note that details of the processes described above with respect to method 1200 (e.g., FIG. 12) are also applicable in an analogous manner to other methods described herein. For example, method 800 optionally includes one or more of the characteristics of the various methods described above with reference to method 1200. For example, one or more steps of method 800 can be used to accept an input at a location, but when the input is directed to a locked application does not accept the input using one or more steps of method 1200. For brevity, these details are not repeated below.

FIG. 13 is a flow diagram illustrating a method (e.g., method 1300) for interacting with interface objects in accordance with some examples. Some operations in method 1300 are, optionally, combined, the orders of some operations are, optionally, changed, and some operations are, optionally, omitted.

As described below, method 1300 provides an intuitive way for interacting with interface objects. Method 1300 reduces the cognitive burden on a user for interacting with interface objects, thereby creating a more efficient human-machine interface. For battery-operated computing devices, enabling a user to manage additional inputs faster and more efficiently conserves power and increases the time between battery charges.

In some examples, method 1300 is performed at a computer system (e.g., 700) (e.g., as described above in relation to method 800) that is in communication with one or more input devices (e.g., as described above in relation to method 800).

At 1302, while detecting that attention of the user (e.g., 702) is directed to a user interface element (e.g., 704*a*, 704*b*, and/or 704*c*) (e.g., a virtual object, a virtual window, an object corresponding to an application, and/or a window corresponding to an application) (e.g., as described above in relation to method 800), the computer system detects, via the one or more input devices, an air gesture (e.g., 1105*a*, 1105*b*, 1105*c*, and/or 1105*g*1). In some examples, detecting the attention of the user includes detecting the gaze (e.g., via 6-120) of the user in a particular direction and/or at a particular location. In some examples, detecting the attention of the user includes detecting the head of the user in a particular direction and/or at a particular location. In some examples, detecting the attention of the user includes detecting that a body part of the user is in a particular direction and/or at a particular location. In some examples, detecting the attention of the user includes detecting that the user is interacting with a particular virtual object, user interface element, application window, and/or portion of an environment (e.g., virtual environment and/or physical environment).

At 1304, in response to detecting the air gesture (e.g., 1105*a*, 1105*b*, 1105*c*, and/or 1105*g*1) while detecting that the attention of the user (e.g., 702) (e.g., as described above in relation to method 1300) is directed to the user interface element (e.g., 704*a*, 704*b*, and/or 704*c*), in accordance with (at 1306) a determination that the user interface element (e.g., 704*a*, 704*b*, and/or 704*c*) is a first type of user interface element (e.g., a user interface element associated with a first level of security, a first level of importance, a first level of impact corresponding to the operation that is performed in response to detecting an input, a first priority level, and/or a first relevance level) and the air gesture (e.g., 1105*a*, 1105*b*, 1105*c*, and/or 1105*g*1) satisfies a first set of one or more criteria, the computer system performs an operation (e.g., as described above in relation to method 800) corresponding to the user interface element.

At 1304, in response to detecting the air gesture (e.g., 1105*a*, 1105*b*, 1105*c*, and/or 1105*g*1) while detecting that the attention of the user (e.g., 702) (e.g., as described above in relation to method 1300) is directed to the user interface element (e.g., 704*a*, 704*b*, and/or 704*c*), in accordance with (at 1308) a determination that the user interface element (e.g., 704*a*, 704*b*, and/or 704*c*) is the first type of user interface element and the air gesture (e.g., 1105*a*, 1105*b*, 1105*c*, and/or 1105*g*1) does not satisfy the first set of one or more criteria, the computer system forgoes performing the operation corresponding to the user interface element.

At 1304, in response to detecting the air gesture (e.g., 1105*a*, 1105*b*, 1105*c*, and/or 1105*g*1) while detecting that the attention of the user (e.g., 702) (e.g., as described above in relation to method 1300) is directed to the user interface element (e.g., 704*a*, 704*b*, and/or 704*c*), in accordance with (at 1310) a determination that the user interface element (e.g., 704*a*, 704*b*, and/or 704*c*) is a second type of user interface element (e.g., a user interface element associated with a second level of security that is greater than the first security level, a second level of important that is greater than the first level of importance, a second level of impact corresponding to the operation that is performed in response to detecting an input that is greater than the first level of impact, a second priority level that is greater than the first priority level, and/or a second relevance level that is greater than the first priority level) (e.g., a send virtual object, a delete virtual object, a camera shutter virtual object, and/or a virtual object that turns on/off virtual objects) and the air gesture (e.g., 1105*a*, 1105*b*, 1105*c*, and/or 1105*g*1) satisfies the first set of one or more criteria without satisfying a second set of one or more criteria, the computer system forgoes performing the operation corresponding to the user interface element.

At 1304, in response to detecting the air gesture (e.g., 1105*a*, 1105*b*, 1105*c*, and/or 1105*g*1) while detecting that the attention of the user (e.g., 702) (e.g., as described above in relation to method 1300) is directed to the user interface element (e.g., 704*a*, 704*b*, and/or 704*c*), in accordance with (at 1312) a determination that the user interface element (e.g., 704*a*, 704*b*, and/or 704*c*) is the second type of user interface element and the air gesture (e.g., 1105*a*, 1105*b*, 1105*c*, and/or 1105*g*1) satisfies the second set of one or more criteria (and, in some examples, irrespective of whether the air input satisfies the first set of one or more criteria), the computer system performs the operation corresponding to the user interface element. In some examples, the first set of one or more criteria and the second set of one or more criteria are different. In some examples, the first set of one or more criteria includes one or more criteria that is included in the first set of one or more criteria and/or vice-versa. Performing an operation corresponding to a user interface element and/or forgoing performing the operation corresponding to the user interface element based on a set of prescribed conditions being met enables to the computer system to require different types of air gesture for different types of user interface elements, thereby performing an operation when a set of conditions has been met without requiring further user input.

In some examples, the second set of one or more criteria includes a criterion that is satisfied when a first gaze (e.g., via 6-120) input (e.g., 1105*g*2) directed to the user interface element (e.g., 704*a*, 704*b*, and/or 704*c*) is detected before detecting at least a portion of the attention of the user (e.g., 702) directed to the user interface element. In some examples, the first set of one or more criteria does not include a criterion that is satisfied when the first gaze (e.g., via 6-120) input directed to the user interface element is detected before detecting at least a portion of the attention of the user directed to the user interface element. In some examples, the second set of one or more criteria is not satisfied when a determination is made that the first gaze input directed to the user interface element has not been detected (e.g., for a threshold amount of time) before detecting at least a portion of the attention of the user directed to the user interface element. In some examples, the first gaze input is a portion of the attention of the user that is detected while detecting the air gesture. In some examples, the first gaze input is not the portion of the attention of the user that is detected while detecting the air gesture. In some examples, the first gaze input is an initial portion of the attention of the user that is detected while detecting the air gesture. Performing an operation corresponding to a user interface element and/or forgoing performing the operation corresponding to the user interface element based on a set of prescribed conditions (e.g., where an additional gaze is required in some instances) being met enables to the computer system to require different types of air gesture for different types of user interface elements, thereby performing an operation when a set of conditions has been met without requiring further user input.

In some examples, the first gaze input (e.g., 1105*g*2) is a gaze input that is directed to the user interface element (e.g., 704*a*, 704*b*, and/or 704*c*) for longer than a threshold amount of time (e.g., 1-1000 seconds). Performing an operation corresponding to a user interface element and/or forgoing performing the operation corresponding to the user interface element based on a set of prescribed conditions (e.g., where an additional gaze is required to be detected for longer than a threshold amount of time in some instances) being met enables to the computer system to require different types of air gesture for different types of user interface elements, thereby performing an operation when a set of conditions has been met without requiring further user input.

In some examples, before detecting at least the portion of the attention of the user (e.g., 702) directed to the user interface element (e.g., 704*a*, 704*b*, and/or 704*c*) (and, in some examples, before detecting the air gesture), the computer system detects the first gaze input (e.g., 1105*g*2) directed to the user interface element. In some examples, in response to detecting the first gaze input, at a first period of time while detecting the first gaze input, the computer system displays a first progress indicator (e.g., 1102) in a visual state that represents a first amount of progress (e.g., as described above in relation to method 1200) at least one criterion of the second set of one or more criteria being satisfied (e.g., a gaze and pinch gesture being enabled, the air gesture being enabled and/or being able to satisfy the set one or more criteria when the air gesture is detected). In some examples, in response to detecting the first gaze input, at a second period of time (e.g., different from the first period of time) while detecting the first gaze input, the computer system displays the first progress indicator in a visual state that represents a second amount of progress of at least one criterion of the second set of one or more criteria being satisfied (e.g., as described above in relation to method 1200) different from the first amount of progress of the second set of one or more criteria being satisfied. In some examples, the second period of time occurs after the first period of time. Displaying a first progress indicator in a visual state that represents a first amount of progress at a first period of time while detecting the first gaze input and displaying the first progress indicator in a visual state that represents a second amount of progress at a second period of time while detecting the first gaze input enables the computer system to display an indication of an amount of time remaining for the user to provide an gaze input, thereby providing improved visual feedback to the user and reducing the number of inputs needed to perform an operation.

In some examples, before detecting at least the portion of the attention of the user (e.g., 702) directed to the user interface element (e.g., 704*a*, 704*b*, and/or 704*c*) (and, in some examples, before detecting the air gesture), the computer system detects the first gaze input. In some examples, in response to detecting the first gaze input (e.g., 1105*g*2) directed to the user interface element, in accordance with a determination that the first gaze input has been directed to the user interface element for a second threshold amount of time, the computer system displays an indication (e.g., 1102) that a respective air gesture (e.g., 1105*a*, 1105*b*, 1105*c*, and/or 1105*g*1) will cause the computer system (e.g., 700) to perform an operation while the attention of the user (e.g., 702) is directed to the user interface element (e.g., that was not previously displayed before detecting the first gaze input directed to the user interface element). In some examples, the user interface element is displayed in a first state before detecting that attention of the user is directed to the user interface element. In some examples, in response to detecting the first gaze input directed to the user interface element and in accordance with a determination that the first gaze input has been directed to the user interface element for a second threshold amount of time, the computer system displays the user interface element in a second state different from the first state. Displaying an indication that a respective air gesture will cause the computer system to perform an operation while the attention of the user is directed to the user interface element based on the first gaze input being directed to the user interface element for a second threshold amount of time enables the computer system to automatically inform the user that the user interface element is active, thereby providing improved visual feedback to the user, reducing the number of inputs needed to perform an operation, and performing an operation when a set of conditions has been met without requiring further user input.

In some examples, the second set of one or more criteria includes a criterion that is satisfied when (and, in some examples, only when) a determination is made that the air gesture (e.g., 1105*a*, 1105*b*, 1105*c*, and/or 1105*g*1) is a first type of air gesture. In some examples, the first set of one or more criteria does not include a criterion that is satisfied when (and, in some examples, only when) the determination is made that the air gesture is the first type of air gesture (e.g., as discussed above in FIG. 11G). In some examples, the first type of air gesture is a more intentional air gesture than another type of air gesture. In some examples, the first set of one or more criteria includes a criterion that is satisfied when a determination is made that the air gesture is the other type of air gesture. In some examples, the second set of one or more criteria does not include a criterion that is satisfied when a determination is made that the air gesture is the other type of air gesture. Performing an operation corresponding to a user interface element and/or forgoing performing the operation corresponding to the user interface element based on a set of prescribed conditions (e.g., where a different type of gesture is required to be performed in some instances) being met enables to the computer system to require different types of air gesture for different types of user interface elements, thereby performing an operation when a set of conditions has been met without requiring further user input.

In some examples, the first type of air gesture (e.g., 1105*a*, 1105*b*, 1105*c*, and/or 1105*g*1) includes (and/or is) an air pinch (e.g., a first portion of a user (e.g., a first finger) approaches and/or touches a second portion of the user (e.g., a second finger different from the first finger)). Performing an operation corresponding to a user interface element and/or forgoing performing the operation corresponding to the user interface element based on a set of prescribed conditions (e.g., where an air pinch is required to be performed in some instances) being met enables to the computer system to require different types of air gesture for different types of user interface elements, thereby performing an operation when a set of conditions has been met without requiring further user input.

In some examples, the first type of air gesture (e.g., 1105*a*, 1105*b*, 1105*c*, and/or 1105*g*1) is an air pinch gesture that includes a pinch portion that is detected for more than a third threshold amount of time (e.g., longer than 3-1000 seconds). In some examples, the first set of one or more criteria includes a criterion that is satisfied when a determination is made that the air gesture is an air pinch gesture that includes a pinch portion that is detected for less than the third threshold amount of time (e.g., as described above in FIGS. 11G-11I). In some examples, in response to detecting the air gesture while detecting that the attention of the user is directed to the user interface element and in accordance with a determination that the air gesture is a pinch gesture that is detected for more than the third threshold amount of time, the computer system performs the operation corresponding to the user interface element, irrespective of whether the user interface element is the first type of user interface element or the second type of user interface element. In some examples, in response to detecting the air gesture while detecting that the attention of the user is directed to the user interface element and in accordance with a determination that the air gesture is a pinch gesture that is detected for less than the third threshold amount and the user interface element is the first type of user interface element, the computer system performs the operation corresponding to the user interface element. In some examples, in response to detecting the air gesture while detecting that the attention of the user is directed to the user interface element and in accordance with a determination that the air gesture is a pinch gesture that is detected for less than the third threshold amount and the user interface element is the second type of user interface element, the computer system does not perform the operation corresponding to the user interface element. In some examples, in response to detecting the air gesture while detecting that the attention of the user is directed to the user interface element and in accordance with a determination that the air gesture is a pinch gesture that satisfies one or more long pinch criterion (e.g., pinch gesture being detected for longer than third threshold amount of time), the computer system performs the operation corresponding to the user interface element, irrespective of whether the user interface element is the first type of user interface element or the second type of user interface element. In some examples, in response to detecting the air gesture while detecting that the attention of the user is directed to the user interface element and in accordance with a determination that the air gesture is a pinch gesture satisfies one or more short pinch criterion (e.g., pinch gesture being detected for shorter than third threshold amount of time) but does not satisfy the one or more long pinch criterion and the user interface element is the first type of user interface element, the computer system performs the operation corresponding to the user interface element. In some examples, in response to detecting the air gesture while detecting that the attention of the user is directed to the user interface element and in accordance with a determination that the air gesture is a pinch gesture that satisfies one or more short pinch criterion (e.g., pinch gesture being detected for shorter than third threshold amount of time) but does not satisfy the one or more long pinch criterion and the user interface element is the second type of user interface element, the computer system does not perform the operation corresponding to the user interface element. In some examples, in response to detecting the air gesture while detecting that the attention of the user is directed to the user interface element and in accordance with a determination that the air gesture is a pinch gesture that does not satisfy one or more short pinch criterion and one or more long pinch criterion, the computer system does not perform an operation corresponding to the user interface element, irrespective of whether the user interface element is the first type of user interface element or the second type of user interface element. Performing an operation corresponding to a user interface element and/or forgoing performing the operation corresponding to the user interface element based on a set of prescribed conditions (e.g., where a longer air pinch is required to be performed in some instances) being met enables to the computer system to require different types of air gesture for different types of user interface elements, thereby performing an operation when a set of conditions has been met without requiring further user input.

In some examples, the first type of air gesture (e.g., 1105*a*, 1105*b*, 1105*c*, and/or 1105*g*1) includes (and/or is) an air tap (e.g., a portion of a user accelerates and then stops without touching a physical object). Performing an operation corresponding to a user interface element and/or forgoing performing the operation corresponding to the user interface element based on a set of prescribed conditions (e.g., where a longer air tap is required to be performed in some instances) being met enables to the computer system to require different types of air gesture for different types of user interface elements, thereby performing an operation when a set of conditions has been met without requiring further user input.

In some examples, the first type of air gesture is an air gesture (e.g., 1105*a*, 1105*b*, 1105*c*, and/or 1105*g*1) that is determined to have an amount of uncertainty that is higher than a first threshold amount of uncertainty (e.g., confidence level described above in FIG. 11H) (e.g., one or more determinations of whether the air gesture was detected, of whether a particular type of air gesture was detected, and/or of whether the air gesture was intended to be performed). In some examples, the first set of one or more criteria includes a criterion that is satisfied only when the determination is made that the air gesture has higher than the threshold amount of uncertainty (and, in some examples, lower than the threshold amount of uncertainty). In some examples, the first type of air gesture is not an air gesture that is determined to have an amount of uncertainty that is lower than the first threshold amount of uncertainty. Performing an operation corresponding to a user interface element and/or forgoing performing the operation corresponding to the user interface element based on a set of prescribed conditions (e.g., where an air gesture that is determined to have an amount of uncertainty that is higher than a first threshold amount of uncertainty in some instances) being met enables to the computer system to require different types of air gesture for different types of user interface elements, thereby performing an operation when a set of conditions has been met without requiring further user input.

In some examples, before performing the operation corresponding to the user interface element (e.g., 704*a*, 704*b*, and/or 704*c*) and while detecting that the attention of the user (e.g., 702) is directed to the user interface element, at a first period of time while detecting that the attention of the user (e.g., 702) is directed to the user interface element, the computer system displays a second progress indicator (e.g., 1102) in a visual state that represents a third amount of progress (e.g., as described above in relation to method 1200). In some examples, before performing the operation corresponding to the user interface element (e.g., 704*a*, 704*b*, and/or 704*c*) and while detecting that the attention of the user (e.g., 702) is directed to the user interface element, at a second period of time while detecting that the attention of the user (e.g., 702) is directed to the user interface element, the computer system displays the second progress indicator in a visual state that represents a fourth amount of progress (e.g., as described above in relation to method 1200) different from the third amount of progress. Displaying a second progress indicator in a visual state that represents a third amount of progress at a first period of time while detecting that the attention of the user is directed to the user interface element and displaying the second progress indicator in a visual state that represents a fourth amount of progress different from the third amount of progress at a second period of time while detecting that the attention of the user is directed to the user interface element enables the computer system to display a progress indicator corresponding to an initiation of an operation corresponding to the user interface element, thereby providing improved visual feedback to the user, performing an operation when a set of conditions has been met without requiring further user input, and reducing the number of inputs needed to perform an operation.

In some examples, after forgoing performing the operation, the computer system provides an indication that the computer system (e.g., 700) did not perform the operation corresponding to the user interface element (e.g., 704*a*, 704*b*, and/or 704*c*) in response to detecting the air gesture (e.g., 1105*a*, 1105*b*, 1105*c*, and/or 1105*g*1) while detecting that the attention of the user (e.g., 702) is directed to the user interface element. Providing an indication that the computer system did not perform the operation corresponding to the user interface element in response to detecting the air gesture while detecting that the attention of the user is directed to the user interface element after forgoing performing the operation enables the computer system to display that a possible user input was not executed, thereby providing improved visual feedback to the user and reducing the number of inputs needed to perform an operation.

In some examples, the computer system (e.g., 700) is in communication with a third display generation component. In some examples, providing the indication that the computer system did not perform the operation corresponding to the user interface element (e.g., 704*a*, 704*b*, and/or 704*c*) includes displaying, via a third display generation component (e.g., 120, 1-122*a* and/or 1-122*b*), a visual indication (e.g., bouncing, shaking, moving, and/or fading in and/or fading out the user interface element) that the computer system did not perform the operation corresponding to the user interface element (e.g., as described above in FIGS. 11A-11B).

In some examples, providing the indication that the computer system (e.g., 700) did not perform the operation corresponding to the user interface element (e.g., 704*a*, 704*b*, and/or 704*c*) includes causing output of a non-visual indication (e.g., audio and/or haptic output) that the computer system did not perform the operation corresponding to the user interface element (e.g., as described above in FIGS. 11A-11B).

Note that details of the processes described above with respect to method 1300 (e.g., FIG. 13) are also applicable in an analogous manner to other methods described herein. For example, method 1200 optionally includes one or more of the characteristics of the various methods described above with reference to method 1300. For example, one or more steps of method 1300 can be used to perform an operation for an air gesture based on user attention, but if the user attention is on a locked window forgo performing the operation using one or more steps of method 1200. For brevity, these details are not repeated below.

FIGS. 14A-14I illustrate exemplary user interfaces for managing additional inputs in accordance with some examples. The user interfaces in these figures are used to illustrate the processes described below, including the processes in FIG. 15.

FIGS. 14A-14I illustrate computer system 700 positioned relative to user 702 in environment 712, which is an XR environment, using one or more techniques described above in relation to FIGS. 7A-7G. In some examples, FIGS. 14A-14I are provided to illustrate one or more scenarios in which user 702 performs a hand input and a determination is made as to whether or not user 702 has interacted with a virtual object (e.g., a virtual controller, a virtual ball, a virtual wheel, and/or a pointer) before and/or while the hand input is performed. In some examples, computer system 700 performs an operation based on a determination that the user 702 interacted with the virtual object before performing a hand input. In some examples, computer system 700 does not perform an operation based on a determination that the user 702 interacted with the virtual object before performing a hand input. In some examples, allowing the computer system to perform operations based on the hand input, provides computer system 700 with mechanism for deciding whether or not a user intends to provide an input to computer system 700.

Figure 14B:
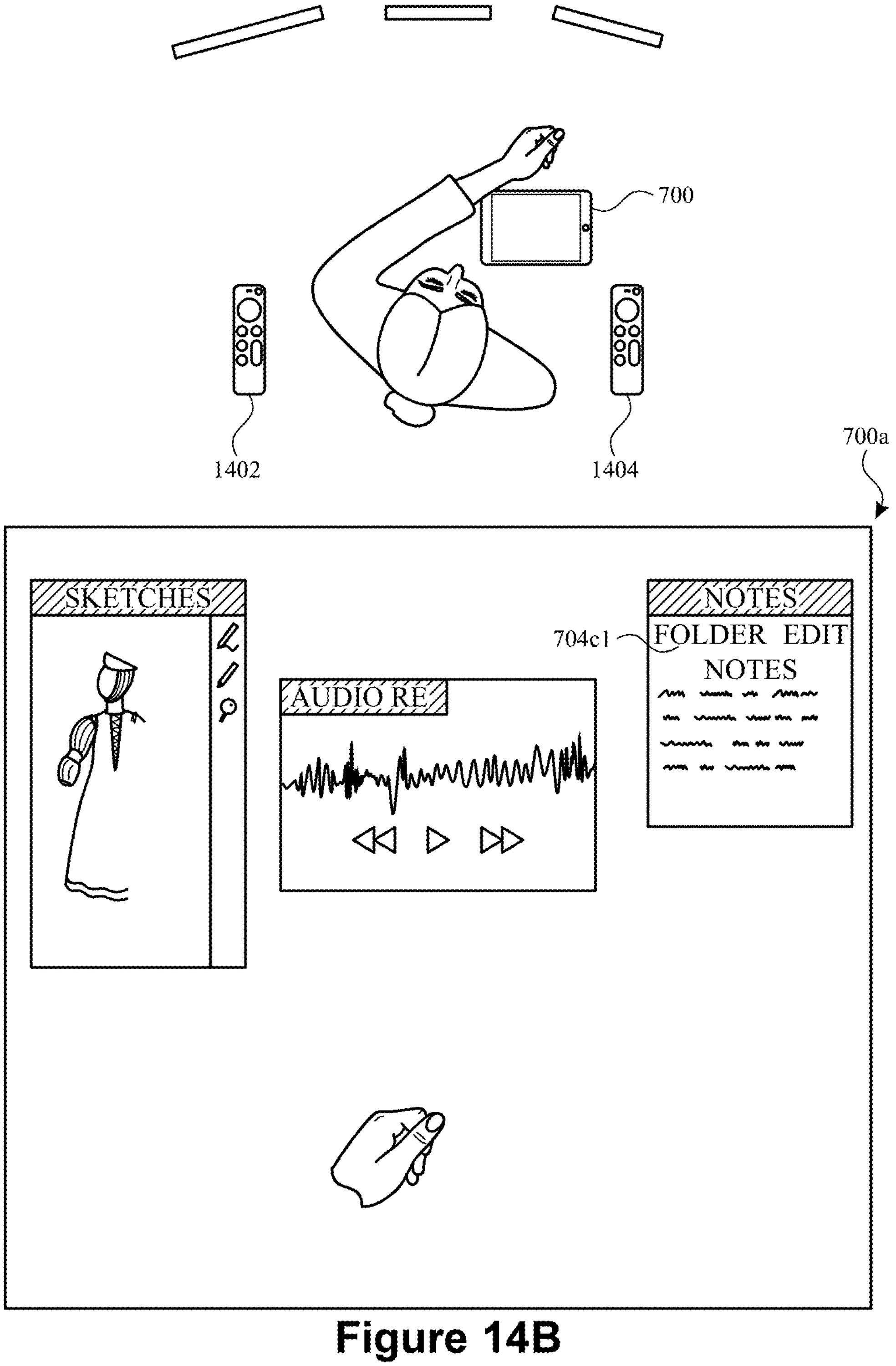
Figure 15:
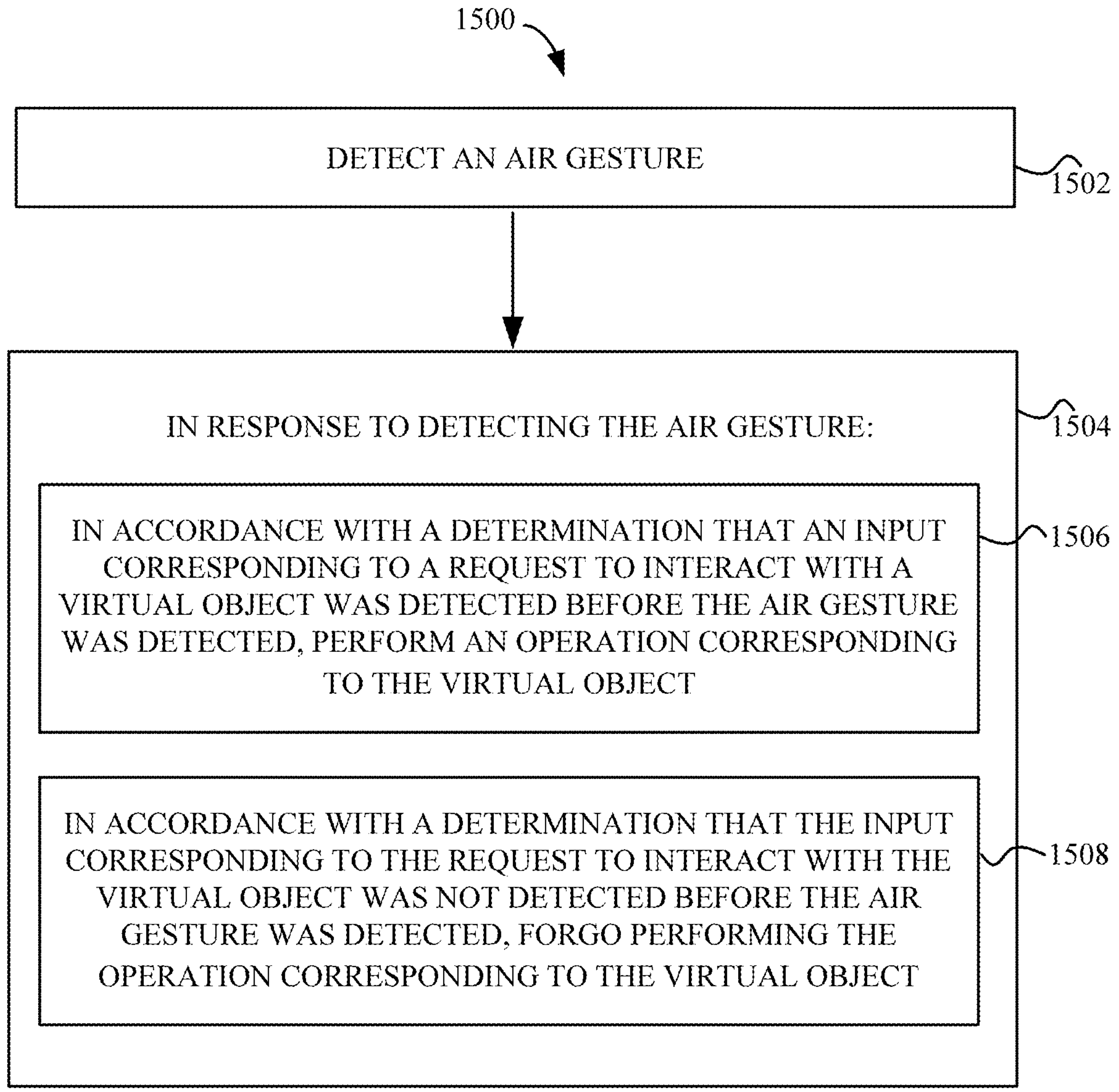
FIG. 15 is a flow diagram illustrating a method for managing virtual controller-based inputs in accordance with some embodiments.

FIGS. 14A-14B illustrate a scenario in which a computer system does not perform an operation based on a user not interacting with a virtual object before performing a hand input. As illustrated in FIG. 14A, in addition to computer system 700 and user 702, environment 712 includes virtual object 704*a*, virtual object 704*b*, and virtual object 704*c*, computer system 700 presents via viewpoint 700*a*. In some examples, computer system 700 presents content included in viewpoint 700*a* via a display generation component 700*a*. In some examples, the display generation component is a translucent and/or transparent display that allows one or more physical objects to "pass-through," such that the one or more physical objects are visible to the user (e.g., in an AR environment). In some examples, the displaying generation component is not a translucent and/or transparent display and does not allow the physical object to "pass-through" (e.g., in a VR environment).

As illustrated at FIG. 14A, virtual controller object 1402 and virtual controller object 1404 are at the side of user 702 in environment 712. Virtual controller object 1402 and virtual controller object 1404 are visible via viewpoint 700*a* when the viewpoint 700*a* is directed to virtual controller object 1402 and virtual controller object 1404 and/or the locations corresponding to virtual controller object 1402 and virtual controller object 1404. At FIG. 14A, computer system 700 detects hand input 1405*a* as illustrated in environment 712 and viewpoint 700*a*. In response to detecting hand input 1405*a*, a determination is made that user 702 has not interacted with a virtual controller object (e.g., virtual controller object 1402 or virtual controller object 1404) before detecting hand input 1405*a*. In some examples, the determination is made that user 702 interacted with the virtual controller object when a determination is made that user 702 perform an input that is directed to the virtual controller object. In some examples, detecting the input includes detecting that user 702 has moved, tapped, and/or pointed to the virtual controller object. In some examples, the determination that user 702 has not interacted with a virtual controller object includes a determination that user 702 has not previously interacted with the virtual controller object. In some examples, the determination that user 702 has not interacted with a virtual controller object includes a determination that user 702 is not currently interacting with the virtual controller object.

As illustrated in FIG. 14B, in response to the determination that user 702 has not interacted with a virtual controller object (e.g., virtual controller object 1402 or virtual controller object 1404) before detecting hand input 1405*a*, computer system 700 does not perform the operation corresponding to hand input 1405*a* (e.g., display notes application virtual object 704*d* described below at FIG. 14E.

Figure 14C:
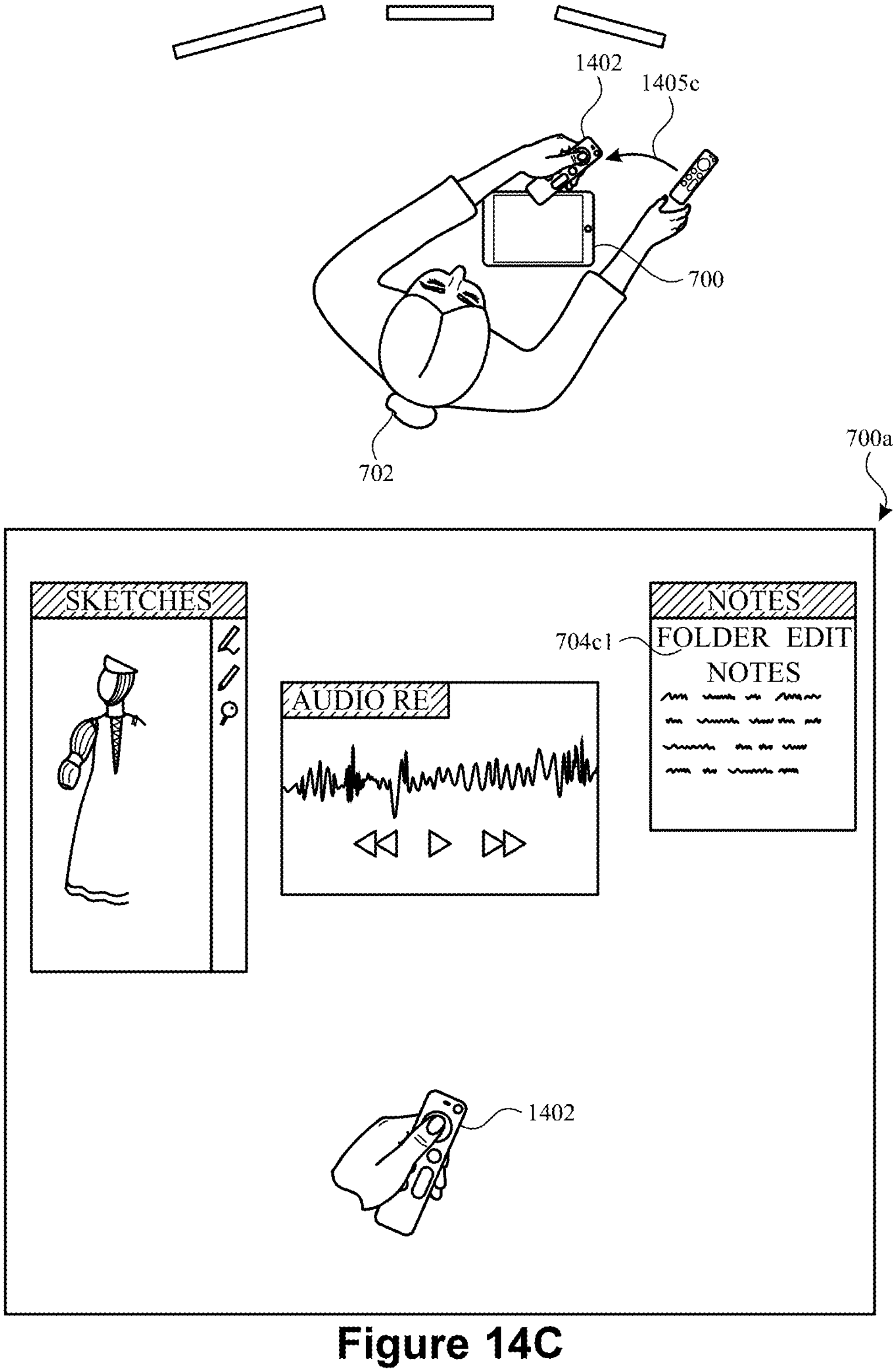
Figure 14D:
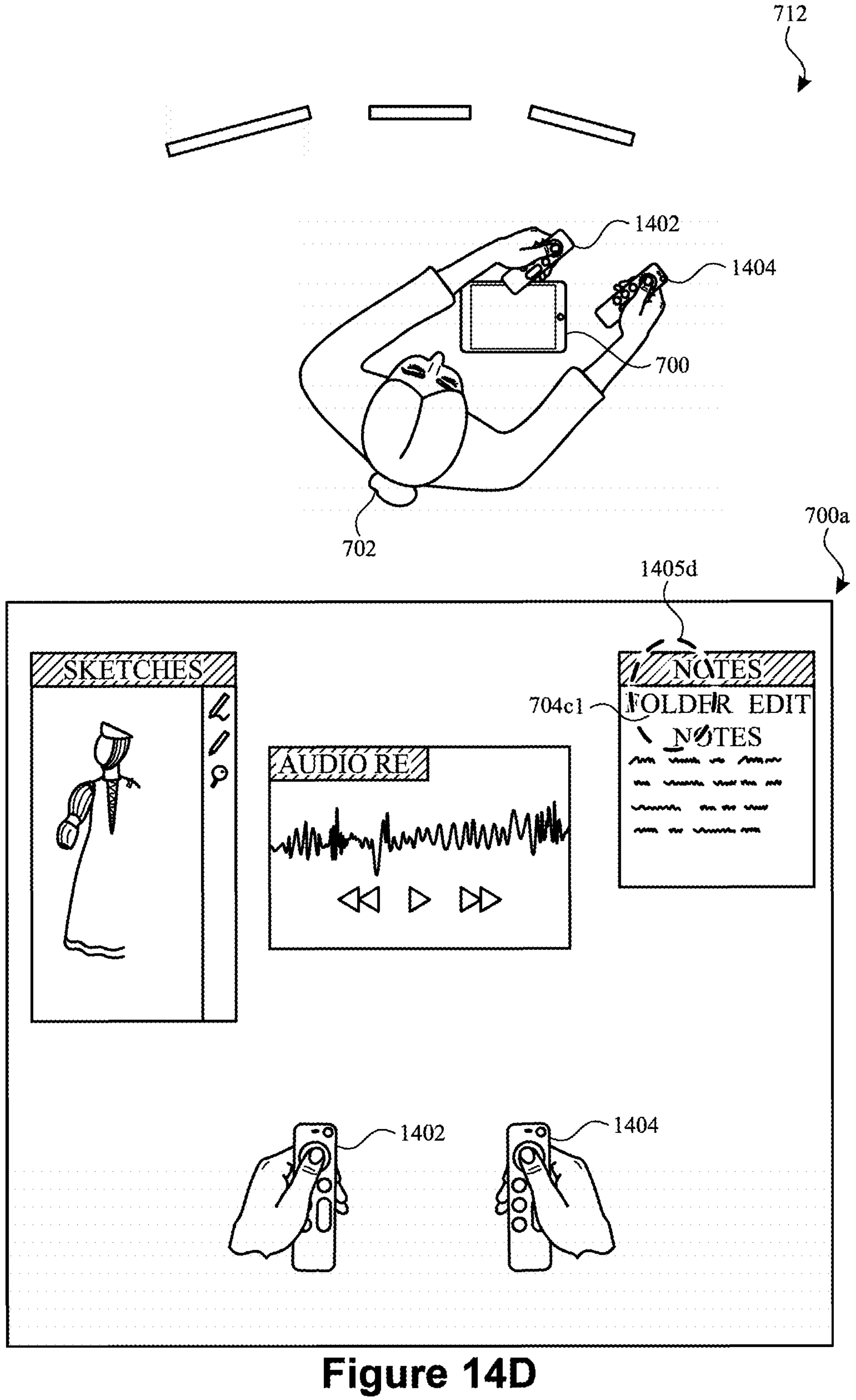
Figure 14E:
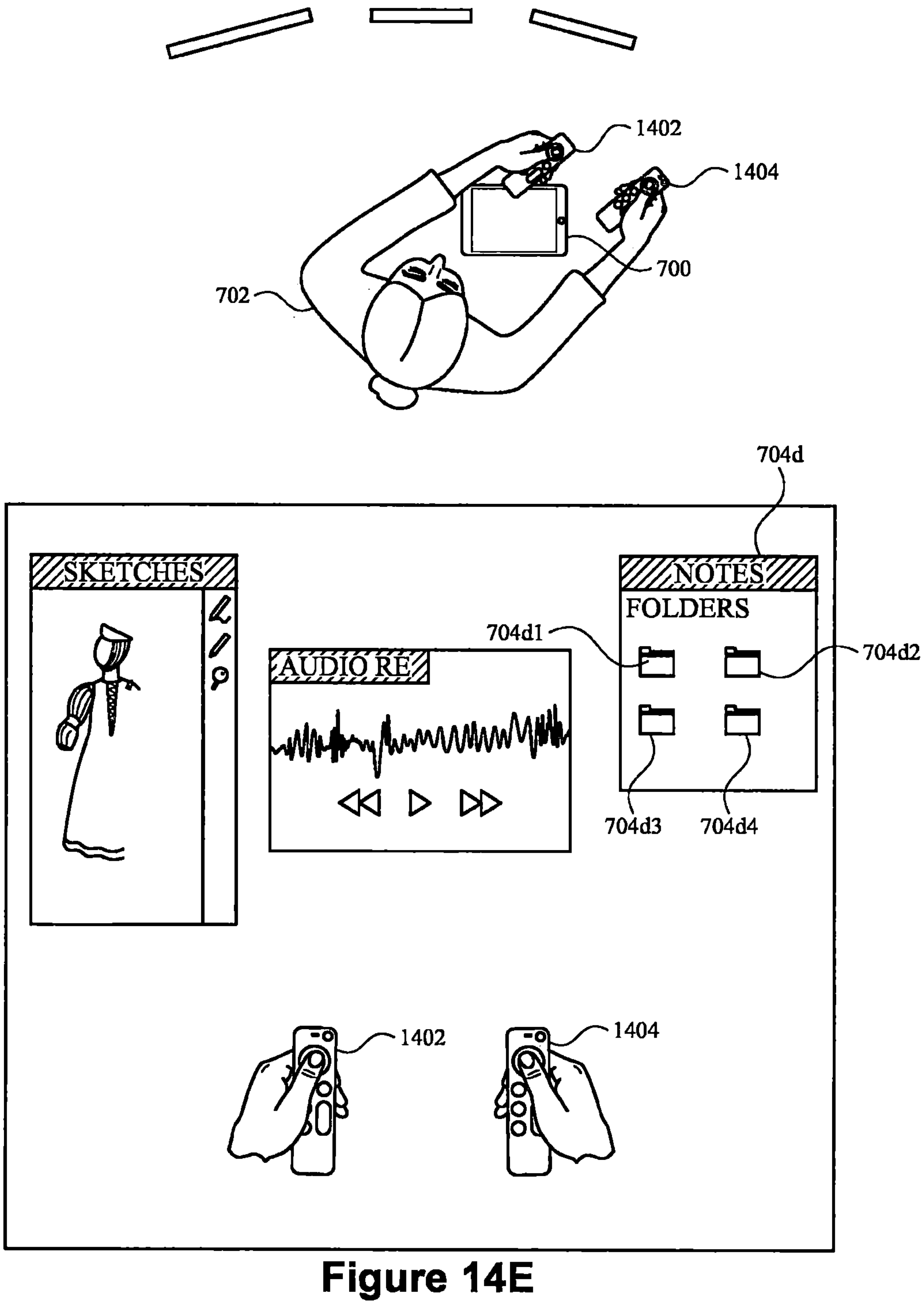

FIGS. 14C-14E illustrate one or more scenarios where a computer system performs an operation based on interacting with a virtual object before performing a hand input. At FIG. 14C, computer system 700 detects that user 702 interacted with virtual controller object 1402 and detects hand input 1405*c* while user 702 is holding virtual controller object 1402. In some examples, in response to detecting that user 702 interacted with virtual controller object 1402, computer system 700*a* displays virtual controller object 1402 in viewpoint 700*a*. In some examples, computer system 700 moves virtual controller object 1402 displayed via viewpoint 700*a* as the hand of user 702 that is holding virtual controller object 1402 is moved (e.g., in the same direction and/or by the same amount). It should be understood that hand inputs are being described for exemplary purposes only and, in some examples, other types of inputs and/or inputs performed by other body parts (e.g., including inputs from a right hand, foot, and/or head) of user 702 can be detected and cause (or not cause) computer system 700 to perform operations using techniques similar to those described in relation to FIGS. 14A-14I. In some examples (e.g., at FIG. 14D), in response to detecting hand input 1405*c*, computer system 700 displays the virtual controller object moved to the left of user 702 from the location illustrated at FIG. 14C.

As illustrated in FIG. 14D, computer system 700 detects user 702 is holding both virtual controller object 1402 and virtual controller object 1404. Thus, at FIG. 14D, user 702 is detected as holding virtual controller object 1402 and virtual controller object 1404 in environment 712 concurrently. In some examples, computer system 700 displays virtual controller object 1402 and virtual controller object 1404 in viewpoint 700*a* in the hands of user 702. In some examples, computer system 700 displays an indication, such as in a tool bar and/or HUD, that user 702 is holding virtual controller object 1402 and virtual controller object 1404. In some examples, computer system 700 detects a hand input while the user is holding both virtual controller objects. In some examples, in response to detecting a hand input while holding both virtual controller objects, computer system 700 performs an operation corresponding to the hand that performed the hand input and/or the particular virtual controller in the hand that performed the hand input. At FIG. 14D, computer system 700 detects hand input 1405*d*. At FIG. 14D, a determination is made that user 702 interacted with virtual controller object 1402 before (and/or while) detecting hand input 1405*d*.

As illustrated in FIG. 14E, in response to the determination that user 702 has interacted with virtual controller object 1402 before (and/or while) detecting hand input 1405*d*, computer system 700 displays notes application virtual object 704*d*. At FIG. 14E, notes application virtual object 704*d* includes folders 704*d*1-704*d*4, which are folders that contain different notes files for notes application virtual object 704*c*. In some examples, the determination that user 702 has interacted with a virtual object (e.g., virtual controller object 1402 and/or virtual controller object 1404) before detecting a hand input (e.g., hand input 1405*c*) includes a determination that the interaction occurred within a threshold period of time before detecting the hand input.

Figure 14F:
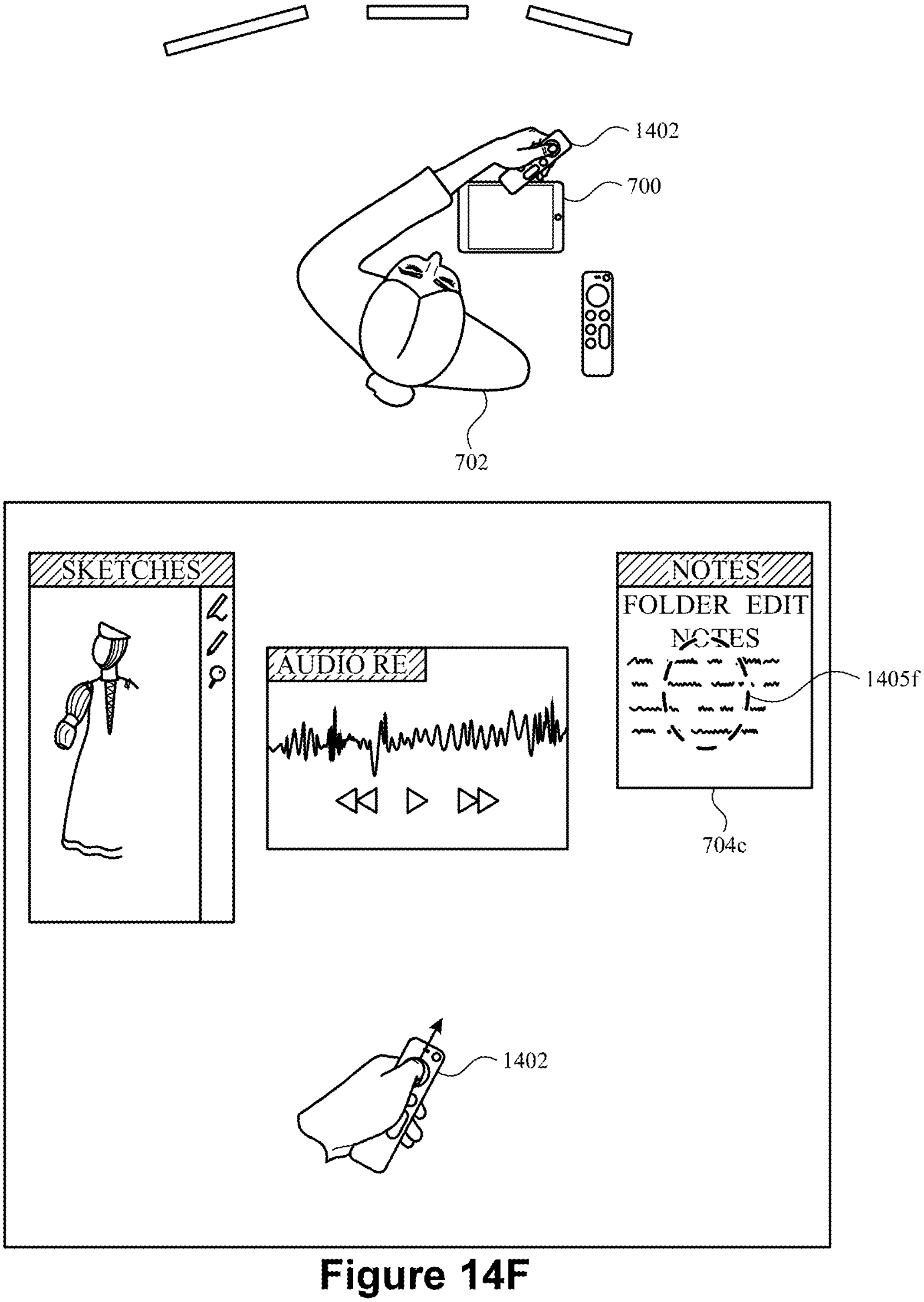
Figure 14G:
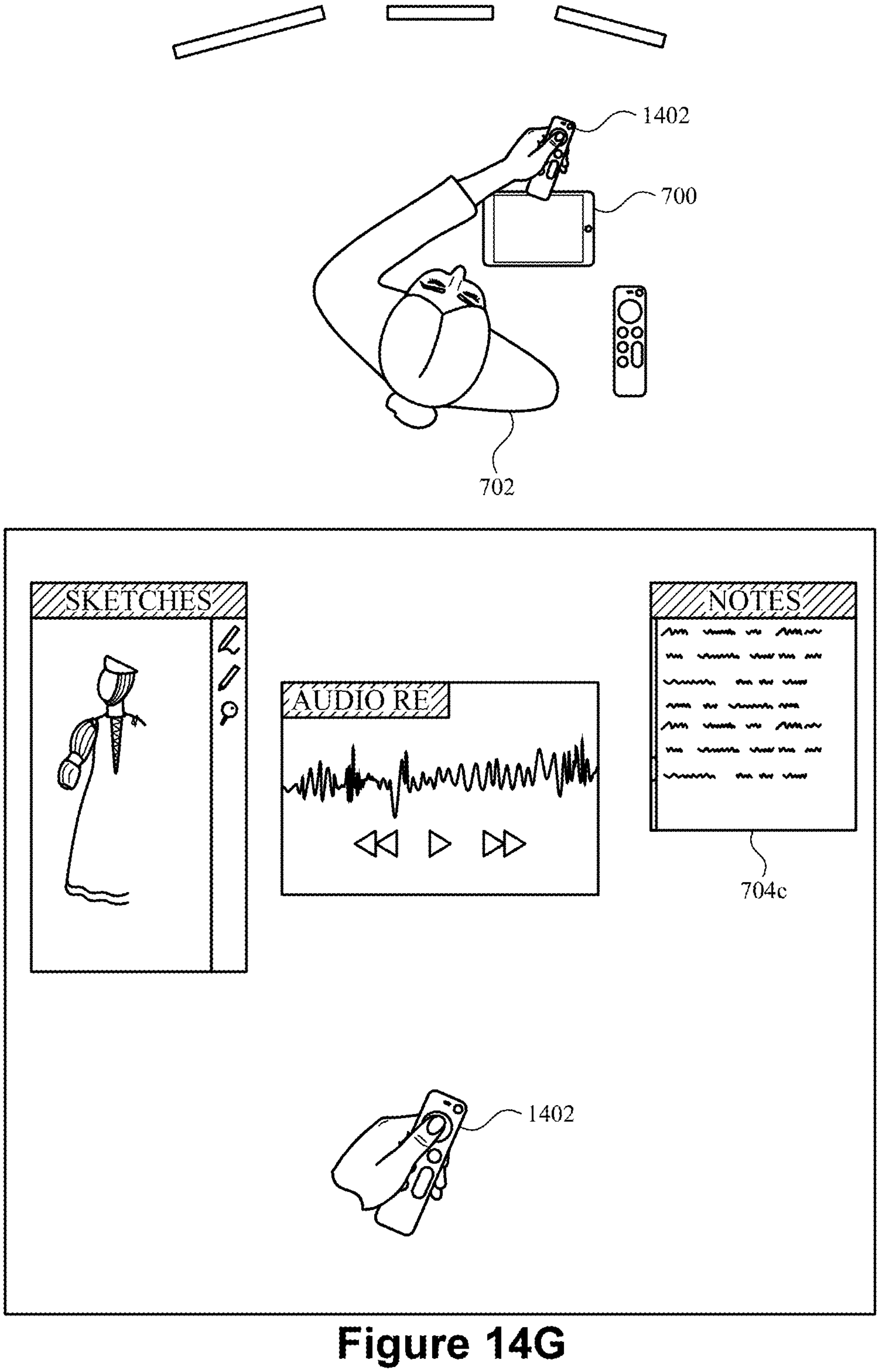

FIGS. 14F-14G illustrate one or more scenarios where a computer system performs a scrolling operation in response to detecting an input while holding a virtual controller object. At FIG. 14F, computer system 700 detects user 702 interacted with virtual controller object 1402 and detects hand input 1405*f*. In response to detecting hand input 1405*f*, a determination is made that user 702 interacted with virtual controller object 1402 before (and/or while) detecting hand input 1405*f*. In some examples, hand input 1405*f* is different from hand input 1405*d* of FIG. 14D. In some examples, hand input 1405*f* is a scrolling input, such as an air flick and/or air swipe. In some examples, hand input 1405*d* is a selection input, such as an air tap and/or an air pinch. As illustrated at FIG. 14G, because a determination is made that user 702 interacted with virtual controller object 1402 before (and/or while) detecting hand input 1405*f*, computer system 700 scrolls notes application virtual object 704*c*.

Figure 14H:
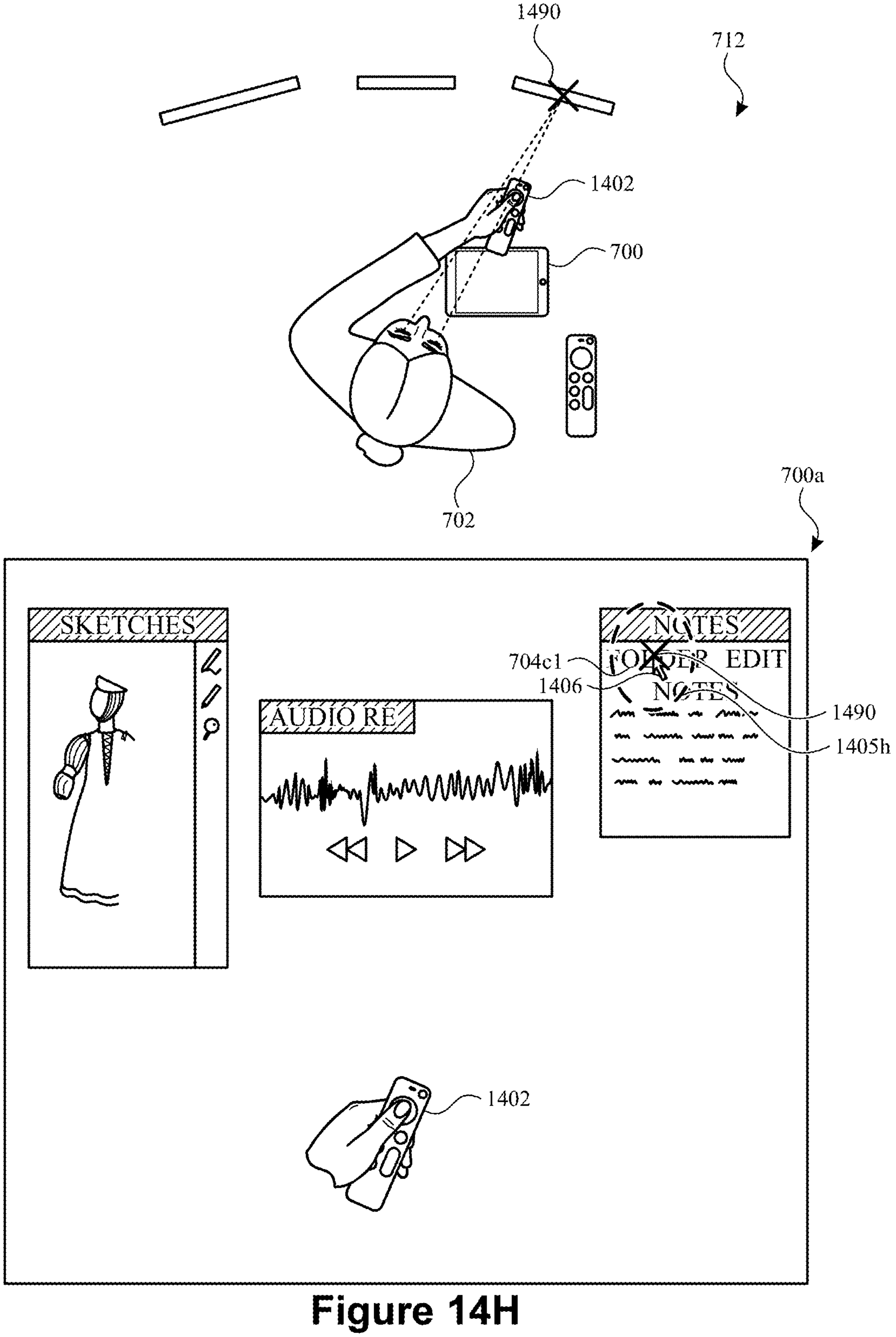

FIG. 14H illustrates one or more scenarios where computer system enters a cursor mode based on interacting with a virtual object. At FIG. 14H, because user 702 is holding virtual controller object 1402, computer system 700 enters a cursor mode. While in the cursor mode, computer system 700 displays cursor 1406 via viewpoint 700*a*. Cursor 1406 is displayed at a location that corresponds to gaze input 1405*h*1, which is detected at gaze position 1490 in environment 712. Here, the location of cursor 1402 is at a position in environment 712 that corresponds to the location of folder control 704*cl*. In some examples, computer system 700*a* perform a respective operation (e.g., display a set of folders, as described above in relation to FIG. 14E) in response to detecting a hand input while user 702 is holding virtual controller object 1402 and gaze input 1405*h*1 is detected at the location corresponding to folder control 704*c*1. In some examples, computer system 700 performs the respective operation when a determination is made that gaze input 1405*h*1 has been detected at the location corresponding to folder control 704*c*1 for more than a threshold period of time (e.g., using one or more techniques as described below in relations to FIGS. 16A-16G). In some examples, in response to detecting that user 702 is no longer holding a virtual controller object, computer system 700 ceases to display cursor 1406 and/or exits out of the cursor mode. In some examples, computer system 700*a* moves display of cursor 1406 based on the movement of the gaze of user 702.

Figure 14I:
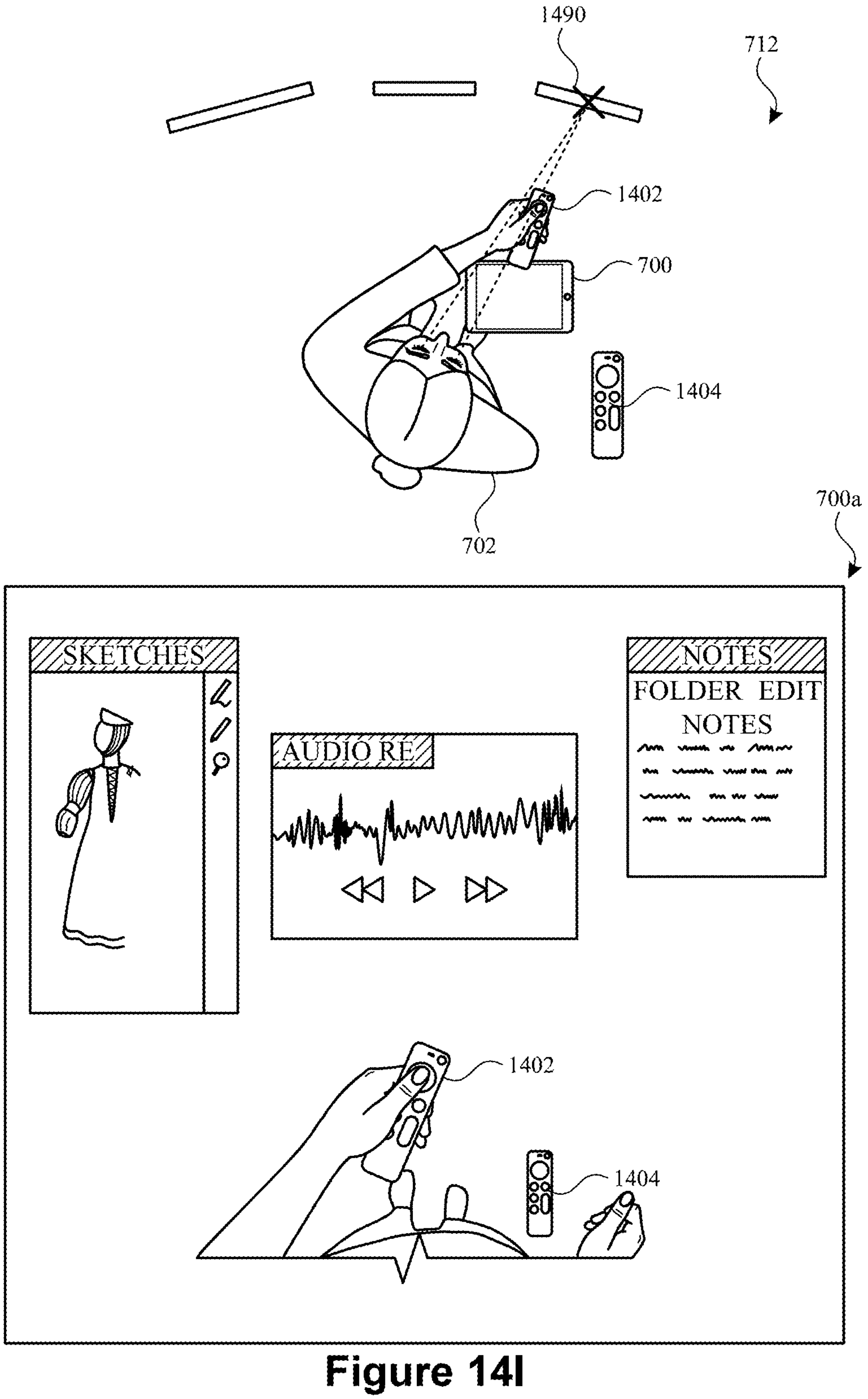

FIG. 14I illustrates one or more scenarios where user 702 moved their gaze downward toward their feet. In response to user 702 moving their gaze, computer system 700 displays, via viewpoint 700*a*, the perspective of user 702. Computer system 700 displays, via viewpoint 700*a*, user 702 holding virtual controller object 1402, a hand of user 702 not holding a virtual controller object (e.g., virtual controller object 1402 and/or virtual controller object 1404), the torso of user 702, the feet of user 702, and near the feet of user 702 virtual controller object 1404.

FIG. 15 is a flow diagram illustrating a method (e.g., method 1500) for virtual controller-based inputs in accordance with some examples. Some operations in method 1500 are, optionally, combined, the orders of some operations are, optionally, changed, and some operations are, optionally, omitted.

As described below, method 1500 provides an intuitive way for virtual controller-based inputs. Method 1500 reduces the cognitive burden on a user for virtual controller-based inputs, thereby creating a more efficient human-machine interface. For battery-operated computing devices, enabling a user to provide virtual controller-based inputs faster and more efficiently conserves power and increases the time between battery charges. In some examples, method 1500 is performed at a computer system (e.g., 700) (e.g., as described above in relation to method 800) that is in communication with one or more input devices (e.g., as described above in relation to method 800).

At 1502, the computer system detects an air gesture (e.g., 1405*a*, 1405*c*, 1405*d*, and/or 1405*f*) (e.g., a hand input to pick up, a hand input to press, an air tap, an air swipe, and/or a clench and hold air input).

At 1504, in response to detecting the air gesture (e.g., 1405*a*, 1405*c*, 1405*d*, and/or 1405*f*), in accordance with (at 1506) a determination that an input (e.g., 1405*a*, 1405*c*, 1405*d*, and/or 1405*f*) (e.g., a hand input to pick up, a hand input to press, an air tap, an air swipe, and/or a clench and hold air input) corresponding to a request to interact with a virtual object (e.g., 1402 and/or 1404) (e.g., a virtual control, an object with an appearance of a control, an object that is displayed with an indication that controlling, picking up, and/or grabbing one or more operations will configure the computer system to operate in a different state (e.g., as a state in which detection of an air input causes the computer system to perform an operation and/or a state at which the computer system was not in before the object was controlled)) was detected before the air gesture (e.g., 1405*a*, 1405*c*, 1405*d*, and/or 1405*f*) was detected, the computer system performs an operation corresponding to the virtual object. In some examples, the input corresponding to the request to control the virtual object is an input that corresponds to picking up the virtual object, grabbing the virtual object, moving the virtual object, and/or adjusting the virtual object. In some examples, the input corresponding to the request to control the virtual object is an input that is directed to the virtual object.

At 1504, in response to detecting the air gesture (e.g., 1405*a*, 1405*c*, 1405*d*, and/or 1405), in accordance with (at 1508) a determination that the input (e.g., 1405*a*, 1405*c*, 1405*d*, and/or 1405*f*) corresponding to the request to interact with the virtual object (e.g., 1402 and/or 1404) was not detected before the air gesture (e.g., 1405*a*, 1405*c*, 1405*d*, and/or 1405*f*) was detected, the computer system forgoes performing the operation corresponding to the virtual object. In some examples, in accordance with a determination that the input corresponding to the request to interact with the virtual object was not detected before the air gesture was detected, the computer system ignores the air gesture. In some examples, the computer system does not detect the input and/or register the input after, while, and/or when a determination is made that the input corresponding to the request to interact with the virtual object is not detected before the air gesture is detected. In some examples, the computer system initiates detection for an air gesture in response to detecting a request to interact with the virtual object. Performing an operation corresponding to the virtual object based on an input corresponding to a request to interact with a virtual object being detected before the air gesture was detected or forgoing performing the operation corresponding to the virtual object based on the input corresponding to the request to interact with the virtual object not being detected before the air gesture was detected enables the computer system to reduce the amount of unnecessary operations being performed in response to detecting unintentional inputs, thereby performing an operation when a set of conditions has been met without requiring further user input and reducing the number of inputs needed to perform an operation.

In some examples, the virtual object (e.g., 1402 and/or 1404) is visible within a threshold distance (e.g., 0.1-2 meters) (e.g., near, adjacent to, and/or on a body part) of a first user (e.g., 702). Displaying the virtual object within a threshold distance of a first user enables the computer system to display objects that are in a predetermined proximity (e.g., within grabbing distance) to the first user, thereby providing improved visual feedback to the user and reducing the number of inputs needed to perform an operation.

In some examples, the virtual object (e.g., 1402 and/or 1404) is visible at a location in a three-dimensional environment (e.g., 712) that is outside (e.g., below and/or above) of a viewpoint (e.g., 700*a*) of a second user (e.g., 702) while the viewpoint of the second user is facing a first direction (e.g., a direction that is parallel to a ground (e.g., a representation of a floor, a street, grass, land, concrete, and/or a sidewalk) and not in a second direction that is perpendicular to the ground) in the three-dimensional environment (e.g., 712). Displaying the virtual object at a location in a three-dimensional environment that is outside of a viewpoint of a second user while the viewpoint of the second user is facing a first direction in a three-dimensional environment enables the computer system to provide the virtual object without having the need to display the virtual object permanently in the viewpoint of the user, thereby providing improved visual feedback to the user and providing additional control options without cluttering the user interface with additional displayed control.

In some examples, after forgoing performing the operation, the computer system provides an indication that the computer system (e.g., 700) did not perform the operation corresponding to the user interface element (e.g., 704*a*, 704*b*, and/or 704*c*) in response to detecting the air gesture (e.g., 1105*a*, 1105*b*, 1105*c*, and/or 1105*g*1) while detecting that the attention of the user (e.g., 702) is directed to the user interface element. Providing an indication that the computer system did not perform the operation corresponding to the user interface element in response to detecting the air gesture while detecting that the attention of the user is directed to the user interface element after forgoing performing the operation enables the computer system to display that a possible user input was not executed, thereby providing improved visual feedback to the user and reducing the number of inputs needed to perform an operation.

In some examples, the computer system (e.g., 700) is in communication with a first display generation component (e.g., 120, 1-122*a* and/or 1-122*b*). In some examples, before detecting the air gesture (e.g., 1405*a*, 1405*c*, 1405*d*, and/or 1405*f*), the computer system detects the input (e.g., 1405*a*, 1405*c*, 1405*d*, and/or 1405*f*) corresponding to the request to interact with the virtual object (e.g., 1402 and/or 1404) (e.g., picking up the object, touching the output, grabbing the object, and/or holding the object. In some examples, after detecting the input corresponding to the request to interact with the virtual object, the computer system displays, via the first display generation component, the virtual object in a hand (e.g., 702*a* and/or 702*b*) (e.g., left hand and/or right hand) (and/or, in some examples, a first body part of the user) (e.g., an actual hand of and/or a representation of a hand of) of a third user (e.g., 702). In some examples, while displaying the virtual object in the hand of the third user, the computer system detects movement of the hand of the third user. In some examples, in response to detecting movement of the hand of the third user, the computer system moves display of the virtual object relative to the hand of the third user (e.g., as described above in FIGS. 14C-14E). In some examples, in response to detecting movement of the hand of the third user, the computer system performs the operation corresponding to the object and, in some examples, in response to detecting movement of another hand of the user, the computer system does not perform the operation corresponding to the object. Displaying a virtual object in the hand of the third user after detecting the input corresponding to the request to interact with the virtual object and moving display of the virtual object relative to the hand of the third user in response to detecting movement of the hand of the third user enables the computer system to simulate detected movement of the virtual object and one or more body parts of a user in a three-dimensional environment, thereby providing improved visual feedback to the user, providing additional control options without cluttering the user interface with additional displayed control, and reducing the number of inputs needed to perform an operation.

In some examples, in accordance with a determination that the input (e.g., 1405*a*, 1405*c*, 1405*d*, and/or 1405*f*) corresponding to the request to interact with the virtual object (e.g., 1402 and/or 1404) was performed by a first hand (e.g., 702*a* and/or 702*b*) of a fourth user (e.g., 702) (e.g., left hand and/or right hand) (and/or, in some examples, a first body part of the fourth user), the virtual object is displayed in (e.g., within, on, overlaid on, and/or between portion of) the first hand of the fourth user. In some examples, in accordance with a determination that the input corresponding to the request to interact with the virtual object was performed by a second hand (e.g., 702*a* and/or 702*b*) of the fourth user (e.g., left hand and/or right hand) (and/or, in some examples, a first body part of the fourth user), the virtual object is displayed in the second hand of the fourth user different from the first hand of the fourth user. Displaying the virtual object in a first hand of a fourth user based on the input corresponding to the request to interact with the virtual object being performed by a first hand of a fourth user and displaying the virtual object in the second hand of the fourth user based on the input corresponding to the request to interact with the virtual object being performed by a second hand of the fourth user enables the computer system to simulate detected movement of a user in a three-dimensional environment and enables the computer system to provide the user with multiple control options, thereby providing improved visual feedback to the user, performing an operation when a set of conditions has been met without requiring further user input, and providing additional control options without cluttering the user interface with additional displayed co.

In some examples, the computer system (e.g., 700) is in communication with a second display generation component (e.g., 120, 1-122*a* and/or 1-122*b*). In some examples, before detecting the air gesture (e.g., 1405*a*, 1405*c*, 1405*d*, and/or 1405*f*), the computer system concurrently displays via the second display generation component, a first virtual object (e.g., 1402 and/or 1404) and a second virtual object (e.g., 1402 and/or 1404). In some examples, the computer system is caused to perform an operation corresponding to the first virtual object in response to detecting an input (e.g., 1405*a*, 1405*c*, 1405*d*, and/or 1405*f*) corresponding to a request to interact with the first virtual object before a respective air gesture is detected. In some examples, the computer system is caused to perform an operation corresponding to the second virtual object in response to detecting an input corresponding to a request to interact with the second virtual object before the respective air gesture is detected, wherein the first virtual object is different from the second virtual object. In some examples, the first virtual object and the second virtual object can be grabbed by a user, and the computer system is configured to perform the same set of operations, irrespective of which virtual object is grabbed. In some examples, the first virtual object and the second virtual object can be grabbed by a user, and the computer system is configured to perform a different set of operations based on which respective virtual object is grabbed. Displaying a first virtual object (e.g., in response to detecting an input corresponding to a request to interact with the first virtual object before a respective air gesture is detected) and a second virtual object (e.g., in response to detecting an input corresponding to a request to interact with the second virtual object before the respective air gesture is detected) concurrently enables the computer system to provide multiple virtual objects to control the computer system to the user, thereby providing improved visual feedback to the user and providing additional control options without cluttering the user interface with additional displayed control.

In some examples, the first virtual object (e.g., 1402 and/or 1404) is visible on a first side (left side of body, right side of body, left side of head, right side of head, left side of feet, and/or right side of feet) of a fifth user (e.g., 702). In some examples, the second virtual object (e.g., 1402 and/or 1404) is visible on a second side (left side of body, right side of body, left side of head, right side of head, left side of feet, and/or right side of feet) of the fifth user different from the first side of the fifth user. In some examples, the first side is opposite of the second side. Displaying a first virtual object at a first side of a fifth user (e.g., in response to detecting an input corresponding to a request to interact with the first virtual object before a respective air gesture is detected) and a second virtual object at a second side of the fifth user (e.g., in response to detecting an input corresponding to a request to interact with the second virtual object before the respective air gesture is detected) concurrently enables the computer system to provide multiple virtual objects to a user, thereby providing improved visual feedback to the user and providing additional control options without cluttering the user interface with additional displayed control.

In some examples, while concurrently displaying, via the second display generation component, the first virtual object (e.g., 1402 and/or 1404) and the second virtual object (e.g., 1402 and/or 1404), the computer system detects the input (e.g., 1405*a*, 1405*c*, 1405*d*, and/or 1405*f*) corresponding to the request to interact with the first virtual object and detecting the input corresponding to the request to interact with the second virtual object. In some examples, in response to detecting the input corresponding to the request to interact with the first virtual object and detecting the input corresponding to the request to interact with the second virtual object, the computer system displays, via the second display generation component, the first virtual object in a first hand (e.g., 702*a* and/or 702*b*) of a fifth user (e.g., 702) and the second virtual object in a second hand (e.g., 702*a* and/or 702*b*) of the fifth user, wherein the first hand of the fifth user is different from the second hand of the fifth user. In some examples, the first virtual object in the first hand of the fifth user is displayed concurrently with the second virtual object in the second hand of the fifth user. Displaying concurrently a first virtual object in a first hand of a fifth user and a second virtual object in a second hand of the fifth user, in response to detecting a input corresponding to the request to interact with the first virtual object and detecting a input corresponding to the request to interact with the second virtual object enables the computer system to provide multiple virtual objects to a user, thereby providing improved visual feedback to the user and providing additional control options without cluttering the user interface with additional displayed control.

In some examples, in accordance with a determination that an interaction (e.g., picking up the virtual object, grabbing the virtual object, moving the virtual object, and/or adjusting the virtual object) with the virtual object (e.g., 1402 and/or 1404) is occurring, the computer system enables a first set of one or more gestures (e.g., 1405*a*, 1405*c*, 1405*d*, and/or 1405*f*) to cause the computer system (e.g., 700) to perform one or more operations (e.g., the operation and/or one or more different operations). In some examples, in accordance with a determination that an interaction with the virtual object (e.g., 1402 and/or 1404) is not occurring, the computer system enables a second set of one or more gestures to cause the computer system to perform one or more operations (e.g., the operation and/or one or more different operations), wherein the first set of one or more gestures is different from the second set of one or more gestures. Enabling a first set of one or more gestures to cause the computer system to perform one or more operations based on an interaction with a virtual object occurring and enabling a second set of one or more gestures to cause the computer system to perform one or more operations different from the first set of one or more gestures based on an interaction with a virtual object not occurring allows the computer system to ignore unintentional inputs, thereby performing an operation when a set of conditions has been met without requiring further user input and reducing the number of inputs needed to perform an operation.

In some examples, the first set of one or more gestures (e.g., 1405*a*, 1405*c*, 1405*d*, and/or 1405*f*) includes a third set of one or more gestures (e.g., scrolling with a flick of a finger (e.g., an air gesture of the finger flicking and/or a hand input of the finger flicking) or movement of a finger (e.g., an air gesture and/or hand input that includes finger movement) around a simulated click wheel) (e.g., one or more selection gestures and/or one or more gestures that include the ability to perform a tap gesture of a user's hand and/or an air tap as a selection input). In some examples, the second set of one or more gestures does not include the third set of one or more gestures. Enabling a first set of one or more gestures including a third set of one or more gestures to cause the computer system to perform one or more operations based on an interaction with a virtual object occurring and enabling a second set of one or more gestures (e.g., the second set of one or more gestures not including the third set of one or more gestures) to cause the computer system to perform one or more operations different from the first set of one or more gestures based on an interaction with a virtual object not occurring allows the computer system to not perform operations when some types of air gestures are directed to some types of user interface elements in some situations, thereby performing an operation when a set of conditions has been met without requiring further user input and reducing the number of inputs needed to perform an operation.

In some examples, the first set of one or more gestures (e.g., 1405*a*, 1405*c*, 1405*d*, and/or 1405*f*) does not include a fourth set of one or more gestures (e.g., one or more air gestures, air swipes, air pinch and hold, and/or one or more gestures not in the third set of one or more gestures). In some examples, the second set of one or more gestures includes the fourth set of one or more gestures. Enabling a first set of one or more gestures (e.g., the first set of one or more gestures does not include a fourth set of one or more gestures) to cause the computer system to perform one or more operations based on an interaction with a virtual object occurring and enabling a second set of one or more gestures (e.g., the second set of one or more gestures includes the fourth set of one or more gestures) to cause the computer system to perform one or more operations different from the first set of one or more gestures based on an interaction with a virtual object not occurring allows the computer system to not perform operations when some types of air gestures are directed to some types of user interface elements in some situations, thereby performing an operation when a set of conditions has been met without requiring further user input and reducing the number of inputs needed to perform an operation.

In some examples, the first set of one or more gestures (e.g., 1405*a*, 1405*c*, 1405*d*, and/or 1405*f*) includes a set of one or more gestures corresponding to a request to scroll a respective portion of a respective user interface (e.g., scrolling with a flick of a finger (e.g., an air gesture of the finger flicking and/or a hand input of the finger flicking) or movement of a finger (e.g., an air gesture and/or hand input that includes finger movement) around a simulated click wheel). In some examples, the second set of one or more gestures does not include the set of one or more gestures corresponding to the request to scroll the respective portion of the respective user interface (e.g., as described above in FIGS. 14F-14G). Enabling a first set of one or more gestures including a set of one or more gestures corresponding to a request to scroll a respective portion of a respective user interface to cause the computer system to perform one or more operations based on an interaction with a virtual object occurring and enabling a second set of one or more gestures not including the set of one or more gestures corresponding to the request to scroll the respective portion of the respective user interface to cause the computer system to perform one or more operations different from the first set of one or more gestures based on an interaction with a virtual object not occurring allows the computer system to not perform operations when a scrolling air gesture is directed to some types of user interface elements in some situations, thereby performing an operation when a set of conditions has been met without requiring further user input and reducing the number of inputs needed to perform an operation.

In some examples, the first set of one or more gestures (e.g., 1405*a*, 1405*c*, 1405*d*, and/or 1405*f*) includes a set of one or more gestures corresponding to a request to select a respective object (e.g., 1402 and/or 1404) (e.g., one or more selection gestures and/or one or more gestures that include the ability to perform a tap gesture of a user's hand and/or an air tap as a selection input). In some examples, the second set of one or more gestures does not include the set of one or more gestures corresponding to the request to select the respective object. Enabling a first set of one or more gestures including a set of one or more gestures corresponding to a request to select a respective portion of a respective user interface to cause the computer system to perform one or more operations based on an interaction with a virtual object occurring and enabling a second set of one or more gestures not including the set of one or more gestures corresponding to the request to select the respective portion of the respective user interface to cause the computer system to perform one or more operations different from the first set of one or more gestures based on an interaction with a virtual object not occurring allows the computer system to not perform operations when a selection air gesture is directed to some types of user interface elements in some situations, thereby performing an operation when a set of conditions has been met without requiring further user input and reducing the number of inputs needed to perform an operation.

In some examples, before detecting the air gesture (e.g., 1405*a*, 1405*c*, 1405*d*, and/or 1405*f*), the computer system detects the input (e.g., 1405*a*, 1405*c*, 1405*d*, and/or 1405*f*) corresponding to the request to interact with the virtual object (e.g., 1402 and/or 1404). In some examples, in response to detecting the input corresponding to the request to interact with the virtual object, the computer system transitions the computer system (e.g., 700) to operate in a cursor interaction mode. In some examples, in response to detecting the input corresponding to the request to interact with the virtual object, the computer system displays a cursor at a location. In some examples, while operating in the cursor interaction mode, the computer system detects movement of a gaze input (e.g., as indicated by location of cursor 1406) from a first gaze position to a second gaze position different from the first gaze position. In some examples, in response to detecting movement of the gaze input from the first gaze position to the second gaze position, the computer system moves display of an indication of a cursor (e.g., 1406) based on (e.g., in direction that is based on, with a speed that is based on, with an acceleration that is based on, and/or with a velocity that is based on) movement of the gaze input from the first gaze position to the second gaze position. Transitioning the computer system to operate in a cursor interaction mode in response to detecting the input corresponding to the request to interact with the virtual object enables the computer system to operate in a cursor mode where a cursor is moved based on the gaze of the user, thereby providing improved visual feedback to the user and providing additional control options without cluttering the user interface with additional displayed control.

In some examples, while displaying the indication of the cursor at a cursor location, the computer system detects one or more inputs (e.g., 1405*a*, 1405*c*, 1405*d*, and/or 1405*f*). In some examples, in response to detecting the one or more inputs and in accordance with a determination that the cursor location corresponds to a location of a user interface object, the computer system selects the user interface object (e.g., 704*a*, 704*b*, 704*c*, and/or 704*d*). In some examples, in accordance with a determination that the cursor location does not correspond to the location of the user interface object, the computer system does not select the user interface object. In some examples, in response to detecting the one or more inputs and in accordance with a determination that the cursor location corresponds to a location of a user interface object, the computer system initiates a drag and drop operation, selects a text entry field for input, displays a mark in a drawing application, and/or performs an operation corresponding to a selectable object. Selecting the user interface object in response to detecting the one or more inputs and in accordance with a determination that the cursor location corresponds to a location of a user interface object allows the computer system to provide the user with a control option to select the user interface object while operating in the cursor mode, thereby providing improved visual feedback to the user and providing additional control options without cluttering the user interface with additional displayed control.

Note that details of the processes described above with respect to method 1500 (e.g., FIG. 15) are also applicable in an analogous manner to other methods described herein. For example, method 1000 optionally includes one or more of the characteristics of the various methods described above with reference to method 1500. For example, one or more steps of method 1500 can be used to perform an operation when using by a specific portion of a user a virtual controller using one or more steps of method 1000. For brevity, these details are not repeated below.

FIGS. 16A-16G illustrate exemplary user interfaces for managing additional inputs in accordance with some examples. The user interfaces in these figures are used to illustrate the processes described below, including the processes in FIG. 17.

FIGS. 16A-16G illustrate computer system 700 positioned relative to user 702 in environment 712, which is an XR environment (e.g., that extends into the physical space around user 702). In some examples, user 702 is wearing computer system 700. In some examples, user 702 is holding computer system 700 in a position where one or more sensors of computer system 700 can detect the gaze of the user 702. In some examples, computer system 700 is a fitness tracking device, smart watch, tablet, personal computing system, laptop, HMD, and/or a set of AR glasses. In some examples, computer system 700 includes one or more components of devices (e.g., 1-112).

FIGS. 16A-16G illustrate several scenarios in which user 702 performs a hand input and a determination is made as to whether user eyes are opened, have been closed for a threshold period of time, or for a threshold period of time. In some examples, when a determination is made that the user's eyes are opened, computer system 700 performs a first operation in response to detecting the hand input. In some examples, when a determination is made that the user's eyes have been closed for less than the threshold period of time, computer system 700 also performs the first operation in response to detecting the hand input. However, in some examples, when a determination is made that the user's eyes have been closed for more than the threshold period of time, computer system 700 does not perform the first operation in response to detecting the hand input. In some examples, when a determination is made that the user's eyes have been closed for more than the threshold period of time, computer system 700 perform an operation that is different from the first operation (e.g., an operation that is not performed when a determination is made that the user's eyes is opened for less than the predetermined of time or opened) in response to detecting the hand input. In some examples, allowing a user to perform an operation based on the hand input and a determination that based on a determination of whether the user's eyes are closed for more or less than the threshold period of time allows the computer system that are more likely to be aligned with the intent of the user. In some examples, these determinations allow the computer system to disambiguate between whether the user is blinking or have their eyes closed while a hand input is being performed. If it is determined that the user's is blinking while the hand input is being performed, the computer system can perform the same operation as if the user had not blinked while the hand input was performed. However, if it is determined that the user is not blinking, the computer system does not perform the same operation as if the user had not blinked while the hand input was performed.

Figure 16A:
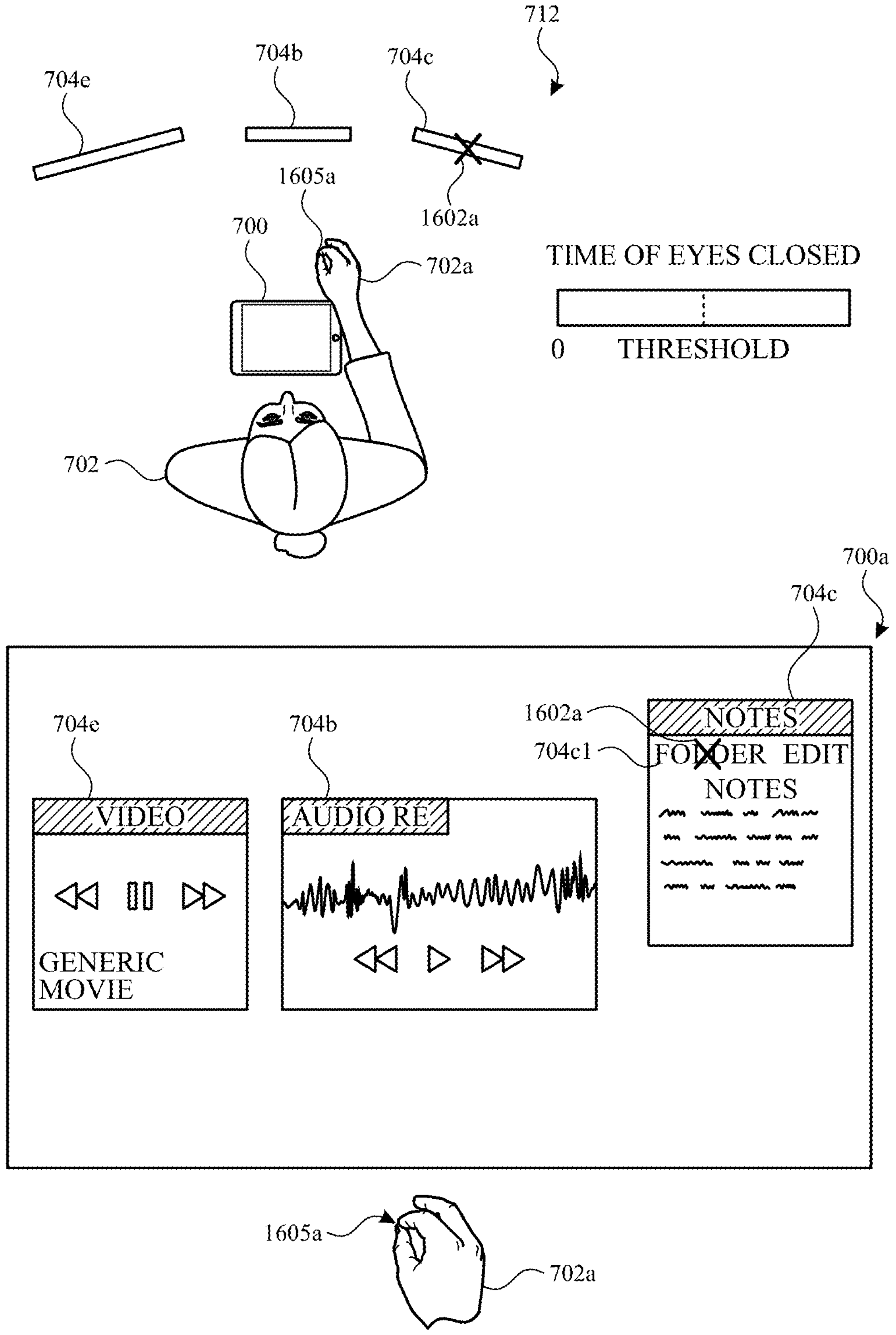
FIGS. 16A-16G illustrate exemplary user interfaces for managing gaze directed inputs in accordance with some embodiments.
Figure 17:
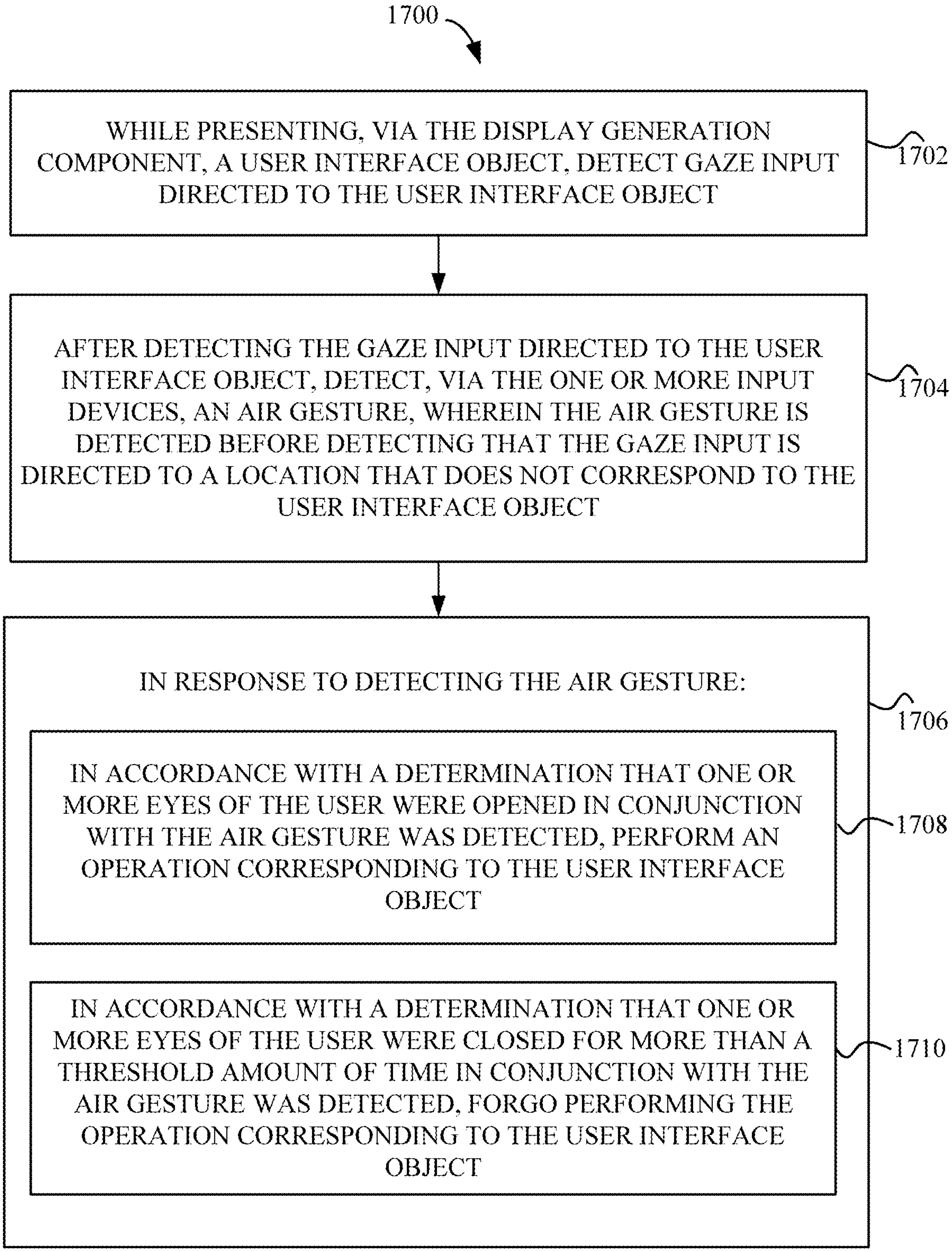
FIG. 17 is a flow diagram illustrating a method for managing gaze directed inputs in accordance with some embodiments.

As illustrated in FIG. 16A, in addition to computer system 700 and user 702, environment 712 includes virtual object 704*e*, virtual object 704*b*, and virtual object 704*c*, which computer system 700 presents via viewpoint 700*a*. In some examples, computer system 700 presents content included in viewpoint 700*a* via a display generation component 700*a*. In some examples, the display generation component is a translucent and/or transparent display that allows one or more physical objects to "pass-through," such that the one or more physical objects are visible to the user (e.g., in an AR environment). In some examples, the display generation component is not a translucent and/or transparent display and does not allow the physical object to "pass-through" (e.g., in a VR environment).

Figure 16B:
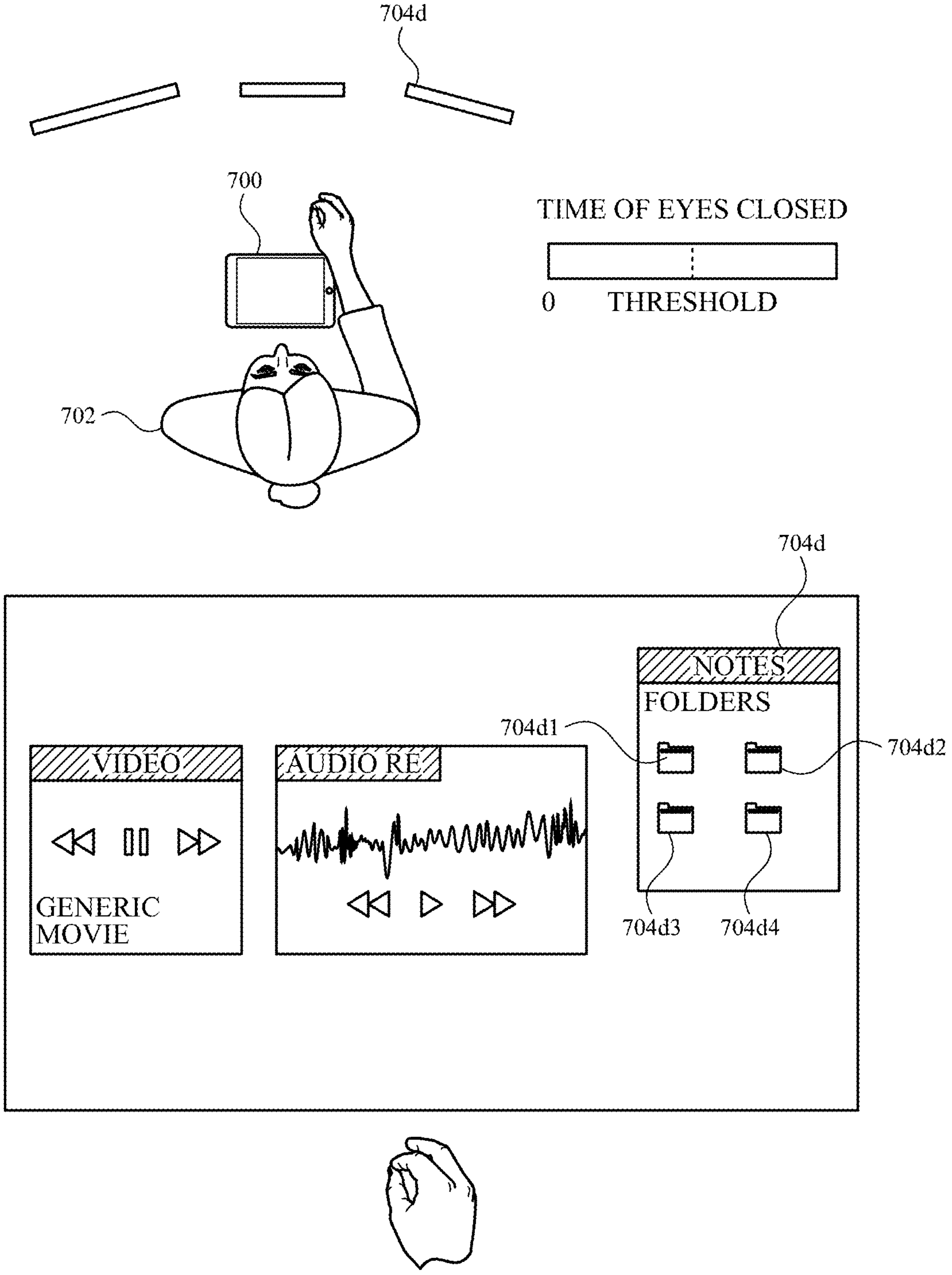

FIGS. 16A-16B illustrate a scenario in which a computer system 700 performs an operation in response to detecting a hand input while the eyes of a user are open. At FIG. 16A, computer system 700 detects hand input 1605*a* (by right hand 702*a*) while the eyes of user 702 are open and a determination is made that the user has been looking at folder control 704*c*1 for more than a threshold period of time. In some examples, detecting that user 702 is looking at notes application virtual object 704*c* includes detecting eyes of user 702 are directed to folder control 704*c*1 of notes application virtual object 704*c*. In some examples, detecting that user 702 is looking at folder control 704*c*1 includes detecting that eyes of user 702 are positioned at gaze position 1602*a* for more than the threshold period of time.

In some examples, detecting that user 702 is not looking at folder control 704*c*1 includes detecting that eyes of user 702 are positioned at gaze position 1602*a* for less than the threshold period of time and/or detecting that eyes of user 702 are not positioned at gaze position 1602*a*. In some examples, detecting that user 702 is not looking at folder control 704*c*1 causes computer system 700 to reset the threshold period of time until computer system 700 detects that the eyes of user 702 are positioned at gaze position 1602*a* for more than the threshold period of time. In some examples, the threshold period of time is a predetermined (and in some examples, automatic) non-zero time (e.g., 0.01-60 seconds). It should be understood that the above description of detecting user 702 is looking at notes application virtual object 704*c* is being described for exemplary purposes only, and in some examples, a similar process can be completed for additional virtual objects (e.g., video application virtual object 704*c* and/or audio application virtual object 704*b*) and/or additional gaze positions on the corresponding virtual object.

In some examples, computer system 700 detecting hand input 1605*a* includes detecting user 702 performing a gesture by a hand in three-dimensional environment 612. In some examples, hand input 1605*a* includes the hand performing a gesture that is not directed towards a particular control or application. In some examples, hand input 1605*a* includes the hand performing an air gesture (e.g., an air pinch, air tap, and/or air flick). It should be understood that hand inputs are being described for exemplary purposes only and, in some examples, other types of inputs and/or inputs performed by other body parts (e.g., including inputs from a right hand, foot, and/or head) of user 702 can be detected and cause (or not cause) computer system 700 to perform operations using techniques similar to those described in relation to FIGS. 16A-16G.

As illustrated in FIG. 16B, computer system 700 performs an operation in response to detecting hand input 1605 because the determination is made that the user has been looking at folder control 704*c*1 for more than a threshold period of time and the user's eyes were opened while (and/or before) hand input 1605*a* was detected. At FIG. 16B, the operation performed includes displaying notes application virtual object 704*d*, which includes folders 704*d*1-704*d*4. In some examples, computer system 700 sends data corresponding to hand input 1605*a* to notes application virtual object 704*c*. In some examples, computer system 700 sends an indication that the eyes of user 702 were opened while hand input 1605*a* was received.

Figure 16C:
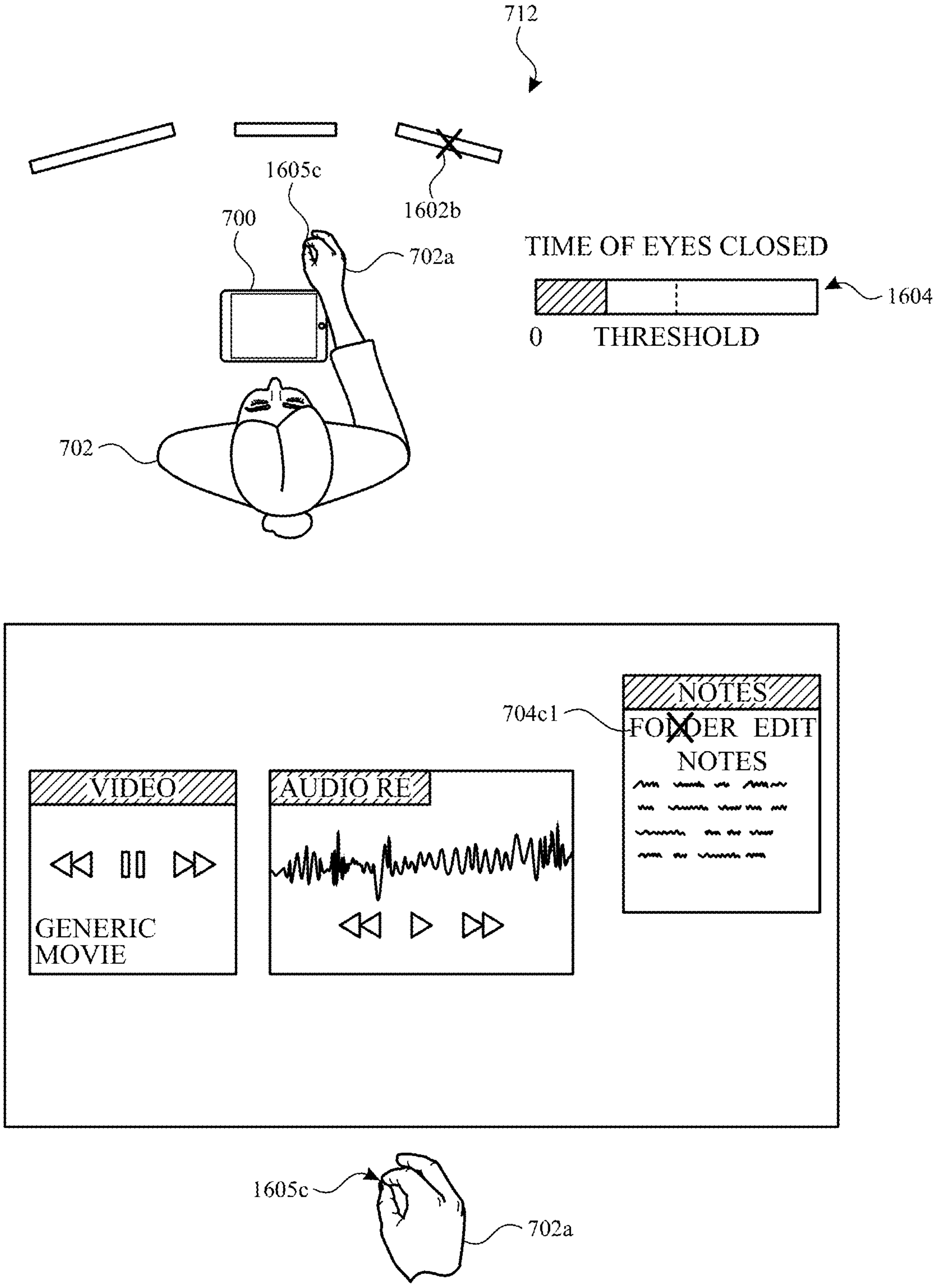
Figure 16D:
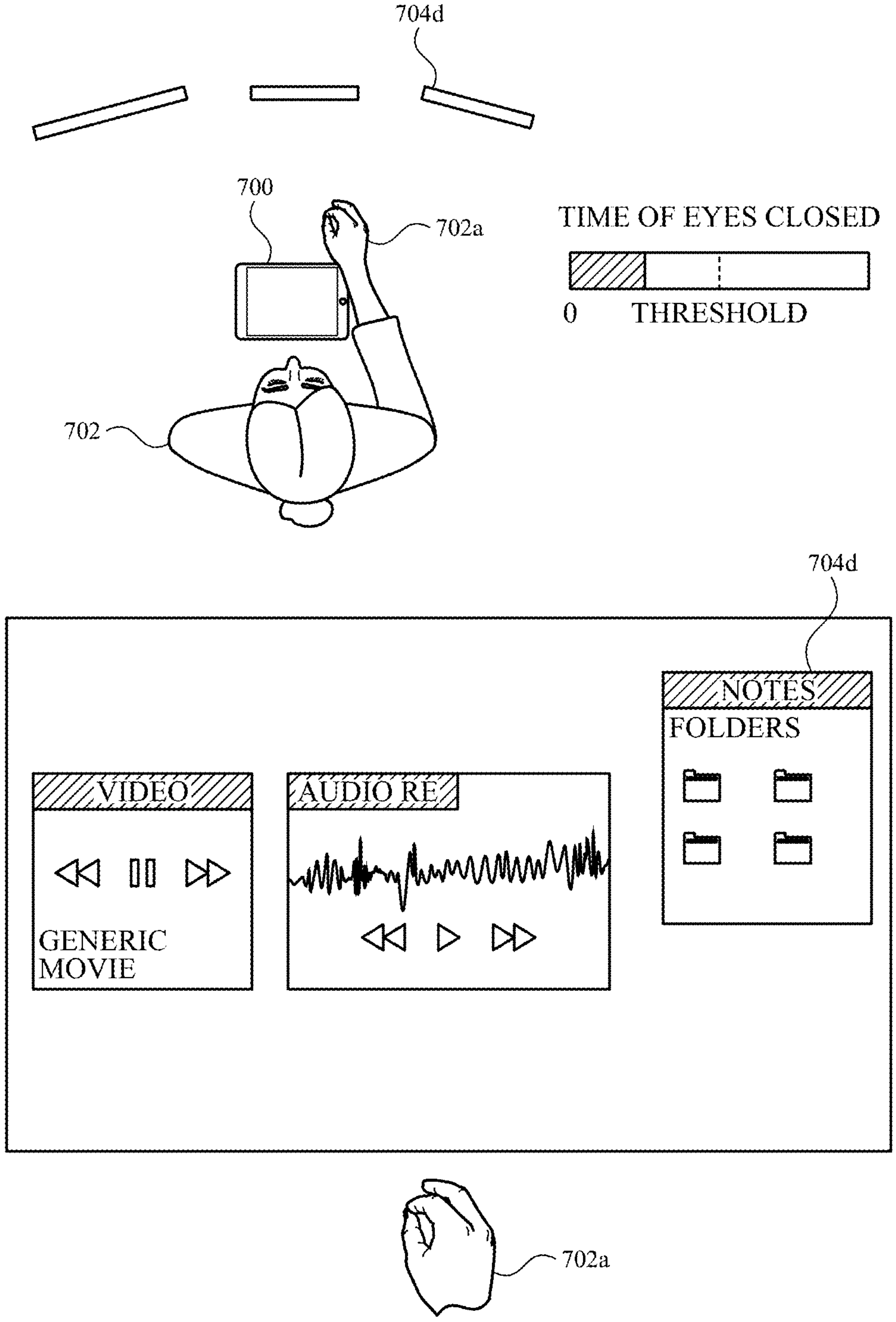

FIGS. 16C-16D illustrate one or more scenarios where a computer system performs an operation based on detecting which application a user is looking at before a user blinked while detecting a hand input. As illustrated in FIG. 16C, computer system 700 detects the eyes of user 702 are closed in environment 612. At FIG. 16C, computer system 700 detects hand input 1605*c* while the eyes of user 702 are closed. At FIG. 16C, a determination is made that the eyes of user 702 have been closed for less than the blink threshold period of time (e.g., as indicated by time of eyes closed meter 1604 being filled less than halfway). Moreover, a determination is made that user 702 was looking at folder control 704*c*1 for more than the threshold period of time before the eyes of user 702 were closed.

As illustrated in FIG. 16D, because the determination was made that user 702 closed their eyes for less than a blink threshold period of time while detecting hand input 1605*c*, computer system 700 performs the operation corresponding to hand input 1605*c* and folder control 704*c*1, which includes displaying notes application virtual object 704*d* (e.g., same operation described above in relation to FIG. 16B). Thus, although the user is blinking at FIGS. 16D, computer system 600 performs the same operation as the operation that was performed while the user's eyes were opened while hand input 1605*a* was being detected (e.g., as described above in relation to FIGS. 16A-16B). In some examples, at FIGS. 16A-16D computer system 700 performs the operation corresponding to the respective hand input without detecting the respective hand input is directed towards any particular control. In some examples, irrespective of the respective hand input not directed towards any particular control, a determination is made of which operation to perform including a determination of which control a user 702 was looking at and sending the input to that application.

Figure 16E:
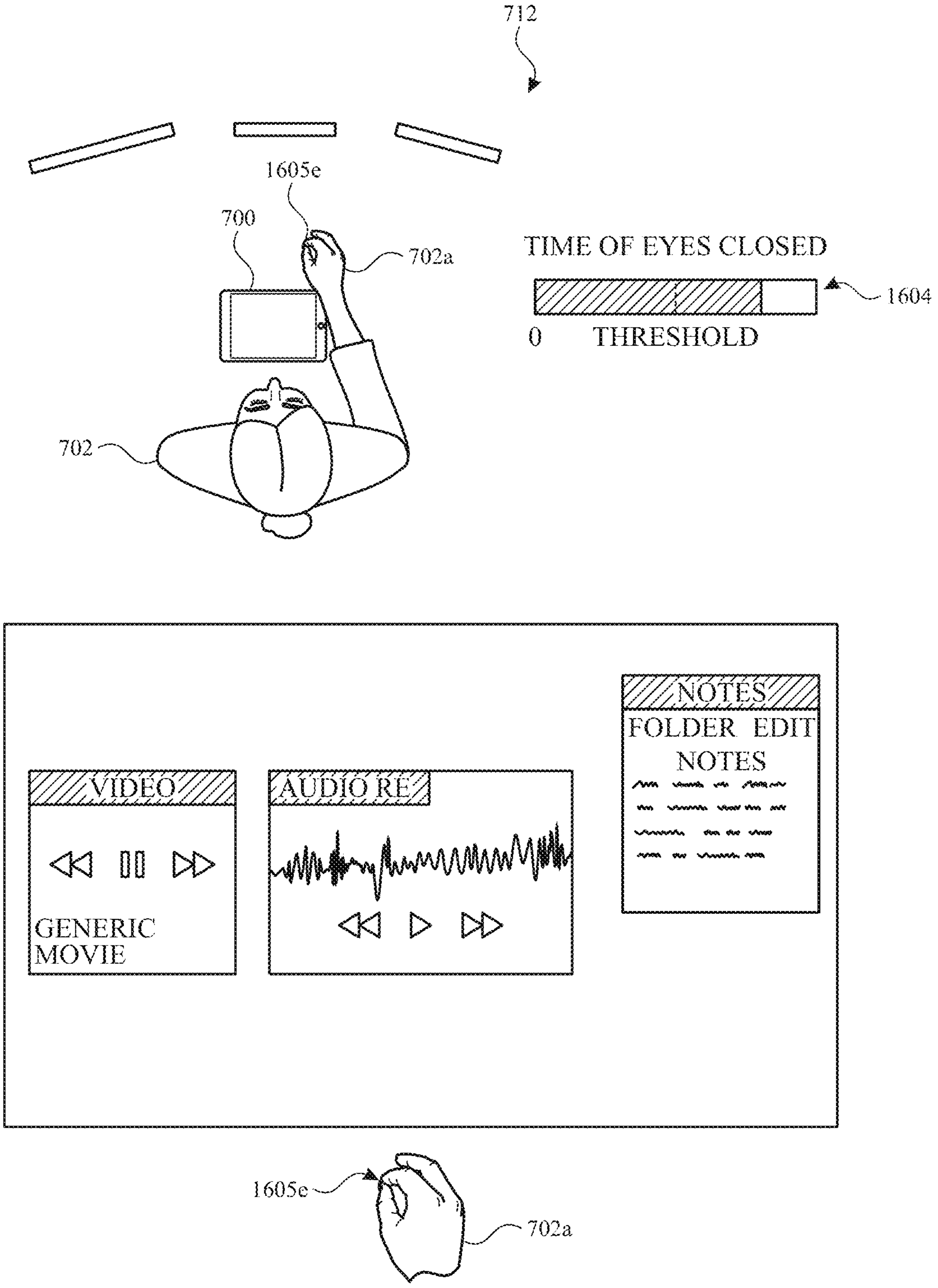
Figure 16F:
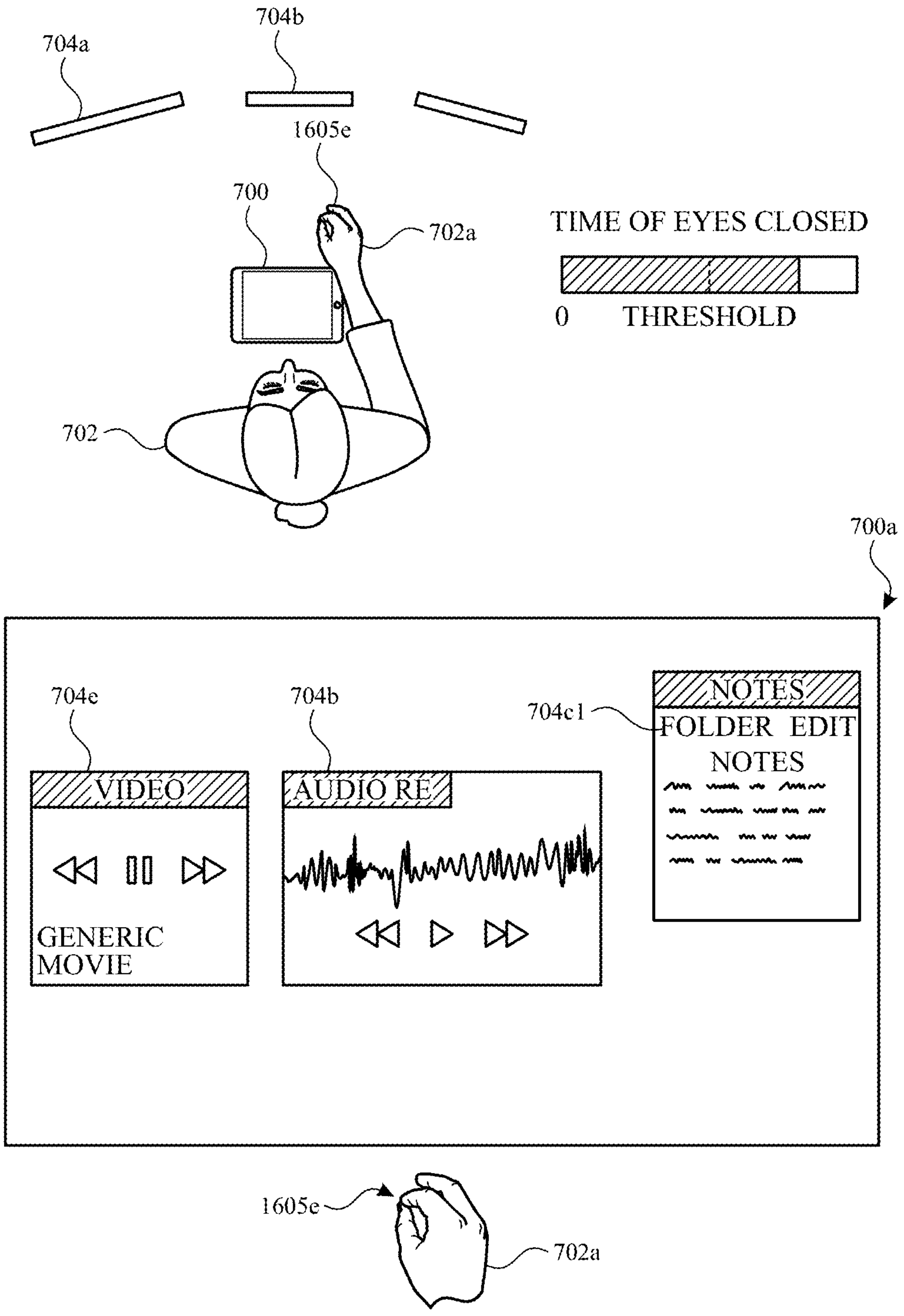
Figure 16G:
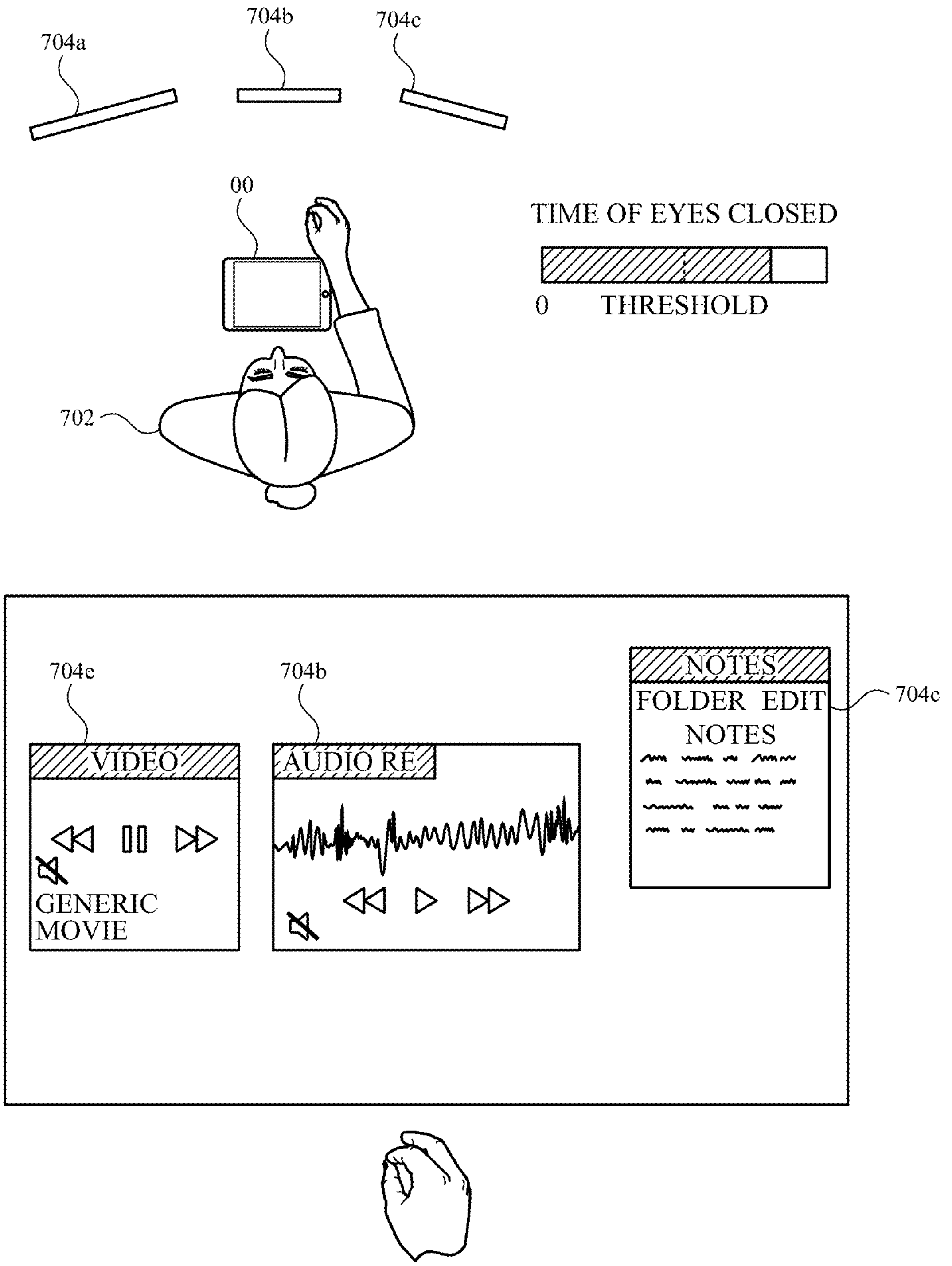

FIGS. 16E-16G illustrate one or more scenarios where a computer system performs no operation (or a different operation) based on which application a user was looking at and the user closing their eyes while detecting a hand input.

As illustrated in FIG. 16E, computer system 700 detects the eyes of user 702 are closed in environment 712. At FIG. 16E, computer system 700 detects hand input 1605*e* while the eyes of user 702 are closed. At FIG. 16E, a determination is made the eyes of user 702 have been closed for more than the blink threshold period time. At FIG. 16E, time of eyes closed meter 1604 indicates the time of eyes closed as over the blink threshold period of time. In some examples, computer system 700 detecting hand input 1605*e* includes detecting user 702 performing a gesture by left hand 702*a* in three-dimensional environment 612.

As illustrated in FIG. 16F, because the determination was made that user 702 closed their eyes for more than the blink threshold period of time while detecting hand input 1605*e*, computer system 700 does not perform the operation corresponding to hand input 1605*c*, which includes not performing the operation discussed above with respect to FIG. 16B. In this example, computer system 700 continues to display notes application virtual object 704*c* (e.g., FIGS. 16E-16F).

FIG. 16G illustrates an alternative to FIG. 16F, where computer system 700 performs a different operation when a determination is made that the eyes of the user were closed for more than the blink threshold period of time. As illustrated in FIG. 16G, because the determination was made that user 702 closed their eyes for more than the blink threshold period of time while detecting hand input 1605*c*, computer system 700 mutes (e.g., as indicated by mute indicators 1608) the audio application virtual object 704*b* and video application virtual object 704*c*. Notably, muting the audio application virtual object 704*b* and video application virtual object 704*e* is different from the operation than the operation that was performed when the user's eyes were closed (e.g., at FIGS. 16A-16B). Thus, in some examples, computer system 700 sends hand input 1605*e* to one or more applications and/or virtual objects that are active on computer system 700 and/or that computer system 700 is displayed. In some examples, computer system 700 sends hand input 1605*e* to applications visible in viewpoint 700*a* (e.g., video application virtual object 704*e*, audio application virtual object 704*b*, and/or notes application virtual object 704*c*). In some examples, computer system 700 sends an indication that the user's eyes were closed for more than the blink threshold period of time.

FIG. 17 is a flow diagram illustrating a method (e.g., method 1700) for gaze directed inputs in accordance with some examples. Some operations in method 1700 are, optionally, combined, the orders of some operations are, optionally, changed, and some operations are, optionally, omitted.

As described below, method 1700 provides an intuitive way for gaze directed inputs. Method 1700 reduces the cognitive burden on a user for gaze directed inputs, thereby creating a more efficient human-machine interface. For battery-operated computing devices, enabling a user to provide gaze directed inputs faster and more efficiently conserves power and increases the time between battery charges. In some examples, method 1700 is performed at a computer system (e.g., 700) (e.g., as described above in relation to method 800) that is in communication with a display generation component (e.g., 120, 1-122*a* and/or 1-122*b*) (e.g., a projector, a display, a display screen, a touch-sensitive display, and/or a transparent display) and one or more input devices (e.g., as described above in relation to method 800).

At 1702, while presenting (e.g., displaying, providing, and/or allowing the object to be shown (e.g., via a transparent display and/or via a display where the opacity of the display is adjustable)), via the display generation component, a user interface object (e.g., 704*a*, 704*b*, and/or 704*d*) (e.g., a physical object, virtual object, an object corresponding to an application, a three-dimensional object, and/or a two-dimensional object), the computer system detects gaze input (e.g., as indicated by gaze position 1602*a* and/or 1602*b*) directed to the user interface object.

At 1704, after detecting the gaze input (e.g., as indicated by gaze position 1602*a* and/or 1602*b*) directed to the user interface object (e.g., 704*a*, 704*b*, and/or 704*d*), the computer system detects, via the one or more input devices, an air gesture (e.g., 1605*a*, 1605*c*, and/or 1605*c*) (e.g., an air tap, an air swipe, a hand input, an air pinch input, a hand clench input, and/or a rotating air input) (and, in some examples, directed to a user interface object), wherein the air gesture is detected before detecting that the gaze input is directed to a location that does not correspond to the user interface object (and/or, in some examples, before detecting that at least one of the user's eyes is closed, before detecting that a user is not looking at the user interface object, and/or before detecting that the user's eyes are looking away).

At 1706, in response to detecting the air gesture (e.g., 1605*a*, 1605*c*, and/or 1605*c*), in accordance with (at 1708) a determination that one or more (at least one or, in some examples, both and/or all) eyes of the user (e.g., 702) were opened in conjunction with (e.g., while, a period of time before, a period of time after, and/or a period of time before detecting the air gesture) the air gesture (e.g., 1605*a*, 1605*c*, and/or 1605*e*) being detected, the computer system performs an operation (e.g., as described above in relation to method 800) corresponding to the user interface object (e.g., 704*a*, 704*b*, and/or 704*d*)

At 1706, in response to detecting the air gesture (e.g., 1605*a*, 1605*c*, and/or 1605*c*), in accordance with (at 1710) a determination that one or more (and, in some examples, both and/or all) eyes of the user (e.g., 702) were closed for more than a threshold amount of time (e.g., 0.1-3 seconds) in conjunction with (e.g., while, a period of time before, a period of time after, and/or a period of time before and detecting the air gesture) the air gesture (e.g., 1605*a*, 1605*c*, and/or 1605*c*) being detected, the computer system forgoes performing the operation corresponding to the user interface object (e.g., 704*a*, 704*b*, and/or 704*d*). Performing an operation corresponding to the user interface object in accordance with a determination that one or more eyes of the user were opened in conjunction with the air gesture being detected or not performing the operation corresponding to the user interface object in accordance with a determination that one or more eyes of the user were closed for more than a threshold amount of time in conjunction with the air gesture being detected allows the computer system to automatically perform or not perform an operation as directed and enables the computer system to reduce the amount of operations that are performed in response to detecting unintended inputs, thereby providing additional control options without cluttering the user interface with additional displayed controls and performing an operation when a set of conditions has been met.

In some examples, in response to detecting the air gesture (e.g., 1605*a*, 1605*c*, and/or 1605*c*), in accordance with a determination that one or more eyes of the user (e.g., 702) were not closed for more than the threshold amount of time in conjunction with the air gesture being detected, the computer system performs the operation corresponding to the user interface object (e.g., 704*a*, 704*b*, and/or 704*d*). In some examples, in response to detecting the air gesture and in accordance with a determination that one or more eyes of the user were not closed for more than the threshold amount of time while the air gesture was detected, the computer system does not perform the operation corresponding to the user interface object. Performing the operation corresponding to the user interface object in accordance with a determination that one or more eyes of the user were not closed for more than the threshold amount of time in conjunction with the air gesture being detected allows the computer system to automatically perform or not perform an operation as directed and enables the computer system to reduce the amount of operations that are performed in response to detecting unintended inputs, thereby providing additional control options without cluttering the user interface with additional displayed controls and performing an operation when a set of conditions has been met.

In some examples, in response to detecting the air gesture (e.g., 1605*a*, 1605*c*, and/or 1605*e*), in accordance with a determination that one or more eyes of the user (e.g., 702) were closed for more than the threshold amount of time in conjunction with the air gesture being detected, the computer system performs a second operation that is different from the operation corresponding to the user interface object (e.g., 704*a*, 704*b*, and/or 704*d*). In some examples, the second operation includes muting one or more applications, ceasing to display one or more applications, moving operation of one or more operations from the foreground to the background, and/or deleting one or more applications. Performing a second operation corresponding to the user interface object in accordance with a determination that one or more eyes of the user were closed for more than the threshold amount of time in conjunction with the air gesture being detected allows the computer system to automatically perform or not perform an operation as directed and enables the computer system to reduce the amount of operations that are performed in response to detecting unintended inputs, thereby providing additional control options without cluttering the user interface with additional displayed controls and performing an operation when a set of conditions has been met.

In some examples, the second operation does not correspond to (and/or is not associated with) the user interface object (e.g., 704*a*, 704*b*, and/or 704*d*). In some examples, the second operation corresponds to the user interface object. In some examples, the second operation corresponds to a system operation (e.g., of a system and/or system process of the computer system) and/or an operation that is not associated with any particular user interface object.

In some examples, in response to detecting the air gesture (e.g., 1605*a*, 1605*c*, and/or 1605*c*), in accordance with a determination that one or more eyes of the user (e.g., 702) were not closed for more than the threshold amount of time in conjunction with the air gesture being detected, the computer system forgoes performing the second operation. In some examples, in response to detecting the air gesture and in accordance with a determination that one or more eyes of the user were not closed for more than the threshold amount of time in conjunction with the air gesture being detected, the computer does not mute one or more applications, cease to display one or more applications, move operation of one or more operations from the foreground to the background, and/or delete one or more applications. Not performing the second operation in accordance with a determination that one or more eyes of the user were not closed for more than the threshold amount of time in conjunction with the air gesture being detected allows the computer system to automatically perform or not perform an operation as directed and enables the computer system to reduce the amount of operations that are performed in response to detecting unintended inputs, thereby providing additional control options without cluttering the user interface with additional displayed controls and performing an operation when a set of conditions has been met.

In some examples, in response to detecting the air gesture (e.g., 1605*a*, 1605*c*, and/or 1605*c*), in accordance with a determination that one or more eyes of the user (e.g., 702) were opened in conjunction with the air gesture being detected, the computer system forgoes performing the second operation. In some examples, in response to detecting the air gesture and in accordance with a determination that one or more eyes of the user were not closed for more than the threshold amount of time in conjunction with the air gesture being detected, the computer does not mute one or more applications, cease to display one or more applications, move operation of one or more operations from the foreground to the background, and/or delete one or more applications. Not performing the second operation in accordance with a determination that one or more eyes of the user were opened in conjunction with the air gesture being detected allows the computer system to automatically perform or not perform an operation as directed and enables the computer system to reduce the amount of operations that are performed in response to detecting unintended inputs, thereby providing additional control options without cluttering the user interface with additional displayed controls and performing an operation when a set of conditions has been met.

In some examples, the user interface object (e.g., 704*a*, 704*b*, and/or 704*d*) is presented concurrently with a first user interface corresponding to a first application (e.g., 704*a*, 704*b*, and/or 704*d*) and a second user interface corresponding a second application (e.g., 704*a*, 704*b*, and/or 704*d*) different from the first user interface. In some examples, the gaze input (e.g., as indicated by gaze position 1602*a* and/or 1602*b*) directed to the user interface object is detected while the first user interface corresponding to the first application and the second user interface corresponding to the second application is concurrently being presented. In some examples, performing the operation corresponding to the user interface object includes, in accordance with a determination that one or more eyes of the user (e.g., 702) were opened in conjunction with the air gesture (e.g., 1605*a*, 1605*c*, and/or 1605*e*) being detected and that the user interface object was displayed as a part of the first user interface corresponding to the first application (and, in some examples, the user interface object was not a part of the second user interface corresponding to the second application) (and, in some examples, that the gaze input was directed to the first user interface corresponding to the first application while the gaze input was detected as being directed to the user interface object), sending a first indication that the air gesture was detected to one or more processes corresponding to the first application (e.g., without sending the indication that the air gesture was detected to one or more processes corresponding to the second application and/or another application different from the first application). In some examples, performing the operation corresponding to the user interface object includes, in accordance with a determination that one or more eyes of the user (e.g., 702) were opened in conjunction with the air gesture being detected and that the user interface object was displayed as a part of the second user interface corresponding to the second application (and, in some examples, the user interface object was not a part of the first user interface corresponding to the first application) (and, in some examples, that the gaze input was directed to the second user interface corresponding to the second application while the gaze input was detected as being directed to the user interface object), sending the first indication that the air gesture was detected to one or more processes corresponding to the second application (e.g., without sending the indication that the air gesture was detected to one or more processes corresponding to the first application and/or another application different from the second application). Sending a first indication that the air gesture was detected to one or more processes corresponding to the first application in accordance with a determination that one or more eyes of the user were opened in conjunction with the air gesture being detected and that the user interface object was displayed as a part of the first user interface corresponding to the first application or sending the first indication that the air gesture was detected to one or more processes corresponding to the second application in accordance with a determination that one or more eyes of the user were opened in conjunction with the air gesture being detected and that the user interface object was displayed as a part of the second user interface corresponding to the second application allows the computer system to automatically send indications to one or more applications, thereby providing additional control options without cluttering the user interface with additional displayed controls and performing an operation when a set of conditions has been met.

In some examples, the user interface object (e.g., 704*a*, 704*b*, and/or 704*d*) is presented concurrently with a third user interface corresponding to a third application (e.g., 704*a*, 704*b*, and/or 704*d*) and a fourth user interface corresponding to a fourth application (e.g., 704*a*, 704*b*, and/or 704*d*) different from the third user interface. In some examples, the gaze input (e.g., as indicated by gaze position 1602*a* and/or 1602*b*) directed to the user interface object is detected while the third user interface corresponding to the third application and the fourth user interface directed to the fourth application is concurrently being presented. In some examples, in response to detecting the air gesture (e.g., 1605*a*, 1605*c*, and/or 1605*e*), in accordance with a determination that one or more eyes of the user (e.g., 702) were closed for more than the threshold amount of time in conjunction with the air gesture being detected, the computer system sends an indication that the air gesture was detected to one or more processes corresponding to the third application and the fourth application. In some examples, in accordance with a determination that one or more eyes of the user were closed for more than the threshold amount of time in conjunction with the air gesture being detected, the computer system performs an operation with the third application and the fourth application (e.g., an operation with the third application and an operation with the fourth application), including ceasing to display one or more user interface objects corresponding to the third application and the fourth application and/or muting volume and/or sound output via the third application and/or the fourth application. Sending an indication that the air gesture was detected to one or more processes corresponding to the third application and the fourth application in accordance with a determination that one or more eyes of the user were closed for more than the threshold amount of time in conjunction with the air gesture being detected allows the computer system to automatically send indications to one or more applications, thereby providing additional control options without cluttering the user interface with additional displayed controls and performing an operation when a set of conditions has been met.

In some examples, in response to detecting the air gesture (e.g., 1605*a*, 1605*c*, and/or 1605*c*), in accordance with a determination that one or more eyes of the user (e.g., 702) were closed for more than the threshold amount of time in conjunction with the air gesture being detected, the computer system sends an indication that the one or more eyes of the user were closed (e.g., for more than the threshold period of time) to the one or more processes corresponding to the third application (e.g., 704*a*, 704*b*, and/or 704*d*) and the fourth application (e.g., 704*a*, 704*b*, and/or 704*d*). In some examples, the indication that the one or more eyes of the user were closed is sent with the indication that the air gesture was detected to one or more processes corresponding to the first application and the second application. In some examples, the indication that the one or more eyes of the user were closed is sent to indicate and/or includes an indication that the input was not directed to a particular user interface object. In some examples, in accordance with a determination that one or more eyes of the user were closed for more than the threshold amount of time in conjunction with the air gesture being detected, the computer system, the computer system does not perform a type of operation, such as a destructive operation (e.g., an operation that requires heighten security, deleting, removing, and/or a non-reversible operation), selects a different operation to perform other than the operation, such as an operation that corresponds to the second operation as described above, and/or provides an alert in response to detecting that the user has opened their eyes. In some examples, the alert indicates that one or more operations were not performed and/or that the user's eyes were closed when the air gesture was made. Sending an indication that the one or more eyes of the user were closed to the one or more processes corresponding to the third application and the fourth application in accordance with a determination that one or more eyes of the user were closed for more than the threshold amount of time in conjunction with the air gesture being detected allows the computer system to control multiple applications including sending data that the user's eyes were closed allows the computer system to automatically send indications to one or more applications, thereby providing additional control options without cluttering the user interface with additional displayed controls and performing an operation when a set of conditions has been met.

In some examples, in response to detecting the air gesture (e.g., 1605*a*, 1605*c*, and/or 1605*e*), in accordance with a determination that one or more eyes of the user (e.g., 702) were closed for more than the threshold amount of time in conjunction with the air gesture being detected, the computer system sends an indication of a last user interface object (e.g., 704*a*, 704*b*, and/or 704*d*) to which a gaze input (e.g., as indicated by gaze position 1602*a* and/or 1602*b*) was detected before a determination was made that one or more eyes of the user were closed to the one or more processes corresponding to the third application (e.g., 704*a*, 704*b*, and/or 704*d*) and the fourth application (e.g., 704*a*, 704*b*, and/or 704*d*) (and/or, in some examples, sending the input with an indication of the last user interface object at which the user was looking). Sending an indication of a last user interface object to which a gaze input was detected before a determination was made that one or more eyes of the user were closed to the one or more processes corresponding to the third application and the fourth application in accordance with a determination that one or more eyes of the user were closed for more than the threshold amount of time in conjunction with the air gesture being detected allows the computer system to automatically send indications to one or more applications, thereby providing additional control options without cluttering the user interface with additional displayed controls and performing an operation when a set of conditions has been met.

In some examples, in response to detecting the air gesture (e.g., 1605*a*, 1605*c*, and/or 1605*c*), in accordance with a determination that one or more eyes of the user (e.g., 702) were closed for less than the threshold amount of time in conjunction with the air gesture being detected and a respective gaze input (e.g., as indicated by gaze position 1602*a* and/or 1602*b*) was directed to the third application (e.g., 704*a*, 704*b*, and/or 704*d*) before (e.g., immediately before) the one or more eyes of the user were closed, the computer system sends the indication that the air gesture was detected to one or more processes corresponding to the third application without sending the indication that the air gesture was detected to one or more processes corresponding to the fourth application (e.g., 704*a*, 704*b*, and/or 704*d*). In some examples, in response to detecting the air gesture (e.g., 1605*a*, 1605*c*, and/or 1605*c*), in accordance with a determination that one or more eyes of the user were closed for less than the threshold amount of time in conjunction with the air gesture being detected and the respective gaze input was directed to the fourth application before (e.g., immediately before) the one or more eyes of the user were closed, the computer system sends the indication that the air gesture was detected to one or more processes corresponding to the third application without sending the indication that the air gesture was detected to one or more processes corresponding to the fourth application. In some examples, in response to receiving the input, the fourth application closes, causes output of media to be muted, ceases to operate in the foreground, starts operating in the background, performs a deletion operation, and/or is deleted. Sending the indication that the air gesture was detected to one or more processes corresponding to the third application without sending the indication that the air gesture was detected to one or more processes corresponding to the fourth application or sending the indication that the air gesture was detected to one or more processes corresponding to the third application without sending the indication that the air gesture was detected to one or more processes corresponding to the fourth application in accordance with a determination that one or more eyes of the user were closed for less than the threshold amount of time in conjunction with the air gesture being detected and the respective gaze input was directed to the fourth application before the one or more eyes of the user were closed allows the computer system to automatically send indications to one or more applications, thereby providing additional control options without cluttering the user interface with additional displayed controls and performing an operation when a set of conditions has been met.

In some examples, after detecting the gaze input (e.g., as indicated by gaze position 1602*a* and/or 1602*b*) directed to the user interface object (e.g., 704*a*, 704*b*, and/or 704*d*), the computer system detects, via the one or more inputs devices, a touch input directed to the user interface object (e.g., as described above in FIGS. 16E-16F). In some examples, in response to detecting the touch input directed to the user interface object, in accordance with a determination that one or more eyes of the user (e.g., 702) were opened while the touch input was detected, the computer system performs the operation corresponding to the user interface object. In some examples, in response to detecting the touch input directed to the user interface object, in accordance with a determination that one or more eyes of the user were closed for more than a threshold amount of time while the touch input was detected, the computer system performs the operation corresponding to the user interface object. In some examples, the operation is performed irrespective as to whether the user's eyes were closed for more than the threshold amount of time. Performing the operation corresponding to the user interface object in accordance with a determination that one or more eyes of the user were closed for more than a threshold amount of time while the touch input was detected or performing the operation corresponding to the user interface object in accordance with a determination that one or more eyes of the user were opened while the touch input was detected allows the computer system to provide a user with a control option to perform the operation irrespective of the state of the user's eyes, thereby providing additional control options without cluttering the user interface with additional displayed controls, reducing the number of inputs needed to perform an operation, and performing an operation when a set of conditions has been met.

Note that details of the processes described above with respect to method 1700 (e.g., FIG. 17) are also applicable in an analogous manner to the methods described herein. For example, method 1500 optionally includes one or more of the characteristics of the various methods described above with reference to method 1700. For example, one or more steps of method 1500 can be used to allow interactions while using a virtual controller and perform different operations when using the virtual controller based on how long the eyes of the user have been closed using one or more steps of method 1700. For brevity, these details are not repeated below.

The foregoing description, for purpose of explanation, has been described with reference to specific examples. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to improve user interaction and available actions to a user when using user interfaces. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to deliver additional and/or alternative user interactions that correspond to how a user uses the device. Accordingly, use of such personal information data enables users to have calculated input profiles. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of providing additional user controls, the present technology can be configured to allow users to select to "opt in" or "opt out" of participation in the collection of personal information data during registration for services or anytime thereafter. In another example, users can select not to provide input intent data for targeted content delivery services. In yet another example, users can select to limit the length of time input intent related user data is maintained or entirely prohibit the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, user interactions can be customized to users by inferring preferences based on non-personal information data or a bare minimum amount of personal information, such as the content being requested by the device associated with a user, other non-personal information available to the user input services, or publicly available information.

What is claimed is:

1. A method, comprising:

at a computer system that is in communication with a display generation component and one or more input devices:

while presenting, via the display generation component, a user interface object, detecting a gaze input directed to the user interface object;

after detecting the gaze input directed to the user interface object, detecting, via the one or more input devices, an air gesture, wherein the air gesture is detected before detecting that the gaze input is directed to a location that does not correspond to the user interface object; and in response to detecting the air gesture:

in accordance with a determination that one or more eyes of the user were opened in conjunction with the air gesture being detected, selecting the user interface object; and in accordance with a determination that one or more eyes of the user were closed for more than a threshold amount of time in conjunction with the air gesture being detected, forgoing selection of the user interface object; and repeating the method until the method is performed at least one time when the one or more eyes of the user were opened in conjunction with the respective air gesture being detected and at least one time when one or more eyes of the user were closed for more than the threshold amount of time in conjunction with the respective air gesture being detected.

2. The method of claim 1, further comprising:

in response to detecting the air gesture:

in accordance with a determination that one or more eyes of the user were not closed for more than the threshold amount of time in conjunction with the air gesture being detected, selecting the user interface object.

3. The method of claim 1, further comprising:

in response to detecting the air gesture:

in accordance with a determination that one or more eyes of the user were closed for more than the threshold amount of time in conjunction with the air gesture being detected, performing a second operation that is different from selection of the user interface object.

4. The method of claim 3, wherein the second operation does not correspond to the user interface object.

5. The method of claim 3, further comprising:

in response to detecting the air gesture:

in accordance with a determination that one or more eyes of the user were not closed for more than the threshold amount of time in conjunction with the air gesture being detected, forgoing performing the second operation.

6. The method of claim 3, further comprising:

in response to detecting the air gesture:

in accordance with a determination that one or more eyes of the user were opened in conjunction with the air gesture being detected, forgoing performing the second operation.

7. The method of claim 1, wherein:

the user interface object is presented concurrently with a first user interface corresponding to a first application and a second user interface corresponding to a second application different from the first user interface;

the gaze input directed to the user interface object is detected while the first user interface corresponding to the first application and the second user interface corresponding to the second application is concurrently being presented; and selecting the user interface object includes:

in accordance with a determination that one or more eyes of the user were opened in conjunction with the air gesture being detected and that the user interface object was displayed as a part of the first user interface corresponding to the first application, sending a first indication that the air gesture was detected to one or more processes corresponding to the first application; and in accordance with a determination that one or more eyes of the user were opened in conjunction with the air gesture being detected and that the user interface object was displayed as a part of the second user interface corresponding to the second application, sending the first indication that the air gesture was detected to one or more processes corresponding to the second application.

8. The method of claim 1, wherein:
the user interface object is presented concurrently with a third user interface corresponding to a third application and a fourth user interface corresponding to a fourth application different from the third user interface;
the gaze input directed to the user interface object is detected while the third user interface corresponding to the third application and the fourth user interface directed to the fourth application is concurrently being presented; and
the method further comprises:
in response to detecting the air gesture:
in accordance with a determination that one or more eyes of the user were closed for more than the threshold amount of time in conjunction with the air gesture being detected, sending an indication that the air gesture was detected to one or more processes corresponding to the third application and the fourth application.

9. The method of claim 8, further comprising:
in response to detecting the air gesture:
in accordance with a determination that one or more eyes of the user were closed for more than the threshold amount of time in conjunction with the air gesture being detected, sending an indication that the one or more eyes of the user were closed to the one or more processes corresponding to the third application and the fourth application.

10. The method of claim 8, further comprising:
in response to detecting the air gesture:
in accordance with a determination that one or more eyes of the user were closed for more than the threshold amount of time in conjunction with the air gesture being detected, sending an indication of a last user interface object to which a gaze input was detected before a determination was made that one or more eyes of the user were closed to the one or more processes corresponding to the third application and the fourth application.

11. The method of claim 8, further comprising:
in response to detecting the air gesture:
in accordance with a determination that one or more eyes of the user were closed for less than the threshold amount of time in conjunction with the air gesture being detected and a respective gaze input was directed to the third application before the one or more eyes of the user were closed, sending the indication that the air gesture was detected to one or more processes corresponding to the third application without sending the indication that the air gesture was detected to one or more processes corresponding to the fourth application; and
in accordance with a determination that one or more eyes of the user were closed for less than the threshold amount of time in conjunction with the air gesture being detected and the respective gaze input was directed to the fourth application before the one or more eyes of the user were closed, sending the indication that the air gesture was detected to one or more processes corresponding to the third application without sending the indication that the air gesture was detected to one or more processes corresponding to the fourth application.

12. The method of claim 1, further comprising:
after detecting the gaze input directed to the user interface object, detecting, via the one or more input devices, a touch input directed to the user interface object; and
in response to detecting the touch input directed to the user interface object:
in accordance with a determination that one or more eyes of the user were opened while the touch input was detected, selecting the user interface object; and
in accordance with a determination that one or more eyes of the user were closed for more than a threshold amount of time while the touch input was detected, selecting the user interface object.

13. A non-transitory computer-readable storage medium storing one or more programs configured to be executed by one or more processors of a computer system that is in communication with a display generation component and one or more input devices, the one or more programs including instructions for:
while presenting, via the display generation component, a user interface object, detecting a gaze input directed to the user interface object;
after detecting the gaze input directed to the user interface object, detecting, via the one or more input devices, an air gesture, wherein the air gesture is detected before detecting that the gaze input is directed to a location that does not correspond to the user interface object; and
in response to detecting the air gesture:
in accordance with a determination that one or more eyes of the user were opened in conjunction with the air gesture being detected, selecting the user interface object; and
in accordance with a determination that one or more eyes of the user were closed for more than a threshold amount of time in conjunction with the air gesture being detected, forgoing selection of the user interface object.

14. The non-transitory computer-readable storage medium of claim 13, the one or more programs further including instructions for:
in response to detecting the air gesture:
in accordance with a determination that one or more eyes of the user were not closed for more than the threshold amount of time in conjunction with the air gesture being detected, selecting the user interface object.

15. The non-transitory computer-readable storage medium of claim 13, the one or more programs further including instructions for:
in response to detecting the air gesture:
in accordance with a determination that one or more eyes of the user were closed for more than the threshold amount of time in conjunction with the air gesture being detected, performing a second operation that is different from selection of the user interface object.

16. The non-transitory computer-readable storage medium of claim 15, wherein the second operation does not correspond to the user interface object.

17. The non-transitory computer-readable storage medium of claim 15, the one or more programs further including instructions for:
in response to detecting the air gesture:
in accordance with a determination that one or more eyes of the user were not closed for more than the threshold amount of time in conjunction with the air gesture being detected, forgoing performing the second operation.

18. The non-transitory computer-readable storage medium of claim 15, the one or more programs further including instructions for:

in response to detecting the air gesture:

in accordance with a determination that one or more eyes of the user were opened in conjunction with the air gesture being detected, forgoing performing the second operation.

19. The non-transitory computer-readable storage medium of claim 13, wherein:

the user interface object is presented concurrently with a first user interface corresponding to a first application and a second user interface corresponding to a second application different from the first user interface;

the gaze input directed to the user interface object is detected while the first user interface corresponding to the first application and the second user interface corresponding to the second application is concurrently being presented; and selecting the user interface object includes:

in accordance with a determination that one or more eyes of the user were opened in conjunction with the air gesture being detected and that the user interface object was displayed as a part of the first user interface corresponding to the first application, sending a first indication that the air gesture was detected to one or more processes corresponding to the first application; and in accordance with a determination that one or more eyes of the user were opened in conjunction with the air gesture being detected and that the user interface object was displayed as a part of the second user interface corresponding to the second application, sending the first indication that the air gesture was detected to one or more processes corresponding to the second application.

20. The non-transitory computer-readable storage medium of claim 13, wherein:

the user interface object is presented concurrently with a third user interface corresponding to a third application and a fourth user interface corresponding to a fourth application different from the third user interface;

the gaze input directed to the user interface object is detected while the third user interface corresponding to the third application and the fourth user interface directed to the fourth application is concurrently being presented; and the one or more programs further including instructions for:

in response to detecting the air gesture:

in accordance with a determination that one or more eyes of the user were closed for more than the threshold amount of time in conjunction with the air gesture being detected, sending an indication that the air gesture was detected to one or more processes corresponding to the third application and the fourth application.

21. The non-transitory computer-readable storage medium of claim 20, the one or more programs further including instructions for:

in response to detecting the air gesture:

in accordance with a determination that one or more eyes of the user were closed for more than the threshold amount of time in conjunction with the air gesture being detected, sending an indication that the one or more eyes of the user were closed to the one or more processes corresponding to the third application and the fourth application.

22. The non-transitory computer-readable storage medium of claim 20, the one or more programs further including instructions for:

in response to detecting the air gesture:

in accordance with a determination that one or more eyes of the user were closed for more than the threshold amount of time in conjunction with the air gesture being detected, sending an indication of a last user interface object to which a gaze input was detected before a determination was made that one or more eyes of the user were closed to the one or more processes corresponding to the third application and the fourth application.

23. The non-transitory computer-readable storage medium of claim 20, the one or more programs further including instructions for:

in response to detecting the air gesture:

in accordance with a determination that one or more eyes of the user were closed for less than the threshold amount of time in conjunction with the air gesture being detected and a respective gaze input was directed to the third application before the one or more eyes of the user were closed, sending the indication that the air gesture was detected to one or more processes corresponding to the third application without sending the indication that the air gesture was detected to one or more processes corresponding to the fourth application; and in accordance with a determination that one or more eyes of the user were closed for less than the threshold amount of time in conjunction with the air gesture being detected and the respective gaze input was directed to the fourth application before the one or more eyes of the user were closed, sending the indication that the air gesture was detected to one or more processes corresponding to the third application without sending the indication that the air gesture was detected to one or more processes corresponding to the fourth application.

24. The non-transitory computer-readable storage medium of claim 13, the one or more programs further including instructions for:

after detecting the gaze input directed to the user interface object, detecting, via the one or more input devices, a touch input directed to the user interface object; and in response to detecting the touch input directed to the user interface object:

in accordance with a determination that one or more eyes of the user were opened while the touch input was detected, selecting the user interface object; and in accordance with a determination that one or more eyes of the user were closed for more than a threshold amount of time while the touch input was detected, selecting the user interface object.

25. A computer system that is in communication with a display generation component and one or more input devices, comprising:

one or more processors; and memory storing one or more programs configured to be executed by the one or more processors, the one or more programs including instructions for:

while presenting, via the display generation component, a user interface object, detecting a gaze input directed to the user interface object;

after detecting the gaze input directed to the user interface object, detecting, via the one or more input devices, an air gesture, wherein the air gesture is detected before detecting that the gaze input is directed to a location that does not correspond to the user interface object; and in response to detecting the air gesture:

in accordance with a determination that one or more eyes of the user were opened in conjunction with the air gesture being detected, selecting the user interface object; and in accordance with a determination that one or more eyes of the user were closed for more than a threshold amount of time in conjunction with the air gesture being detected, forgoing selection of the user interface object.

26. The computer system of claim 25, the one or more programs further including instructions for:

in response to detecting the air gesture:

in accordance with a determination that one or more eyes of the user were not closed for more than the threshold amount of time in conjunction with the air gesture being detected, selecting the user interface object.

27. The computer system of claim 25, the one or more programs further including instructions for:

in response to detecting the air gesture:

in accordance with a determination that one or more eyes of the user were closed for more than the threshold amount of time in conjunction with the air gesture being detected, performing a second operation that is different from selection of the user interface object.

28. The computer system of claim 27, wherein the second operation does not correspond to the user interface object.

29. The computer system of claim 27, the one or more programs further including instructions for:

in response to detecting the air gesture:

in accordance with a determination that one or more eyes of the user were not closed for more than the threshold amount of time in conjunction with the air gesture being detected, forgoing performing the second operation.

30. The computer system of claim 27, the one or more programs further including instructions for:

in response to detecting the air gesture:

in accordance with a determination that one or more eyes of the user were opened in conjunction with the air gesture being detected, forgoing performing the second operation.

31. The computer system of claim 25, wherein:

the user interface object is presented concurrently with a first user interface corresponding to a first application and a second user interface corresponding to a second application different from the first user interface;

the gaze input directed to the user interface object is detected while the first user interface corresponding to the first application and the second user interface corresponding to the second application is concurrently being presented; and selecting the user interface object includes:

in accordance with a determination that one or more eyes of the user were opened in conjunction with the air gesture being detected and that the user interface object was displayed as a part of the first user interface corresponding to the first application, sending a first indication that the air gesture was detected to one or more processes corresponding to the first application; and in accordance with a determination that one or more eyes of the user were opened in conjunction with the air gesture being detected and that the user interface object was displayed as a part of the second user interface corresponding to the second application, sending the first indication that the air gesture was detected to one or more processes corresponding to the second application.

32. The computer system of claim 25, wherein:

the user interface object is presented concurrently with a third user interface corresponding to a third application and a fourth user interface corresponding to a fourth application different from the third user interface;

the gaze input directed to the user interface object is detected while the third user interface corresponding to the third application and the fourth user interface directed to the fourth application is concurrently being presented; and the one or more programs further including instructions for:

in response to detecting the air gesture:

in accordance with a determination that one or more eyes of the user were closed for more than the threshold amount of time in conjunction with the air gesture being detected, sending an indication that the air gesture was detected to one or more processes corresponding to the third application and the fourth application.

33. The computer system of claim 32, the one or more programs further including instructions for:

in response to detecting the air gesture:

in accordance with a determination that one or more eyes of the user were closed for more than the threshold amount of time in conjunction with the air gesture being detected, sending an indication that the one or more eyes of the user were closed to the one or more processes corresponding to the third application and the fourth application.

34. The computer system of claim 32, the one or more programs further including instructions for:

in response to detecting the air gesture:

in accordance with a determination that one or more eyes of the user were closed for more than the threshold amount of time in conjunction with the air gesture being detected, sending an indication of a last user interface object to which a gaze input was detected before a determination was made that one or more eyes of the user were closed to the one or more processes corresponding to the third application and the fourth application.

35. The computer system of claim 32, the one or more programs further including instructions for:

in response to detecting the air gesture:

in accordance with a determination that one or more eyes of the user were closed for less than the threshold amount of time in conjunction with the air gesture being detected and a respective gaze input was directed to the third application before the one or more eyes of the user were closed, sending the indication that the air gesture was detected to one or more processes corresponding to the third application without sending the indication that the air gesture was detected to one or more processes corresponding to the fourth application; and in accordance with a determination that one or more eyes of the user were closed for less than the threshold amount of time in conjunction with the air gesture being detected and the respective gaze input was directed to the fourth application before the one or more eyes of the user were closed, sending the indication that the air gesture was detected to one or more processes corresponding to the third application without sending the indication that the air gesture was detected to one or more processes corresponding to the fourth application.

36. The computer system of claim 25, the one or more programs further including instructions for:

after detecting the gaze input directed to the user interface object, detecting, via the one or more input devices, a touch input directed to the user interface object; and in response to detecting the touch input directed to the user interface object:

in accordance with a determination that one or more eyes of the user were opened while the touch input was detected, selecting the user interface object; and in accordance with a determination that one or more eyes of the user were closed for more than a threshold amount of time while the touch input was detected, selecting the user interface object.

* * * * *